(12) United States Patent
Yamashita et al.

(10) Patent No.: US 7,860,339 B2
(45) Date of Patent: Dec. 28, 2010

(54) VISUAL PROCESSING DEVICE, VISUAL PROCESSING METHOD, VISUAL PROCESSING PROGRAM, INTERGRATED CIRCUIT, DISPLAY DEVICE, IMAGE-CAPTURING DEVICE, AND PORTABLE INFORMATION TERMINAL

(75) Inventors: Haruo Yamashita, Osaka (JP); Akio Kojima, Osaka (JP); Toshiharu Kurosawa, Kanagawa (JP); Yasuhiro Kuwahara, Osaka (JP); Tatsumi Watanabe, Osaka (JP); Yusuke Monobe, Kyoto (JP); Takeshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 974 days.

(21) Appl. No.: 10/571,124

(22) PCT Filed: Sep. 10, 2004

(86) PCT No.: PCT/JP2004/013605
§ 371 (c)(1),
(2), (4) Date: Jan. 16, 2007

(87) PCT Pub. No.: WO2005/027043
PCT Pub. Date: Mar. 24, 2005

(65) Prior Publication Data
US 2007/0188623 A1 Aug. 16, 2007

(30) Foreign Application Priority Data

| Sep. 11, 2003 | (JP) | ............................. 2003-320061 |
| Dec. 26, 2003 | (JP) | ............................. 2003-433324 |
| Jun. 8, 2004 | (JP) | ............................. 2004-169693 |

(51) Int. Cl.
*G06K 9/40* (2006.01)
*G09G 5/02* (2006.01)
*H04N 5/228* (2006.01)

(52) U.S. Cl. ................ 382/274; 382/260; 382/264; 345/600; 345/601; 345/602; 348/222.1

(58) Field of Classification Search ......... 345/600–602; 382/260, 264, 274; 348/222.1
See application file for complete search history.

(56) References Cited

U.S. PATENT DOCUMENTS 4,334,240 A * 6/1982 Franklin ..................... 358/525

(Continued)

FOREIGN PATENT DOCUMENTS

EP 0 732 669 9/1996

(Continued)

OTHER PUBLICATIONS

U.S. Office Action issued Dec. 4, 2009 in U.S. Appl. No. 10/571,120.
Chinese Office Action (along with English language translation) issued Sep. 28, 2007 in Chinese Application No. 200480026254.5.

(Continued)

*Primary Examiner*—Vu Le
*Assistant Examiner*—Soo Jin Park
(74) *Attorney, Agent, or Firm*—Wenderoth, Lind & Ponack, L.L.P.

(57) ABSTRACT

The invention is a visual processing device having a hardware configuration that does not depend on achieving visual processing, wherein the visual processing device includes a spatial processing portion and a visual processing portion. The spatial processing portion performs predetermined processing with respect to an input signal IS that has been received as input, and outputs the result as an unsharp signal US. The visual processing portion outputs an output signal OS, which is the input signal IS after the visual processing, based on a two-dimensional LUT that lists a relationship between the input signal IS, which that has been received as an input, the unsharp signal US, and the output signal OS.

48 Claims, 111 Drawing Sheets

U.S. PATENT DOCUMENTS

| | | | |
|---|---|---|---|
| 4,837,722 A | 6/1989 | Sara |
| 5,454,044 A | 9/1995 | Nakajima |
| 5,454,053 A | 9/1995 | Okubo et al. |
| 5,479,926 A | 1/1996 | Ustuner et al. |
| 5,483,360 A | 1/1996 | Rolleston et al. |
| 5,524,070 A | 6/1996 | Shin et al. |
| 5,608,813 A | 3/1997 | Nakajima |
| 5,774,599 A | 6/1998 | Muka et al. |
| 5,991,457 A | 11/1999 | Ito et al. |
| 6,023,533 A | 2/2000 | Sano et al. |
| 6,069,597 A | 5/2000 | Hansen |
| 6,094,185 A | 7/2000 | Shirriff |
| 6,147,664 A | 11/2000 | Hansen |
| 6,163,621 A | 12/2000 | Paik et al. |
| 6,266,102 B1 | 7/2001 | Azuma et al. |
| 6,275,605 B1 | 8/2001 | Gallagher et al. |
| 6,323,869 B1 | 11/2001 | Kohm et al. |
| 6,324,309 B1 | 11/2001 | Tokuyama et al. |
| 6,411,306 B1 | 6/2002 | Miller et al. |
| 6,480,202 B1 | 11/2002 | Deguchi et al. |
| 6,580,835 B1 | 6/2003 | Gallagher et al. |
| 6,618,045 B1 | 9/2003 | Lin |
| 6,624,828 B1 | 9/2003 | Dresevic et al. |
| 6,650,774 B1 | 11/2003 | Szeliski |
| 6,674,436 B1 | 1/2004 | Dresevic et al. |
| 6,766,055 B2 | 7/2004 | Matsugu et al. |
| 6,813,041 B1 | 11/2004 | Moroney et al. |
| 6,822,762 B2 | 11/2004 | Moroney et al. |
| 6,853,747 B1 | 2/2005 | Matsuura et al. |
| 6,856,704 B1 | 2/2005 | Gallagher |
| 6,915,024 B1 | 7/2005 | Maurer |
| 6,927,784 B2 | 8/2005 | Matsuda et al. |
| 7,046,843 B2 | 5/2006 | Kanai |
| 7,072,507 B2 | 7/2006 | Ohga |
| 7,113,307 B1 | 9/2006 | Ohkubo |
| 7,113,648 B1 | 9/2006 | Aihara |
| 2001/0007599 A1 | 7/2001 | Iguchi et al. |
| 2002/0006230 A1 | 1/2002 | Enomoto |
| 2002/0024529 A1 | 2/2002 | Miller et al. |
| 2002/0051001 A1 | 5/2002 | Kanai |
| 2002/0085752 A1 | 7/2002 | Ohga |
| 2002/0154138 A1* | 10/2002 | Wada et al. ............ 345/600 |
| 2002/0171852 A1 | 11/2002 | Zhang et al. |
| 2003/0053690 A1 | 3/2003 | Trifonov et al. |
| 2003/0058252 A1 | 3/2003 | Matsuda et al. |
| 2003/0095706 A1 | 5/2003 | Kuwata |
| 2003/0103162 A1 | 6/2003 | Sano et al. |
| 2003/0152283 A1 | 8/2003 | Moriwaki |
| 2005/0100242 A1 | 5/2005 | Trifonov et al. |
| 2005/0169553 A1 | 8/2005 | Maurer |
| 2006/0204124 A1 | 9/2006 | Aihara |

FOREIGN PATENT DOCUMENTS

| | | |
|---|---|---|
| EP | 0 440 166 | 7/1999 |
| EP | 0 961 487 | 12/1999 |
| EP | 1 058 209 | 12/2000 |
| EP | 1 130 896 | 9/2001 |
| EP | 1 189 457 | 3/2002 |
| EP | 1 209 621 | 5/2002 |
| EP | 1 302 898 | 4/2003 |
| JP | 58-27145 | 2/1983 |
| JP | 1-106578 | 4/1989 |
| JP | 1-120682 | 5/1989 |
| JP | 2-73783 | 3/1990 |
| JP | 3-48980 | 3/1991 |
| JP | 3-222577 | 10/1991 |
| JP | 4-367162 | 12/1992 |
| JP | 06-070168 | 3/1994 |
| JP | 6-259543 | 9/1994 |
| JP | 7-220066 | 8/1995 |
| JP | 8-2012 | 1/1996 |
| JP | 8-181863 | 7/1996 |
| JP | 9-153132 | 6/1997 |
| JP | 9-168097 | 6/1997 |
| JP | 9-231353 | 9/1997 |
| JP | 09-275496 | 10/1997 |
| JP | 10-13667 | 1/1998 |
| JP | 10-65930 | 3/1998 |
| JP | 10-75395 | 3/1998 |
| JP | 10-154223 | 6/1998 |
| JP | 10-261077 | 9/1998 |
| JP | 2832954 | 10/1998 |
| JP | 10-334218 | 12/1998 |
| JP | 11-27517 | 1/1999 |
| JP | 11-501841 | 2/1999 |
| JP | 11-069181 | 3/1999 |
| JP | 11-122488 | 4/1999 |
| JP | 11-205620 | 7/1999 |
| JP | 2000-4379 | 1/2000 |
| JP | 2000-32281 | 1/2000 |
| JP | 2000-50097 | 2/2000 |
| JP | 2000-57335 | 2/2000 |
| JP | 2000-207548 | 7/2000 |
| JP | 2000-278522 | 10/2000 |
| JP | 2001-69352 | 3/2001 |
| JP | 2001-78047 | 3/2001 |
| JP | 2001-111858 | 4/2001 |
| JP | 2001-243463 | 9/2001 |
| JP | 2001-515229 | 9/2001 |
| JP | 2001-298619 | 10/2001 |
| JP | 2002-44451 | 2/2002 |
| JP | 2002-95021 | 3/2002 |
| JP | 2002-133409 | 5/2002 |
| JP | 2002-204372 | 7/2002 |
| JP | 2002-281333 | 9/2002 |
| JP | 2002-536677 | 10/2002 |
| JP | 2003-46778 | 2/2003 |
| JP | 2003-108109 | 4/2003 |
| JP | 2003-174602 | 6/2003 |
| JP | 2003-242498 | 8/2003 |
| WO | 96/28095 | 9/1996 |
| WO | 99/23637 | 5/1999 |
| WO | 00/45365 | 8/2000 |
| WO | 01/26054 | 4/2001 |
| WO | 02/19307 | 3/2002 |
| WO | 02/27657 | 4/2002 |

OTHER PUBLICATIONS

Chinese Office Action (along with English language translation) issued Sep. 28, 2007 in Chinese Application No. 200480026253.0.

Supplementary European Search Report issued May 8, 2009 in the Application No. EP 04 77 3246.

Supplementary European Search Report issued May 11, 2009 in the Application No. EP 04 77 3245.

Albert M. Vossepoel et al., "Adaptive Histogram Equalization Using Variable Regions", Proceedings of the International Conference on Pattern Recognition (ICPR), Rome, Nov. 14-17, 1988; [Proceedings of the International Conference on Pattern Recognition (ICPR)], Washington, IEEE Comp. Soc. Press, US, vol. 1, Nov. 14, 1988, pp. 351-353.

Frédo Durand et al., "Fast Bilateral Filtering for the Display of High-Dynamic-Range Images", ACM Transactions on Graphics, ACM, US, vol. 21, No. 3, Jul. 1, 2002, pp. 257-266.

Jack Tumblin et al., "Tone Reproduction for Realistic Images", IEEE Computer Graphics and Applications, Nov. 1993, vol. 13, No. 6, pp. 42-48.

Chinese Office Action issued Sep. 28, 2007 for Chinese Application No. 200480026191.3 w/translation.

* cited by examiner

Fig.51

|     | G1 | G2 | ･･･ | G63 | G64 |
|-----|------|------|-----|-----|-----|
| 1   | CS11 | CS12 | ･･･ |     |     |
| 2   | CS21 | CS22 | ･･･ |     |     |
| ⁝   |      |      | ･･･ |     |     |
| 63  |      |      |     |     |     |
| 64  |      |      |     |     |     |

(IS)

141 original image

δ : threshold value [20/256 to 60/256]

(a)

(b)

VISUAL PROCESSING DEVICE, VISUAL PROCESSING METHOD, VISUAL PROCESSING PROGRAM, INTERGRATED CIRCUIT, DISPLAY DEVICE, IMAGE-CAPTURING DEVICE, AND PORTABLE INFORMATION TERMINAL

BACKGROUND OF THE INVENTION

1. Field of Invention

The present invention relates to visual processing devices, in particular to visual processing devices that perform visual processing such as spatial processing or gradation processing of an image signal. Separate aspects of the invention relate to visual processing methods, visual processing programs, integrated circuits, display devices, image-capturing devices, and portable information terminals.

2. Description of the Related Art

Spatial processing and gradation processing are known as techniques for visually processing image signals of an original image. Spatial processing involves using the pixels around a pixel to be filtered when processing that pixel. Further, the technique of using an image signal that has been subjected to spatial processing to perform contrast enhancement or dynamic range (DR) compression, for example, of an original image is known. With contrast enhancement, the difference between the original image and the blur signal (the sharp component of the image) is added to the original image, sharpening the image. With DR compression, a portion of the blur signal is subtracted from the original image, compressing the dynamic range.

Gradation processing is processing in which a lookup table (LUT) is used to transform a pixel value for each pixel being processed without regard for the pixels around the pixel being processed, and is also referred to as "gamma correction." For example, in the case of contrast enhancement, transformation of the pixel value is performed using a LUT that produces a gradation of gray levels that appear frequently (whose area is large) in the original image. Well-known examples of gradation processing using a LUT include gradation processing in which a single LUT is chosen and used for the entire original image (histogram equalization) and gradation processing in which the original image is partitioned into a plurality of image regions and a LUT is chosen and used for each image region (local histogram equalization) (for example, see JP 2000-57335A (pg. 3, FIGS. 13 to 16)).

An example of gradation processing in which an original image is partitioned into a plurality of image regions and a LUT is chosen and used for each image region is described using FIGS. 104 to 107.

FIG. 104 shows a visual processing device 300 that partitions an original image into a plurality of image regions and chooses a LUT to use for each image region. The visual processing device 300 is provided with an image partitioning portion 301 that partitions an original image that has been input as an input signal IS into a plurality of image regions Sm ($1 \leq m \leq n$; where n is the number of partitions of the original image), a gradation transformation curve derivation portion 310 that derives a gradation transformation curve Cm for each image region Sm, and a gradation processing portion 304 that obtains the gradation transformation curves Cm and subjects each image region Sm to gradation processing and outputs the result as an output signal OS. The gradation transformation curve derivation portion 310 comprises a histogram creation portion 302 that creates a brightness histogram Hm for each image region Sm, and a gradation curve creation portion 303 that creates a gradation transformation curve Cm for each image region Sm from the brightness histogram Hm that has been created.

The operations of these portions are described using FIGS. 105 to 107. The image partitioning portion 301 partitions an original image that has been received as an input signal IS into a plurality (n) of image regions (see FIG. 105(a)). The histogram creation portion 302 creates a brightness histogram Hm for each image region Sm (see FIG. 106). Each brightness histogram Hm shows the distribution of the brightness values of all pixels in an image region Sm. That is, the horizontal axes in the brightness histograms Hm shown in FIG. 106(a) to (d) show the brightness level of the input signal IS and the vertical axes show the pixel number. The gradation curve creation portion 303 cumulates the "pixel number" of the brightness histogram Hm in the order of their brightness and this cumulative curve is taken as a gradation transformation curve Cm (see FIG. 107). In the gradation transformation curve Cm shown in FIG. 107, the horizontal axis shows the brightness value of the pixels of the image region Sm in the input signal IS, and the vertical axis shows the brightness value of the pixels of the image region Sm in the output signal OS. The gradation processing portion 304 obtains the gradation transformation curve Cm and transforms the brightness value of the pixels in the image region Sm in the input signal IS based on the gradation transformation curve Cm. By doing this, a gradient is established between the most frequent gradations in each block, and this increases the sense of contrast for each block.

Visual processing that combines spatial processing and gradation processing also is known. Conventional visual processing that combines spatial processing and gradation processing is described below using FIG. 108 and FIG. 109.

FIG. 108 shows a visual processing device 400 that performs edge enhancement and contrast enhancement utilizing unsharp masking. The visual processing device 400 shown in FIG. 108 is provided with a spatial processing portion 401 that performs spatial processing with respect to the input signal IS and outputs an unsharp signal US, a subtracting portion 402 that subtracts the unsharp signal US from the input signal IS and outputs a difference signal DS, an enhancing portion 403 that performs enhancement of the difference signal DS and outputs an enhanced signal TS, and a summing portion 404 that takes the sum of the input signal IS and the enhanced signal TS and outputs an output signal OS.

Here, enhancement processing is performed with respect to the difference signal DS using a linear or non-linear enhancement function. FIG. 109 shows the enhancement functions R1 to R3. The horizontal axis in FIG. 109 marks the difference signal DS and the vertical axis marks the enhanced signal TS. The enhancement function R1 is an enhancement function that is linear with respect to the difference signal DS. The enhancement function R1 is a gain adjustment function expressed for example by $R1(x)=0.5x$ (where x is the value of the difference signal DS). The enhancement function R2 is a non-linear enhancement function with respect to the difference signal DS, and is a function that inhibits extreme contrasts. In other words, a greater inhibitory effect (an inhibitory effect due to a larger inhibition rate) is exhibited with respect to an input x having a large absolute value (where x is the value of the difference signal DS). For example, the enhancement function R2 is expressed by a graph having a smaller slope the larger the absolute value of the input x. The enhancement function R3 is a non-linear enhancement function for the difference signal DS that inhibits the noise component in small amplitudes. That is, a greater inhibitory effect (an inhibitory effect due to a larger inhibition rate) is attained with respect to an input x having a small absolute value (where x is the value of the difference signal DS). For example, the enhancement function R3 is expressed by a graph having a larger slope the greater the absolute value of the input x. The enhancing portion 403 can use any of these enhancement functions R1 to R3.

The difference signal DS is the sharp component of the input signal IS. With the visual processing device 400, the intensity of the difference signal DS is transformed and added to the input signal IS. Thus, the output signal OS is the input signal IS in which the edges and the contrast have been enhanced.

FIG. 110 shows a visual processing device 406 that improves the local contrast (intensity) (for example, see Japanese Patent JP 2832954 (pg. 2, FIG. 5)). The visual processing device 406 shown in FIG. 110 is provided with a spatial processing portion 407, a subtracting portion 408, a first transformation portion 409, a multiplying portion 410, a second transformation portion 411, and a summing portion 412. The spatial processing portion 407 performs spatial processing with respect to the input signal IS and outputs an unsharp signal US. The subtracting portion 408 subtracts the unsharp signal US from the input signal IS and outputs a difference signal DS. The first transformation portion 409 outputs an amplification coefficient signal GS for locally amplifying the difference signal DS based on the intensity of the unsharp signal US. The multiplying portion 410 takes the product of the difference signal DS and the amplification coefficient signal GS and outputs a contrast enhanced signal HS in which the difference signal DS has been locally amplified. The second transformation portion 411 locally corrects the intensity of the unsharp signal US and outputs a corrected unsharp signal AS. The summing portion 412 takes the sum of the contrast enhanced signal HS and the corrected unsharp signal AS and outputs an output signal OS.

The amplification coefficient signal GS is a non-linear weight coefficient that locally corrects the contrast in portions of the input signal IS where the contrast is unsuitable. For this reason, portions of the input signal IS having suitable contrast are output unchanged, and those portions with an unsuitable contrast are corrected and then output.

FIG. 111 shows a visual processing device 416 that performs compression of the dynamic range (for example, see JP 2001-298619A (pg. 3, FIG. 9)). The visual processing device 416 shown in FIG. 111 is provided with a spatial processing portion 417 that performs spatial processing with respect to the input signal IS and outputs an unsharp signal US, a LUT computation portion 418 that uses a LUT to perform an inverse transformation of the unsharp signal US to produce a LUT processed signal LS which it then outputs, and a summing portion 419 that takes the sum of the input signal IS and the LUT processed signal LS and outputs an output signal OS.

The LUT processed signal LS is added to the input signal IS to compress the dynamic range of low-frequency components of the input signal IS (frequency components lower than the cutoff frequency of the spatial processing portion 417). As a result, the dynamic range of the input signal IS is compressed while its high-frequency components are retained.

BRIEF SUMMARY OF THE INVENTION

Conventionally, when performing visual processing that combines gradation processing and spatial processing, it was necessary to adopt a structure that had separate circuits for achieving these different visual processing effects, such as shown in FIG. 108, FIG. 110, and FIG. 111. Thus, a custom-made LSI design was necessary to achieve this visual processing, and this had the disadvantage that it increased the scale of the circuit.

Accordingly, the present invention provides a visual processing device that has a hardware configuration that does not depend on the visual processing that is achieved.

The visual processing device according to a first aspect of the invention comprises input signal processing means and visual processing means. The input signal processing means performs a predetermined processing with respect to an image signal that has been received as an input and outputs a processed signal. The visual processing means transforms the image signal that has been received as input based on transformation means that gives a transformation relationship between the image signal that has been received as input and the processed signal, and an output signal, which is the image signal after visual processing, and outputs the output signal.

Here, the predetermined processing is for example direct or indirect processing with respect to the image signal, and includes processing such as spatial processing or gradation processing for adding a transformation to the pixel value of the image signal.

With the visual processing device of this invention, image processing is performed using transformation means that gives a transformation relationship from the image signal and the processed signal to a visually-processed output signal. Here, the transformation means is for example a lookup table (LUT) that stores values of the output signal with respect to the values of the input signal and the processed signal, or computation means that includes matrix data or the like for outputting an output signal with respect to the values of the image signal and the processed signal. Thus, it is possible to achieve a hardware configuration that does not depend on the function of the transformation means. That is, it is possible to achieve a hardware configuration that is independent of the visual processing to be achieved by the device as a whole.

The visual processing device according to a second aspect of the invention is the visual processing device according to the first aspect of the invention in which the processed signal is a signal that has been obtained by performing the predetermined processing with respect to a pixel being processed and surrounding pixels that surround the pixel being processed in the image signal.

Here, the predetermined processing is for example spatial processing of a pixel being processed using surrounding pixels, and is processing for deriving the mean value, maximum value, or minimum value, for example, of the pixel being processed and the surrounding pixels.

With the visual processing device of this invention, it is possible to achieve different types of visual processing due to the effects of the surrounding pixels, even though the visual processing may be performed with respect to pixels being processed having the same value.

The visual processing device according to a third aspect of the invention is the visual processing device according to the first aspect of the invention in which the transformation relationship given by the transformation means is a relationship in which at least a portion of the image signal or at least a portion of the processed signal, and at least a portion of the image signal, are in a nonlinear relationship.

Here, the nonlinear relationship is for example expressed by a nonlinear function in which the at least some of the values of the output signal are obtained by transforming at least some of the values of the image signal or at least some of the values of the processed signal, or is a relationship that is difficult to define with a function.

With the visual processing device of this invention, it is for example possible to achieve visual processing suited for the visual characteristics of the image signal or visual processing that is suited for the nonlinear properties of the device for outputting the output signal.

The visual processing device according to a fourth aspect of the invention is the visual processing device according to the third aspect of the invention in which the transformation relationship given by the transformation means is a relationship in which both the image signal and processed signal are nonlinear with respect to the output signal.

Here, both the image signal and the processed signal being in a nonlinear relationship with respect to the output signal means that, for example, the value of the output signal is expressed by a nonlinear function having the value of the image signal and the value of the processed signal as its two variables, or that it cannot be easily formalized with a function.

With the visual processing device of this invention, it is for example possible to achieve different visual processing that is in accordance with the value of the processed signal in a case where the image signal values are the same but the processed signal value is different.

The visual processing device according to a fifth aspect of the invention is the visual processing device according to any one of the first to fourth aspects of the invention, in which the transformation relationship given by the transformation means is determined based on a computation for enhancing a value calculated from the image signal and the processed signal.

Here, the value that is calculated from the image signal and the processed signal is for example a value that is obtained by arithmetic computation of the image signal and the processed signal, or a value that is obtained by computing the value of the image signal or the processed signal transformed by a certain function. The computation for enhancing is for example a computation for adjusting the gain, a computation for inhibiting extreme contrasts, or a computation for suppressing small amplitude noise components.

With the visual processing device of this invention, it is possible to enhance the value calculated from the image signal and the processed signal.

The visual processing device according to a sixth aspect of the invention is the visual processing device according to the fifth aspect of the invention in which the computation for enhancing is a nonlinear function.

With the visual processing device of this invention, it is for example possible to achieve enhancement suited for the visual characteristics of the image signal or enhancement that is suited for the nonlinear properties of the device for outputting the output signal.

The visual processing device according to a seventh aspect of the invention is the visual processing device according to the fifth or sixth aspects of the invention in which the computation for enhancing is a transformation that uses a value obtained by transforming the image signal or the processed signal.

The visual processing device according to an eighth aspect of the invention is the visual processing device according to any one of the fifth to seventh aspects of the invention, in which the computation for enhancing is an enhancement function that enhances the difference between each of the transformed values obtained by transforming the image signal and the processed signal.

Here, the enhancement function is for example a function for adjusting the gain, a function for inhibiting extreme contrasts, or a function for suppressing small amplitude noise components.

With the visual processing device of this invention, it is possible to enhance the differences in the image signal and the processed signal after they have been transformed to separate spaces. Thus, it is possible to achieve enhancement that is suited for the viewing properties.

The visual processing device according to a ninth aspect of the invention is the visual processing device according to any one of the fifth to eighth aspects of the invention, in which the computation for enhancing is an enhancement function that enhances the ratio between the image signal and the processed signal.

With the visual processing device of this invention, the ratio of the image signal to the processed signal expresses the sharp component of the image signal. Thus, it is for example possible to perform visual processing that enhances the sharp component.

The visual processing device according to a tenth aspect of the invention is the visual processing device according to the first or second aspects of the invention in which the transformation relationship given by the transformation means is determined based on a transformation that changes brightness.

With the visual processing device of this invention, it is possible to achieve visual processing for changing the brightness of the image signal.

The visual processing device according to an eleventh aspect of the invention is the visual processing device according to the tenth aspect of the invention in which the transformation that changes brightness is a transformation that alters a level or a gain of the image signal.

Here, "changing a level of the image signal" means to for example give offset to the image signal, to change the gain of the image signal, or to change the value of the image signal by performing a calculation that takes the image signal as its variable. Also, "changing the gain of the image signal" means changing the coefficient by which the image signal is multiplied.

The visual processing device according to a twelfth aspect of the invention is the visual processing device according to the tenth aspect of the invention in which the transformation that changes brightness is a transformation that is determined based on the processed signal.

With the visual processing device of this invention, it is for example possible to achieve different transformations in accordance with the value of the processed signal in a case where the values of the processed signals are different but the values of the image signals are the same.

The visual processing device according to a thirteenth aspect of the invention is the visual processing device according to the tenth aspect of the invention in which the transformation that changes brightness is a transformation with which an output signal that monotonically decreases with respect to the processed signal is output.

With the visual processing device of this invention, for example if the processed signal is the image signal after spatial processing, then large areas of darkness in the image are made brighter and large areas of brightness in the image are made darker. Thus, it is for example possible to correct backlight or blooming.

The visual processing device according to a fourteenth aspect of the invention is the visual processing device according to any one of the first to thirteenth aspects of the invention in which the transformation means stores the relationship between the image signal and the output signal as gradation transformation curve groups each having a plurality of gradation transformation curves.

Here, the gradation transformation curve groups are collections of gradation transformation curves for executing gradation processing with respect to a pixel value such as the luminance or brightness of the image signal.

With the visual processing device of this invention, it is possible to perform gradation processing of an image signal using a gradation transformation curve that has been selected from a plurality of gradation transformation curves. Thus, it is possible to perform more appropriate gradation processing.

The visual processing device according to a fifteenth aspect of the invention is the visual processing device according to the fourteenth aspect of the invention in which the processed signal is a signal for selecting a corresponding gradation transformation curve from the plurality of gradation transformation curve groups.

Here, the processed signal is a signal for selecting a gradation transformation curve, and for example is the image signal after it has been subjected to spatial processing.

With the visual processing device of this invention, it is possible to transform the gradation of the image signal using a gradation transformation curve that has been selected by the processed signal.

The visual processing device according to a sixteenth aspect of the invention is the visual processing device according to the fifteenth aspect of the invention in which the value of the processed signal is associated with at least one gradation transformation curve included in the plurality of gradation transformation curve groups.

Here, at least one gradation transformation curve to be used in gradation processing is selected based on the value of the processed signal.

With the visual processing device of this invention, at least one gradation transformation curve is selected based on the value of the processed signal. Further, the gradation of the image signal is transformed using the gradation transformation curve(s) that has been selected.

The visual processing device according to a seventeenth aspect of the invention is the visual processing device according to any one of the first to sixteenth aspects of the invention, in which the transformation means includes a lookup table (hereinafter, "LUT"), and wherein profile data that have been created in advance through a predetermined computation are registered to the LUT.

With the visual processing device of this invention, visual processing is performed using a LUT to which profile data that have been created in advance have been registered. Thus, a process for creating profile data, for example, is not necessary at the time of visual processing, and this allows visual processing to be executed faster.

The visual processing device according to an eighteenth aspect of the invention is the visual processing device according to the seventeenth aspect of the invention in which the LUT can be changed through the registration of profile data.

Here, the profile data are data of the LUT that accomplish different types of visual processing.

With the visual processing device of this invention, the visual processing that is achieved can be varied widely due to the registration of profile data. That is, various manner of visual processing can be achieved without changing the hardware configuration of the visual processing device.

The visual processing device according to a nineteenth aspect of the invention is the visual processing device according to the seventeenth or eighteenth aspects of the invention, further comprising profile data registration means for registering profile data to the visual processing means.

Here, the profile data registration means registers profile data that have been calculated in advance to the visual processing means in correspondence with the visual processing.

With the visual processing device of this invention, the visual processing that is achieved can be widely varied by registering profile data. That is, various manner of visual processing can be achieved without changing the hardware configuration of the visual processing device.

The visual processing device according to a twentieth aspect of the invention is the visual processing device according to the nineteenth aspect of the invention in which the visual processing means obtains profile data that have been created by an external device.

The profile data are created in advance by an external device. The external device is for example a computer having a CPU and program capable of creating profile data. The visual processing means obtains the profile data. This obtaining is accomplished over a network or via a recording medium. The visual processing means uses the profile data that it has obtained to execute visual processing.

With the visual processing device of this invention, it is possible to execute visual processing using profile data that have been created by an external device.

The visual processing device according to a twenty-first aspect of the invention is the visual processing device according to the twentieth aspect of the invention in which the LUT can be changed by the profile data that have been obtained.

With the visual processing device of this invention, the profile data that have been obtained are registered as a new LUT. Thus, it is possible to change the LUT and thereby achieve different visual processing.

The visual processing device according to a twenty-second aspect of the invention is the visual processing device according to the twentieth or twenty-first aspects of the invention in which the visual processing means obtains the profile data over a communications network.

Here, a communications network refers to connection means that is capable of communication, such as a dedicated line, a public telephone line, the Internet, or a LAN, and can be a wired or wireless connection.

With the visual processing device of this invention, it is possible to achieve visual processing using profile data that have been obtained via a communications network.

The visual processing device according to a twenty-third aspect of the invention is the visual processing device according to the seventeenth aspect of the invention, further comprising profile data creation means that creates profile data.

The profile data creation means for example creates profile data using properties of the image signal or the processed signal, for example.

With the visual processing device of this invention, it is possible to execute visual processing using profile data that have been created by the profile data creation means.

The visual processing device according to a twenty-fourth aspect of the invention is the visual processing device according to the twenty-third aspect of the invention in which the profile data creation means creates the profile data based on a histogram of a gradation property of the image signal.

With the visual processing device of this invention, visual processing is achieved using profile data that have been created based on a histogram of the gradation properties of the image signal. Thus, it is possible to accomplish appropriate visual processing based on the properties of the image signal.

The visual processing device according to a twenty-fifth aspect of the invention is the visual processing device according to the seventeenth aspect of the invention in which the profile data that are registered to the LUT are switched in accordance with a predetermined condition.

With the visual processing device of this invention, visual processing is achieved using profile data that are switched based on a predetermined condition. Thus, it is possible to accomplish more appropriate visual processing.

The visual processing device according to a twenty-sixth aspect of the invention is the visual processing device according to the twenty-fifth aspect of the invention in which the predetermined condition is a condition relating to the brightness.

With the visual processing device of this invention, it is possible to achieve more appropriate visual processing under the condition relating to the brightness.

The visual processing device according to a twenty-seventh aspect of the invention is the visual processing device according to the twenty-sixth aspect of the invention in which the brightness is the brightness of the image signal.

With the visual processing device of this invention, it is possible to achieve more appropriate visual processing under the condition relating to the brightness of the image signal.

The visual processing device according to a twenty-eighth aspect of the invention is the visual processing device according to the twenty-seventh aspect of the invention, further comprising brightness determination means that determines the brightness of the image signal. The profile data registered to the LUT are switched in accordance with results of a determination by the brightness determination means.

Here, the brightness determination means for example determines the brightness of the image signal based on a pixel value such as the luminance or the brightness of the image signal. Further, it is possible to switch between profile data based on the results of this determination.

With the visual processing device of this invention, it is possible to achieve more appropriate visual processing, based on the brightness of the image signal.

The visual processing device according to a twenty-ninth aspect of the invention is the visual processing device according to the twenty-sixth aspect of the invention, further comprising brightness input means that allows a condition relating to the brightness to be input. The profile data registered to the LUT are switched in accordance with results of an input by the brightness input means.

Here, the brightness input means is for example a switch or the like, connected through a wired or wireless connection, which allows the user to input conditions relating to the brightness.

With the visual processing device of this invention, a user can determine a condition relating to the brightness, and through the brightness input means switch between profile data. Thus, it is possible to accomplish visual processing that is more suited for the user.

The visual processing device according to a thirtieth aspect of the invention is the visual processing device according to the twenty-ninth aspect of the invention in which the brightness input means allows the brightness of the output environment of the output signal, or the brightness of the input environment of the input signal, to be input.

Here, the brightness of the output environment is for example the brightness of the ambient light around the medium that outputs the output signal, such as a computer, television, digital camera, portable telephone, or PDA, or is the brightness of the medium itself to which the output signal will be output, such as the printer paper. The brightness of the input environment is for example the brightness of the medium itself to which the input signal will be input, such as scanner paper.

With the visual processing device of this invention, it is for example possible for the user to determine a condition relating to the brightness of the room, for example, and through the brightness input means to switch between profile data. Thus, it is possible to accomplish visual processing that is more suited for the user.

The visual processing device according to a thirty-first aspect of the invention is the visual processing device according to the twenty-sixth aspect of the invention, further comprising brightness detection means that detects at least two types of brightness. The profile data registered to the LUT are switched in accordance with results of a detection by the brightness detection means.

Here, the brightness detection means is for example means for detecting the brightness of the image signal based on a pixel value such as the luminance or the brightness of the image signal, means such as a photo sensor for detecting the brightness of the output environment or the input environment, or means for detecting conditions relating to the brightness that has been input by the user. It should be noted that the brightness of the output environment is for example the brightness of the ambient light around the medium itself to which the output signal will be output, such as a computer, television, digital camera, portable telephone, or PDA, or is the brightness of the medium itself to which the output signal will be output, such as the printer paper. The brightness of the input environment is for example the brightness of the medium itself from which the input signal is input, such as scanner paper.

With the visual processing device of this invention, at least two types of brightness are detected and based on these the profile data are switched. Thus, it is possible to achieve more appropriate visual processing.

The visual processing device according to a thirty-second aspect of the invention is the visual processing device according to the thirty-first aspect of the invention in which the brightness that is detected by the brightness detection means includes the brightness of the image signal, and the brightness of the output environment of the output signal or the brightness of the input environment of the input signal.

With the visual processing device of this invention, it is possible to achieve more appropriate visual processing in correspondence with the brightness of the image signal and the brightness of the output environment of the output signal or the brightness of the input environment of the input signal.

The visual processing device according to a thirty-third aspect of the invention is the visual processing device according to the twenty-fifth aspect of the invention, further comprising profile data selection means that allows the profile data registered to the LUT to be selected. The profile data registered to the LUT are switched in accordance with results of a selection by the profile data selection means.

The profile data selection means allows the user to select profile data. Further, with this visual processing device, visual processing is achieved using the profile data that have been selected.

With the visual processing device of this invention, it is possible for the user to select profile data based on his or her preferences and using this to perform visual processing.

The visual processing device according to a thirty-fourth aspect of the invention is the visual processing device according to the thirty-third aspect of the invention in which the profile data selection means is an input device for performing the selection of profile data.

Here, the input device is for example a switch that is provided in, or connected to, wirelessly or through wired connection, the visual processing device.

With the visual processing device of this invention, the user can use the input device to select preferred profile data.

The visual processing device according to the thirty-fifth aspect of the invention is the visual processing device according to the twenty-fifth aspect of the invention, further comprising image property determination means that determines an image property of the image signal. The profile data registered to the LUT are switched in accordance with results of a determination by the image property determination means.

The image property determination means determines an image property, such as the luminance, brightness, or spatial frequency, of the image signal. The visual processing device uses the profile data that have been switched in accordance with results of a determination by the image property determination means to accomplish visual processing.

With the visual processing device of this invention, the image property determination means automatically selects profile data corresponding to the image property. Thus, it is possible to execute visual processing using profile data that are more appropriate for the image signal.

The visual processing device according to a thirty-sixth aspect of the invention is the visual processing device according to the twenty-fifth aspect of the invention, further comprising user authentication means that authenticates the user. The profile data registered to the LUT are switched according to the result of the authentication by the user authentication means.

The user authentication means is for example an input device or a camera for authenticating the user.

With the visual processing device of this invention, it is possible to achieve visual processing that is suited for the user that has been authenticated by the user authentication means.

The visual processing device according to a thirty-seventh aspect of the invention is the visual processing device according to the seventeenth aspect of the invention in which the visual processing means performs an interpolation computation of the values stored in the LUT and outputs the result as an output signal.

The LUT stores values with respect to values of the image signal or values of the processed signal at a predetermined interval. By performing interpolation computation of the values of the LUT corresponding to a section that includes the value of the image signal that has been received as input or the value of the processed signal, it is possible to output a value for the output signal that corresponds to the value of the image signal that has been received as input or the value of the processed signal.

With the visual processing device of this invention, it is not necessary for the LUT to store a value for all of the values that the image signal or the processed signal can take, and this allows the amount of memory for the LUT to be reduced.

The visual processing device according to a thirty-eighth aspect of the invention is the visual processing device according to the thirty-seventh aspect of the invention in which the interpolation computation is linear interpolation based on the values of the lower bits of at least one of the image signal or the processed signal, which are expressed in binary form.

The LUT stores values corresponding to the values of the upper bits of the image signal or the processed signal. The visual processing means performs linear interpolation of the values of the LUT corresponding to the section including the value of image signal that has been input or the processed signal with the values of the lower bits of the image signal or the processed signal, and outputs the result as an output signal.

With the visual processing device of this invention, it is possible to store the LUT using a smaller memory amount while achieving even more accurate visual processing.

The visual processing device according to a thirty-ninth aspect of the invention is the visual processing device according to any one of the first to thirty-eighth aspects of the invention in which the input signal processing means performs spatial processing of the image signal.

With the visual processing device of this invention, it is possible to use the image signal and the image signal after spatial processing to perform visual processing using a LUT.

The visual processing device according to a fortieth aspect of the invention is the visual processing device according to the thirty-ninth aspect of the invention in which the input signal processing means creates an unsharp signal from the image signal.

Here, "unsharp signal" means the signal that is obtained by directly or indirectly spatially processing the image signal.

With the visual processing device of this invention, it is possible to use the image signal and the unsharp signal to achieve visual processing using a LUT.

The visual processing device according to a forty-first aspect of the invention is the visual processing device according to the thirty-ninth or fortieth aspects of the invention in which the spatial processing leads to the derivation of a mean value, a maximum value, or a minimum value of the image signal.

Here, the mean value can be the simple mean or the weighted mean of the image signal.

With the visual processing device of this invention, it is possible to achieve visual processing through a LUT using the image signal and a mean value, a maximum value, or a minimum value of the image signal.

The visual processing device according to a forty-second aspect of the invention is the visual processing device according to any one the first to forty-first aspects of the invention in which the visual processing means performs spatial processing and gradation processing using the image signal that has been received as input and the processed signal.

With the visual processing device of this invention, it is possible to use a LUT to simultaneously achieve spatial processing and gradation processing.

The visual processing method according to a fourth-third aspect of the invention comprises an image signal processing step and a visual processing step. The input signal processing step is a step of performing a predetermined processing with respect to an image signal that has been received as input and outputting the result as a processed signal. The visual processing step is a step of transforming the image signal that has been received as input based on transformation means that gives a relationship between the image signal that has been received as input and the processed signal, and an output signal, which is the image signal after visual processing, and outputting an output signal.

Here, the predetermined processing is for example direct or indirect processing with respect to the image signal, and includes a process of adding a transformation to the pixel values of the image signal, such as spatial processing or gradation processing.

With the visual processing method of this invention, visual processing is performed using transformation means that gives a transformation relationship of the image signal and the processing signal with respect to the visually processed output signal. For this reason, other than the transformation means it is possible to use generalized hardware or software. That is, it is possible to adopt a hardware configuration or a software configuration that is not dependant on the function of the visual processing. Thus, one effect that follows from this is that hardware costs can be curtailed and generalized software can be adopted.

The visual processing program according to a fourth-fourth aspect of the invention is a visual processing program for performing a visual processing method on a computer, causing the computer to perform a visual processing method that comprises an image signal processing step and a visual processing step. The input signal processing step is a step of performing a predetermined processing with respect to an image signal that has been received as input and outputting the result as a processed signal. The visual processing step is a step of transforming the image signal that has been received as input based on transformation means that gives a relationship between the image signal that has been received as input and the processed signal, and an output signal, which is the image signal after visual processing, and outputting an output signal.

Here, the predetermined processing is for example direct or indirect processing of the image signal, and includes a process of adding a transformation to the pixel values of the image signal, such as spatial processing or gradation processing.

With the visual processing program of this invention, visual processing is performed using transformation means that gives a transformation relationship of the image signal and the processed signal with respect to the visually processed output signal. For this reason, other than the transformation means it is possible to use generalized software. That is, it is possible to adopt a software configuration that is not dependant on the function of the visual processing. Thus, one effect that follows from this is that generalized software can be adopted.

The integrated circuit according to a forty-fifth aspect of the invention includes the visual processing device according to any one of the first to forty-second aspects of the invention.

With the integrated circuit of this invention, it is possible to obtain the same effects as any of the visual processing devices according to the first to forty-second aspects of the invention.

The display device according to a forty-sixth aspect of the invention comprises a visual processing device according to any one of the first to forty-second aspects of the invention, and display means that performs a display of the output signal that has been output from the visual processing device.

With the display device of this invention, it is possible to obtain the same effects as any of the visual processing devices according to the first to forty-second aspects of the invention.

The image-capturing device according to a forty-seventh aspect of the invention comprises image-capturing means that captures an image, and a visual processing device according to any one of the first to forty-second aspects of the invention that visually processes the image that has been captured by the image-capturing means as the image signal.

With the image-capturing device of this invention, it is possible to obtain the same effects as any of the visual processing devices according to the first to forty-second aspects of the invention.

The portable information terminal according to a forty-eighth aspect of the invention comprises data reception means that receives image data that have been transmitted or broadcast, a visual processing device according to any one of the first to forty-second aspects of the invention that visually processes as the image signal the image data that have been received, and display means that performs a display of the image signal that has been visually processed by the visual processing device.

With the portable information terminal of this invention, it is possible to obtain the same effects as any of the visual processing devices according to the first to forty-second aspects of the invention.

The portable information terminal according to a forty-ninth aspect of the invention comprises image-capturing means that captures an image, a visual processing device according to any one of the first to forty-second aspects of the invention that visually processes as the image signal the image that has been captured by the image-capturing means, and data transmission means that transmits the visually-processed image signal.

With the portable information terminal of this invention, it is possible to obtain the same effects as any of the visual processing devices according to the first to forty-second aspects of the invention.

With the visual processing device of the invention, it is possible to provide a visual processing device that has a hardware configuration that does not depend on the visual processing that is to be achieved.

BRIEF DESCRIPTION OF DRAWINGS

FIG. 51 is an explanatory diagram describing the two-dimensional LUT 141 (fifth embodiment).

DETAILED DESCRIPTION OF THE INVENTION

Hereinafter, first through eleventh embodiments serving as best modes for implementing the present invention will be described.

The first embodiment describes a visual processing device that employs a two-dimensional LUT.

The second embodiment describes a visual processing device that performs correction of the ambient light when ambient light is present in the environment in which the image is to be displayed.

The third embodiment describes applied examples of the first embodiment and the second embodiment.

The fourth through sixth embodiments describe visual processing devices that achieve a gradation processing that increases the visual effect.

The seventh embodiment describes a visual processing device that performs visual processing using a suitable blur signal.

The eighth embodiment describes applied examples of the fourth through seventh embodiments.

The ninth embodiment describes applied examples of the first through eighth embodiments.

The tenth embodiment describes an example in which the visual processing devices of the above embodiments are adopted in a display device.

The eleventh embodiment describes an example in which the visual processing devices of the above embodiments are adopted in an image-capturing device.

First Embodiment

A visual processing device 1 that employs a two-dimensional LUT is described below as a first embodiment of the present invention using FIGS. 1 to 10. A modified example of this visual processing device is described using FIGS. 11 to 14. Further, a visual processing device that achieves visual processing that is equivalent to that of the visual processing device 1 is described using FIGS. 15 to 23.

The visual processing device 1 is a device for performing visual processing such as spatial processing and gradation processing of an image signal. The visual processing device 1, together with a device that performs color processing of an image signal, constitutes an image processing device in a device that handles images, such as a computer, a television, a digital camera, a portable telephone, a PDA, a printer, or a scanner.

<Visual Processing Device 1>

Figure 1:
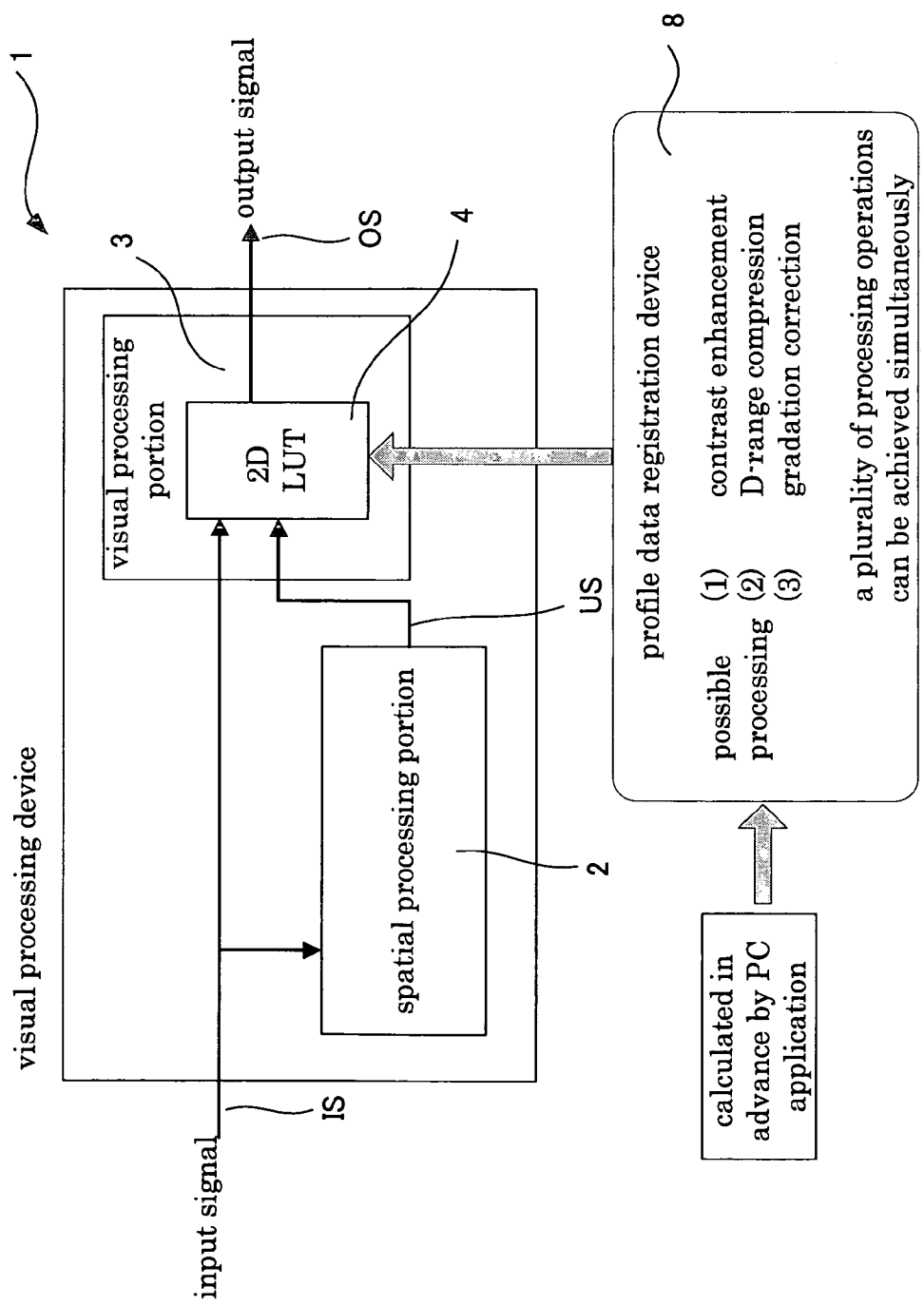
FIG. 1 is a block diagram describing the structure of the visual processing device 1 (first embodiment).

FIG. 1 shows the basic structure of the visual processing device 1, which performs visual processing of an image signal (input signal IS) and outputs the result as a visually processed image (output signal OS). The visual processing device 1 is provided with a spatial processing portion 2 that performs spatial processing of the luminance value of each pixel of an original image that has been obtained as an input signal IS and outputs the result as an unsharp signal US, and a visual processing portion 3 that performs visual processing of the original image using the input signal IS and the unsharp signal US for the same pixel and outputs the result as an output signal OS.

The spatial processing portion 2 for example obtains the unsharp signal US with a low-pass spatial filter that permits the passage of only the low-frequency space of the input signal IS. As the low-pass spatial filter it is possible to use a FIR (Finite Impulse Response)-type low-pass spatial filter or an IIR (Infinite Impulse Response)-type low-pass spatial filter, which are commonly used to create unsharp signals.

The visual processing portion 3 has a two-dimensional LUT 4 that lists the relationship between the input signal IS and the unsharp signal US, and the output signal OS, and references the two-dimensional LUT 4 with the input signal IS and the unsharp signal US and outputs an output signal OS.

<Two-Dimensional LUT 4>

Matrix data referred to as profile data are registered to the two-dimensional LUT 4. The profile data has a row (or column) for each pixel value of the input signal IS and a column (or row) for each pixel value of the unsharp signal US, and the pixel values of the output signal OS that correspond to the combination of the input signal IS and the unsharp signal US are stored as elements of the rows and columns. The profile data are registered to the two-dimensional LUT 4 by a profile data registration device 8 that is provided in or connected to the visual processing device 1. The profile data registration device 8 stores data of a plurality of profiles that have been created in advance by a personal computer (PC) or the like. For example, it stores data of a plurality of profiles for achieving contrast enhancement, D-range compression, or gradation correction, for example (for a more detailed description, see the section <Profile Data> below). Thus, with the visual processing device 1, the profile data registration device 8 can be used to change the profile data registered to the two-dimensional LUT 4, and this allows a variety of types of visual processing to be achieved.

Figure 2:
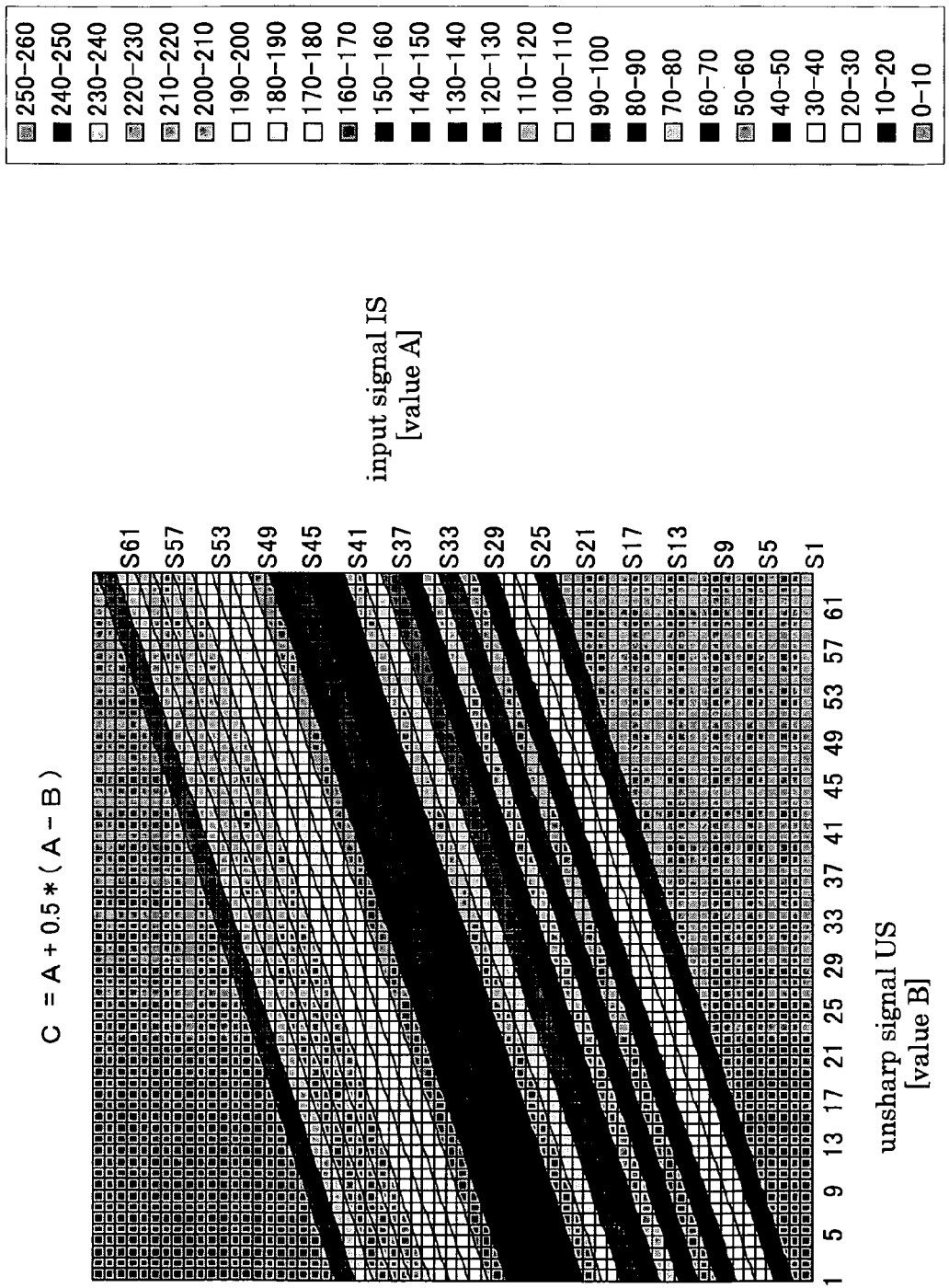
FIG. 2 is an example of the profile data (first embodiment).

An example of the profile data is shown in FIG. 2. The profile data shown in FIG. 2 causes the visual processing device 1 to execute processing equivalent to that of the visual processing device 400 shown in FIG. 108. In FIG. 2, the profile data takes the form of a 64×64 matrix in which the values of the upper six bits of the luminance values of the 8-bit input signal IS are shown in the column direction (vertical direction) and the value of the upper six bits of the luminance value of the 8-bit unsharp signal US are shown in the row direction (horizontal direction). The value of the output signal OS is expressed in 8 bits value as the matrix element corresponding to the two luminance values.

The value C of each element of the profile data shown in FIG. 2 (the value of the output signal OS) is expressed as $C=A+0.5*(A-B)$ (hereinafter, this is referred to as Equation M11), using the value A of the input signal IS (which is a value obtained by discarding the lower two bits of the 8 bit input signal IS) and the value B of the unsharp signal US (which is a value that is obtained by discarding the lower two bits of the 8-bit unsharp signal US). In other words, it can be seen that the visual processing device 1 performs processing equivalent to processing by the visual processing device 400 (see FIG. 108) using the enhancement function R1 (see FIG. 109).

It should be noted that depending on the combination of the value A of the input signal IS and the value B of the unsharp signal US, the value C obtained from Eq. M11 may be a negative value. In this case, the element of the profile data corresponding to the value A of the input signal IS and the value B of the unsharp signal US may be set to the value 0. Further, depending on the combination of the value A of the input signal IS and the value B of the unsharp signal US, the value C obtained from Eq. M11 may be saturated. That is, it may exceed the maximum value of 255 that can be expressed with 8 bits. In this case, the element of the profile data corresponding to the value A of the input signal IS and the value B of the unsharp signal US may be set to the value 255. In FIG. 2, the elements of the profile data found in this manner are shown by contour line.

Figure 110:
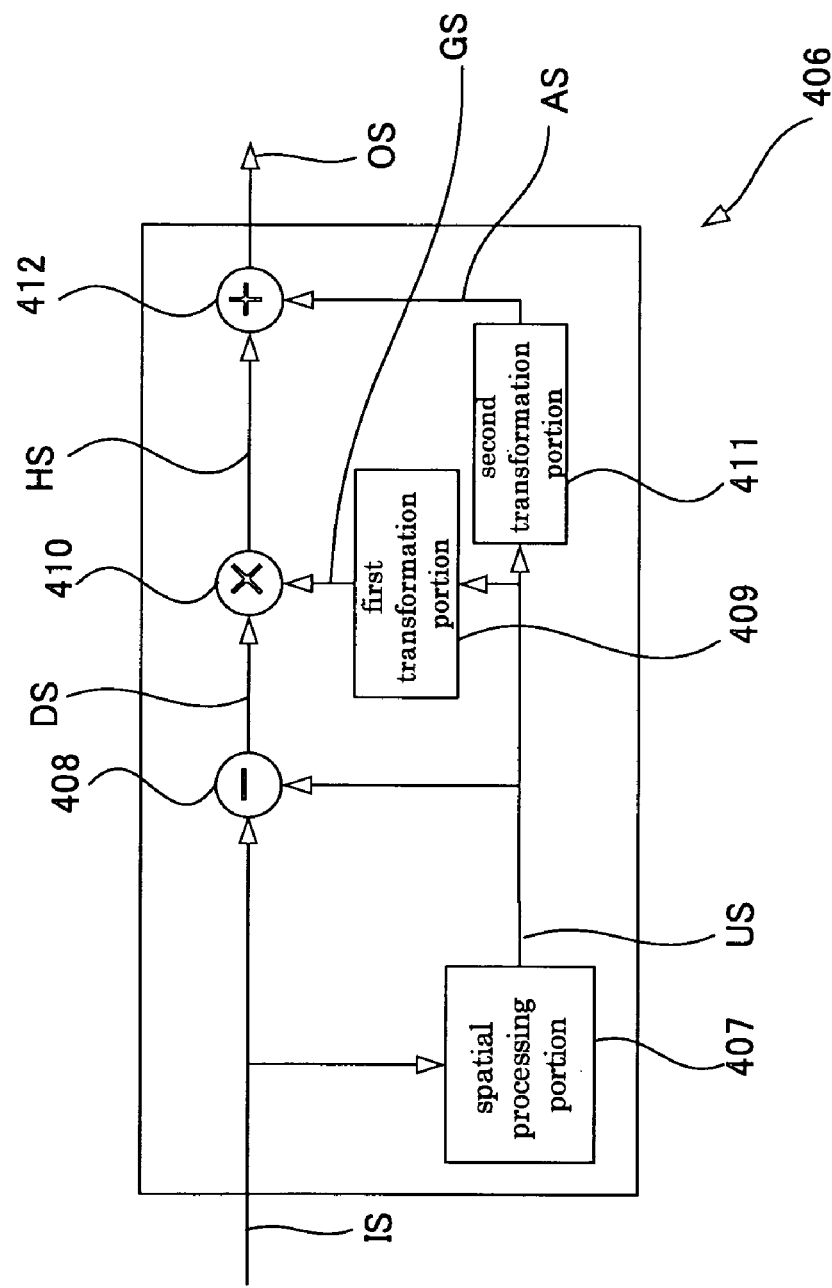
FIG. 110 is a block diagram describing the structure of the visual processing device 406, which performs an improvement of the local contrast (background art).

When using profile data in which the value C of the elements is expressed as $C=R6(B)+R5(B)*(A-B)$ (hereinafter, this is referred to as Equation M12), processing equal to that of the visual processing device 406 shown in FIG. 110 can be achieved. Here, the function R5 is that of the first transformation portion 409 outputting an amplification coefficient signal GS from the unsharp signal US, and the function R6 is that of the second transformation portion 411 outputting a corrected unsharp signal AS from the unsharp signal US.

Figure 111:
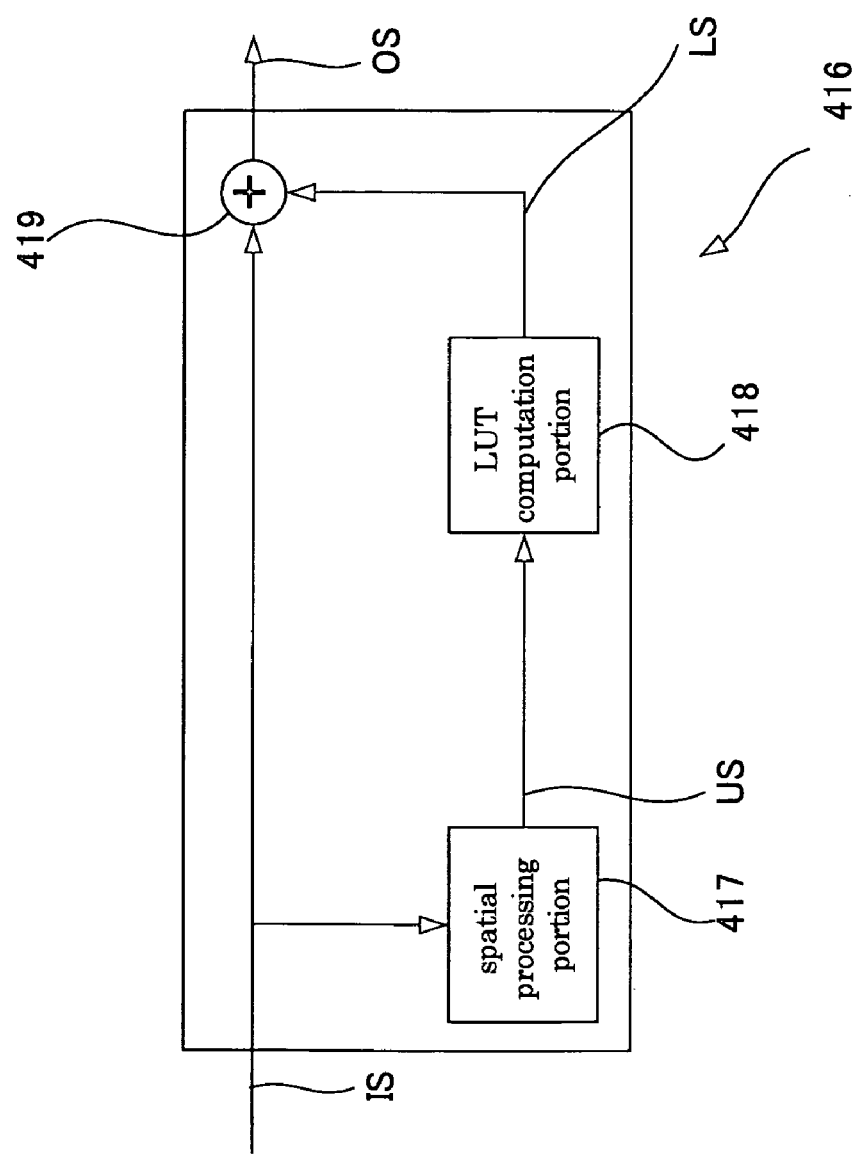
FIG. 111 is a block diagram describing the structure of the visual processing device 416, which performs a compression of the dynamic range (background art).

When using profile data in which the values C of the elements are expressed by $C=A+R8(B)$ (hereinafter, this is referred to as Equation M13), processing equivalent to that of the visual processing device 416 shown in FIG. 111 can be achieved. Here, the function R8 is that of outputting a LUT processed signal LS from the unsharp signal US.

It should be noted that if the value C of a particular element of the profile data found through Eq. M12 or Eq. M13 is outside the range $0 \leq C \leq 255$, then the value C of that element can be regarded as 0 or 255.

<Visual Processing Method and Visual Processing Program>

Figure 3:
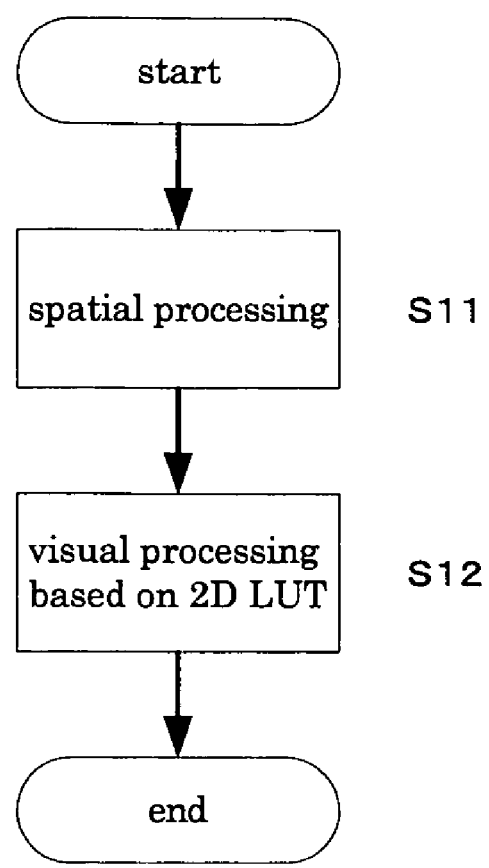
FIG. 3 is a flowchart for describing the visual processing method (first embodiment).

FIG. 3 shows a flowchart that describes the visual processing method of the visual processing device 1. The visual processing method shown in FIG. 3 is a method for performing visual processing of an input signal IS (see FIG. 1), and is achieved by the hardware in the visual processing device 1.

With the visual processing method shown in FIG. 3, an input signal IS is spatially processed by the low-pass spatial filter (step S11) to obtain an unsharp signal US. The value of the two-dimensional LUT 4 that corresponds to the input signal IS and the unsharp signal US is looked up and this value is output as the output signal OS (step S12). The above processing is performed for each pixel that is received as an input signal IS.

It should be noted that each step of the visual processing method shown in FIG. 3 can also be achieved on a computer, for example, as a visual processing program.

<Effects>

(1)

When visual processing is performed based on only the value A of the input signal IS (for example, in the case of performing a transformation based on a one-dimensional gradation transformation curve), if pixels having the same darkness are present at different areas in the image, then the two are transformed to the same brightness. More specifically, when brightening a dark area in the background of a person in an image, hair of that person having the same darkness will also be brightened.

In contrast to this, the visual processing device 1 performs visual processing using profile data that have created based on a two-dimensional function and correspond to the value A of an input signal IS and the value B of an unsharp signal US. For this reason, pixels having the same darkness that are present at different areas within the image are not transformed uniformly but instead can be made brighter or darker taking into account information on their surroundings, and this allows each region of the image to be adjusted to an ideal brightness. More specifically, a background that has the same darkness as the hair of a person in the image can be brightened without changing the darkness of the hair.

(2)

With the visual processing device 1, visual processing of the input signal IS is performed using the two-dimensional LUT 4. The visual processing device 1 has a hardware configuration that is independent of the visual processing effect that is to be achieved. That is, the visual processing device 1 can be constituted by generalized hardware, and this is useful for reducing hardware costs, for example.

(3)

The profile data that are registered to the two-dimensional LUT 4 can be changed by the profile data registration device 8. Thus, by changing the profile data it is possible for the visual processing device 1 to achieve various types of visual processing, without changing the hardware configuration of the visual processing device 1. More specifically, the visual processing device 1 is capable of simultaneously executing spatial processing and gradation processing.

(4)

The profile data that are registered to the two-dimensional LUT 4 can be calculated in advance. For profile data that have been created already, the amount of time required for visual processing using those data is the same regardless of the complexity of the processing. Thus, it is possible to increase the speed of visual processing by using the visual processing device 1 because the processing time does not depend on the complexity of the visual processing, even if the visual processing requires a complex structure when configured by hardware or software.

<Modified Examples>

(1)

FIG. 2 shows profile data in the form of a 64×64 matrix. Here, the effect of the present invention does not depend on the size of the profile data. For example, the two-dimensional LUT 4 can also have profile data that correspond to all the combinations of values possible from the input signal IS and the unsharp signal US. For example, if the input signal IS and the unsharp signal US are expressed with 8 bits, then the profile data can take the form of a 256×256 matrix.

In this case, although the memory capacity required for the two-dimensional LUT 4 increases, more accurate visual processing can be achieved.

(2)

In FIG. 2, the profile data have been explained as storing the values of the output signals OS for the values of the upper six bits of the luminance value of the 8-bit input signal IS and the values of the upper six bits of the luminance value of the 8-bit unsharp signal US. Here, it is also possible that the visual processing device 1 is further provided with an interpolation portion that performs linear interpolation of the value of the output signal OS based on the adjacent elements of the profile data and the size of the lower two bits of the input signal IS and the unsharp signal US.

In this case, more accurate visual processing can be achieved without increasing the memory capacity necessary for the two-dimensional LUT 4.

The interpolating portion may be provided in the visual processing portion 3 and may output as an output signal OS a value that is obtained by linearly interpolating the values stored in the two-dimensional LUT 4.

Figure 4:
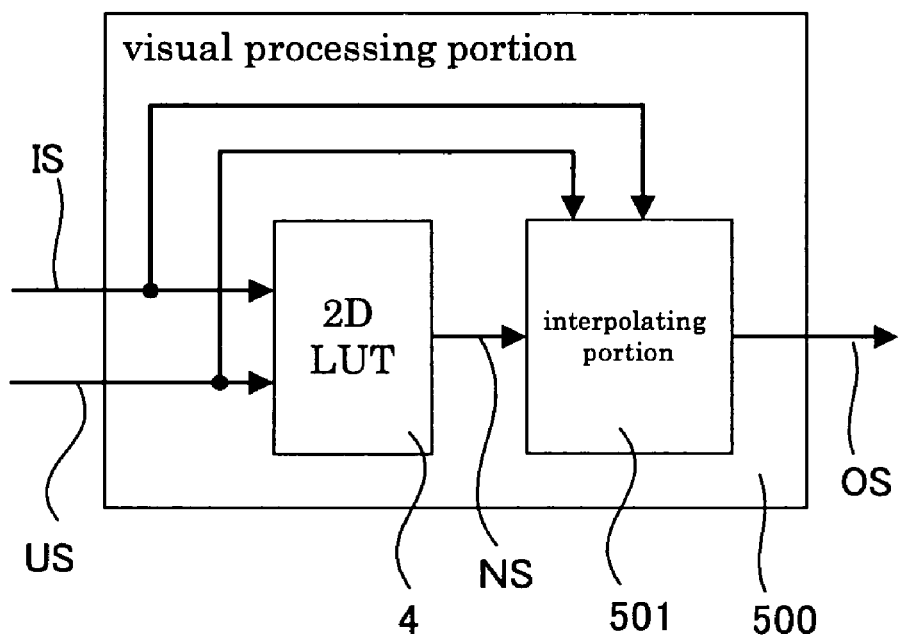
FIG. 4 is a block diagram describing the structure of the visual processing portion 500 (first embodiment).

FIG. 4 shows a visual processing portion 500 provided with an interpolating portion 501, as a modified example of the visual processing portion 3. The visual processing portion 500 is provided with a two-dimensional LUT 4 that lists the relationship between an input signal IS and an unsharp signal US and a pre-interpolation output signal NS, and the interpolating portion 501, which receives the pre-interpolation output signal NS, the input signal IS and the unsharp signal US and outputs an output signal OS.

The two-dimensional LUT 4 stores the values of the pre-interpolation output signal NS for the values of the upper six bits of the luminance of the 8-bit input signal IS and the values of the upper six bits of the luminance of the 8-bit unsharp signal US. The values of the pre-interpolation output signal NS are for example stored as 8-bit values. When the two-dimensional LUT 4 receives the 8-bit value of the input signal IS and the 8-bit value of the unsharp signal US, it outputs the values of the four pre-interpolation output signals NS corresponding to the section including each of the values. The section including each of the values is the section surrounded by the four pre-interpolation output signals NS stored for the combinations of (the value of the upper six bits of the input signal IS, the value of the upper six bits of the unsharp signal US), (the smallest six-bit value that exceeds the value of the upper six bits of the input signal IS, the value of the upper six bits of the unsharp signal US), (the value of the upper six bits of the input signal IS, the smallest six-bit value that exceeds the value of the upper six bits of the unsharp signal US), and (the smallest six-bit value that exceeds the value of the upper six bits of the input signal IS, the smallest six-bit value that exceeds the value of the upper six bits of the unsharp signal US).

The value of the lower two bits of the input signal IS and the value of the lower two bits of the unsharp signal US are input to the interpolating portion 501, and using these values, the interpolating portion 501 performs linear interpolation of the values of the four pre-interpolation output signals NS output by the two-dimensional LUT 4. More specifically, the interpolating portion 501 uses the value of the lower two bits of the input signal IS and the value of the lower two bits of the unsharp signal US to calculate the weighted mean of the values of the four pre-interpolation output signals NS, and outputs this as the output signal OS.

Through the above, more accurate visual processing can be achieved without increasing the memory capacity required for the two-dimensional LUT 4.

It should be noted that it is also possible for the interpolating portion 501 to perform linear interpolation of only one of either the input signal IS or the unsharp signal US.

(3)

With the spatial processing performed by the spatial processing portion 2, as the unsharp signal US for the input signal IS of a pixel being processed it is also possible to output the mean value (simple mean or weighted mean), the maximum value, the minimum value, or the median value of the input signal IS of the pixel being processed and the pixels surrounding the pixel being processed. It is further possible to output the mean value (simple mean or weighted mean), the maximum value, the minimum value, or the median value of only the pixels surrounding the pixel being processed as the unsharp signal US.

(4)

In FIG. 2, the values C of the elements of the profile data are created based on the linear function M11 performed with respect to each of the value A of the input signal IS and the value B of the unsharp signal US. However, it is also possible to create the values C of the elements of the profile data based on a non-linear function with respect to the value A of the input signal IS.

In this case, it is possible to achieve visual processing that corresponds to the viewing properties or visual processing that is suited for the non-linear characteristics of a device that handles images, such as a computer, a television, a digital camera, a portable telephone, a PDA, a printer, or a scanner, that outputs an output signal OS.

It is also possible to create the value C of the each element of the profile data based on a non-linear function of the value A of the input signal IS and the value B of the unsharp signal US, that is, a two-dimensional non-linear function.

For example, when visual processing is performed based on only the value A of the input signal IS (for example, in the case of performing a transformation based on a one-dimensional gradation transformation curve), if pixels having the same darkness are present at different areas in the image, then the two are transformed to the same brightness. More specifically, when brightening a dark area in the background of a person in an image, hair of that person having the same darkness will also be brightened.

On the other hand, if visual processing is performed using profile data that have been created based on a two-dimensional non-linear function, pixels having the same darkness that are present at different areas within the image are not transformed uniformly but instead can be made brighter or darker taking into account surrounding information, and this allows each region of the image to be adjusted to an ideal brightness. More specifically, a background that has the same darkness as the hair of a person in the image can be brightened without changing the darkness of the hair. Moreover, it is also possible to perform visual processing in which the gradation is maintained, even for those image regions in which the pixel values become saturated after visual processing according to a linear function.

Figure 5:
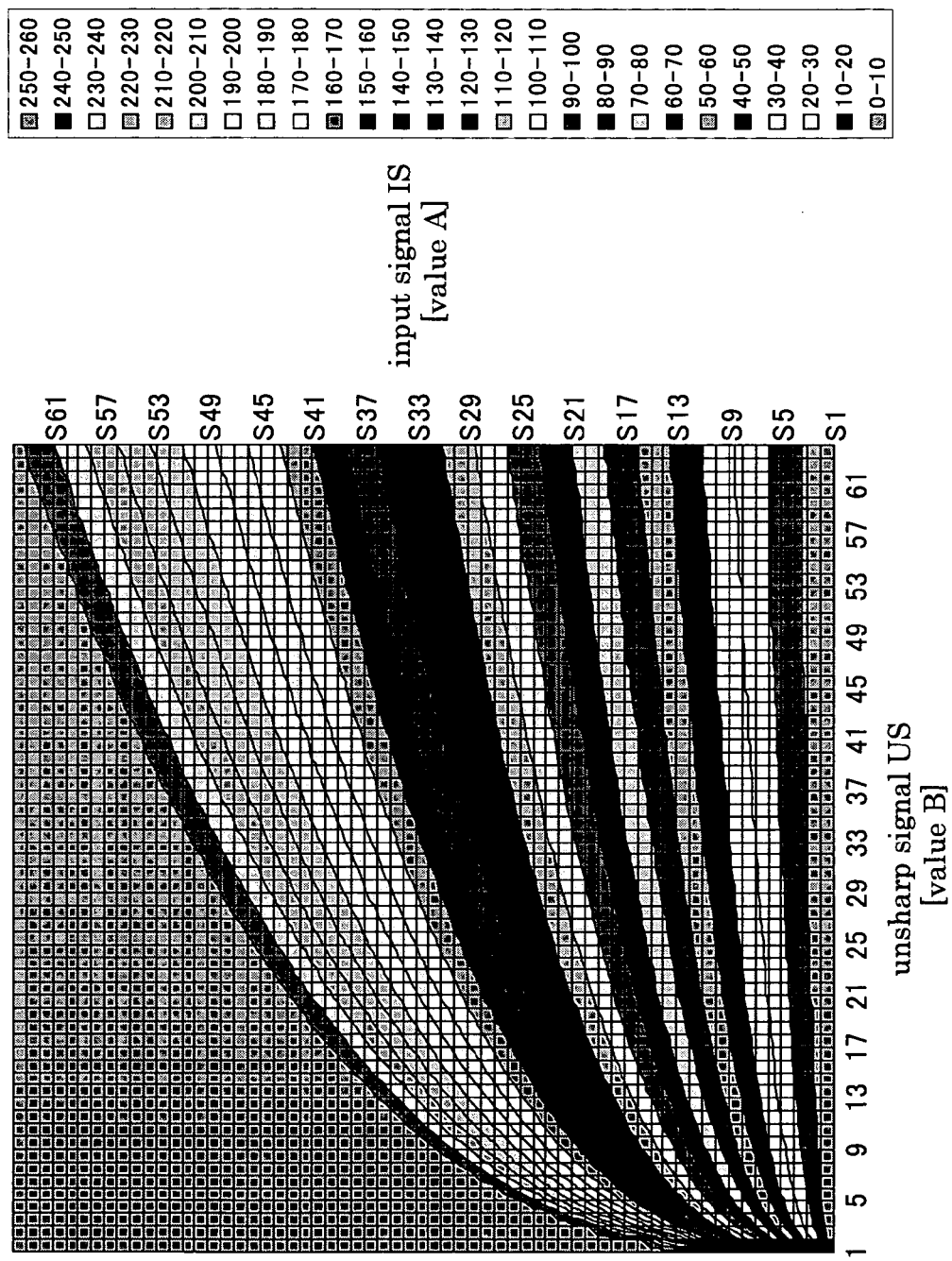
FIG. 5 is an example of the profile data (first embodiment).

FIG. 5 shows an example of such profile data. The profile data shown in FIG. 5 are profile data with which the visual processing device 1 can perform contrast enhancement that is suited for the visual characteristics. In FIG. 5, the profile data are expressed as a 64×64 matrix, in which the value of the upper six bits of the luminance value of the 8-bit input signal IS is shown in the column direction (vertical direction) and the value of the upper six bits of the luminance value of the 8-bit unsharp signal US is shown in the row direction (horizontal direction). The output signal OS is expressed as an 8-bit value as the matrix element corresponding to the two luminance values.

The values C of the elements of the profile data shown in FIG. 5 (the values of the output signal OS) can be expressed by $C=F2(F1(A)+F3(F1(A)-F1(B)))$ (hereinafter, this is referred to as Equation M14), using the value A of the input signal IS (which is a value obtained by discarding the lower two bits of the 8 bit input signal IS, for example), the value B of the unsharp signal US (which is a value that is obtained by discarding the lower two bits of the 8-bit unsharp signal US, for example), a transformation function F1, an inverse transformation function F2 of that transformation function, and an enhancement function F3. Here, the transformation function F1 is a common logarithmic function. The inverse transformation function F2 is an exponential function (antilog) that functions as the inverse function of the common logarithmic function. The enhancement function F3 is any of the enhancement functions R1 to R3 explained using FIG. 109.

These profile data allow visual processing using an input signal IS and an unsharp signal US that have been transformed to logarithmic space by the transformation function F1. Human visual performance is logarithmic, and visual processing that is suited for our visual performance is best achieved by performing processing after transforming to logarithmic space. Due to this, the visual processing device 1 performs contrast enhancement in logarithmic space.

It should be noted that depending on the combination of the value A of the input signal IS and the value B of the unsharp signal US, the value C obtained from Eq. M14 may be a negative value. In this case, the element of the profile data corresponding to the value A of the input signal IS and the value B of the unsharp signal US may be set to the value 0. Further, depending on the combination of the value A of the input signal IS and the value B of the unsharp signal US, the value C that is obtained from Eq. M14 may be saturated. That is, it may exceed the maximum value of 255 that can be expressed with 8 bits. In this case, the element of the profile data corresponding to the value A of the input signal IS and the value B of the unsharp signal US may be set to the value 255. In FIG. 5, each element of the profile data found in this manner is shown by a contour line.

Non-linear profile data are described in more specific detail in the section <Profile Data> below.

(5)

It is also possible for the profile data of the two-dimensional LUT 4 to include a plurality of gradation transformation curves (gamma curves) for correcting the gradation of the input signal IS.

Each gradation transformation curve is a monotonously increasing function such as a gamma function that has different gamma coefficients, and is associated with the value of the unsharp signal US. This association is performed such that gamma functions having large gamma coefficients are selected for the values of small unsharp signals US, for example. Thus, the unsharp signal US can function as a selection signal for selecting at least one gradation transformation curve from the gradation transformation curve group included in the profile data.

According to the above configuration, the gradation of the value A of the input signal IS is transformed using a gradation transformation curve that has been selected by the value B of the unsharp signal US. It should be noted that it is also possible to interpolate the output of the two-dimensional LUT 4 as described in (2) above.

(6)

It was explained above that the profile data registration device 8 is provided in or connected to the visual processing device 1, stores data of a plurality of profiles created in advance by a PC or the like, and can be used to change the content registered to the two-dimensional LUT 4.

Here, the profile data stored in the profile data registration device 8 are created by a PC that is disposed outside of the visual processing device 1. The profile data registration device 8 obtains the profile data from the PC over a network or via a recording medium.

The profile data registration device 8 registers data of a plurality of profiles to be stored to the two-dimensional LUT 4 in accordance with a predetermined condition. This is described in greater detail using FIGS. 6 to 8. It should be noted that portions having substantially the same function as in the visual processing device 1, which was described above using FIG. 1, are assigned identical reference numerals and further description thereof is omitted.

<<1>>

Figure 6:
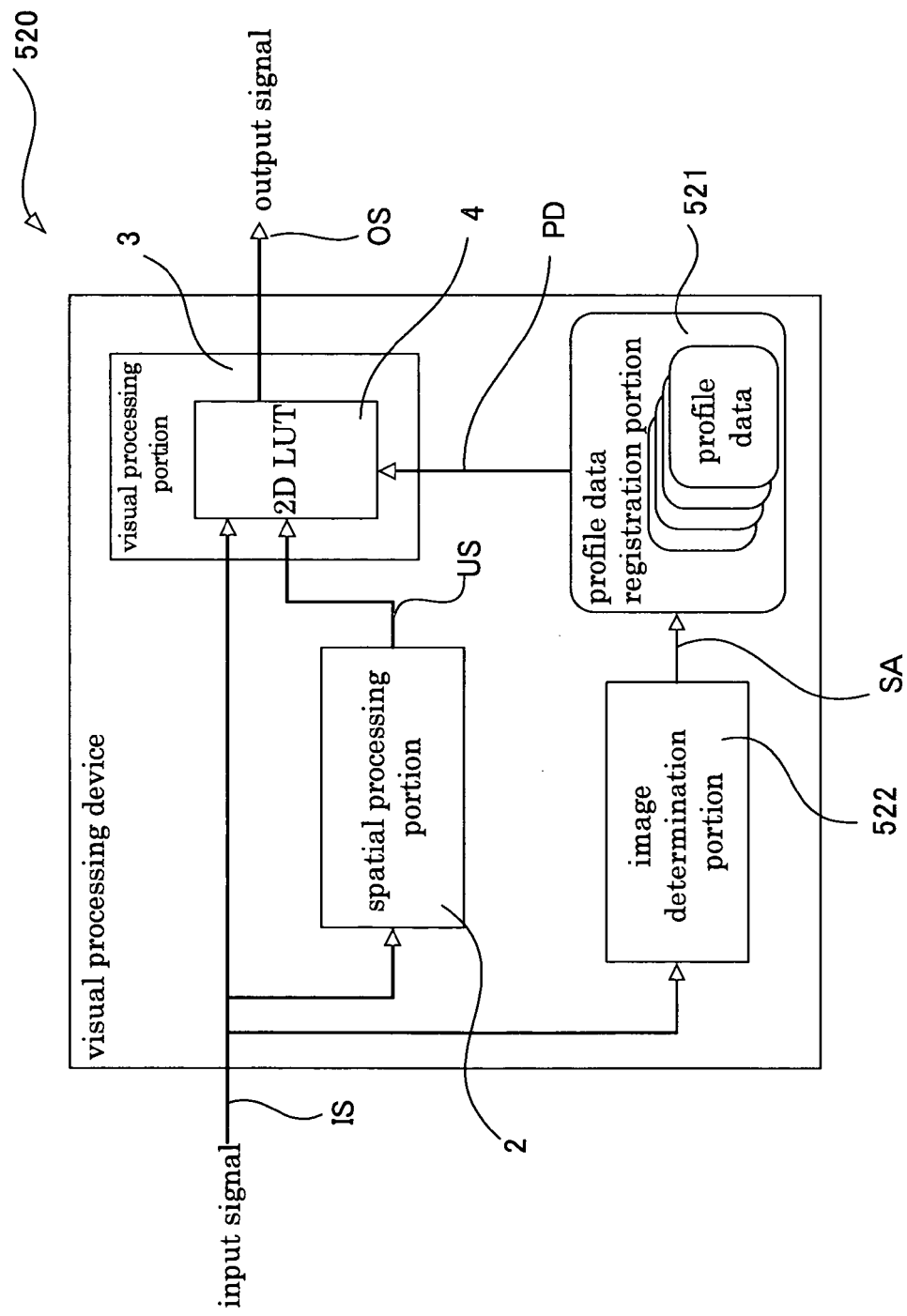
FIG. 6 is a block diagram describing the structure of the visual processing device 520 (first embodiment).

FIG. 6 is a block diagram of a visual processing device 520 that determines the image of an input signal IS, and based on the results of this determination, switches the profile data registered to the two-dimensional LUT 4.

The visual processing device 520, in addition to the same structural components as the visual processing device 1 shown in FIG. 1, also has a profile data registration portion 521 that has the same function as the profile data registration device 8. The visual processing device 520 is further provided with an image determination portion 522.

The image determination portion 522 receives an input signal IS and outputs determination results SA of the input signal IS. The profile data registration portion 521 receives the determination results SA and outputs profile data PD selected based on those determination results SA.

The image determination portion 522 determines the image of the input signal IS. In this determination of the image, the brightness of the input signal IS is determined by obtaining a pixel value such as the luminance or the brightness of the input signal IS.

The profile data registration portion 521 obtains the determination results SA, and based on these determination results SA, it switches the profile data PD and outputs the result. More specifically, if the input signal IS is determined to be bright, then profile data that compress the dynamic range, for example, are selected. By doing this, the contrast can be maintained even for images that are bright overall. Also, a profile with an output signal OS having a suitable dynamic range for the characteristics of the device that will display the output signal OS is selected.

Thus, the visual processing device 520 is capable of suitably visually processing an input signal IS.

It should be noted that it is also possible for the image determination portion 522 to determine an image characteristic, such as the spatial frequency, in addition to a pixel value such as the luminance or the brightness of the input signal IS.

In this case, it is possible to achieve more suitable visual processing, such as the selection of a profile that leads to a higher degree of sharpness enhancement with respect to an input signal IS whose spatial frequency is low.

<<2>>

Figure 7:
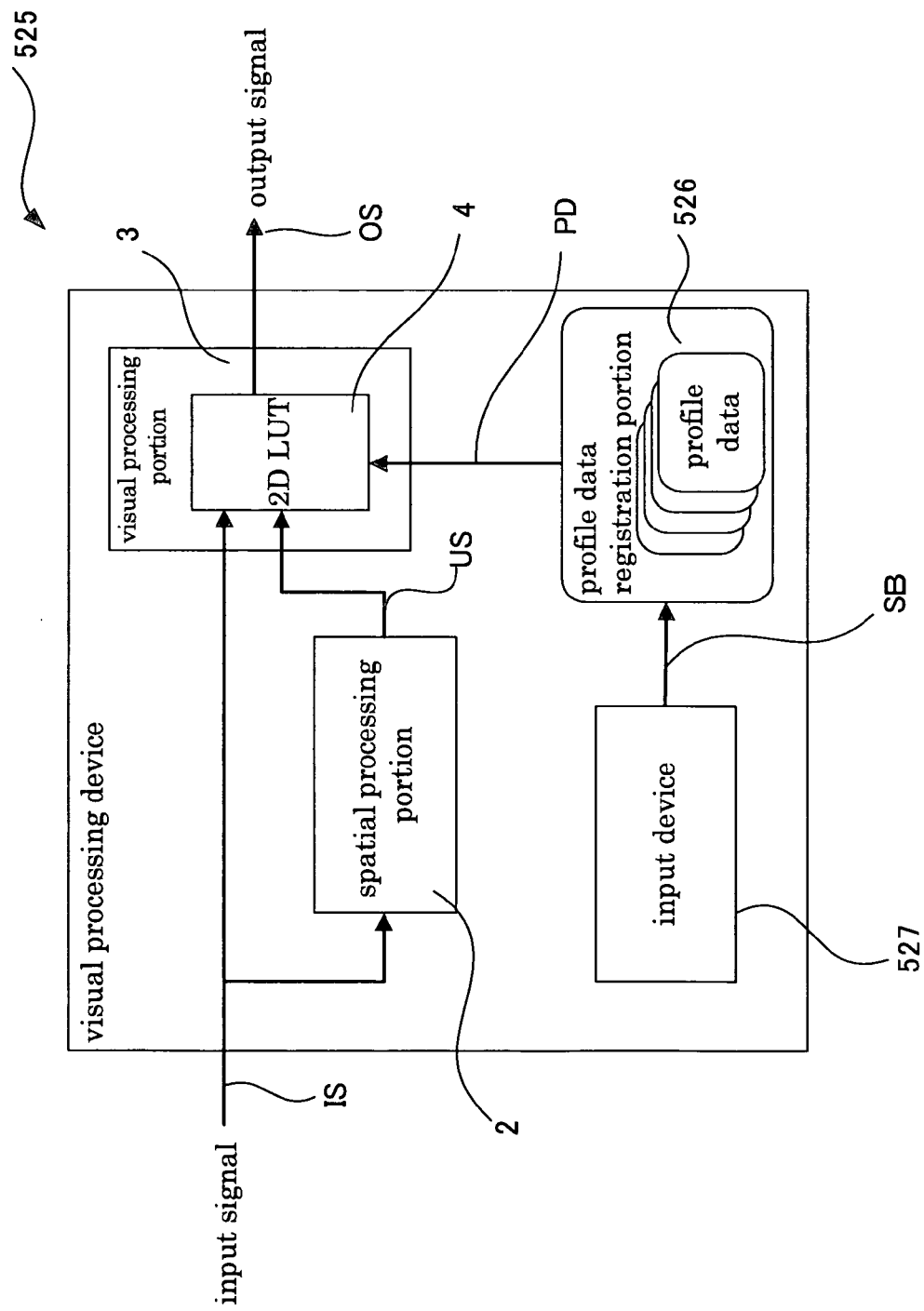
FIG. 7 is a block diagram describing the structure of the visual processing device 525 (first embodiment).

FIG. 7 is a block diagram of a visual processing device 525 that switches the profile data registered to the two-dimensional LUT 4 based on the results of an input from an input device for inputting conditions relating to the brightness.

The visual processing device 525, in addition to the same structural components as the visual processing device 1 shown in FIG. 1, also is provided with a profile data registration portion 526 that has the same function as the profile data registration device 8. The visual processing device 525 is provided with an input device 527 to which it is connected through a wired or a wireless connection. More specifically, the input device 527 can be achieved for example by an input button provided on, or remote control for, a device that handles images, such as a computer, a television, a digital camera, a portable telephone, a PDA, a printer, or a scanner, that outputs an output signal OS.

The input device 527 is an input device for inputting conditions related to the brightness, and for example is provided with switches such as "bright" and "dark." The input device 527 outputs the input results SB through control by a user.

The profile data registration portion 526 obtains the input results SB, and based on the input results SB switches the profile data PD and outputs the result. More specifically, for example if the user has input "bright," then a profile for compressing the dynamic range of the input signal IS, for example, is selected and this is output as the profile data PD. Thus, the contrast can be maintained even if the device for displaying the output signal OS has been placed in a "bright" environment.

Thus, with the visual processing device 525, it is possible to attain suitable visual processing that is in accordance with the input from the input device 527.

It should be noted that the conditions related to the brightness can be not only the conditions related to the brightness of the ambient light around the medium that will output the output signal, such as a computer, digital camera, portable telephone, or PDA, but also can be the conditions related to the brightness of the medium itself to which the output signal will be output, such as the printer paper. The conditions can also be related to the brightness of the medium by which the input signal is received, such as the scanner paper.

It is also possible for these conditions to be automatically input by a photo sensor, for example, instead of only being input through a switch or the like.

It should be noted that it is also possible for the input device 527 to be a device that directly causes the profile data registration portion 526 to change the profile rather than a device that simply inputs conditions related to brightness. In this case, the input device 527 can display a list of the profile data in addition to the conditions to the related to the brightness, and have the user make a selection from among these.

By doing this, the user can perform visual processing that suits his personal tastes.

It should be noted that the input device 527 can also be a device for authenticating the user. In this case, the input device 527 can be a device such as a camera that authenticates the user or a device through which the user inputs his or her user name.

For example, if the user indicates through the input device 527 that he or she is a child, then profile data for inhibiting extreme luminance changes, for example, are selected.

Visual processing that is suited for the user thus can be achieved.

<<3>>

Figure 8:
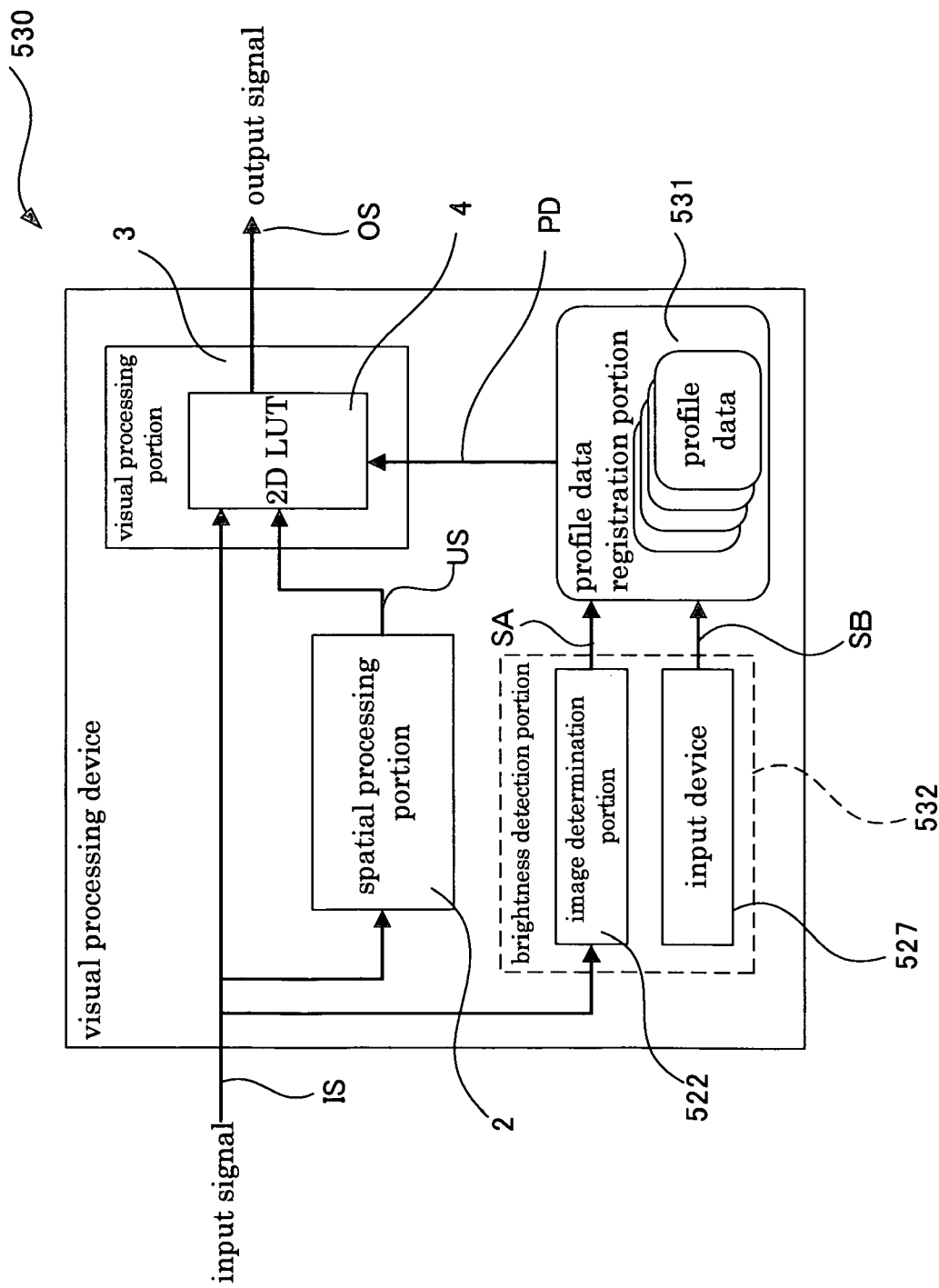
FIG. 8 is a block diagram describing the structure of the visual processing device 530 (first embodiment).

FIG. 8 is a block diagram of a visual processing device 530 that switches the profile data registered to the two-dimensional LUT 4 based on the detection results from a luminance detection portion for detecting two types of brightness.

The visual processing device 530, in addition to the same structural components as the visual processing device 1 shown in FIG. 1, also has a profile data registration portion 531 that has the same function as the profile data registration device 8. The visual processing device 530 is further provided with a brightness detection portion 532.

The brightness detection portion 532 comprises the image determination portion 522 and the input device 527. The image determination portion 522 and the input device 527 are the same as those described using FIGS. 6 and 7. Thus, the brightness detection portion 532 receives the input signal IS as input, and outputs the determination results SA from the image determination portion 522 and the input results SB from the input device 527 as detection results.

The profile data registration portion 531 receives the determination results SA and the input results SB as input, and based on the determination results SA and the input results SB, switches the profile data PD and outputs the result. More specifically, for example if the ambient light is "bright" and it also has been determined that the input signal IS is bright, then a profile that compresses the dynamic range of the input signal IS, for example, is selected and this is output as the profile data PD. Thus, the contrast can be maintained when the output signal OS is displayed.

Thus, with the visual processing device 530, it is possible to achieve suitable visual processing.

<<4>>

In the visual processing devices of FIGS. 6 to 8, it is not necessary to provide the profile data registration portion in a single unit with the visual processing device. More specifically, the profile data registration portions can be connected to the visual processing devices over a network as a server provided with a plurality of profile data sets or as a plurality of servers each provided with profile data. Here, the network is a wired or wireless connection means that is capable of communication, such as a dedicated telephone line, a public telephone line, the Internet, or a LAN. In this case, the determination results SA and the input results SB both are transferred from the visual processing device side to the profile data registration portion side over the same network.

(7)

In the above embodiment, it was explained that the profile data registration device 8 is provided with a plurality of profile data sets, and different visual processing was achieved by switching which of these is registered to the two-dimensional LUT 4.

Here, it is also possible for the visual processing device 1 to be provided with a plurality of two-dimensional LUT, each being provided with profile data for achieving a different visual processing. In this case, the visual processing device 1 achieves different visual processing by switching which of the two-dimensional LUTs receives the input or by switching which of the two-dimensional LUTs to receive the output from.

In this case, the memory capacity that must be secured for the two-dimensional LUT increases, but the time required for switching between the different visual processing types can be shortened.

It is also possible for the profile data registration device 8 to be provided with a device that creates new profile data based on data of a plurality of profiles and registers the profile data that are created to the two-dimensional LUT 4.

Figure 9:
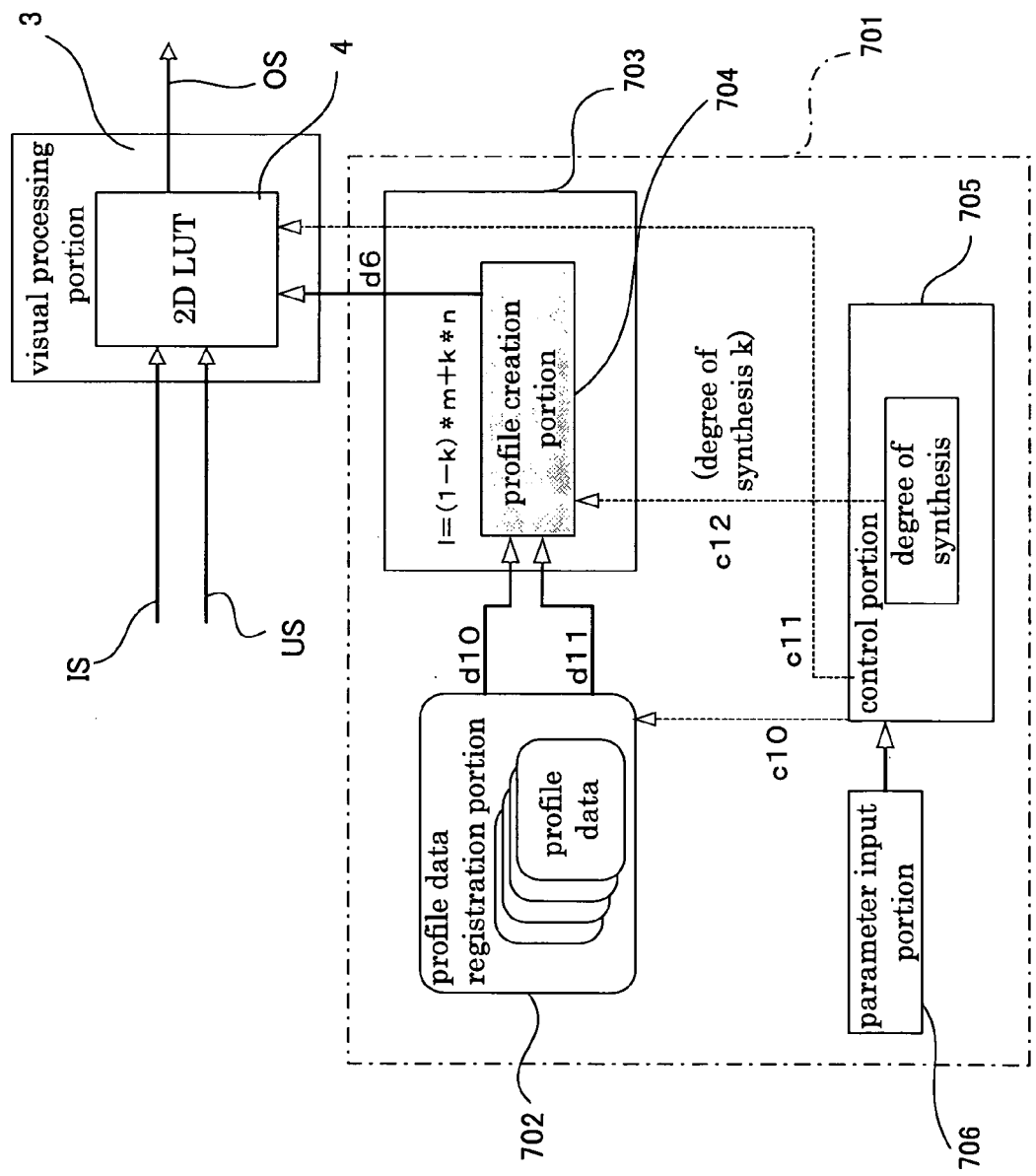
FIG. 9 is a block diagram describing the structure of the profile data registration device 701 (first embodiment).
Figure 10:
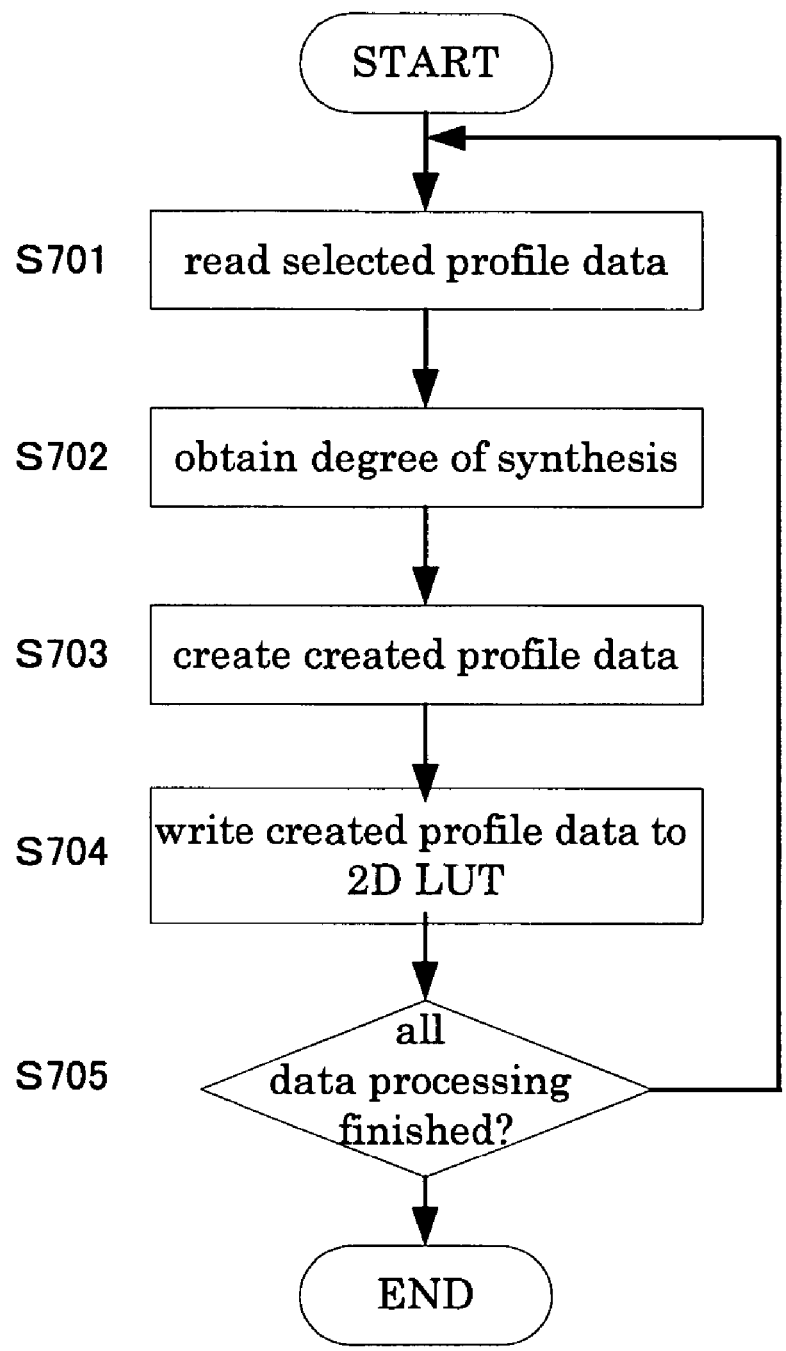
FIG. 10 is a flowchart explaining the visual processing profile creation method (first embodiment).
Figure 11:
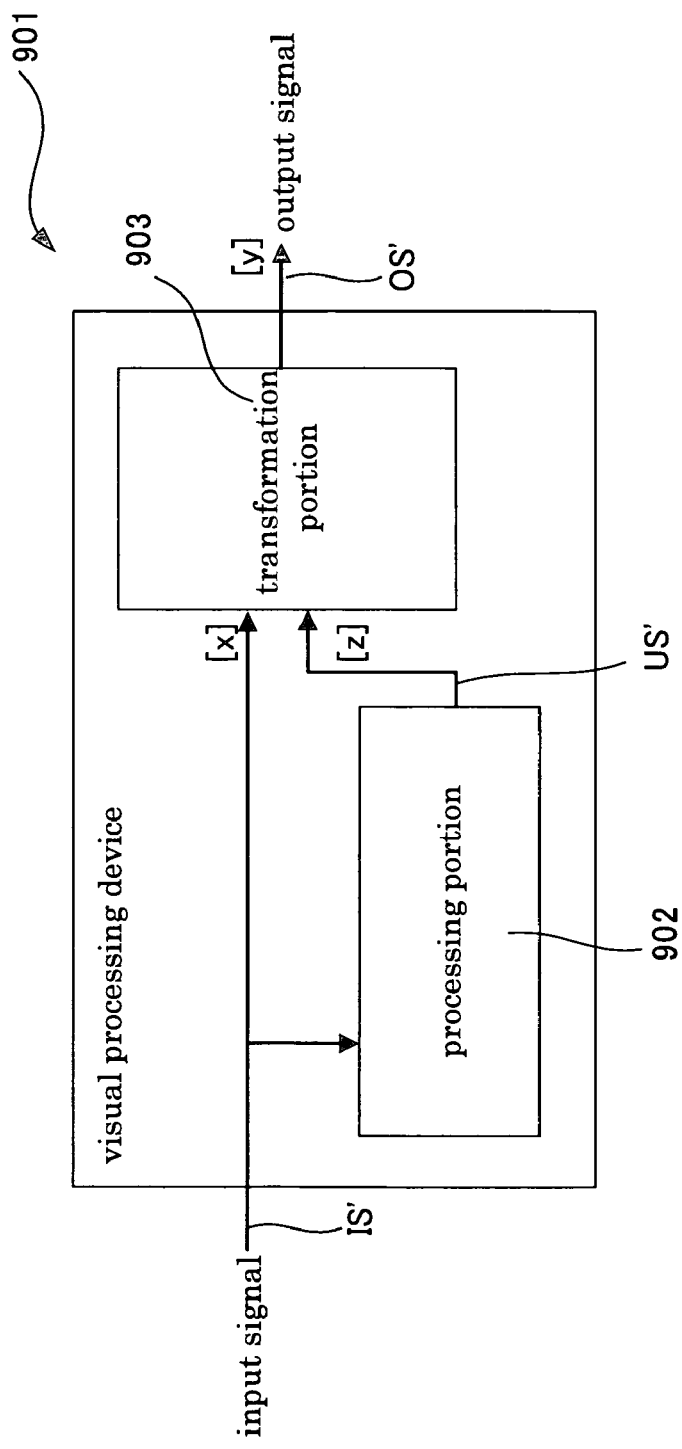
FIG. 11 is a block diagram describing the structure of the visual processing device 901 (first embodiment).
Figure 12:
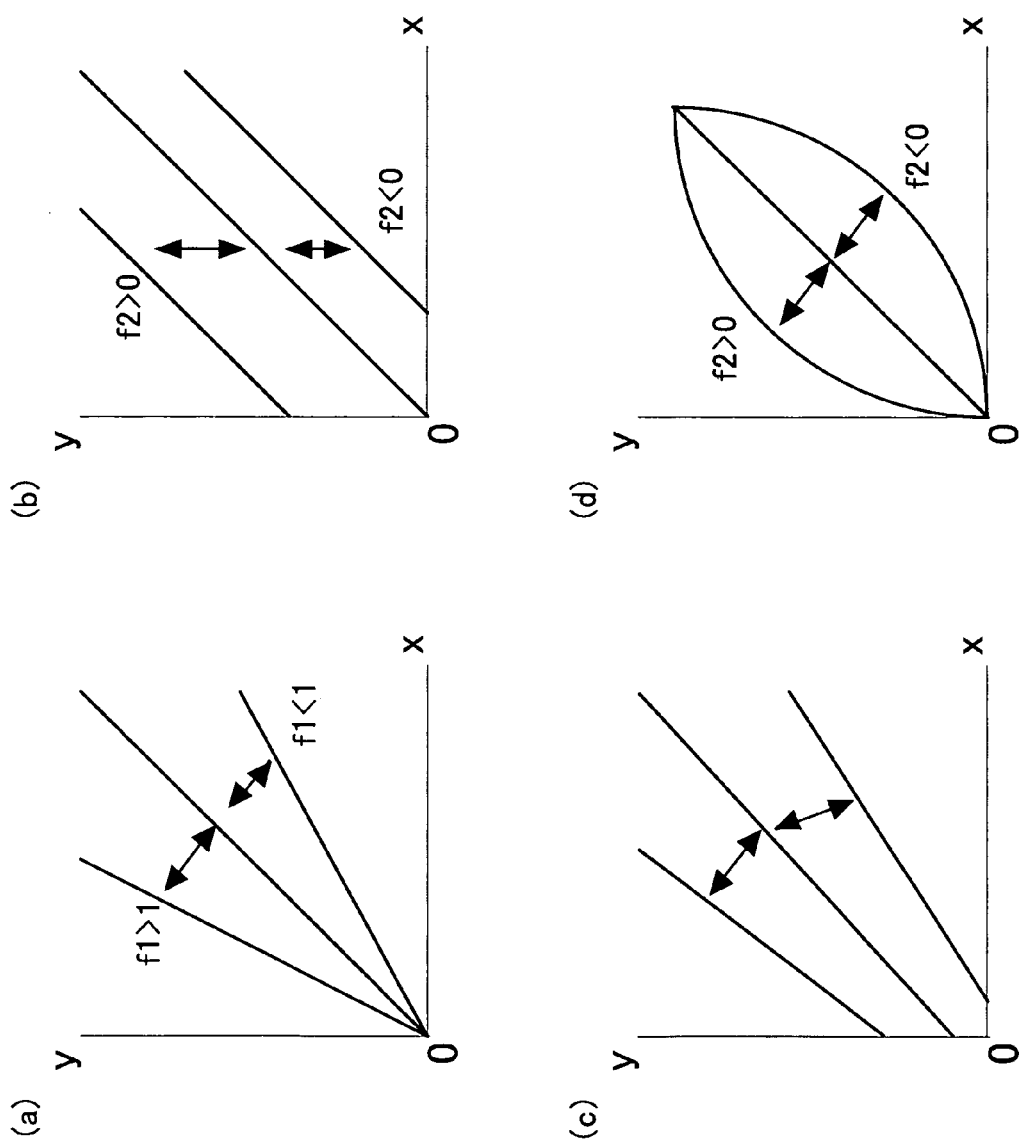
FIG. 12 is a graph showing the relationship between the input signal IS' and the output signal OS' after changing the extent change function fk(z) (first embodiment).
Figure 13:
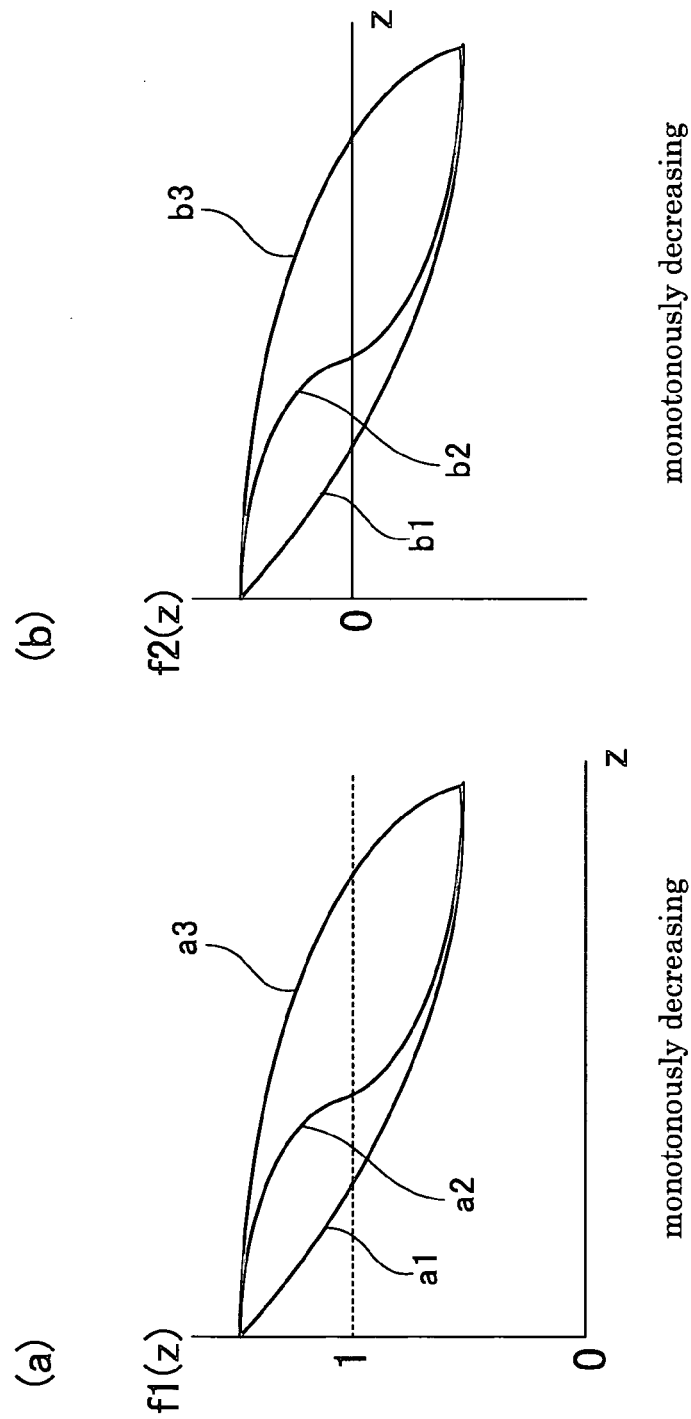
FIG. 13 is a graph showing the extent change functions f1(z) and f2(z) (first embodiment).

This implementation is described using FIGS. 9 and 10.

FIG. 9 is a block diagram that primarily illustrates a profile data registration device 701, as a modified example of the profile data registration device 8. The profile data registration device 701 is a device for switching the profile data that are registered to the two-dimensional LUT 4 of the visual processing device 1.

The profile data registration device 701 comprises a profile data registration portion 702 to which a plurality of profile data sets are registered, a profile creation execution portion 703 that creates new profile data based on the data of a plurality of profiles, a parameter input portion 706 for inputting parameters with which to create new profile data, and a control portion 705 that controls these portions.

Data of a plurality of profiles are registered to the profile data registration portion 702 as in the profile data registration device 8 or the profile data registration portions shown in FIG. 6 to FIG. 8, and the profile data that have been selected through a control signal C10 from the control portion 705 are read out. Here, data of two selected profiles are read out from the profile data registration portion 702, namely first selected profile data d10 and second selected profile data d11.

The profile data that are read from the profile data registration portion 702 are determined based on input from the parameter input portion 706. The parameter input portion 706, either manually or automatically from a sensor or the like, receives the desired visual processing effect, the degree of that processing, or information relating to the viewing environment of the image to be processed, as a parameter. From the parameter input by the parameter input portion 706, the control portion 705 specifies the profile data to be read out with a control signal c10 and also specifies the value of the degree of synthesis of the respective profile data using a control signal c12.

The profile creation execution portion 703 is provided with a profile creation portion 704 that produces a created profile data d6, which are new profile data, from the first selected profile data d10 and the second selected profile data d11.

The profile creation portion 704 obtains the first selected profile data d10 and the second selected profile data d11 from the profile data registration portion 702. It also obtains the control signal c12, which specifies the degree of synthesis of the respective selected profile data, from the control portion 705.

The profile creation portion 704 then applies the value [k] of the degree of synthesis specified by the control signal c12 to a value [m] of the first selected profile data d10 and a value [n] of the second selected profile data d11 to create created profile data d6 having a value [l]. Here, the value [l] is calculated by $[l]=(1-k)*[m]+k*[n]$. It should be noted that if the value [k] is $0 \leq k \leq 1$, then the first selected profile data d10 and the second selected profile data d11 are interpolated, and if the value [k] is k<0 or k>1, then the first selected profile data d10 and the second selected profile data d11 are extrapolated.

The two-dimensional LUT 4 obtains the created profile data d6 created by the profile creation portion 704 and stores the obtained value in an address that is specified by a count signal c11 of the control portion 705. Here, the created profile data d6 are associated with the same image signal value as the selected profile data that were used to create the created profile data d6.

Thus, profile data that achieve different visual processing can be used to create new profile data that achieve yet different visual processing.

The visual processing profile creation method that is executed by the visual processing device provided with the profile data registration device 701 is described using FIG. 10.

The address of the profile data registration portion 702 is specified at a fixed count period by a count signal c10 from the control portion 705, and the image signal value that is stored in the specified address is read out (step S701). More specifically, the control portion 705 outputs a count signal c10 in correspondence with a parameter that has been input by the parameter input portion 706. The count signal c10 specifies the addresses of two profile data, each of which achieves different visual processing, in the profile data registration portion 702. From this signal, the first selected profile data d10 and the second selected profile data d11 are read from the profile data registration portion 702.

The profile creation portion 704 obtains the control signal c12, which specifies the degree of synthesis, from the control portion 705 (step S702).

The profile creation portion 704 then applies the value [k] of the degree of synthesis specified by the control signal c12 to the value [m] of the first selected profile data d10 and the value [n] of the second selected profile data d11 to create a created profile data d6 having the value [l] (step S703). Here, the value [l] is calculated by $[l]=(1-k)*[m]+k*[n]$.

The created profile data d6 are written to the two-dimensional LUT 4 (step S704). The address to which the data are written is specified by a count signal c11 from the control portion 705 that is given to the two-dimensional LUT 4.

The control portion 705 determines whether or not processing has finished for all of the selected profile data (step S705), and repeats the processes of step S701 to step S705 until this processing is finished.

The new profile data stored in the two-dimensional LUT 4 in this manner are then used to execute visual processing.

<<Effect of (7)>>

With the visual processing device provided with the profile data registration device 701, profile data that achieve different visual processing can be used to create new profile data that achieve yet different visual processing, and this visual processing can be performed. That is, it is possible to achieve visual processing to any degree simply by providing the profile data registration portion 702 with a small number of profile data, and thus the memory capacity of the profile data registration portion 702 can be reduced.

It should be noted that the profile data registration device 701 can be provided not only in the visual processing device 1 shown in FIG. 1, but also in any of the visual processing devices of FIGS. 6 to 8. In this case, the profile data registration portion 702 and the profile creation execution portion 703 are used in place of the profile data registration portions 521, 526, and 531 shown in FIGS. 6 to 8, respectively, and the parameter input portion 706 and the control portion 705 are used in place of the image determination portion 522 of FIG. 6, the input device 527 of FIG. 7, and the brightness detection portion 532 of FIG. 8.

(8)

The visual processing device can also be a device that transforms the brightness of the input signal IS. A visual processing device 901 that transforms the brightness is described using FIG. 11.

<<Configuration>>

The visual processing device 901 is a device that transforms the brightness of an input signal IS', and comprises a processing portion 902 that performs a predetermined processing with respect to the input signal IS' and outputs a processed signal US', and a transformation portion 903 that uses the input signal IS' and the processed signal US' to perform transformation of the input signal IS'.

The processing portion 902 operates in the same manner as the spatial processing portion 2 (see FIG. 1), and performs spatial processing of the input signal IS'. It should be noted that it can also perform spatial processing such as that discussed in the above <Modified Example> (3).

The transformation portion 903 is provided with a two-dimensional LUT like the visual processing portion 3 and outputs an output signal OS' (value [y]) based on the input signal IS' (value [x]) and the processed signal US' (value [z]).

Here, the values of the elements of the two-dimensional LUT of the transformation portion 903 are determined by applying the value [x] of the input signal IS' to gain or offset that has been determined in correspondence with the value of the function fk(z), which is related to the extent of change in brightness. The function fk(z) related to the extent of change in brightness is hereinafter referred to as the "extent change function."

The value of each element of the two-dimensional LUT (=the value [y] of the output signal OS') is determined according to a function relating the value [x] of the input signal IS' and the value [z] of the processed signal US'. Hereinafter, this function is referred to as a "transformation function," and the transformation functions (a) to (d) are examples thereof. FIGS. 12(a) to (d) show the relationship between the input signal IS' and the output signal OS' when the extent change function fk(z) has been changed.

<<Regarding the Transformation Function (a)>>

The transformation function (a) is expressed as [y]=f(z)* [x]. Here, the extent change function f1(z) acts as gain of the input signal IS'. Thus, the gain of the input signal IS' changes depending on the value of the extent change function f1(z), and this changes the value [y] of the output signal OS'.

FIG. 12(a) shows the change in the relationship between the input signal IS' and the output signal OS' for various values of the extent change function f1(z).

The value [y] of the output signal increases as the extent change function f1(z) becomes larger (f1(z)>1). That is, the image after transformation becomes brighter. On the other hand, the value [y] of the output signal decreases as the extent change function f1(z) becomes smaller (f1(z)<1). That is, the image after transformation becomes darker.

Here, the extent change function f1(z) is a function in which the smallest value in the defined domain of the value [z] does not become less than [0].

If due to the computation of the transformation function (a) the value [y] of the output signal is outside the valid range of values, then it may be clipped to the valid range of values. For example, if the value [y] of the output signal exceeds the value [1], then it is possible to clip it to the value [1], and if the value [y] of the output signal is below the value [0], then it can be clipped to the value [0]. This also applies to the other transformation functions (b) through (d) discussed below.

<<Regarding the Transformation Function (b)>>

The transformation function (b) is expressed as [y]=[x]+f2(z).

Here, the extent change function f2(z) acts as offset of the input signal IS'. Thus, the offset of the input signal IS' changes depending on the value of the extent change function f2(z), and this changes the value [y] of the output signal OS'.

FIG. 12(b) shows the change in the relationship between the input signal IS' and the output signal OS' when the value of the extent change function f2(z) is changed.

The value [y] of the output signal increases as the extent change function f2(z) becomes larger (f2(z)>0). That is, the image after transformation becomes brighter. On the other hand, the value [y] of the output signal decreases as the extent change function f2(z) becomes smaller (f2(z)<0). That is, the image after transformation becomes darker.

<<Regarding the Transformation Function (c)>>

The transformation function (c) is expressed as [y]= f1(z)* [x]+f2(z).

Here, the extent change function f1(z) acts as gain of the input signal IS'. The extent change function f2(z) also acts as offset of the input signal IS'. Thus, the gain of the input signal IS' changes depending on the value of the extent change function f1(z), and the offset of the input signal IS' changes depending on the value of the extent change function f2(z), and this changes the value [y] of the output signal OS'.

FIG. 12(c) shows the change in the relationship between the input signal IS' and the output signal OS' when the values of the extent change function f1(z) and the extent change function f2(z) are changed.

The value [y] of the output signal increases as the extent change function f1(z) and the extent change function f2(z) become larger. That is, the image after transformation becomes brighter. On the other hand, the value [y] of the output signal decreases as the extent change function f1(z) and the extent change function f2(z) become smaller. That is, the image after transformation becomes darker.

<<Regarding the Transformation Function (d)>>

The transformation function (d) is expressed as [y]= [x]^(1−f2(z)).

Here, the extent change function f2(z) determines the "power" of the "power function." Thus, the input signal IS' changes depending on the value of the extent change function f2(z), and this changes the value [y] of the output signal OS'.

FIG. 12(d) shows the change in the relationship between the input signal IS' and the output signal OS' when the value of the extent change function f2(z) is changed.

The value [y] of the output signal increases as the extent change function f2(z) becomes larger (f2(z)>0). That is, the image after transformation becomes brighter. On the other hand, the value [y] of the output signal decreases as the extent change function f2(z) becomes smaller (f2(z)<0). That is, the image after transformation becomes darker. If the extent change function f2(z) is the value [0], then transformation with respect to the input signal IS' is not performed.

It should be noted that the value [x] is a value obtained by normalizing the value of the input signal IS' to the range of [0] to [1].

<<Effect>>

(1)

With the visual processing device 901, visual processing of the input signal IS' is performed in accordance with a two-dimensional LUT that has elements that have been determined using one of the transformation functions (a) to (d) shown above. Each element of the two-dimensional LUT stores a value [y] with respect to a value [x] and a value [z]. Thus, it is possible to achieve viewing angle processing in which the brightness of the input signal IS' is transformed based on the input signal IS' and the processed signal US'.

(2)

Here, if the extent change function f1(z) and the extent change function f2(z) are both functions that decrease monotonically, then it is also possible to achieve the effect of backlight correction or to prevent blooming, for example. This is described in greater detail below.

FIGS. 13(a) and (b) show examples in which the extent change function f1(z) and the extent change function f2(z) both decrease monotonically. Each shows three graphs (a1 to a3, b1 to b3), and each of these graphs is an example of a function that decreases monotonically.

The extent change function f1(z) is a function that has a value range that spans the value [1], and is a function in which the minimum value with respect to the defined range of the value [z] is not less than the value [0]. The extent change function f2(z) is a function that has a value range that spans the value [0].

For example, in portions in the image in which the area of darkness is large, the value [z] of the processed signal US' is small. The value of the extent change function for a small value [z] is large. That is, when a two-dimensional LUT that has been created based on a transformation function (a) through (d) is used, then portions in the image in which the area of darkness is large are made brighter. Thus, for example in an image that is captured with backlight, the dark portions are fixed in sections in which the area of darkness is large, and this improves the visual effect.

Also, for example in portions in the image in which the area of brightness is large, the value [z] of the processed signal US' is large. The value of the extent change function for a large value [z] is small. That is, when a two-dimensional LUT that has been created based on a transformation function (a) through (d) is used, portions in the image in which the area of brightness is large are made darker. Thus, for example in an image having bright portions such as the sky, blooming is fixed in the portions in which the area of brightness is large, and this improves the visual effect.

<<Modified Examples>>

(1)

The transformation functions described above are only examples, and any functions are possible as long as transformation having the same characteristics is achieved.

(2)

It is not absolutely necessary that the value of each element of the two-dimensional LUT is determined by a transformation function discussed above.

For example, if the value of the above transformation functions is outside the range of values that can be adopted as the output signal OS', then the two-dimensional LUT can store values that have been clipped to a range of values that can be adopted as the output signal OS'.

(3)

It is also possible to perform the same processing as discussed above without using a two-dimensional LUT. For example, it is also possible for the transformation portion 903 to execute the transformation functions (a) to (d) with respect to the input signal IS' and the processed signal US' and output the result as the output signal OS'.

(9)

It is also possible for the visual processing device to be provided with a plurality of spatial processing portions and for it to perform visual processing using a plurality of unsharp signals each spatially processed to a different degree.

<<Configuration>>

Figure 14:
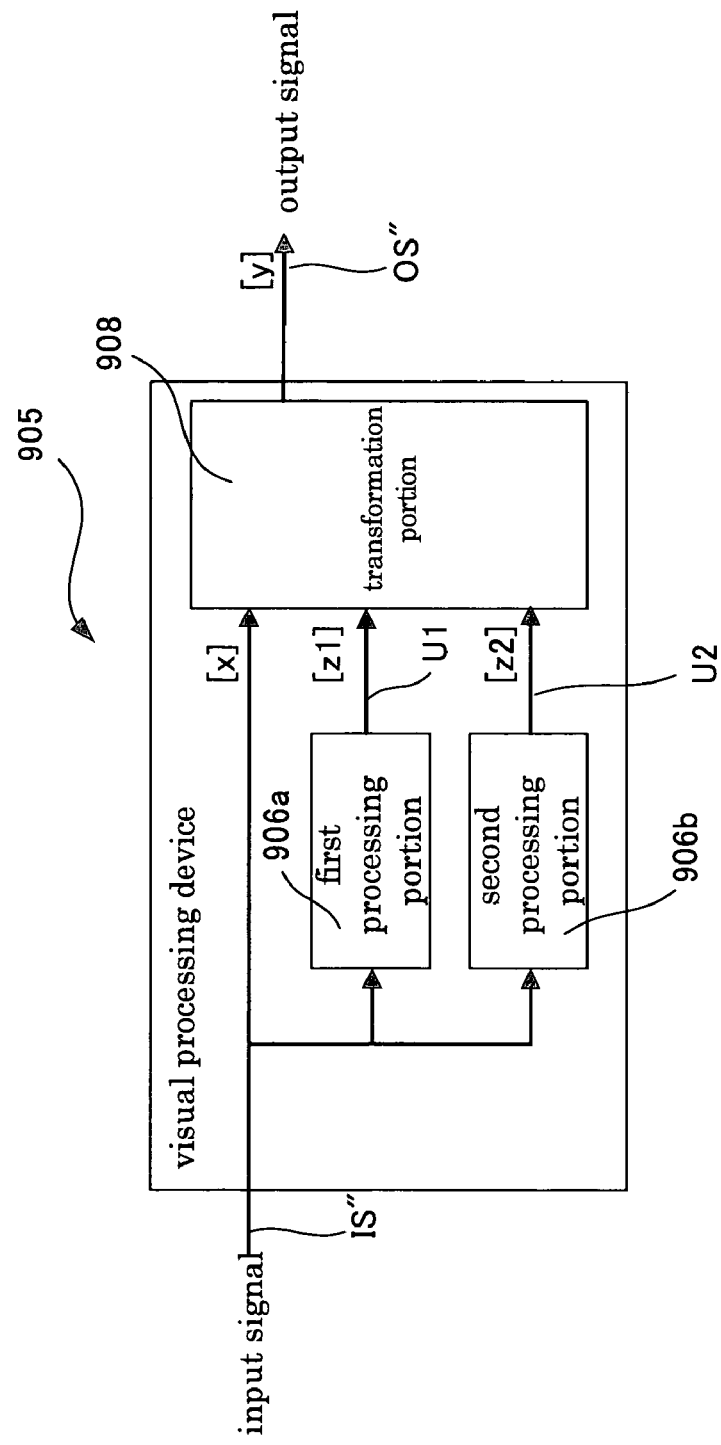
FIG. 14 is a block diagram describing the structure of the visual processing device 905 (first embodiment).

FIG. 14 shows the configuration of a visual processing device 905. The visual processing device 905 is a device that performs visual processing of an input signal IS", and comprises a first processing portion 906a that performs a first predetermined processing with respect to the input signal IS" and outputs a first processed signal U1, a second processing portion 906b that performs a second predetermined processing with respect to the input signal IS" and outputs a second processed signal U2, and a transformation portion 908 that uses the input signal IS", the first processed signal U1, and the second processed signal U2 to perform transformation of the input signal IS".

The first processing portion 906a and the second processing portion 906b both operate in the same manner as the spatial processing portion 2 (see FIG. 1), and perform spatial processing of the input signal IS". It should be noted that it is also possible for them to perform spatial processing such as that described in the <Modified Example> (3) above.

Here, the first processing portion 906a and the second processing portion 906b differ in the size of the region of the surrounding pixels that are used for the spatial processing.

More specifically, the first processing portion 906a uses the surrounding pixels that are included in a region of 30 pixels vertically by 30 pixels horizontally with the target pixel in the center (small unsharp signal), whereas the second processing portion 906b uses the surrounding pixels that are included in the region of 90 pixels vertically by 90 pixels horizontally with the target pixel in the center (large unsharp signal). It should be noted that the region of surrounding pixels that is described here is only one example, and there is no limitation to this. It is preferable that the unsharp signal is created from a fairly wide region in order to obtain a sufficient visual processing effect.

The transformation portion 908 is provided with a LUT, and outputs an output signal OS" (value [y]) based on the input signal IS" (value [x]), the first processed signal U1 (value [z1]), and the second processed signal U2 (value [z2]).

Here, the LUT that the transformation portion 903 is provided with is a three-dimensional LUT that stores values [y] of the output signal OS" with respect to the values [x] of the input signal IS", the values [z1] of the first processed signal U1, and the values [z2] of the second processed signal U2. The value of each element of this three-dimensional LUT (=the values [y] of the output signal OS") is determined based on a function of the value [x] of the input signal IS', the value [z1] of the first processed signal U1, and the value [z2] of the second processed signal U2.

This three-dimensional LUT is capable of achieving the processing discussed in the above-described and later-described embodiments, but here the three-dimensional LUT is described for the <<Case of Transforming the Brightness of the Input Signal IS">> and the <<Case of Enhancement Transformation of the Input Signal IS">>.

<<Case of Transforming the Brightness of the Input Signal IS">>

The transformation portion 908 performs a transformation to brighten the input signal IS" if the value [z1] of the first processed signal U1 is small. However, the extent to which it is brightened is kept low if the value [z2] of the second processed signal US also is small.

As examples of this transformation, the value of each element of the three-dimensional LUT of the transformation portion 903 is determined based on the following transformation function (e) or (f).

(Regarding the Transformation Function (e))

The transformation function (e) is expressed by $[y]=[f11(z1)/f12(z2)]*[x]$.

Here, the extent change functions $f11(z1)$ and $f12(z2)$ are the same function as the extent change function $f1(z)$ described in <Modified Example> (8) above. The extent change function $f11(z1)$ and the extent change function $f12(z2)$ are different functions.

Thus, $[f11(z1)/f12(z2)]$ acts as the gain of the input signal IS", and the gain of the input signal IS" changes in accordance with the value of the first processed signal U1 and the value of the second processed signal U2, and this changes the value [y] of the output signal OS".

(Regarding the Transformation Function (f))

The transformation function (f) is expressed by $[y]=[x]+f21(z1)-f22(z2)$.

Here, the extent change functions $f21(z1)$ and $f22(z2)$ are the same function as the extent change function $f2(z)$ described in <Modified Example> (8) above. The extent change function $f21(z1)$ and the extent change function $f22(z2)$ are different functions.

Thus, $[f21(z1)-f22(z2)]$ acts as the offset of the input signal IS", and the offset of the input signal IS" changes in accordance with the value of the first processed signal U1 and the value of the second processed signal U2, and this changes the value [y] of the output signal OS".

(Effect)

Through transformation using the transformation functions (e) and (f), it is possible to achieve the effect of brightening dark areas in regions having a small area of backlight while keeping the large dark area region of nighttime images from being brightened too much.

(Modified Example)

It should be noted that the processing by the transformation portion 908 is not limited to processing using a three-dimensional LUT, and it can also be processing in which the same computations as those of the transformation functions (e) or (f), for example, are performed.

Also, it is not absolutely necessary that the elements of the three-dimensional LUT are determined based on the transformation functions (e) or M.

<<Case of Enhancement Transformation of the Input Signal IS">>

If the transformation by the transformation portion 908 is transformation that enhances the input signal IS", then it is possible to independently enhance a plurality of frequency components.

In the case of a transformation further enhancing the first processed signal U1, it is possible to enhance dark portions in which the frequency is relatively high, whereas in the case of a transformation further enhancing the second processed signal U2, it is possible to enhance dark portions in which the frequency is low.

<Profile Data>

The visual processing device 1 can also be provided with profile data for achieving various types of visual processing other than that described above. First through seventh profile data for achieving various types of visual processing are described below, for each showing the equation that characterizes the profile data and the structure of a visual processing device that achieves visual processing that is equivalent to the visual processing device 1 provided with those profile data.

Each set of profile data is determined based on a mathematical equation that includes a computation for enhancing the values calculated from the input signal IS and the unsharp signal US. Here, this computation for enhancing is a computation that is achieved by a non-linear enhancement function, for example.

Thus, with each set of profile data, it is possible to achieve enhancement that is suited for the visual characteristics of the input signal IS or enhancement that is suited for the non-linear characteristics of the device that will output the output signal OS.

(1)

<<First Profile Data>>

The first profile data are determined in accordance with a computation that includes a function for enhancing the difference between the respective transformed values that are obtained by performing a predetermined transformation with respect to the input signal IS and the unsharp signal US. By doing this, it becomes possible to enhance the respective differences after transforming the input signal IS and the unsharp signal US in separate spaces. Thus, it is possible to achieve enhancement that is suited for the visual characteristics, for example.

Hereinafter, this will be described in more detail.

The values C of the elements of the first profile data (the value of the output signal OS) are expressed by $C=F2(F1(A)+F3(F1(A)-F1(B)))$ (hereinafter, this is referred to as Equation M1) using the value A of the input signal IS, the value B of the unsharp signal US, the transformation function F1, the inverse transformation function F2 of the transformation function, and an enhancement function F3.

Here, the transformation function F1 is a common logarithmic function. The inverse transformation function F2 is an exponential function (antilog) that functions as the inverse function of the common logarithmic function. The enhancement function F3 is any of the enhancement functions R1 to R3 explained using FIG. 109.

<<Equivalent Visual Processing Device 11>>

Figure 15:
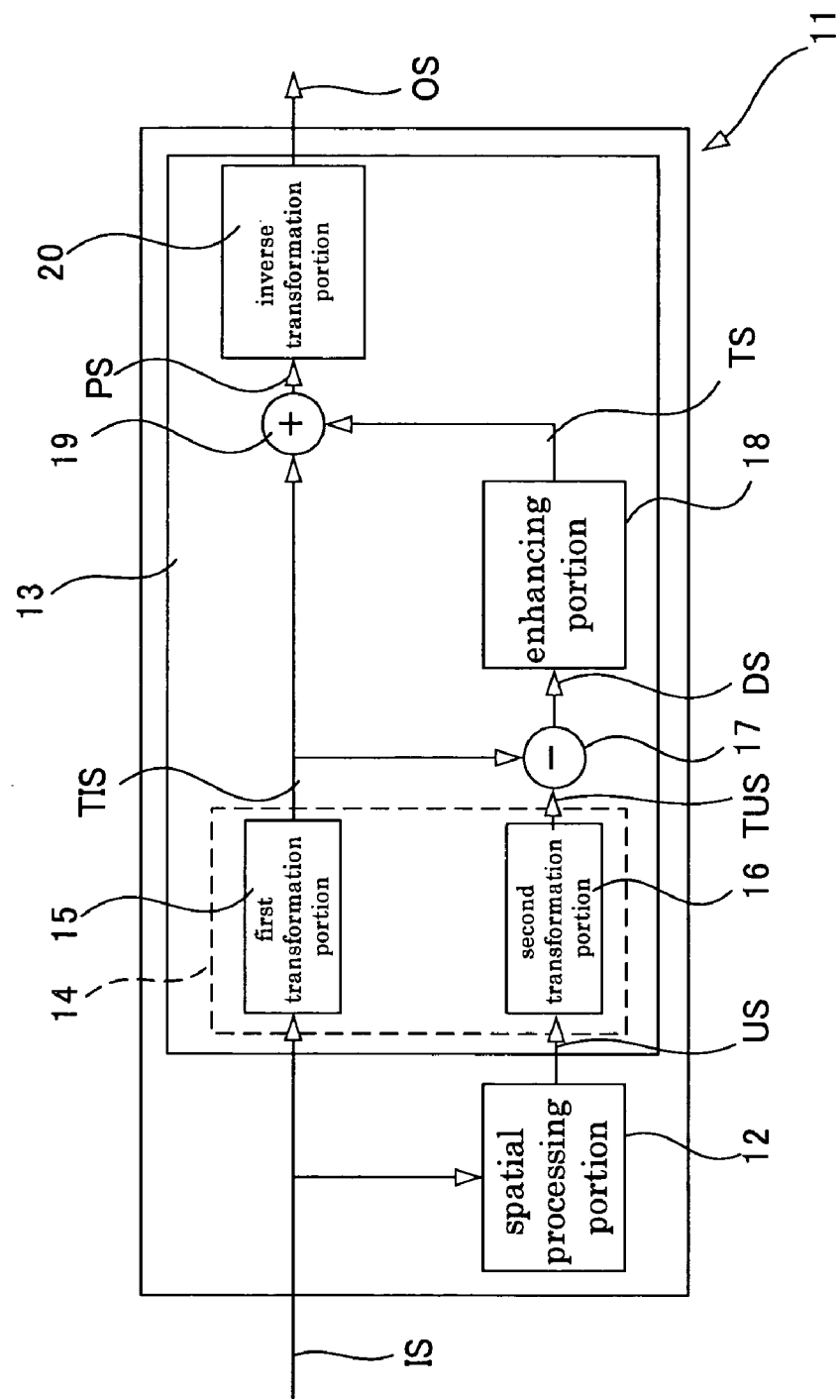
FIG. 15 is a block diagram describing the structure of the visual processing device 11 (first embodiment).

FIG. 15 shows a visual processing device 11 that is equivalent to the visual processing device 1 in which the first profile data have been registered to the two-dimensional LUT 4.

The visual processing device 11 is a device that outputs an output signal OS based on a computation that enhances the differences in the transformed values of the input signal IS and the unsharp signal US after the two have been subjected to a predetermined transformation. Thus, the input signal IS and the unsharp signal US are transformed to separate spaces and their respective differences are enhanced, and this allows for example enhancement that is suited for the visual characteristics to be achieved.

The visual processing device 11 shown in FIG. 15 is provided with a spatial processing portion 12 that performs spatial processing on the luminance of each pixel of an original image that it has obtained as an input signal IS and outputs an unsharp signal US, and a visual processing portion 13 that uses the input signal IS and the unsharp signal US to perform visual processing of the original image and outputs an output signal OS.

The spatial processing portion 12 performs the same operation as the spatial processing portion 2 of the visual processing device 1, and thus its further description is omitted.

The visual processing portion 13 is provided with a signal space transformation portion 14 that performs transformation of the signal space of the input signal IS and the unsharp signal US and outputs a transformed input signal TIS and a transformed unsharp signal TUS, a subtracting portion 17 that receives the transformed input signal TIS as a first input and the transformed unsharp signal TUS as a second input and outputs a difference signal DS of the difference between the two, an enhancing portion 18 that receives the difference signal DS as input and outputs an enhanced signal TS that has been enhanced, a summing portion 19 that receives the transformed input signal TIS as a first input and the enhanced signal TS as a second input and sums the two to obtain a summed signal PS that it then outputs, and an inverse transformation portion 20 that receives the summed signal PS as an input and outputs an output signal OS.

The signal space transformation portion 14 further includes a first transformation portion 15 that receives the input signal IS as input and outputs the transformed input signal TIS, and a second transformation portion 16 that receives the unsharp signal US as input and outputs the transformed unsharp signal TUS.

<<Action of the Equivalent Visual Processing Device 11>>

The operation of the visual processing portion 13 is described in further detail below.

The first transformation portion 15 uses the transformation function F1 to transform the input signal, which has the value A, to the transformed input signal TIS, which has the value F1(A). The second transformation portion 16 uses the transformation function F1 to transform the unsharp signal US, which has the value B, to the transformed unsharp signal TUS, which has the value F1(B). The subtracting portion 17 calculates the difference between the transformed input signal TIS having the value F1(A) and the transformed unsharp signal TUS having the value F1(B) and outputs a difference signal DS having the value F1(A)−F1(B). The enhancing portion 18 uses the enhancement function F3 to output an enhanced signal TS having a value F3(F1(A)−F1(B)) from the difference signal DS of the value F1(A)−F1(B). The summing portion 19 takes the sum of the transformed input signal TIS having the value F1(A) and the enhanced signal TS having the value F3(F1(A)−F1(B)) and outputs a summed signal PS that has a value F1(A)+F3(F1(A)−F1(B)). The inverse transformation portion 20 uses the inverse transformation function F2 to perform inverse transformation of the summed signal PS having the value F1(A)+F3(F1(A)−F1(B)), and outputs an output signal OS having the value F2(F1(A)+F3(F1(A)−F1(B))).

It should be noted that the calculations using the transformation function F1, the inverse transformation function F2, and the enhancement function F3 each can be performed using a one-dimensional LUT for that function, or can be performed without using a LUT.

<<Effects>>

The visual processing device 11 and the visual processing device 1 provided with the first profile data attain the same visual processing effects.

(i)

Visual processing using the transformed input signal TIS and the transformed unsharp signal TUS, which were transformed to logarithmic space by the transformation function F1, is achieved. Human visual characteristics are logarithmic, and visual processing that is suited for our visual characteristics is achieved by performing processing after transforming to logarithmic space.

(ii)

With each of these visual processing devices, contrast enhancement in the logarithmic space is achieved.

Figure 108:
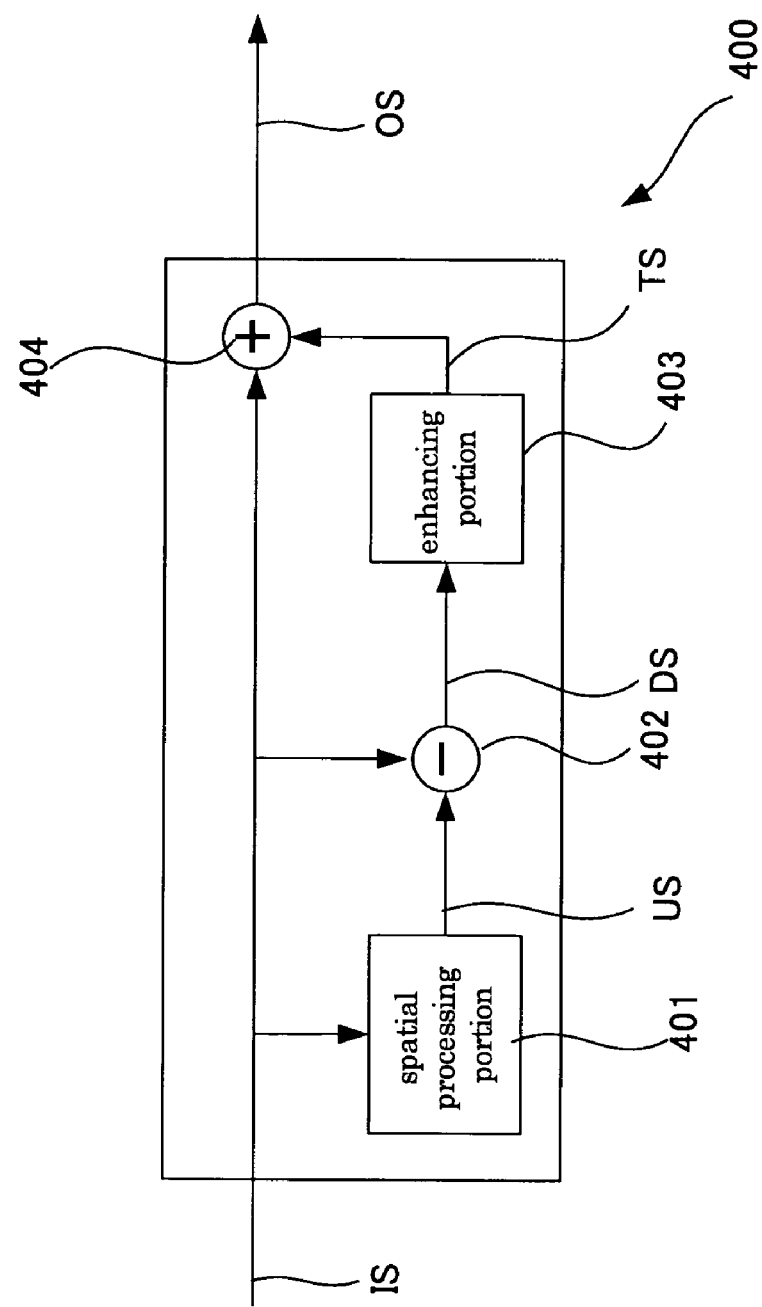
FIG. 108 is a block diagram describing the structure of the visual processing device 400, which employs unsharp masking (background art).

The conventional visual processing device 400 shown in FIG. 108 is used for performing edge enhancement using the unsharp signal US, which generally has a small degree of blur. However, if the visual processing device 400 performs contrast enhancement using an unsharp signal US that has a large degree of blur, then bright portions in the original image are not enhanced enough and dark portions in the original image are enhanced too much, resulting in visual processing that is not suited for our visual characteristics. That is, the visual processing device 400 has a tendency for insufficient enhancement when correcting by increasing the brightness and too much enhancement when correcting by increasing the darkness.

On the other hand, if visual processing is performed using the visual processing device 1 or the visual processing device 11, it is possible to perform visual processing that is suited for our visual characteristics over a range that spans dark and light areas, and enhancement for increased brightness and enhancement for increased darkness can be performed with good balance.

(iii)

With the conventional visual processing device 400, there are cases where the output signal OS is negative after visual processing, and fails.

On the other hand, if the value C of a particular element of the profile data found with Eq. M1 is outside of the range $0 \leq C \leq 255$, then the value of that element can be set to either 0 or 255 in order to prevent the pixel signals after correction from becoming negative and failing or becoming saturated and failing. This can be achieved regardless of the bit length for expressing the elements of the profile data.

<<Modified Examples>>

(i)

The transformation function F1 is not limited to a logarithmic function. For example, it is also possible for the transformation function F1 to achieve transformation that removes the gamma correction (for example, a gamma coefficient of "0.45") that is applied to the input signal IS, and for the inverse transformation function F2 to achieve transformation that applies the gamma correction that has been applied to the input signal IS.

The gamma correction that is applied to the input signal IS can thus be removed so as to perform processing under linear conditions. Thus, it is possible to correct optical blurring.

(ii)

With the visual processing device 11, it is also possible for the visual processing portion 13 to execute the computation of Eq. M1, without using the two-dimensional LUT 4, according to the input signal IS and the unsharp signal US. In this case, it is possible to use a one-dimensional LUT for the calculations of the functions F1 to F3.

(2)

<<Second Profile Data>>

The second profile data are determined by a computation that includes a function for enhancing the ratio between the input signal IS and the unsharp signal US. Thus, it is for example possible to achieve visual processing that enhances the sharp component.

Further, the second profile data are determined by a computation in which dynamic range compression is performed with respect to the ratio between the enhanced input signal IS and the unsharp signal US. Thus, it is for example possible to achieve visual processing in which the sharp component is enhanced while the dynamic range is compressed.

This is described in greater detail below.

The values C of the elements of the second profile data (the values of the output signal OS) are expressed by C=F4(A)*F5(A/B) (hereinafter, this is referred to as Equation M2) using the value A of the input signal IS, the value B of the unsharp signal US, a dynamic range compression function F4, and an enhancement function F5.

Here, the dynamic range compression function F4 is for example a monotonously increasing function such as a concave power function. For example, it is expressed by F4(x)=x^γ (0≦γ≦1). The enhancement function F5 is a power function. It is for example expressed by F5(x)=x^α (0<α≦1).

<<Equivalent Visual Processing Device 21>>

Figure 16:
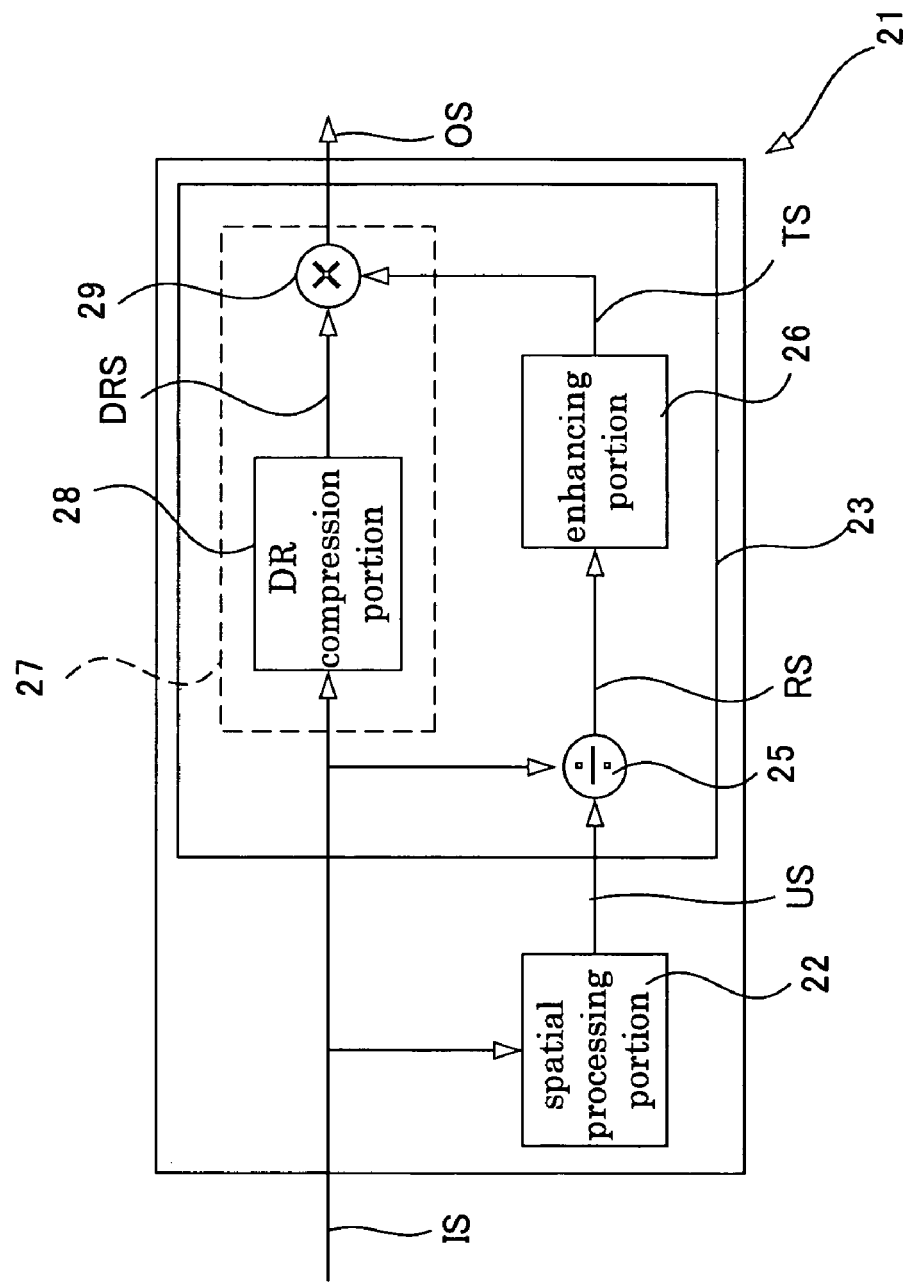
FIG. 16 is a block diagram describing the structure of the visual processing device 21 (first embodiment).

FIG. 16 shows a visual processing device 21 that is equivalent to the visual processing device 1 in which the second profile data have been registered to the two-dimensional LUT 4.

The visual processing device 21 is a device that outputs an output signal OS based on a computation that enhances the ratio between the input IS and the unsharp signal US. Thus, it is for example possible to achieve visual processing for enhancing the sharp component.

The visual processing device 21 also outputs an output signal OS based on a computation in which dynamic range compression is performed with respect to the ratio between the enhanced input signal IS and the unsharp signal US. Thus, it is for example possible to achieve visual processing in which the sharp component is enhanced while the dynamic range is compressed.

The visual processing device 21 shown in FIG. 16 is provided with a spatial processing portion 22 that executes spatial processing on the luminance value of each pixel of an original image that it has obtained as an input signal IS and outputs an unsharp signal US, and a visual processing portion 23 that uses the input signal IS and the unsharp signal US to perform visual processing of the original image and outputs an output signal OS.

The spatial processing portion 22 performs the same operation as the spatial processing portion 2 of the visual processing device 1, and thus it will not be described further.

The visual processing portion 23 is provided with a dividing portion 25 that takes the input signal IS as a first input and the unsharp signal US as a second input, and divides the input signal IS by the unsharp signal US to obtain a divided signal RS that it then outputs, an enhancing portion 26 that receives the divided signal RS as input and outputs an enhanced signal TS, and an output portion 27 that receives the input signal IS as a first input and the enhanced signal TS as a second input and outputs an output signal OS. The output portion 27 is provided with a DR compression portion 28 that receives the input signal IS as input and outputs a DR compressed signal DRS that has been subjected to dynamic range (DR) compression, and a multiplying portion 29 that receives the DR compressed signal DRS as a first input and the enhanced signal TS as a second input and outputs an output signal OS.

<<Action of the Equivalent Visual Processing Device 21>>

The operation of the visual processing portion 23 is described in further detail below.

The dividing portion 25 divides the input signal IS, which has the value A, by the unsharp signal US, which has the value B, and outputs a divided signal RS having the value A/B. The enhancing portion 26 uses the enhancement function F5 to output an enhanced signal TS having the value F5(A/B) from the divided signal RS having the value A/B. The DR compression portion 28 uses the dynamic range compression function F4 to output a DR compressed signal DRS having the value F4(A) from the input signal IS, whose value is A. The multiplying portion 29 multiplies the DR compressed signal DRS, whose value is F4(A), and the enhanced signal TS, whose value is F5(A/B), and outputs an output signal OS having the value F4(A)*F5(A/B).

It should be noted that the calculations using the dynamic range compression function F4 and the enhancement function F5 can each be performed using a one-dimensional LUT for that function, or can be performed without using a LUT.

<<Effects>>

The visual processing device 21 and the visual processing device 1 provided with the second profile data achieve the same visual processing effects.

(i)

Figure 17:
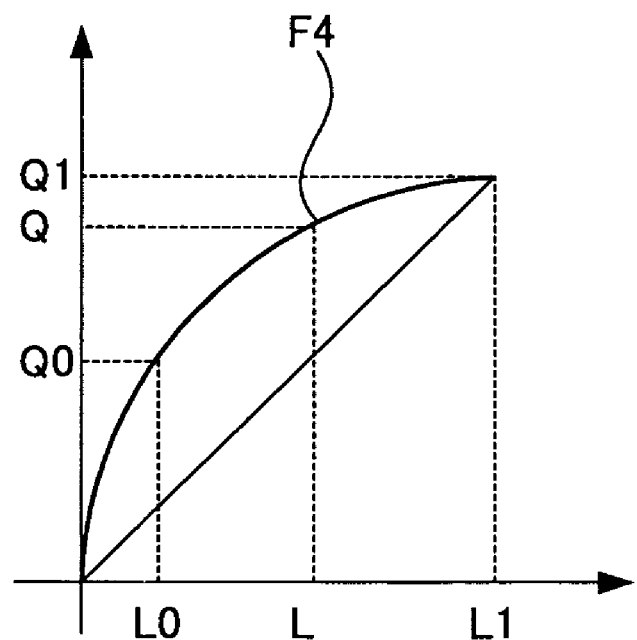
FIG. 17 is an explanatory diagram describing the dynamic range compression function F4 (first embodiment).

Conventionally, when compressing the overall dynamic range of an image, the dynamic range compression function F4 shown in FIG. 17 is used to compress the grey level from dark portions to highlights without causing saturation. That is, when L0 is the target black level to be reproduced in the image signal before compression and L1 is the maximum white level, then the dynamic range L1:L0 prior to compression is compressed to the dynamic range Q1:Q0 after compression. However, the contrast, which is the ratio of the image signal level, is lowered to (Q1/Q0)*(L0/L1) times its value due to dynamic range compression. Here, the dynamic range compression function F4 is a concave power function, for example.

However, with the visual processing device 21 and the visual processing device 1 that has been provided with the second profile data, the divided signal RS having the value A/B, that is, the sharp signal enhanced by the enhancement function F5, is multiplied by the DR compressed signal DRS. The result is that local contrast is enhanced. Here, the enhancement function F5 is a power function such as that shown in FIG. 18 (F5(x)=x^cc), and leads to enhancement in the bright direction when the value of the divided signal RS is greater than 1 and to enhancement in the dark direction when it is less than 1.

In general, human vision has the characteristic that an image will be viewed at a same contrast as long as local contrast is maintained, even if there is a drop in the overall contrast. Thus, with the visual processing device 21 and the visual processing device 1 that has been provided with the second profile data, it is possible to achieve visual processing with which the dynamic range is compressed but the visual contrast is not lowered.

(ii)

The effects of the present invention are described in further detailed below.

The dynamic range compression function F4 shall be F4(x)=x^γ (γ=0.6). The enhancement function F5 shall be F5(x)=x^α (α=0.4). Further, if the maximum white level of the input signal is normalized to 1, then the target black level to be reproduced shall be the value 1/300. That is, the dynamic range of the input signal IS shall be 300:1.

If the dynamic range of this input signal IS is compressed using the dynamic range compression function F4, then the dynamic range after compression becomes F4(1):F4(1/300)=30:1. That is, the dynamic range is compressed by 1/10 due to the dynamic range compression function F4.

On the other hand, the value C of the output signal OS is expressed by the above equation M2, where C=(A^0.6)*{(A/B)^0.4}, that is, C=A/(B^0.4). Here, in a local range the value of B is regarded as constant and thus C is proportional to A. That is, ratio of the amount of change of the value C and the amount of change of the value A is 1, and the local contrast does not change between the input signal IS and the output signal OS.

As mentioned above, human vision has the characteristic that as long as local contrast is maintained, an object will be viewed at the same contrast even if there is a drop in the overall contrast. Thus, with the visual processing device 21 and the visual processing device 1 that has been provided with the second profile data, it is possible to achieve visual processing with which the dynamic range is compressed but visually the contrast is not lowered.

Figure 18:
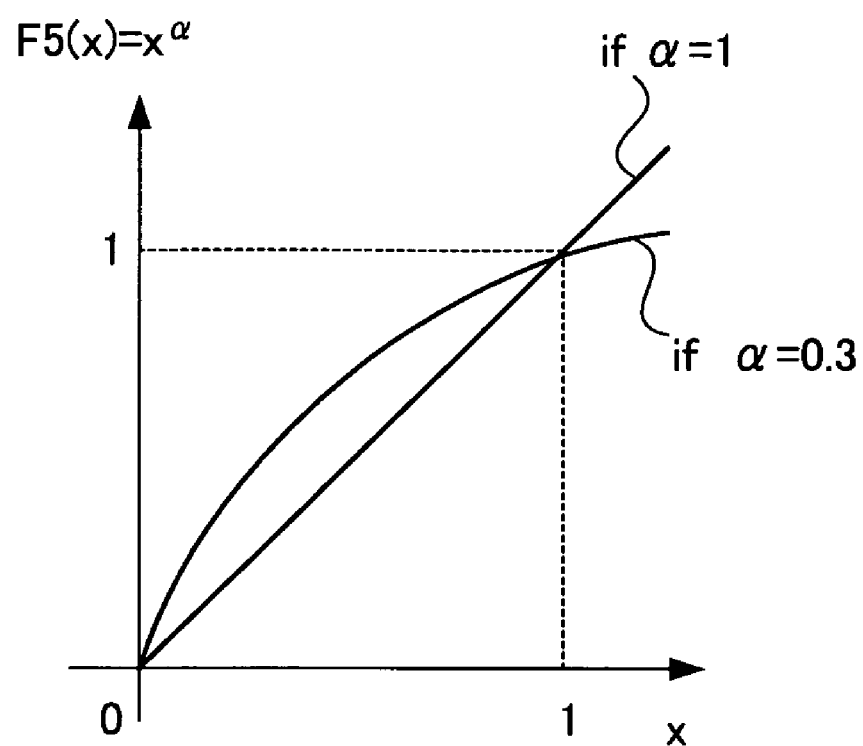
FIG. 18 is an explanatory diagram describing the enhancement function F5 (first embodiment).

It should be noted that if the power multiplier a of the enhancement function F5 shown in FIG. 18 is larger than 0.4, then it is possible to raise the visible contrast of the output signal OS over the input signal IS while performing compression of the dynamic range.

(iii)

Because the above effects can be achieved with the present invention, the invention is particularly useful in the following conditions. That is, it is possible to reproduce a high contrast image on a display having a narrow physical dynamic range without squashing the dark and light areas. It is also possible for example to display high contrast video on a television projector in a bright environment and to obtain a high contrast print using thin inks (on a printer that can print light colors only).

<<Modified Examples>>

(i)

With the visual processing device 21, it is also possible for the visual processing portion 23 to perform the calculation of Eq. M2 based on the input signal IS and the unsharp signal US without using the two-dimensional LUT 4. In this case, it is possible to use a one-dimensional LUT for the calculation of each of the functions F4 and F5.

(ii)

It should be noted that if the value C of a particular element of the profile data obtained by the Eq. M2 is C>255, then the value C of that element can be regarded as 255.

(3)

<<Third Profile Data>>

The third profile data are determined based on a computation that includes a function for enhancing the ratio between the input signal IS and the unsharp signal US. Thus, it is for example possible to achieve visual processing that enhances the sharp component.

This is described in further detail below.

In Eq. M2 of the second profile data, it is also possible for the dynamic range compression function F4 to be a direct proportion function of a proportional coefficient 1. In this case, the value C of each element of the third profile data (the value of the output signal OS) is expressed by $C=A*F5(A/B)$ (hereinafter, this is referred to as Equation M3) using the value A of the input signal IS, the value B of the unsharp signal US, and the enhancement function F5.

<<Equivalent Visual Processing Device 31>>

Figure 19:
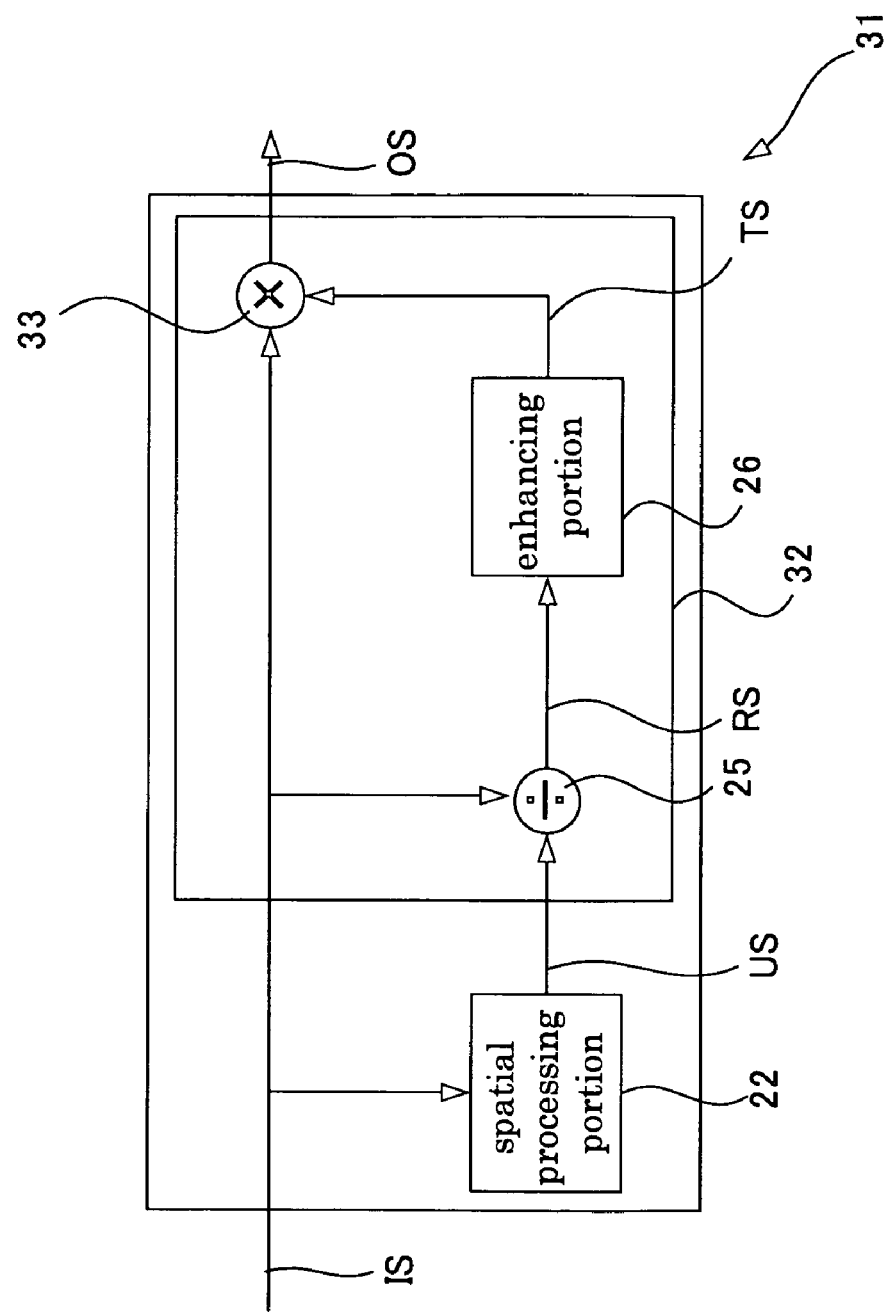
FIG. 19 is a block diagram describing the structure of the visual processing device 31 (first embodiment).

FIG. 19 shows a visual processing device 31 that is equivalent to the visual processing device 1 in which the third profile data have been registered to the two-dimensional LUT 4.

The visual processing device 31 is a device that outputs an output signal OS based on a computation that enhances the ratio between the input IS and the unsharp signal US. Thus, it is for example possible to achieve visual processing for enhancing the sharp component.

The visual processing device 31 shown in FIG. 19 differs from the visual processing device 21 shown in FIG. 16 in that it is not provided with the DR compression portion 28. The visual processing device 31 shown in FIG. 19 is described below, assigning the same reference numerals to and omitting description of portions that perform the same operations as those of the visual processing portion 21 shown in FIG. 16.

The visual processing device 31 is provided with a spatial processing portion 22 that performs spatial processing of the luminance value of each pixel of an original image that it has obtained as an input signal IS and outputs an unsharp signal US, and a visual processing portion 32 that uses the input signal IS and the unsharp signal US to perform visual processing of the original image and outputs an output signal OS.

The spatial processing portion 22 performs the same operation as the spatial processing portion 2 of the visual processing device 1, and thus it will not be described further.

The visual processing portion 32 is provided with a dividing portion 25 that takes an input signal IS as a first input and an unsharp signal US as a second input, and divides the input signal IS by the unsharp signal US to obtain a divided signal RS that it then outputs, an enhancing portion 26 that receives the divided signal RS as input and outputs an enhanced signal TS, and a multiplying portion 33 that receives the input signal IS as a first input and the enhanced signal TS as a second input and outputs an output signal OS.

<<Action of the Equivalent Visual Processing Device 31>>

The operation of the visual processing portion 32 is described in further detail below.

The dividing portion 25 and the enhancing portion 26 perform the same operations as described with regard to the visual processing device 21 shown in FIG. 16.

The multiplying portion 33 multiplies the input signal IS, whose value is A, and the enhanced signal TS, whose value is value $F5(A/B)$, and outputs an output signal OS having the value $A*F5(A/B)$. Here, the enhancement function F5 is the same as that shown in FIG. 18.

It should be noted that the calculation using the enhancement function F5, as described with regard to the visual processing device 21 shown in FIG. 16, can be performed using a one-dimensional LUT for that function, or can be performed without using a LUT.

<Effects>

The visual processing device 31 and the visual processing device 1 that has been provided with the third profile data achieve the same visual processing effect.

(i)

With the enhancing portion 26, enhancement of the sharp signal (divided signal RS), which is expressed as the ratio of the input signal IS to the unsharp signal US, is performed, and the enhanced sharp signal and the input signal IS are multiplied. Enhancement of the sharp signal, which is expressed as the ratio of the input signal IS to the unsharp signal US, is equivalent to calculating the difference between the input signal IS and the unsharp signal US in logarithmic space. That is, visual processing that is suited to the logarithmic visual characteristics of humans is achieved.

(ii)

The amount of enhancement by the enhancement function F5 is large if the input signal IS is large (if it is bright) and is small if the input signal IS is small (if it is dark). Also, the amount of enhancement toward increased brightness is greater than the amount of enhancement toward increased darkness. Thus, it is possible to achieve visual processing that is suited for our visual characteristics, and visual processing that is balanced and natural is achieved.

(iii)

It should be noted that if the value C of a particular element of the profile data obtained by Eq. M3 is C>255, then the value C of that element can be regarded as 255.

(iv)

With the processing employing the equation M3, although compression of the dynamic range is not performed with respect to the input signal IS, local contrast can be enhanced and the dynamic range can be visually compressed and expanded.

(4)

<<Fourth Profile Data>>

The fourth profile data are determined based on a computation that includes a function for enhancing the difference between the input signal IS and the unsharp signal US in accordance with the value of the input signal IS. Due to this, it is for example possible to enhance the sharp component of the input signal IS, for example, in accordance with the value of the input signal IS. Thus, enhancement of the input signal IS can be performed suitably over a range including dark areas and light areas.

Further, the fourth profile data are determined based on a computation that adds to the enhanced value the value that is obtained by compressing the dynamic range of the input signal IS. Thus, it is possible to enhance the sharp component of the input signal IS, for example, in accordance with the value of the input signal IS while performing compression of the dynamic range.

This is described in further detail below.

The values C of the elements of the fourth profile data (the values of the output signal OS) are expressed by $C=F8(A)+F6(A)*F7(A-B)$ (hereinafter, this is referred to as Equation M4) using the value A of the input signal IS, the value B of the unsharp signal US, an enhancement amount adjustment function F6, an enhancement function F7, and a dynamic range compression function F8.

Here, the enhancement amount adjustment function F6 is a function that monotonically increases with respect to the value of the input signal IS. That is, when the value A of the input signal IS is small, the value of the enhancement amount adjustment function F6 also is small, and when the value A of the input signal IS is large, then the value of the enhancement amount adjustment function F6 also is large. The enhancement function F7 is any one of the enhancement functions R1 to R3 that were described using FIG. 109. The dynamic range compression function F8 is the power function described using FIG. 17, and is expressed by $F8(x)=x^\gamma (0 \leq \gamma \leq 1)$.

<<Equivalent Visual Processing Device 41>>

Figure 20:
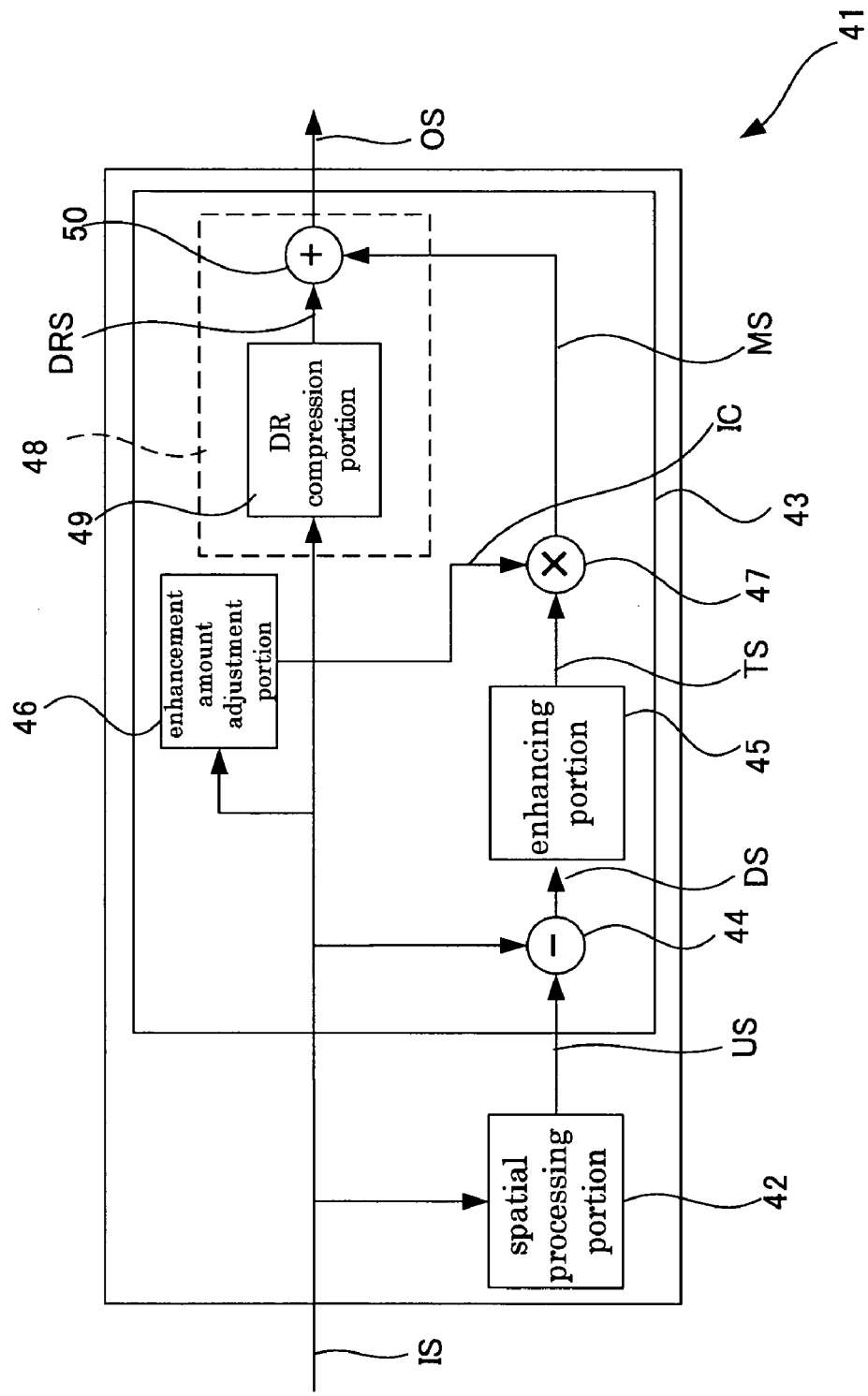
FIG. 20 is a block diagram describing the structure of the visual processing device 41 (first embodiment).

FIG. 20 shows a visual processing device 41 that is equivalent to the visual processing device 1 in which the fourth profile data have been registered to the two-dimensional LUT 4.

The visual processing device 41 is a device that outputs an output signal OS based on a computation for enhancing the difference between the input signal IS and the unsharp signal US in accordance with the value of the input signal IS. Due to this, it is for example possible to enhance the sharp component of the input signal IS, for example, in accordance with the value of the input signal IS. Thus, enhancement can be suitably performed from dark areas through light areas of the input signal IS.

Further, the visual processing device 41 outputs an output signal OS based on a computation that adds to the enhanced value, the value that is obtained by compressing the dynamic range of the input signal IS. Thus, it is possible to enhance the sharp component of the input signal IS, for example, in accordance with the value of the input signal IS while performing compression of the dynamic range.

The visual processing device 41 shown in FIG. 20 is provided with a spatial processing portion 42 that performs spatial processing of the luminance value of each pixel of an original image that it has obtained as an input signal IS and outputs an unsharp signal US, and a visual processing portion 43 that uses the input signal IS and the unsharp signal US to perform visual processing of the original image and outputs an output signal OS.

The spatial processing portion 42 performs the same operation as the spatial processing portion 2 of the visual processing device 1, and thus it will not be described further.

The visual processing portion 43 is provided with a subtracting portion 44 that receives an input signal IS as a first input and an unsharp signal US as a second input and then outputs a difference signal DS of the difference between the two, an enhancing portion 45 that receives the difference signal DS as an input and outputs an enhanced signal TS, an enhancement amount adjustment portion 46 that receives the input signal IS as input and outputs an enhancement amount adjusted signal IC, a multiplying portion 47 that receives the enhancement amount adjusted signal IC as a first input and the enhanced signal TS as a second input and multiplies the enhancement amount adjusted signal IC and the enhanced signal TS to obtain a multiplied signal MS that it then outputs, and an output portion 48 that receives the input signal IS as a first input and the multiplied signal MS as a second input and outputs an output signal OS. The output portion 48 is provided with a DR compression portion 49 that receives the input signal IS as input and outputs a DR compressed signal DRS that has been subjected to dynamic range (DR) compression, and a summing portion 50 that receives the DR compressed signal DRS as a first input and the multiplied signal MS as a second input and outputs an output signal OS.

<<Action of the Equivalent Visual Processing Device 41>>

The operation of visual processing portion 43 is described in further detail below.

The subtracting portion 44 calculates the difference between the input signal IS, which has the value A, and the unsharp signal US, which has the value B, and outputs a difference signal DS having the value A−B. The enhancing portion 45 uses the enhancement function F7 to output an enhanced signal TS having the value F7(A−B) from the difference signal DS, which has the value A−B. The enhancement amount adjustment portion 46 uses the enhancement amount adjustment function F6 to output an enhancement amount adjusted signal IC having the value F6(A) from the input signal IS, which has the value A. The multiplying portion 47 multiplies the enhancement amount adjusted signal IC, which has the value F6(A), and the enhanced signal TS, which has the value F7(A−B), and outputs the result as a multiplied signal MS having the value F6(A)*F7(A−B). The DR compression portion 49 uses the dynamic range compression function F8 to output a DR compressed signal DRS having the value F8(A) from the input signal IS, which has the value A. The summing portion 50 takes the sum of the DR compressed signal DRS and the multiplied signal MS, which has the value F6(A)*F7(A−B), and outputs an output signal OS having the value F8(A)+F6(A)*F7(A−B).

It should be noted that the calculations using the enhancement amount adjustment function F6, the enhancement function F7, and the dynamic range compression function F8 can each be performed using a one-dimensional LUT for that function, or can be performed without using a LUT.

<<Effects>>

The visual processing device 41 and the visual processing device 1 provided with the fourth profile data achieve the same visual processing effects.

(i)

Adjustment of the enhancement amount of the difference signal DS is performed based on the value A of the input signal IS. Thus, it is possible to perform dynamic range compression while maintaining local contrast over dark areas to light areas.

(ii)

The enhancement amount adjustment function F6 is a function in which the values increases monotonically, and thus it can be a function with which the amount of increase in the values of the function decreases as the value A of the input signal IS increases. In this case, the value of the output signal OS is kept from becoming saturated.

(iii)

Figure 109:
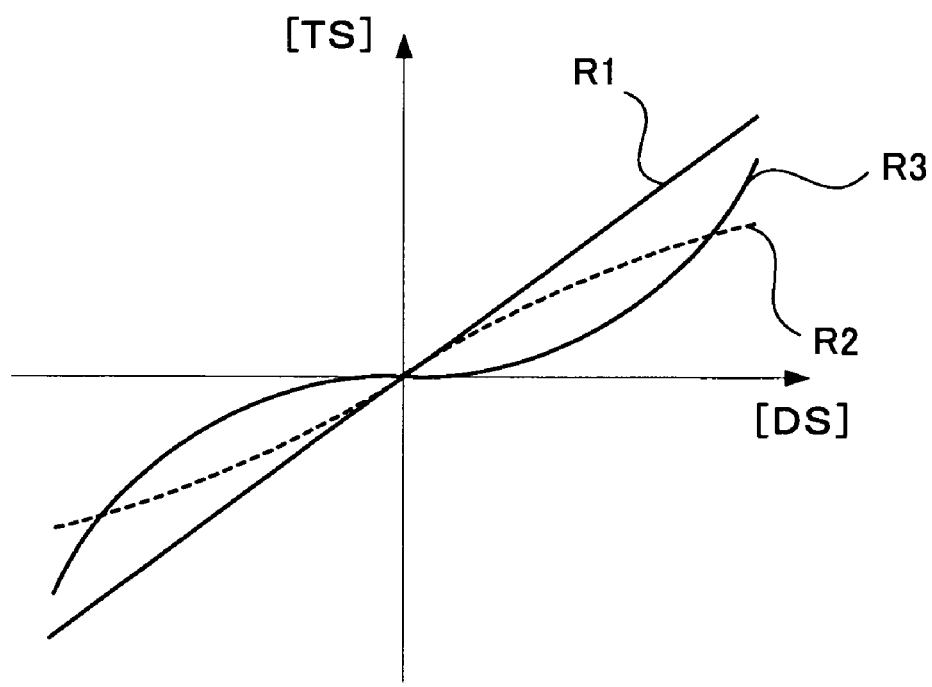
FIG. 109 is an explanatory diagram describing the enhancement functions R1 to R3 (background art).

If the enhancement function F7 is the enhancement function R2 that was described using FIG. 109, then it is possible to inhibit the amount of enhancement when the absolute value of the difference signal DS is large. Thus, the enhancement value in high-sharpness areas is kept from becoming saturated, and this allows visual processing that leads to a visually natural image to be executed.

<<Modified Examples>>

(i)

With the visual processing device 41, the visual processing portion 43 can also perform the computation of Eq. M4 based on the input signal IS and the unsharp signal US without using the two-dimensional LUT 4. In this case, it can also use a one-dimensional LUT in the calculations of any of the functions F6 to F8.

(ii)

If the enhancement function F7 is a direct proportion function of a proportion coefficient 1, then there is no particular need to provide the enhancing portion 45.

(iii)

It should be noted that if the value C of a particular element of the profile data found through Eq. M4 is outside the range $0 \leq C \leq 255$, then the value C of that element can be regarded as 0 or 255.

(5)

<Fifth Profile Data>

The fifth profile data are determined based on a computation that includes a function for enhancing the difference between the input signal IS and the unsharp signal US in accordance with the value of the input signal IS. Due to this, it is for example possible to enhance the sharp component of the input signal IS, for example, in accordance with the value of the input signal IS. Thus, enhancement of the input signal IS can be performed suitably across dark areas to light areas.

This is described in further detail below.

It is also possible that in Eq. M4 of the fourth profile data, the dynamic range compression function F8 is a direct proportion function of a proportion coefficient 1. In this case, the values C of the elements of the fifth profile data (the values of the output signal OS) are expressed by C=A+F6(A)*F7(A−B) (hereinafter, this is referred to as Equation M5) using the value A of the input signal IS, the value B of the unsharp signal US, the enhancement amount adjustment function F6, and the enhancement function F7.

<<Equivalent Visual Processing Device 51>>

Figure 21:
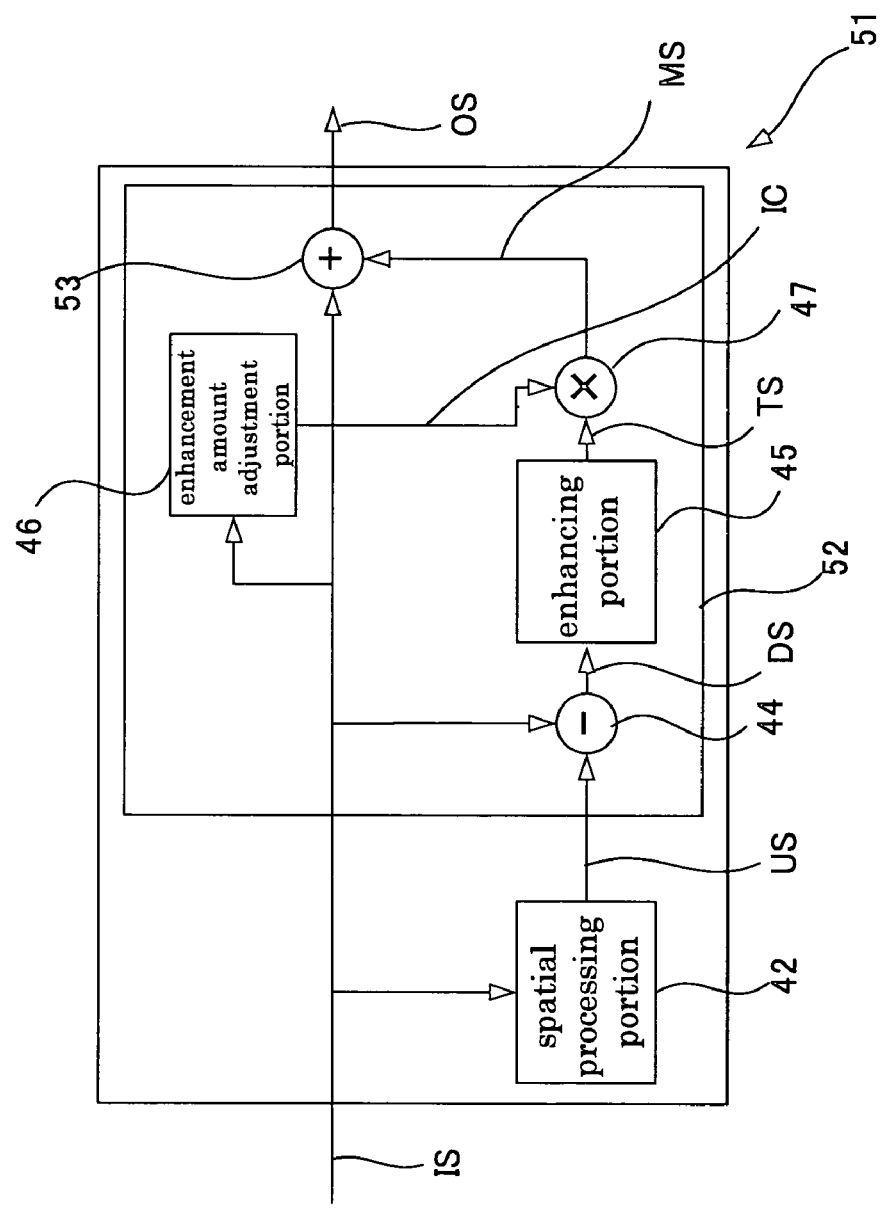
FIG. 21 is a block diagram describing the structure of the visual processing device 51 (first embodiment).

FIG. 21 shows a visual processing device 51 that is equivalent to the visual processing device 1 in which the fifth profile data have been registered to the two-dimensional LUT 4.

The visual processing device 51 is a device that outputs an output signal OS based on a computation for enhancing the difference between the input signal IS and the unsharp signal US in accordance with the value of the input signal IS. Due to this, it is for example possible to enhance the sharp component of the input signal IS, for example, in accordance with the value of the input signal IS. Thus, enhancement of the input signal IS can be suitably performed over a range that spans dark areas and light areas.

The visual processing device 51 shown in FIG. 21 differs from the visual processing device 41 shown in FIG. 20 in that it is not provided with the DR compression portion 49. The visual processing device 51 shown in FIG. 21 is described below, assigning the same reference numerals to portions that perform the same operations as those of the visual processing portion 41 shown in FIG. 20, and detailed description thereof is omitted.

The visual processing device 51 is provided with a spatial processing portion 42 that executes spatial processing of the brightness value of each pixel of an original image that it has obtained as an input signal IS and outputs the result as an unsharp signal US, and a visual processing portion 52 that uses the input signal IS and the unsharp signal US to perform visual processing of the original image and outputs the result as an output signal OS.

The spatial processing portion 42 performs the same operation as the spatial processing portion 2 of the visual processing device 1, and thus it will not be described further.

The visual processing portion 52 is provided with a subtracting portion 44 that receives an input signal IS as a first input and an unsharp signal US as a second input and then outputs a difference signal DS of the difference between the two, an enhancing portion 45 that receives the difference signal DS as input and outputs an enhanced signal TS, an enhancement amount adjustment portion 46 that receives the input signal IS as input and outputs an enhancement amount adjusted signal IC, a multiplying portion 47 that receives the enhancement amount adjusted signal IC as a first input and the enhanced signal TS as a second input and multiplies the enhancement amount adjusted signal IC and the enhanced signal TS to obtain a multiplied signal MS that it then outputs, and a summing portion 53 that receives the input signal IS as a first input and the multiplied signal MS as a second input and outputs an output signal OS.

<<Action of the Equivalent Visual Processing Device 51>>

The operation of the visual processing portion 52 is described in further detail below.

The subtracting portion 44, the enhancing portion 45, the enhancement amount adjustment portion 46, and the multiplying portion 47 perform the same operations as those described with regard to the visual processing device 41 shown in FIG. 20.

The summing portion 53 takes the sum of the input signal IS, which has the value A, and the multiplied signal MS, which has the value F6(A)*F7(A−B), and outputs an output signal OS having the value A+F6(A)*F7(A−B).

It should be noted that as described with respect to the visual processing device 41 shown in FIG. 20, the calculations using the enhancement amount adjustment function F6 and the enhancement function F7 can each be performed using a one-dimensional LUT for that function, or can be performed without using a LUT.

<<Effects>>

The visual processing device 51 and the visual processing device 1 provided with the fifth profile data achieve the same visual processing effects. Moreover, they achieve substantially the same visual processing effects as those attained by the visual processing device 41 and the visual processing device 1 provided with the fourth profile data.

(i)

The adjustment of the enhancement amount of the difference signal DS is performed based on the value A of the input signal IS. Thus, it is possible to attain a uniform amount of contrast enhancement from dark areas up to light areas.

<<Modified Examples>>

(i)

If the enhancement function F7 is a direct proportion function of a proportion coefficient 1, then it is not particularly necessary to provide the enhancing portion 45.

(ii)

It should be noted that if the value C of a particular element of the profile data found through Eq. M5 is outside the range $0 \leq C \leq 255$, then the value C of that element can be taken as 0 or 255.

(6)

<<Sixth Profile Data>>

The sixth profile data are determined based on a computation that corrects the gradation of a value that is obtained by adding the value of the input signal IS to a value obtained by enhancing the difference between the input signal IS and the unsharp signal US.

Thus, it is for example possible to achieve visual processing in which gradation correction is performed with respect to an input signal IS whose sharp component has been enhanced.

This is described in further detail below.

The values C of the elements of the sixth profile data (the values of the output signal OS) are expressed by C=F10(A+F9(A−B)) (hereinafter, this is referred to as Equation M6) using the value A of the input signal IS, the value B of the unsharp signal US, an enhancement function F9, and a gradation correction function F10.

Here, the enhancement function F9 is any one of the enhancement functions R1 to R3 that were described using FIG. 109. The gradation correction function F10 is a function that is used in ordinary gradation correction, and for example is a gamma correction function, an S-shaped gradation correction function, or an inverted S-shaped gradation correction function.

<<Equivalent Visual Processing Device 61>>

Figure 22:
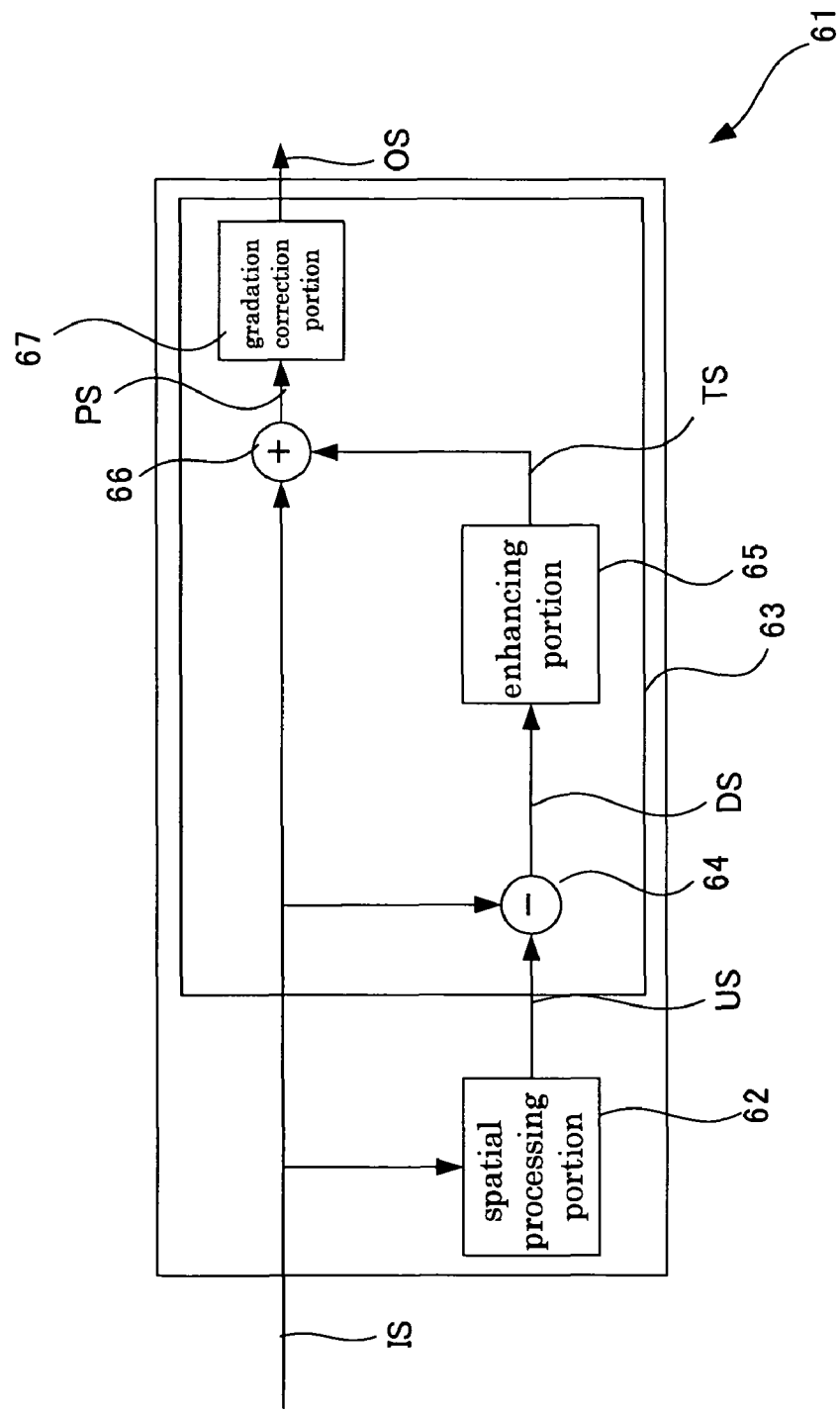
FIG. 22 is a block diagram describing the structure of the visual processing device 61 (first embodiment).

FIG. 22 shows a visual processing device 61 that is equivalent to the visual processing device 1 in which the sixth profile data have been registered to the two-dimensional LUT 4.

The visual processing device 61 is a device that outputs an output signal OS based on a computation that corrects the gradation of the value obtained by adding the value of the input signal IS to a value that is obtained by enhancing the difference between the input signal IS and the unsharp signal US. Thus, it is for example possible to achieve visual processing in which gradation correction is performed with respect to an input signal IS whose sharp component has been enhanced.

The visual processing device 61 shown in FIG. 22 is provided with a spatial processing portion 62 that performs spatial processing of the luminance value of each pixel of an original image that it has obtained as an input signal IS and outputs an unsharp signal US, and a visual processing portion 63 that uses the input signal IS and the unsharp signal US to perform visual processing of the original image and outputs an output signal OS.

The spatial processing portion 62 performs the same operation as the spatial processing portion 2 of the visual processing device 1, and thus it will not be described further.

The visual processing portion 63 is provided with a subtracting portion 64 that receives an input signal IS as a first input and an unsharp signal US as a second input and then outputs a difference signal DS of the difference between the two, an enhancing portion 65 that receives the difference signal DS as input and outputs an enhanced signal TS that has been enhanced, a summing portion 66 that receives the input signal IS as a first input and the enhanced signal TS as a second input and outputs a summed signal PS that is the sum of the two, and a gradation correction portion 67 that receives the summed signal PS as input and outputs an output signal OS.

<<Action of the Equivalent Visual Processing Device 61>>

The operation of the visual processing portion 63 is described in further detail below.

The subtracting portion 64 calculates the difference between the input signal IS, which has the value A, and the unsharp signal US, which has the signal B, and outputs a difference signal DS having the value A−B. The enhancing portion 65 uses the enhancement function F9 to output an enhanced signal TS having the value F9(A−B) from the difference signal DS, which has the value A−B. The summing portion 66 takes the sum of the input signal IS, which has the value A, and the enhanced signal TS, which has the value F9(A−B), and outputs a summed signal PS having the value A+F9(A−B). The gradation correction portion 67 uses the gradation correction function F10 to output an output signal OS having the value F10(A+F9(A−B)) from the summed signal PS, which has the value A+F9(A−B).

It should be noted that the calculations using the enhancement function F9 and the gradation correction function F10 can each be performed using a one-dimensional LUT for that function, or can be performed without using a LUT.

<<Effects>>

The visual processing device 61 and the visual processing device 1 furnished with the sixth profile data achieve the same visual processing effects.

(i)

The difference signal DS is enhanced by the enhancement function F9 and is added to the input signal IS. Thus, it becomes possible to enhance the contrast of the input signal IS. Moreover, the gradation correction portion 67 corrects the gradation of the summed signal PS. Thus, it is for example possible to further enhance the contrast at intermediate tones, which frequently appear in original images. It is also possible to brighten the entire summed signal PS, for example. Thus, spatial processing and gradation processing can be simultaneously achieved together.

<<Modified Examples>>

(i)

With the visual processing device 61, the visual processing portion 63 can also perform the computation of Eq. M6 based on the input signal IS and the unsharp signal US without using the two-dimensional LUT 4. In this case, it is also possible to use a one-dimensional LUT for each of the calculations of the functions F9 and F10.

(ii)

It should be noted that if the value C of a particular element of the profile data found through Eq. M6 is outside the range $0 \leq C \leq 255$, then the value C of that element can be regarded as 0 or 255.

(7)

<<Seventh Profile Data>>

The seventh profile data are determined based on a computation that adds a value that is obtained by correcting the gradation of the input signal IS to a value that is obtained by enhancing the difference between the input signal IS and the unsharp signal US. Here, enhancement of the sharp component and gradation correction of the input signal IS are performed independently. Thus, it is possible to perform a fixed enhancement of the sharp component, regardless of the amount of gradation correction of the input signal IS.

This is described in further detail below.

The values C of the elements of the seventh profile data (the values of the output signal OS) are expressed by C=F12(A)+F11(A−B) (hereinafter, this is referred to as Equation M7) using the value A of the input signal IS, the value B of the unsharp signal US, an enhancement function F11, and a gradation correction function F12.

Here, the enhancement function F11 is any one of the enhancement functions R1 to R3 described using FIG. 109. The gradation correction function F12 is for example a gamma correction function, an S-shaped gradation correction function, or an inverted S-shaped gradation correction function.

<<Equivalent Visual Processing Device 71>>

Figure 23:
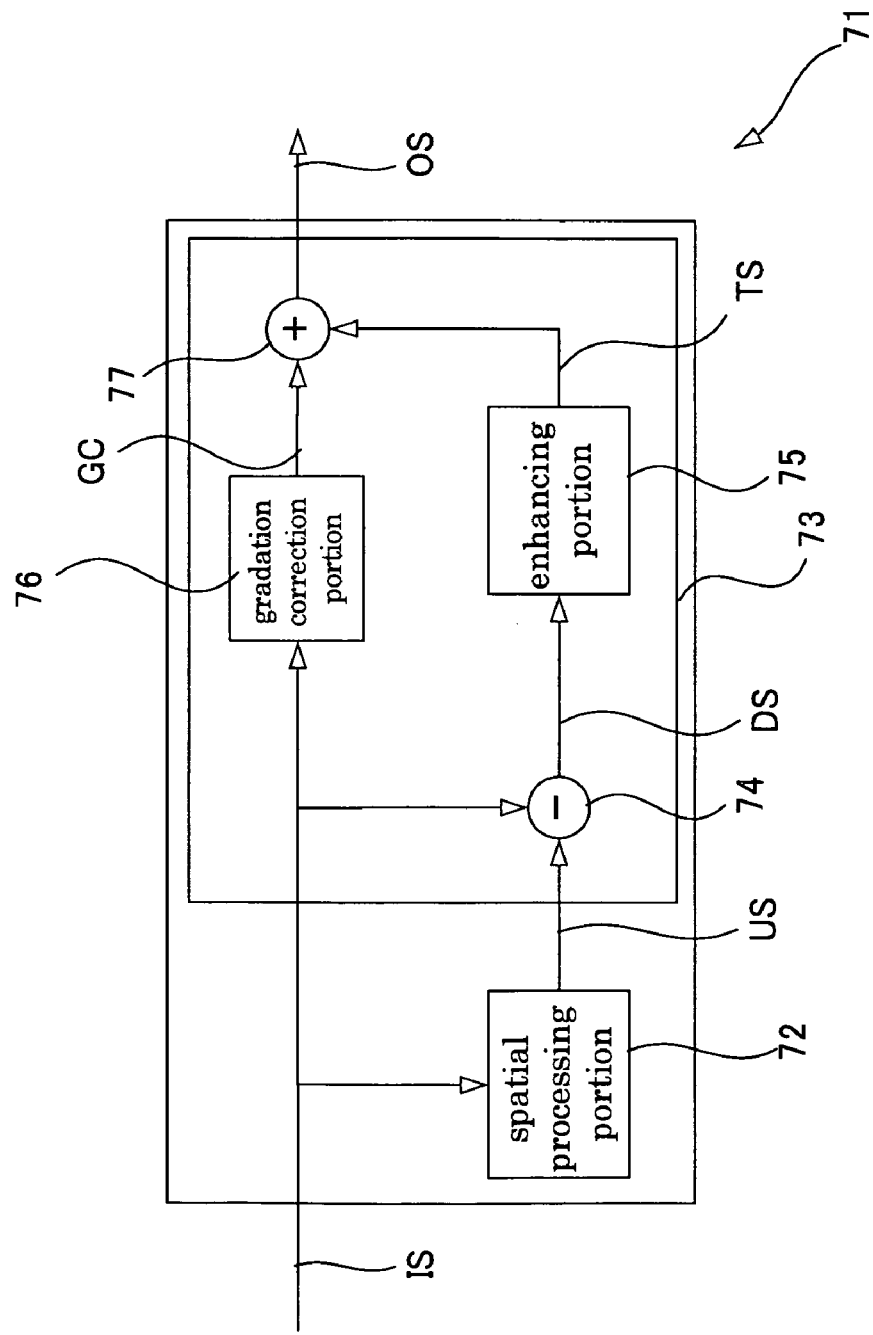
FIG. 23 is a block diagram describing the structure of the visual processing device 71 (first embodiment).

FIG. 23 shows a visual processing device 71 that is equivalent to the visual processing device 1 in which the seventh profile data have been registered to the two-dimensional LUT 4.

The visual processing device 71 is a device that outputs an output signal OS based on a computation that adds a value that is obtained by correcting the gradation of the input signal IS to a value that is obtained by enhancing the difference between the input signal IS and the unsharp signal US. Here, enhancement of the sharp component and gradation correction of the input signal IS are performed independently. Thus, it is possible to perform a fixed enhancement of the sharp component, regardless of the amount of gradation correction of the input signal IS.

The visual processing device 71 shown in FIG. 23 is provided with a spatial processing portion 72 that performs spatial processing of the luminance value of each pixel of an original image that it has obtained as an input signal IS and outputs an unsharp signal US, and a visual processing portion 73 that uses the input signal IS and the unsharp signal US to perform visual processing of the original image and outputs an output signal OS.

The spatial processing portion 72 performs the same operation as the spatial processing portion 2 of the visual processing device 1, and thus it will not be described further.

The visual processing portion 73 is provided with a subtracting portion 74 that receives the input signal IS as a first input and the unsharp signal US as a second input and then outputs a difference signal DS of the difference between the two, an enhancing portion 75 that receives the difference signal DS as input and outputs an enhanced signal TS that has been enhanced, a gradation correction portion 76 that receives the input signal IS as input and outputs a gradation corrected signal GC whose gradation has been corrected, and a summing portion 77 that receives the gradation corrected signal GC as a first input and the enhanced signal TS as a second input and outputs an output signal OS.

<<Action of the Equivalent Visual Processing Device 71>>

The operation of the visual processing portion 73 is described in further detail below.

The subtracting portion 74 calculates the difference between the input signal IS, which has the value A, and the unsharp signal US, which has the signal B, and outputs a difference signal DS having the value A−B. The enhancing portion 75 uses the enhancement function F11 to output an enhanced signal TS having the value F11(A−B) from the difference signal DS, which has the value A−B. The gradation correction portion 76 uses the gradation correction function F12 to output a gradation corrected signal GC having the value F12(A) from the input signal IS having the value A. The summing portion 77 takes the sum of the gradation corrected signal GC, which has the value F12(A), and the enhanced signal TS, which has the value F11(A−B), and outputs an output signal OS having the value F12(A)+F11(A−B).

It should be noted that the calculations using the enhancement function F11 and the gradation correction function F12 can each be performed using a one-dimensional LUT for that function, or can be performed without using a LUT.

<<Effects>>

The visual processing device 71 and the visual processing device 1 furnished with the seventh profile data achieve the same visual processing effects.

(i)

After the input signal IS has been subjected to gradation correction by the gradation correction portion 76, it is added to the enhanced signal TS. Thus, by adding that input signal IS to the enhanced signal TS, it is possible to emphasize local contrast even in regions where there has been little change in the gradation by the gradation correction function F12, that is, regions in which the contrast is lowered.

<<Modified Examples>>

(i)

With the visual processing device 71, the visual processing portion 73 can also perform the computation of Eq. M7 based on the input signal IS and the unsharp signal US without using the two-dimensional LUT 4. In this case, it is also possible to use a one-dimensional LUT in the calculations of the functions F11 and F12.

(ii)

It should be noted that if the value C of a particular element of the profile data found through Eq. M7 is outside the range $0 \leq C \leq 255$, then the value C of that element can be regarded as 0 or 255.

(8)

<<Modified Examples of the First through Seventh Profile Data>>

(i)

In (1) through (7) above, each element of the first through seventh profile data was described as storing a value that has been calculated based on an equation M1 through M7. It was also explained that the value of an element in the profile data that has been calculated by an equation M1 through M7 can be clipped if the value is outside of the range of values that can be stored as profile data.

Moreover, some of the values of the profile data can be any value. For example, if the value of the input signal IS is large but the value of the unsharp signal US is small, such as small bright areas in a dark nighttime setting (such as areas of neon in a nighttime setting), then the value of the input signal IS that has been subjected to visual processing will have little effect on the picture quality. Thus, for portions where the value after visual processing will have little effect on the picture quality, the values stored in the profile data can be approximate values of the value calculated by the equations M1 through M7, or can be arbitrary values.

Even if the values stored in the profile data are approximate values of the value calculated by the equations M1 through M7, or are arbitrary values, it is preferable that the values stored for the same values of the input signal IS and the unsharp signal US maintain the monotonically increasing, or monotonically decreasing, relationship with respect to the values of the input signal IS and the unsharp signal US. In the profile data created based on the equations M1 to M7, the values stored by the profile data with respect to the same values for the input signal IS and the unsharp signal US show an overview of the characteristics of the profile data. Thus, to maintain the characteristics of the two-dimensional LUT, it is preferable that the above relationship is maintained when tuning the profile data.

Second Embodiment

A visual processing device 600 serving as a second embodiment of the present invention is described using FIGS. 24 through 39.

The visual processing device 600 is a visual processing device for performing visual processing of an image signal (input signal IS) and outputting a visually processed image (output signal OS), and it performs visual processing that is in accordance with the environment in which a display device (not shown) for displaying the output signal OS is located (hereinafter, this is referred to as the display environment).

More specifically, the visual processing device 600 is a device that fixes drops in the "visual contrast" of the display image due to the effect of ambient light of the display environment by performing visual processing that utilizes our visual characteristics.

The visual processing device 600, together with a device that performs color processing of an image signal, constitutes an image processing device in a machine that handles images, such as a computer, a television, a digital camera, a portable telephone, a PDA, a printer, or a scanner.

<Visual Processing Device 600>

Figure 24:
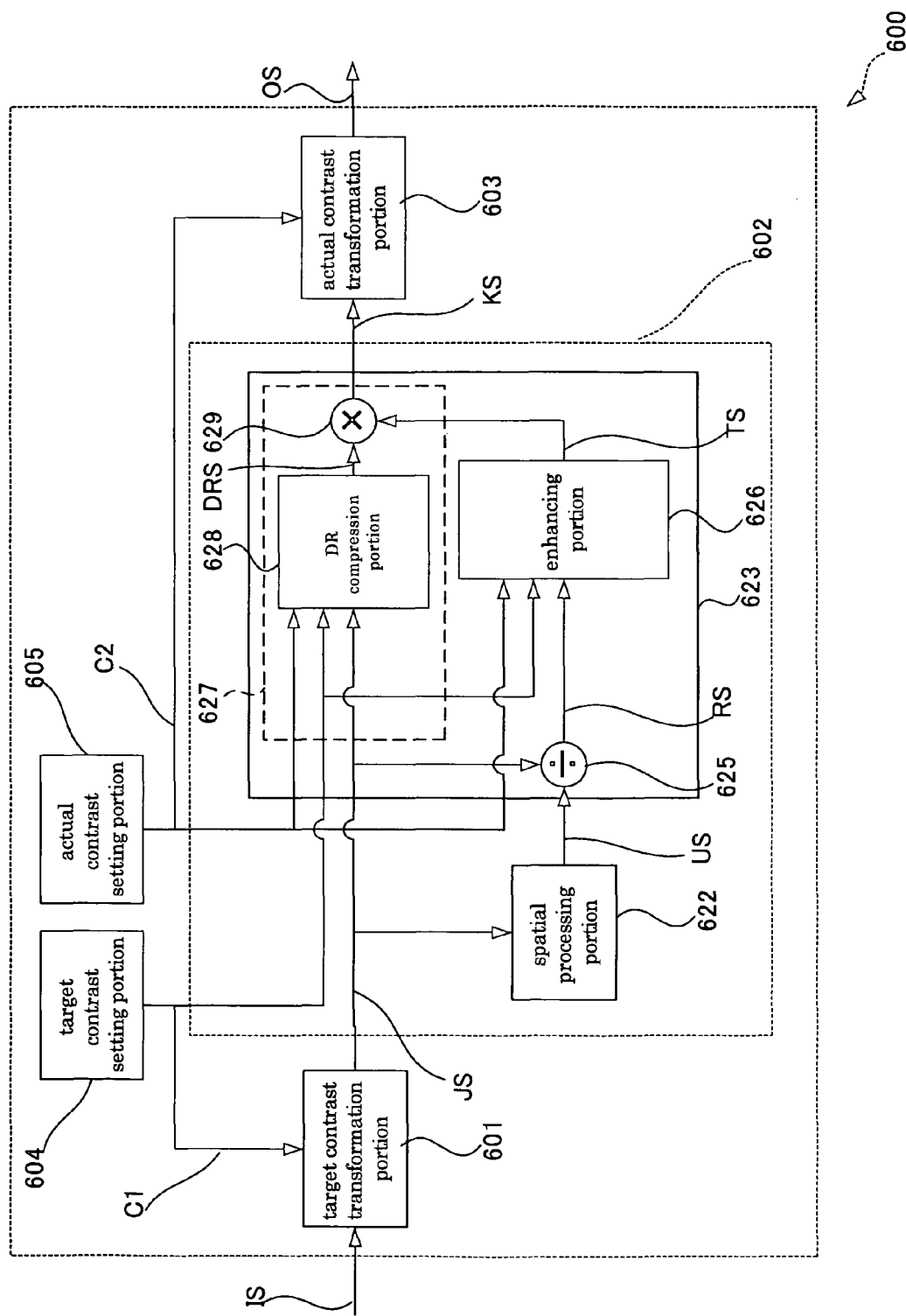
FIG. 24 is a block diagram describing the structure of the visual processing device 600 (second embodiment).

FIG. 24 shows the basic structure of the visual processing device 600.

The visual processing device 600 comprises a target contrast transformation portion 601, a transformed signal processing portion 602, an actual contrast transformation portion 603, a target contrast setting portion 604, and an actual contrast setting portion 605.

The target contrast transformation portion 601 receives the input signal IS as a first input and a target contrast C1 that has been set by the target contrast setting portion 604 as a second input, and outputs a target contrast signal JS. It should be noted that the target contrast C1 will be defined later.

The transformed signal processing portion 602 receives the target contrast signal JS as a first input, the target contrast C1 as a second input, and the actual contrast C2 that has been set by the actual contrast setting portion 605 as a third input, and outputs a visually processed signal KS, which is the target contrast signal JS after being subjected to visual processing. It should be noted that the actual contrast C2 will be defined later.

The actual contrast transformation portion 603 receives the visually processed signal KS as a first input and the actual contrast C2 as a second input, and outputs an output signal OS.

The user is allowed to set the values of the target contrast C1 and the actual contrast C2 with the target contrast setting portion 604 and the actual contrast setting portion 605 via an input interface, for example.

These portions are described in greater detail below.

<Target Contrast Transformation Portion 601>

The target contrast transformation portion 601 transforms the input signal IS that has been input to the visual processing portion 600 into a target contrast signal JS that is suited for contrast expression. Here, the input signal IS is expressed by a gradation in which the luminance of the image that has been input to the visual processing portion 600 is from [0.1 to 1.0].

The target contrast transformation portion 601 uses a target contrast C1 (value [m]) to transform the input signal IS (value [P]) through "Eq. M20" and outputs the target contrast signal JS (value [A]). Here, Eq. M20 is $A=\{(m-1)/m\}*P+1/m$.

The value [m] of the target contrast C1 is set as the contrast value at which the displayed image that is displayed by the display device can be seen at the best contrast.

Here, the contrast value is a value that is expressed as the brightness ratio of the white level to the black level of the image, and indicates the luminance value of the white level in a case where the black level has been set to 1 (black level: white level=1:m).

The value [m] of the target contrast C1 is preferably set to approximately 100 to 1000 (black level:white level=1:100 to 1:1000), but this can also be determined based on the brightness ratio of the white level to the black level that can be displayed by the display device.

Figure 25:
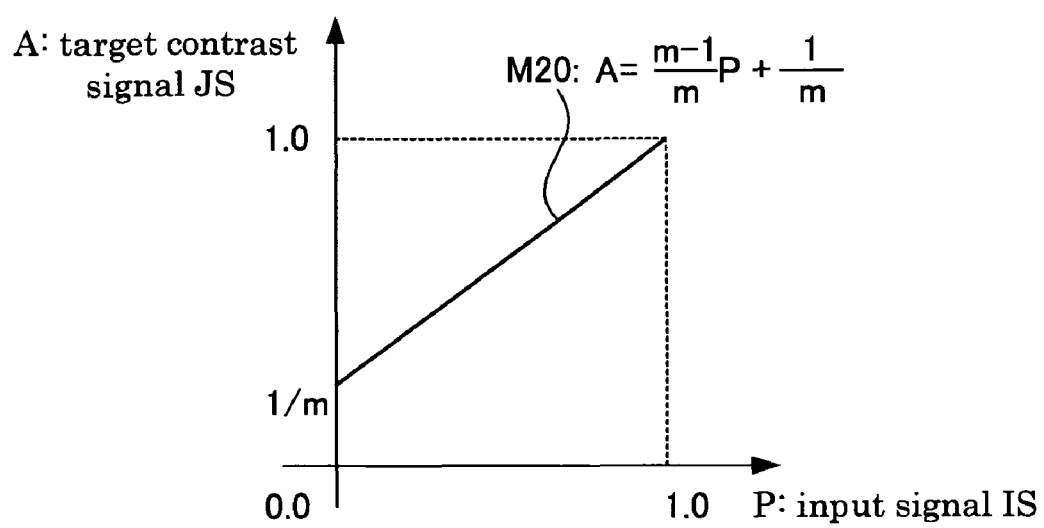
FIG. 25 is a graph describing the transformation by Eq. M20 (second embodiment).

Transformation by Equation M20 is described in further detail using FIG. 25. FIG. 25 is a graph that shows the relationship between the value of the input signal IS (horizontal axis) and the value of the target contrast signal JS (vertical axis). As shown in FIG. 25, an input signal IS whose value is in the range of [0.0 to 1.0] is transformed into a target contrast signal JS having a value in the range of [1/m to 1.0] by the target contrast transformation portion 601.

<Transformed Signal Processing Portion 602>

Using FIG. 24, the transformed signal processing portion 602 is described in greater detail below.

The transformed signal processing portion 602 compresses the dynamic range while maintaining local contrast in the target contrast signal JS that is input, and outputs a visually processed signal KS. More specifically, the transformed signal processing portion 602 has the same structure, action, and effect as if in the visual processing device 21 described in the first embodiment the input signal IS (see FIG. 16) is regarded as the target contrast signal JS and the output signal OS (see FIG. 16) is regarded as the visually processed signal KS.

The transformed signal processing portion 602 outputs the visually processed signal KS based on a computation that enhances the ratio between the target contrast signal JS and the unsharp signal US. Thus, it is for example possible to achieve the visual processing for enhancing the sharp component.

Further, the transformed signal processing portion 602 outputs the visually processed signal KS based on a computation for compressing the dynamic range of the ratio between the target contrast signal JS that has been enhanced and the unsharp signal US. Thus, it is possible to achieve visual processing in which the sharp component is enhanced while the dynamic range is compressed, for example.

<<Structure of the Transformed Signal Processing Portion 602>>

The transformed signal processing portion 602 is provided with a spatial processing portion 622 that performs spatial processing on the luminance value of each pixel in the target contrast signal JS and outputs an unsharp signal US, and a visual processing portion 623 that uses the target contrast signal JS and the unsharp signal US to perform visual processing of the target contrast signal JS and outputs a visually processed signal KS.

The spatial processing portion 622 performs the same operation as the spatial processing portion 2 of the visual processing device 1 (see FIG. 1), and thus detailed description thereof is omitted.

The visual processing portion 623 is provided with a dividing portion 625, an enhancing portion 626, and an output portion 627 that has a DR compression portion 628 and a multiplying portion 629.

The dividing portion 625 receives the target contrast signal JS as a first input and the unsharp signal US as a second input and divides the target contrast signal JS by the unsharp signal US to obtain a divided signal RS that it then outputs. The enhancing portion 626 receives the divided signal RS as a first input, the target contrast C1 as a second input, and the actual contrast C2 as a third input, and outputs an enhanced signal TS.

The output portion 627 receives the target contrast signal JS as a first input, the enhanced signal TS as a second input, the target contrast C1 as a third input, and the actual contrast C2 as a fourth input, and outputs a visually processed signal KS. The DR compression portion 628 receives the target contrast signal JS as a first input, the target contrast C1 as a second input, and the actual contrast C2 as a third input, and outputs a DR compressed signal DRS whose dynamic range (DR) has been compressed. The multiplying portion 629 receives the DR compressed signal DRS as a first input and the enhanced signal TS as a second input, and outputs the visually processed signal KS.

<<Action of the Transformed Signal Processing Portion 602>>

The transformed signal processing portion 602 uses the target contrast C1 (value [m]) and the actual contrast C2 (value [n]) to transform the target contrast signal JS (value [A]) through "Eq. M2" and outputs the result as a visually processed signal KS (value [C]). Here, Eq. M2 is expressed as C=F4(A)*F5(A/B) using the dynamic range compression function F4 and the enhancement function F5. It should be noted that the value [B] is the value of the unsharp signal US obtained by subjecting the target contrast signal JS to spatial processing.

The dynamic range compression function F4 is a "power function" that is a concave and monotonically increasing function, and is expressed by F4($x$)=x^x^γ. The exponent γ of the dynamic range compression function F4 is expressed using normal logarithms by y=log(n)/log(m). The enhancement function F5 is a power function, and is expressed by F5($x$)=x^(1−γ).

The relationship between Eq. M2 and the operations of the various portions of the transformed signal processing portion 602 is described in further detail below.

The spatial processing portion 622 performs spatial processing with respect to the target contrast signal JS, which has the value [A], and outputs the result as an unsharp signal US having the value [B].

The dividing portion 625 divides the target contrast signal JS, which has the value [A], by the unsharp signal US, which has the value [B], and outputs the result as the divided signal RS, which has the value [A/B]. The enhancing portion 626 uses the enhancement function F5 to obtain an enhanced signal TS having the value [F5(A/B)] from the divided signal RS, which has the value [A/B], and outputs this enhanced signal TS. The DR compression portion 628 uses the dynamic range compression function F4 to obtain a DR compressed signal DRS having the value [F4(A)] from the target contrast signal JS, which has the value [A], and outputs the DR compressed signal DRS. The multiplying portion 629 multiplies the DR compressed signal DRS, which has the value [F4(A)], by the enhanced signal TS, which has the value [F5(A/B)], and outputs the result as a visually processed signal KS having the value [F4(A)* F5(A/B)].

It should be noted that the calculations using the dynamic range compression function F4 and the enhancement function F5 can each be performed using a one-dimensional LUT for that function, or can be performed without using a LUT.

<<Effect of the Transformed Signal Processing Portion 602>>

The visual dynamic range in the visually processed signal KS is determined by the value of the dynamic range compression function F4.

Figure 26:
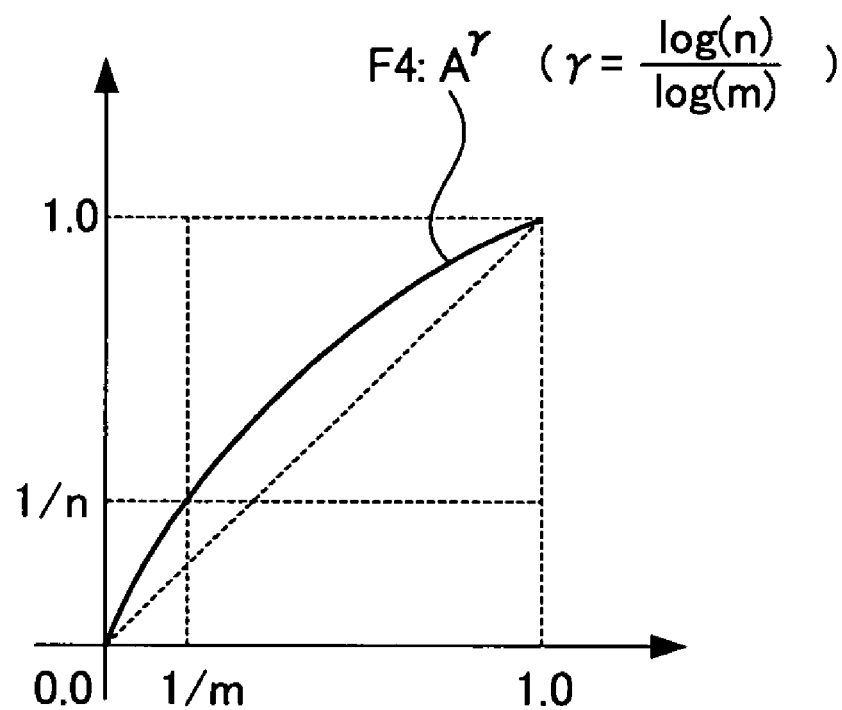
FIG. 26 is a graph describing the transformation by Eq. M2 (second embodiment).

The transformation by Eq. M2 is described in more specific detail using FIG. 26. FIG. 26 is a graph showing the relationship between the value of the target contrast signal JS (horizontal axis) and the value obtained by applying the dynamic range compression function F4 to the target contrast signal JS (vertical axis). As shown in FIG. 26, the dynamic range of the target contrast signal JS is compressed by the dynamic range compression function F4. More specifically, a target contrast signal JS in the value range of [1/m to 1.0] is transformed by the dynamic range compression function F4 to a value range of [1/n to 1.0]. As a result, the viewable dynamic range of the visually processed signal KS is compressed to 1/n (minimum value:maximum value=1:n).

The actual contrast C2 shall be described here. The value [n] of the actual contrast C2 is set as the viewable contrast value of the displayed image under the circumstances of the ambient light of the display environment. That is, the value [n] of the actual contrast C2 can be determined to be the value obtained by lowering the value [m] of the target contrast C1 by an amount that corresponds to the impact of the luminance of the ambient light of the display environment.

As the result of using the value [n] of the actual contrast C2 that has been set in this way, the dynamic range of the target contrast signal JS following from Eq. M2 is compressed to between 1:m and 1:n. It should be noted that here "dynamic range" means the ratio between the minimum value and the maximum value of the signal.

On the other hand, the change in the local contrast in the visually processed signal KS is expressed as the ratio of the change amount before and after transformation between the value [A] of the target contrast signal JS and the value [C] of the visually processed signal KS. Here, the value [B] of the unsharp signal US in a local, that is, narrow range is regarded as constant. Thus, the ratio between the amount of change in the value [C] and the amount of change in the value [A] in Eq. M2 is 1, meaning that the local contrast does not change between the target contrast signal JS and the visually processed signal KS.

Human vision has the characteristic that as long as local contrast is maintained, an image will be viewed at the same contrast even if there is a drop in the overall contrast. Thus, with the transformed signal processing portion 602, it is possible to achieve visual processing with which the dynamic range of the target contrast signal JS is compressed but the viewable contrast is not lowered.

<Actual Contrast Transformation Portion 603>

The actual contrast transformation portion 603 is described in detail using FIG. 24.

The actual contrast transformation portion 603 transforms the visually processed signal KS into image data of a range that can be input to a display device (not shown). The image data of a range that can be input to a display device are image data in which the luminance values of the image are expressed in a gray scale value range of [0.0 to 1.0].

The actual contrast transformation portion 603 uses the actual contrast C2 (value [n]) to transform the visually processed signal KS (value [C]) with "Equation M21," and outputs the result as an output signal OS (value [Q]). Here, Eq. M21 is Q={n/(n−1)}* C−{1/(n−1)}.

Figure 27:
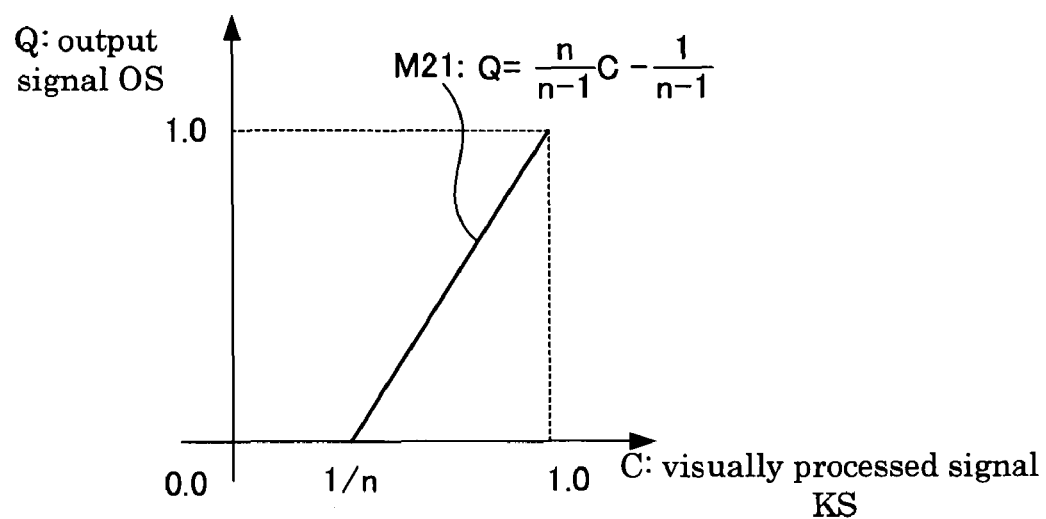
FIG. 27 is a graph describing the transformation by Eq. M21 (second embodiment).

This transformation following from Eq. M21 is described in greater detail using FIG. 27. FIG. 27 is a graph showing the relationship between the value of the visually processed signal KS (horizontal axis) and the value of the output signal OS (vertical axis). As shown in FIG. 27, the actual contrast transformation portion 603 transforms a visually processed signal KS, which is in the range of [1/n to 1.0], into an output signal OS that has a range of [0.0 to 1.0]. Here, the value of the output signal OS decreases with respect to the value of the visually processed signal KS. The amount of this decrease corresponds to the impact of the ambient light on the luminance values of the display image.

It should be noted that if a visually processed signal KS having a value less than [1/n] is input, then the actual contrast transformation portion 603 transforms the output signal OS to the value [0]. Further, if a visually processed signal KS having a value greater than [1] is input, then the actual contrast transformation portion 603 transforms the output signal OS to the value [1].

<Effects of the Visual Processing Device 600>

The visual processing device 600 attains the same effects as the visual processing device 21 described in the first embodiment. Those characteristic effects of the visual processing device 600 are discussed below.

(i)

When there is ambient light in the display environment in which the visual processing device 600 displays the output signal OS, the ambient light affects how the output signal OS is viewed. However, the output signal OS is a signal in which processing to correct the impact of ambient light has been executed by the actual contrast transformation portion 603. That is, in a display environment where there is ambient light, the output signal OS that is displayed by the display device is viewed as a display image having the characteristics of the visually processed signal KS.

As for the characteristics of the visually processed signal KS, like for example the output signal OS of the visual processing device 21 described in the first embodiment (see FIG. 16), the local contrast is maintained while compressing the dynamic range of the entire image. That is, the visually processed signal KS is a signal in which the target contrast C1 at which locally the display image is displayed most suitably is maintained while the dynamic range is compressed to a dynamic range that can be displayed in the presence of the ambient light (this corresponds to the actual contrast C2).

Thus, with the visual processing device 600, it is possible to correct the contrast, which drops due to the presence of ambient light, while maintaining the visual contrast through processing that exploits the viewing characteristics.

<Visual Processing Method>

The visual processing method for achieving the same effects as the visual processing device 600 is described below using FIG. 28. It should be noted that the specific processing of each step is the same as that in the visual processing device 600, and thus description thereof will be omitted.

Figure 28:
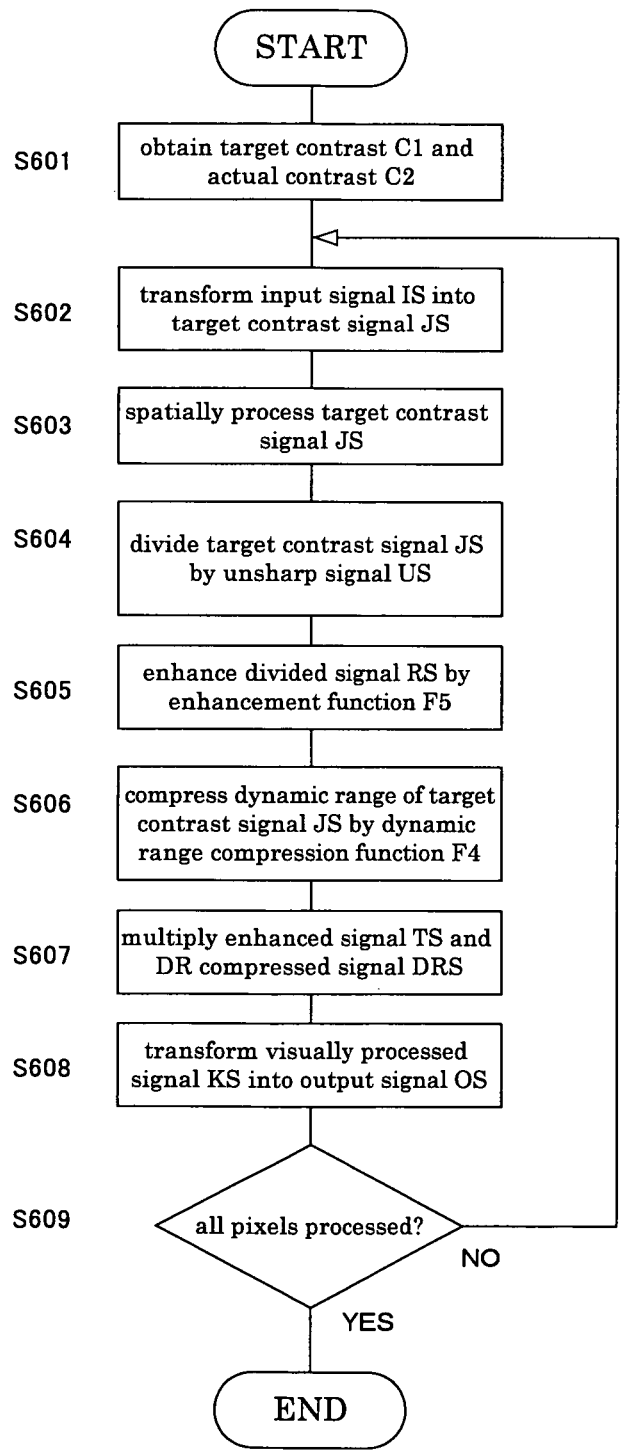
FIG. 28 is a flowchart describing the visual processing method (second embodiment).

With the visual processing method shown in FIG. 28, first the target contrast C1 that has been set and the actual contrast C2 are obtained (S601). Next, the target contrast C1 that has been obtained is used to transform the input signal IS (step S602), and the result is output as a target contrast signal JS. The target contrast signal JS is then subjected to spatial processing (step S603) and the result is output as an unsharp signal US. The target contrast signal JS is then divided by the unsharp signal US (step S604) and the result is output as a divided signal RS. The divided signal RS is enhanced by the enhancement function F5, which is a "power function" whose exponent is determined by the target contrast C1 and the actual contrast C2 (step S605), and the result is output as an enhanced signal TS. On the other hand, the dynamic range of the target contrast signal JS is compressed by the dynamic range compression function F4, which is a "power function" whose exponent is determined by the target contrast C1 and the actual contrast C2 (step S606), and the result is output as a DR compressed signal DRS. Next, the enhanced signal TS output in step S605 and the DR compressed signal DRS output in step S606 are multiplied (step S607), and the result is output as a visually processed signal KS. Next, the actual contrast C2 is used to transform the visually processed signal KS (step S608), and the result is output as an output signal OS. The processes of steps S602 through S608 are repeated for every pixel of the input signal IS (step S609).

The steps of the visual processing method shown in FIG. 28 can also be achieved as a visual processing program in the visual processing device 600 or another computer, for example. It is also possible for all the processes of steps S604 to S607 to be executed at one time by performing the calculation of Eq. M2.

<Modified Examples>

The present invention is not limited to the foregoing embodiment, and various modifications and improvements thereof are possible without departing from the gist of the invention.

(i) Eq. M2—A Case in Which the Enhancement Function F5 Is Not Provided—

In the foregoing embodiment, the transformed signal processing portion 602 was described as outputting a visually processed signal KS based on Eq. M2. Here, it is also possible for the transformed signal processing portion 602 to output a visually processed signal KS based only on the dynamic range enhancement function F4. In this case, it is not necessary for the transformed signal processing portion 602 of this modified example to be provided with the spatial processing portion 622, the dividing portion 625, the enhancing portion 626, or the multiplying portion 629, and it is only necessary that it is provided with the DR compression portion 628.

With the transformed signal processing portion 602 of this modified example, it is possible to output a visually processed signal KS that has been compressed to a dynamic range that can be displayed under the conditions of ambient light.

(ii) Enhancement Function F5—Exponents and Other Modified Examples—

In the foregoing embodiment, the enhancement function F5 is a "power function" and expressed as $F5(x)=x^{(1-\gamma)}$. Here, the exponent of the enhancement function F5 can be a function of the value [A] of the target contrast signal JS or the value [B] of the unsharp signal US.

Specific Examples <<1>> to <<6>> are described below.

<<1>>

Figure 29:
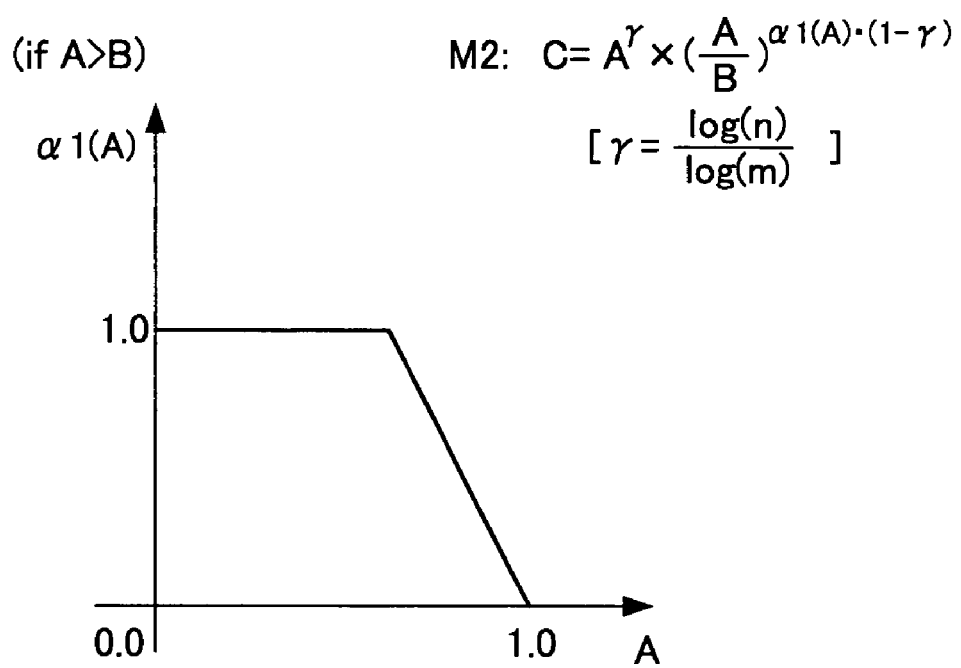
FIG. 29 is a graph showing the trend of the function α1(A) (second embodiment).

If the exponent of the enhancement function F5 is a function of the value [A] of the target contrast signal JS, and the value [A] of the target contrast signal JS is larger than the value [B] of the unsharp signal US, then the enhancement function F5 is a function that monotonically decreases. More specifically, the exponent of the enhancement function F5 is expressed as $\alpha 1(A)*(1-\gamma)$, where the function $\alpha 1(A)$ is a function that monotonically decreases with respect to the value [A] of the target contrast signal JS as shown in FIG. 29. It should be noted that the maximum value of the function $\alpha 1(A)$ is [1.0].

In this case, there is little enhancement of the local contrast of high luminance portions by the enhancement function F5. For this reason, if the luminance of a target pixel is higher than the luminance of the surrounding pixels, then the local contrast of the high luminance portion is kept from being over-enhanced. That is, the luminance of the target pixel is kept from becoming saturated at the high luminance, resulting in "blooming."

<<2>>

Figure 30:
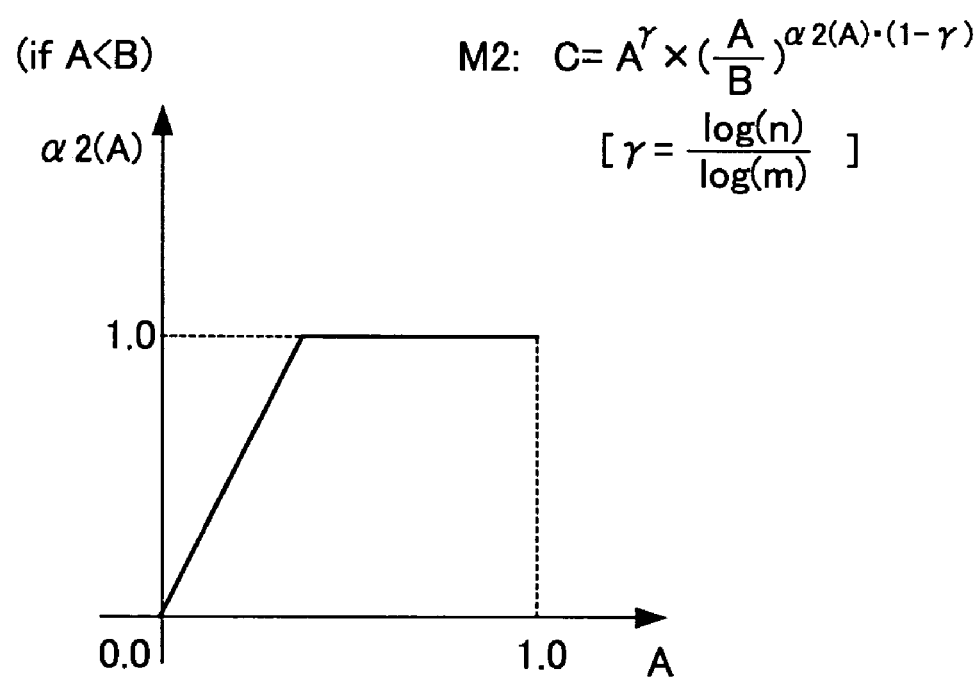
FIG. 30 is a graph showing the trend of the function α2(A) (second embodiment).

If the exponent of the enhancement function F5 is a function of the value [A] of the target contrast signal JS, and the value [A] of the target contrast signal JS is smaller than the value [B] of the unsharp signal US, then the enhancement function F5 is a function that monotonically increases. More specifically, the exponent of the enhancement function F5 is expressed as α2(A)*(1−γ), where the function α2(A) is a function that monotonically increases with respect to the value [A] of the target contrast signal JS is shown in FIG. 30. It should be noted that the maximum value of the function α2(A) is [1.0].

In this case, there is little enhancement of the local contrast of low luminance portions by the enhancement function F5. For this reason, if the luminance of a target pixel is lower than the luminance of the surrounding pixels, then the local contrast of the low luminance portion is kept from being over-enhanced. That is, the luminance of the target pixel is kept from being saturated at the low luminance and resulting in black squashing.

<<3>>

Figure 31:
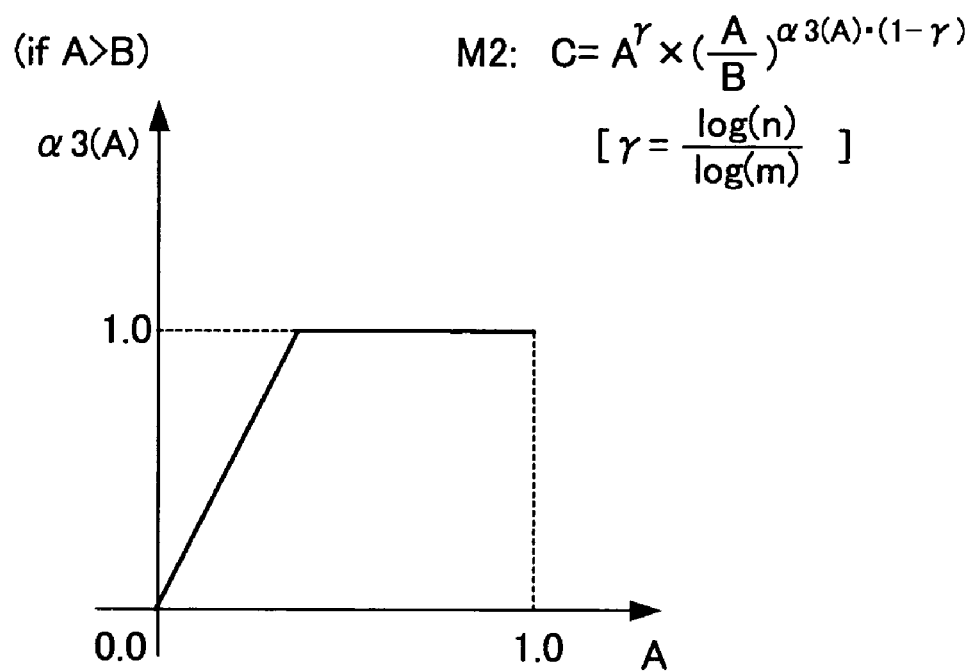
FIG. 31 is a graph showing the trend of the function α3(A) (second embodiment).

If the exponent of the enhancement function F5 is a function of the value [A] of the target contrast signal JS, and the value [A] of the target contrast signal JS is larger than the value [B] of the unsharp signal US, then the enhancement function F5 is a function that monotonically increases. More specifically, the exponent of the enhancement function F5 is expressed as α3(A)* (1-7), where the function α3(A) is a function that monotonically increases with respect to the value [A] of the target contrast signal JS as shown in FIG. 31. It should be noted that the maximum value of the function α3(A) is [1.0].

In this case, there is little enhancement of the local contrast of low luminance portions by the enhancement function F5. For this reason, if the luminance of a target pixel is higher than the luminance of the surrounding pixels, then the local contrast of the low luminance portion is kept from being over-enhanced. The low luminance portions in the image have a small signal level, and thus the ratio to noise is relatively high, but by performing this processing it is possible to keep the SN ratio from becoming worse.

<<4>>

Figure 32:
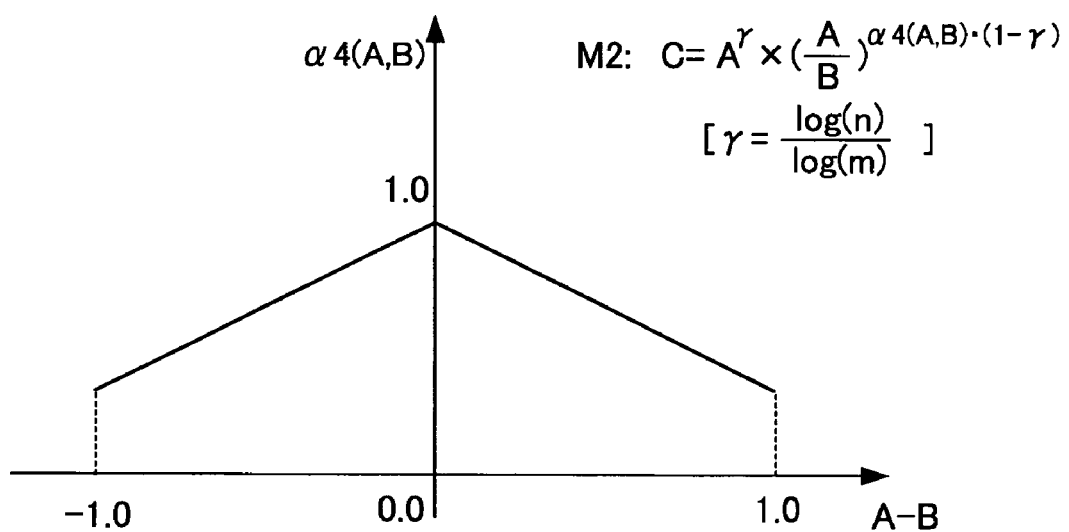
FIG. 32 is a graph showing the trend of the function α4(A, B) (second embodiment).

The exponent of the enhancement function F5 is a function of the value [A] of the target contrast signal JS and the value [B] of the unsharp signal US, and monotonically decreases with respect to the absolute value of the difference between the value [A] and the value [B]. In other words, the exponent of the enhancement function F5 could be said to be a function that increases the closer the ratio of the value [A] to the value [B] is to 1. More specifically, the exponent of the enhancement function F5 is expressed as α4(A,B)*(1−γ), where the function α4(A,B) is a function that monotonically decreases with respect to the absolute value of the value [A−B] as shown in FIG. 32.

In this case, it is possible to particularly enhance the local contrast in target pixels whose difference in brightness with respect to the surrounding pixels is small, and to inhibit the enhancement of the local contrast in target pixels whose difference in brightness with respect to the surrounding pixels is large.

<<5>>

It is also possible to set an upper limit or a lower limit to the result of the computation of the enhancement function F5 in <<1>> though <<4>> above. More specifically, if the value [F5(A/B)] is greater than a predetermined upper limit value, then the predetermined upper limit value can be adopted as the result of the computation of the enhancement function F5. Likewise, if the value [F5(A/B)] is lower than a predetermined lower limit value, then the predetermined lower limit value can be adopted as the result of the computation of the enhancement function F5.

In this case, it is possible to restrict the amount that the local contrast is enhanced by the enhancement function F5 to a suitable range, and this inhibits over- or under-enhancement of the contrast.

<<6>>

It should be noted that <<1>> through <<5>> discussed above can be similarly adopted in a case where a computation that employs the enhancement function F5 is performed in the first embodiment (for example, in <Profile Data> (2) or (3) in the first embodiment). It should be noted that in the first embodiment the value [A] is the value of the input signal IS, and the value [B] is the value of the unsharp signal US that is obtained by spatially processing the input signal IS.

(iii) Equation M2—Case in which Dynamic Range Compression is not Performed—

In the foregoing embodiment, the transformed signal processing portion 602 was described as having the same configuration as the visual processing device 21 shown in the first embodiment. Here, as a modified example of the transformed signal processing portion 602 it is possible for it to have the same configuration as the visual processing device 31 shown in the first embodiment (see FIG. 19). More specifically, it is possible to achieve a modified example of the transformed signal processing portion 602 by taking the visual processing device 31 and regarding the input signal IS as the target contrast signal JS and regarding the output signal OS as the visually processed signal KS.

In this case, with the transformed signal processing portion 602 of this modified example, the visually processed signal KS (value [C]) is output based on "Equation M3" with respect to the target contrast signal JS (value [A]) and the unsharp signal US (value [B]). Here, Eq. M3 is expressed as C=A*F5(A/B), using the enhancement function F5.

With the processing using Eq. M3, the dynamic range of the input signal IS is not compressed, but it is possible to enhance the local contrast. Due to the effect of enhancing the local contrast, it is possible to give the impression of a "visually" compressed or expanded dynamic range.

It should be noted that <Modified Examples> (ii)<<1>> to <5>> discussed above can be similarly adopted in this modified example as well. That is, in this modified example, the enhancement function F5 is a "power function" whose exponent has the same trend as a function α1(A), α2(A), α3(A), and α4(A,B) discussed in the above <Modified Examples> (ii)<<1>> to <4>>. As discussed in the above <Modified Example> (ii)<<5>>, it is also possible to establish an upper limit or a lower limit for the result of the computation of the enhancement function F5.

(iv) Automatic Setting of Parameters

In the foregoing embodiment, the target contrast setting portion 604 and the actual contrast setting portion 605 were described as allowing the user to set the values of the target contrast C1 and the actual contrast C2 through an input interface, for example. It is also possible for the target contrast setting portion 604 and the actual contrast setting portion 605 to automatically set the values of the target contrast C1 and the actual contrast C2.

<<1>> Display

An actual contrast setting portion 605 that automatically sets the value of the actual contrast C2 will be described below with regard to a case in which the display device for displaying the output signal OS is a display such as a PDP, LCD, or CRT, and the white luminance (white level) and black luminance (black level) that can be displayed under conditions in which there is no ambient light are known already.

Figure 33:
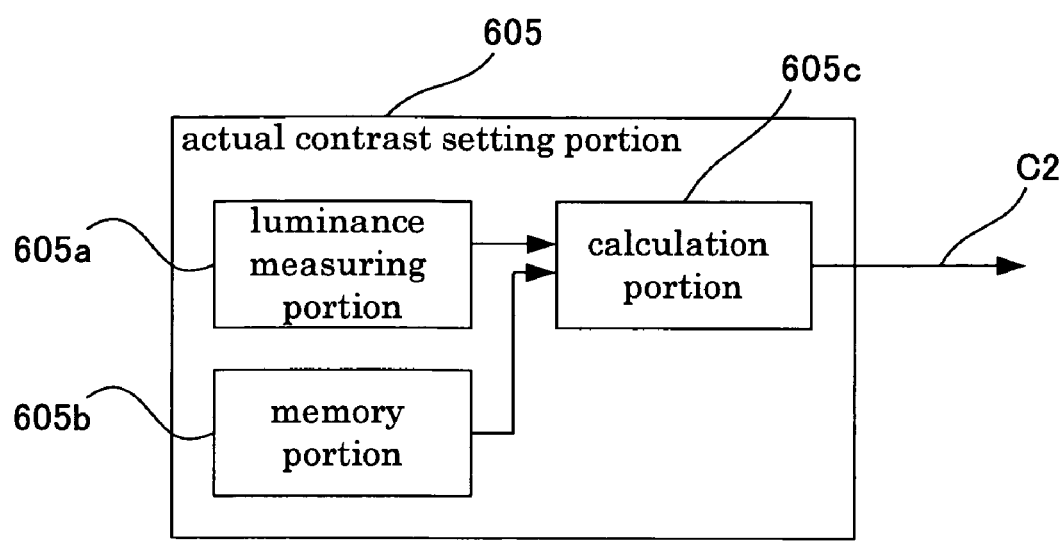
FIG. 33 is a block diagram describing the structure of the actual contrast setting portion 605 as a modified example (second embodiment).

FIG. 33 shows the actual contrast setting portion 605 that automatically sets the value of the actual contrast C2. The actual contrast setting portion 605 is provided with a luminance measuring portion 605a, a memory portion 605b, and a calculation portion 605c.

The luminance measuring portion 605a is a luminance sensor that measures the luminance value of the ambient light in the display environment of the display that will display the output signal OS. The memory portion 605b stores the white luminance (white level) and black luminance (black level) that can be displayed under the condition of no ambient light by the display for displaying the output signal OS. The calculation portion 605c obtains values from the luminance measuring portion 605a and the memory portion 605b and uses these to calculate the value of the actual contrast C2.

An example of the calculation of the calculation portion 605c is described below. The calculation portion 605c adds the luminance value of the ambient light that it obtains from the luminance measuring portion 605a to each of the luminance value of the black level and the luminance value of the white level stored in the memory portion 605b. The calculation portion 605c then divides the result obtained by this addition to the luminance value of the white level by the result obtained by this addition to the luminance value of the black level, and outputs the value that is obtained as the value [n] of the actual contrast C2. Thus, the value [n] of the actual contrast C2 indicates the contrast value that is displayed by the display in a display environment in which there is ambient light.

It is also possible for the memory portion 605b shown in FIG. 33 to store the ratio of the white luminance (white level) and black luminance (black level) that can be displayed by the display under the condition of no ambient light as the value [m] of the target contrast C1. In this case, the actual contrast setting portion 605 simultaneously also functions as the target contrast setting portion 604 for automatically setting the target contrast C1. It should be noted that it is also possible for the memory portion 605b to not store this ratio and instead for this ratio to be calculated by the calculation portion 605c.

<<2>> Projector

An actual contrast setting portion 605 that automatically sets the value of the actual contrast C2 will be described below with regard to a case in which the display device for displaying the output signal OS is a projector, for example, and the white luminance (white level) and black luminance (black level) that can be displayed under the conditions of no ambient light depend on the distance to the screen.

Figure 34:
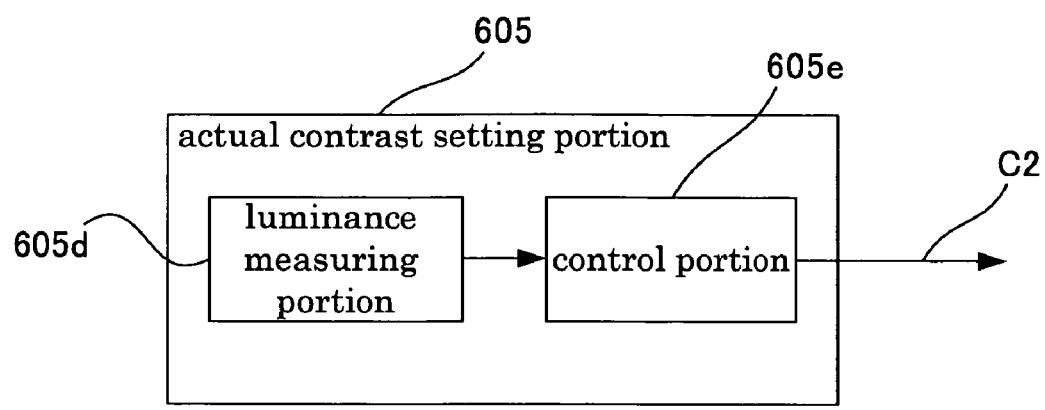
FIG. 34 is a block diagram describing the structure of the actual contrast setting portion 605 as a modified example (second embodiment).

FIG. 34 shows an actual contrast setting portion 605 for automatically setting the value of the actual contrast C2. The actual contrast setting portion 605 is provided with a luminance measuring portion 605d and a control portion 605e.

The luminance measuring portion 605d is a luminance sensor that measures the luminance value in the display environment of the output signal OS that is displayed by the projector. The control portion 605e causes the projector to perform a display of the white level and the black level. It also obtains the luminance values when those levels are displayed from the luminance measuring portion 605d and calculates the value of the actual contrast C2.

Figure 35:
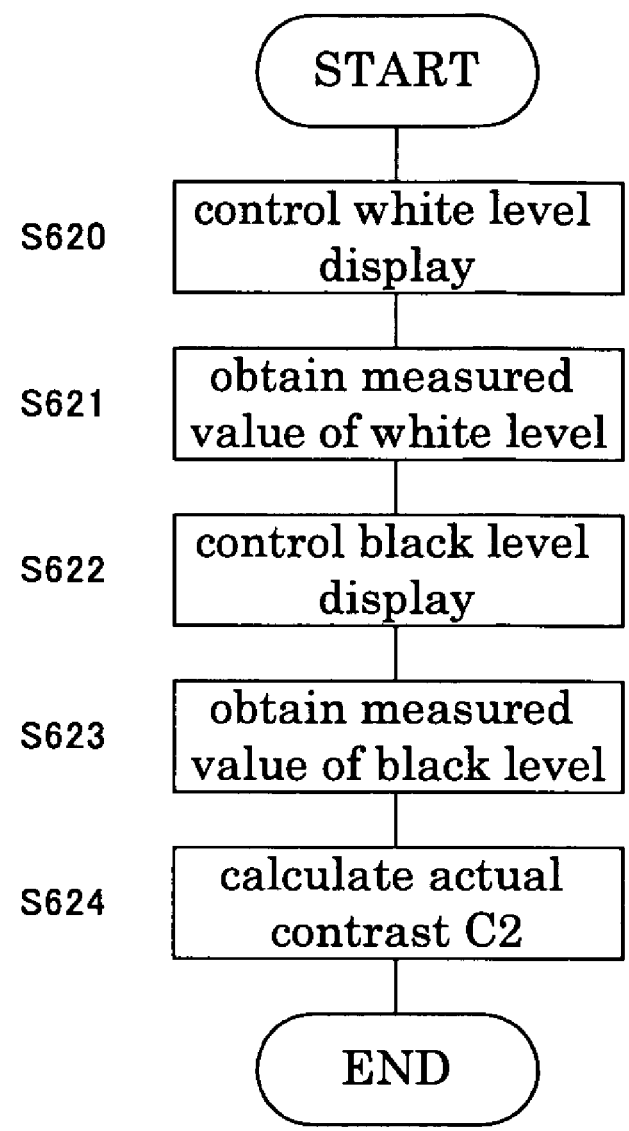
FIG. 35 is a flowchart describing the operation of the control portion 605e (second embodiment).

An example of the operation of the control portion 605e is described using FIG. 35. First, the control portion 605e operates the projector in a display environment in which ambient light is present and causes it to perform a display of the white level (step S620). The control portion 605e obtains the luminance value of the white level that has been measured from the luminance measuring portion 605d (step S621). Next, the control portion 605e operates the projector in a display environment in which ambient light is present and causes it to perform a display of the black level (step S622). The control portion 605e obtains the luminance value of the black level that has been measured from the luminance measuring portion 605d (step S623). The control portion 605e then calculates the ratio between the luminance value of the white level and the luminance value of the black level that have been obtained, and outputs the result as the value of the actual contrast C2. The result of this is that the value [n] of the actual contrast C2 indicates the contrast value that is displayed by the projector in a display environment in which ambient light is present.

In the same manner as described above, it is also possible to derive the value [m] of the target contrast C1 by calculating the ratio of the white level to the black level in a display environment in which no ambient light is present. In this case, the actual contrast setting portion 605 ends up simultaneously also achieving the function of the target contrast setting portion 604 for automatically setting the target contrast C1.

(v) Other Signal Space

In the foregoing embodiment, the processing in the visual processing device 600 was described as being performed with respect to the luminance of the input signal IS. Here, the present invention is not limited to being useful for only a case in which the input signal IS is represented by a YCbCr color space. It is also possible for the input signal IS to be represented in YUV color space, Lab color space, Luv color space, YIQ color space, XYZ color space, or YPbPr color space, for example. In the case of these, it is possible to execute the processing described in the foregoing embodiment with respect to the luminance or brightness of that color space.

Also, if the input signal IS is represented in RGB color space, then the processing by the visual processing portion 600 can also be performed independently for each RGB component. That is, processing by the target contrast transformation portion 601 is performed independently for the RGB components of the input signal IS, and the RGB components of the target contrast signal JS are output. Also, processing by the transformed signal processing portion 602 is performed independently for each of the RGB components of the target contrast signal JS, and the RGB components of the visually processed signal KS are output. Further, processing by the actual contrast transformation portion 603 is performed independently for the RGB components of the visually processed signal KS, and the RGB components of the output signal OS are output. Here, the same value for the target contrast C1 and for the actual contrast C2 can be used to process each of the RGB components.

(vi) Color Difference Correction

The visual processing device 600 can be further provided with a color difference correcting portion in order to prevent the hue of the output signal OS from differing from the hue of the input signal IS due to the impact of the luminance component that has been processed by the transformed signal processing portion 602.

Figure 36:
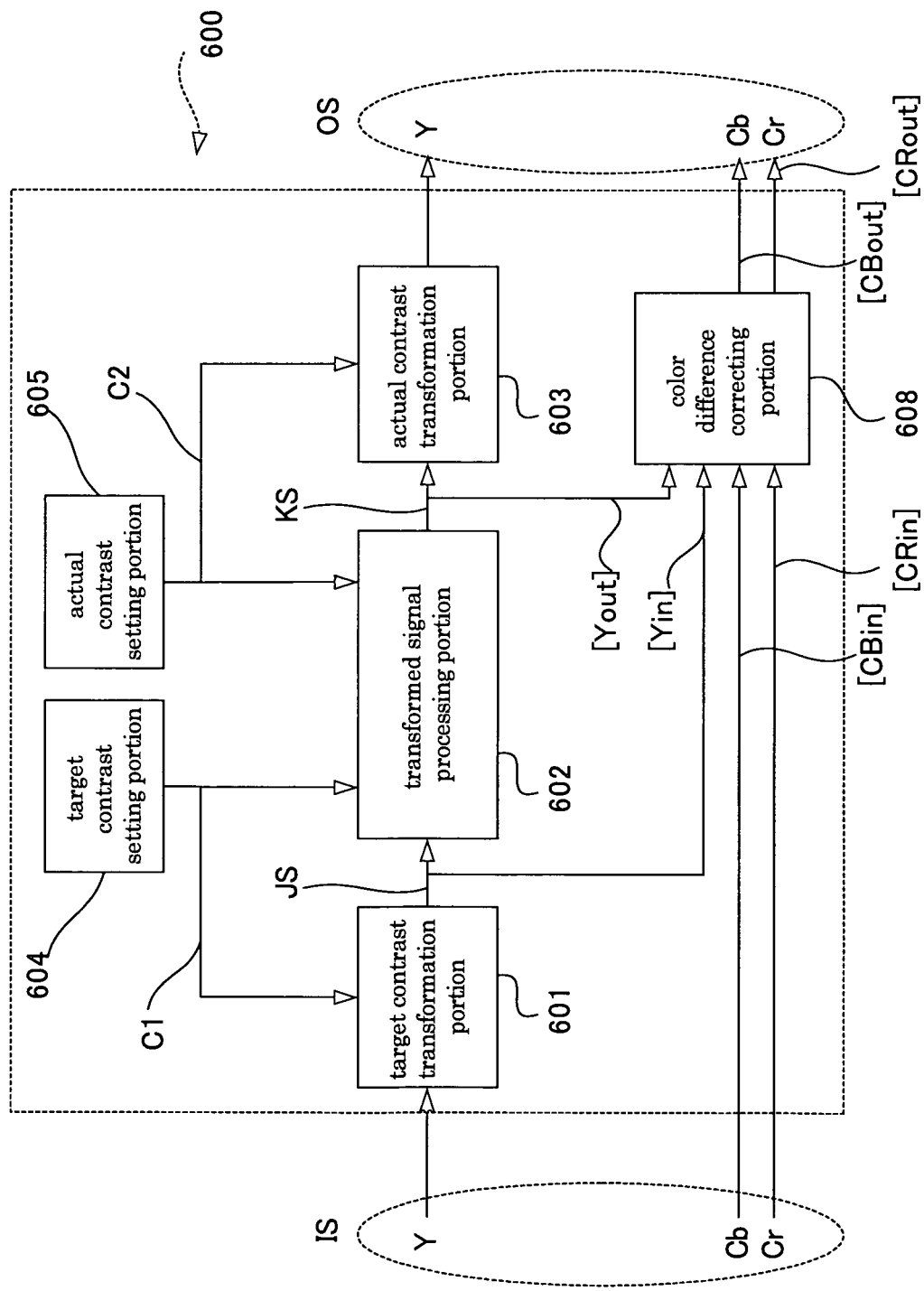
FIG. 36 is a block diagram describing the structure of the visual processing device 600 provided with the color difference correcting portion 608 (second embodiment).

FIG. 36 shows the visual processing device 600 provided with a color difference correcting portion 608. It should be noted that the structural components that are the same as those of the visual processing device 600 shown in FIG. 24 are assigned the same reference numerals. The input signal IS shall have a YCbCr color space, in which the Y component is subjected to the same processing as described in the above embodiment. The color difference correcting portion 608 is described below.

The color difference correcting portion 608 receives the target contrast signal JS as a first input (value [Yin]), the visually processed signal KS as a second input (value [Yout]), the Cb component of the input signal IS as a third input (value [CBin]), and the Cr component of the input signal IS as a fourth input (value [CRin]), and outputs the Cb component after color difference correction as a first output (value [CBout]), and the Cr component after color difference correction as a second output (value [CRout]).

Figure 37:
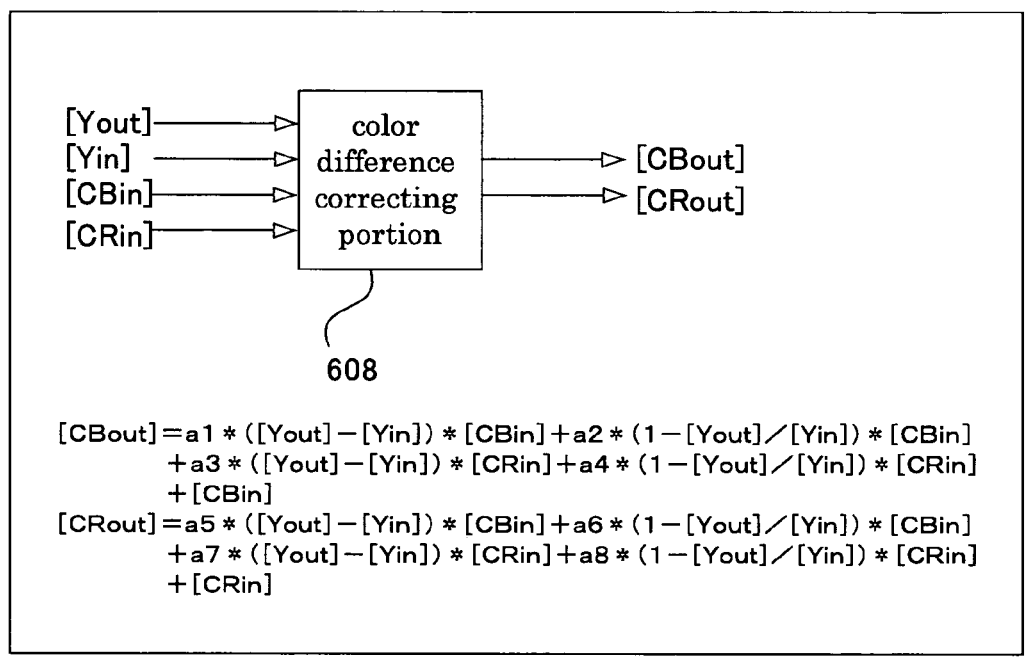
FIG. 37 is an explanatory diagram describing an overview of color difference correction (second embodiment).

FIG. 37 shows an overview of color difference correction. The color difference correcting portion 608 has four inputs [Yin], [Yout], [CBin], and [CRin], and by performing computations with these four inputs, obtains two outputs [CBout] and [CRout].

[CBout] and [CRout] are derived based on the following equations for correcting [CBin] and [CRin] based on the difference and the ratio between [Yin] and [Yout].

[CBout] is derived based on $\alpha 1*([Yout]-[Yin])*[CBin]+\alpha 2*(1-[Yout]/[Yin])*[CBin]+\alpha 3*([Yout]-[Yin])*[CRin]+\alpha 4*(1-[Yout]/[Yin])*[CRin]+[CBin]$ (hereinafter, referred to as the CB equation).

[CRout] is derived based on $a5*([Yout]-[Yin])*[CBin]+\alpha 6*(1-[Yout]/[Yin])*[CBin]+\alpha 7*([Yout]-[Yin])*[CRin]+a8*(1-[Yout]/[Yin])*[CRin]+[CRin]$ (hereinafter, referred to as the CR equation).

The values that are used for the coefficients a1 to a8 in the CB equation and the CR equation are determined by a calculating device outside the visual processing device 600, for example, in advance by an estimation computation that is described below.

Figure 38:
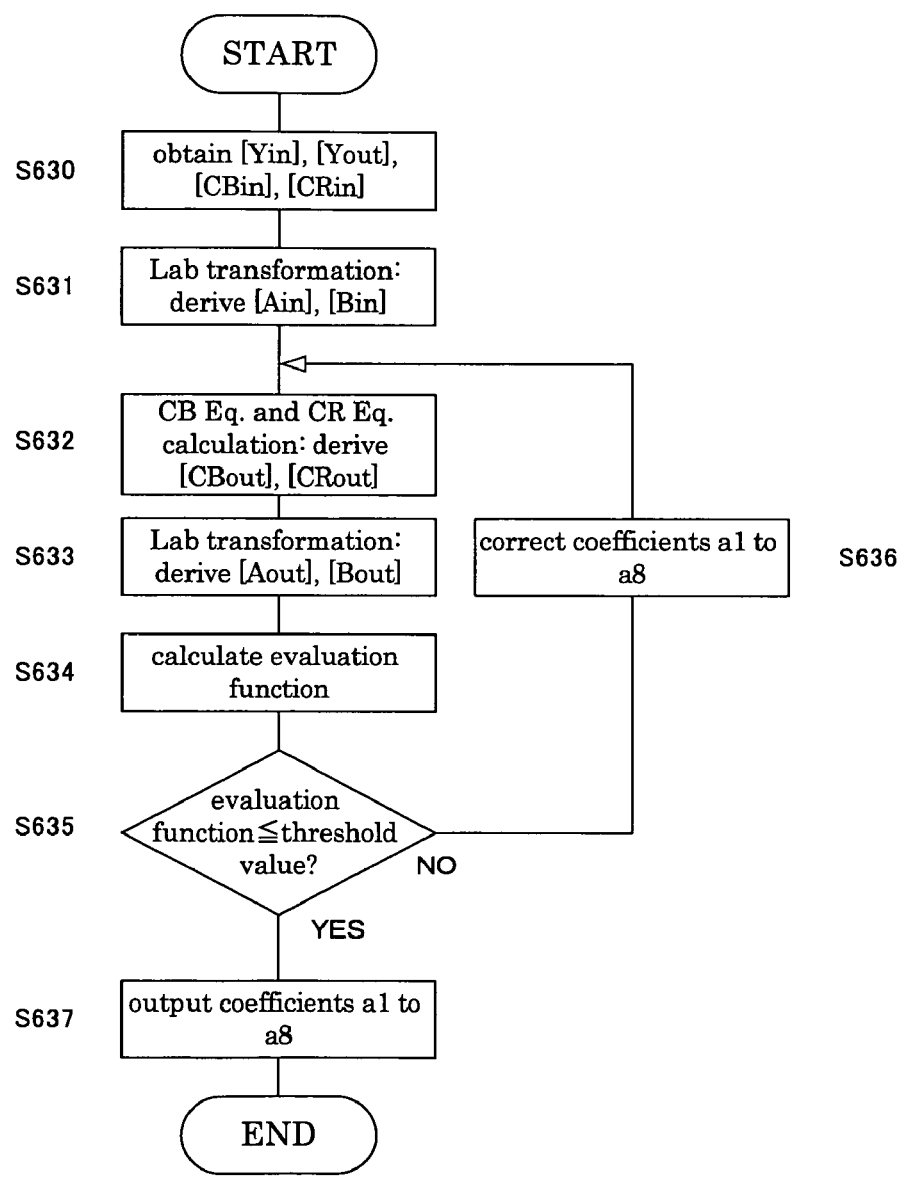
FIG. 38 is a flowchart describing the estimation computation in the color difference correcting portion 608 (second embodiment).

The computation for estimating the coefficients a1 to a8 with a calculating device or the like is described below using FIG. 38.

First, the four inputs of [Yin], [Yout], [CBin], and [CRin] are obtained (step S630). The value of each of these inputs is data that has been prepared in advance to determine the coefficients a1 to a8. For example, [Yin], [CBin], and [CRin] can each be a value that is obtained by decimating all of the obtainable values at a predetermined interval. As [Yout], it is possible to use a value that is obtained by decimation at a predetermined interval of the values that can be output when the value of [Yin] has been input to the transformed signal processing portion 602. The data that has been prepared in this manner are obtained as the four inputs.

The [Yin], [CBin], and [CRin] that are obtained are transformed into a Lab color space and the chromaticity values [Ain] and [Bin] in the transformed Lab color space are calculated (step S631).

Next, default coefficients a1 to a8 are used to perform the calculations of the "CB equation" and the "CR equation," from these obtaining values for [CBout] and [CRout] (step S632). These obtained values and [Yout] are transformed into Lab color space, and the chromaticity values [Aout] and [Bout] in the transformed Lab color space are calculated (step S633).

Next, the chromaticity values [Ain], [Bin], [Aout], and [Bout] that have been calculated are used to perform calculation of an evaluation function (step S634), and then it is determined whether or not the value of the evaluation function is equal to or less than a predetermined threshold value. Here, the evaluation function is a function whose value is small if the hue change is small between [Ain] and [Bin] and between [Aout] and [Bout], and for example it is the squared-sum of the deviation between each of these components. More specifically, it can be $([Ain]-[Aout])^2+([Bin]-[Bout])^2$.

If the value of the evaluation function is greater than the predetermined threshold value (step S635), then the coefficients a1 to a8 are corrected (step S636), and the computations of the steps S632 to S635 are repeated using the new coefficients.

If the value of the evaluation function is less than the predetermined threshold value (step S635), then the coefficients a1 to a8 that have been used for calculating the evaluation function are output as the results of the estimation computation (step S637).

It should be noted that in the estimation calculation, any one of the combinations of the four inputs [Yin], [Yout], [CBin], and [CRin], which are prepared in advance, can be used to estimate the coefficients a1 through a8, but it is also possible to use a plurality of combinations to perform the above processing and then output the coefficients a1 through a8 having the smallest evaluation function as the outcome of the estimation calculation.

[Modified Examples of Color Difference Correction]

<<1>>

With the color difference correcting portion 608, [Yin] is taken as the value of the target contrast signal JS, [Yout] is taken as the value of the visually processed signal KS, [CBin] is taken as the value of the Cb component of the input signal IS, [CRin] is taken as the value of the Cr component of the input signal IS, [CBout] is taken as the value of the Cb component of the output signal OS, and [CRout] is taken as the value of the Cr component of the output signal OS. Here, it is also possible for [Yin], [Yout], [CBin], [CRin], [CBout], and [CRout] to represent other signal values.

For example, if the input signal IS is in RGB color space, then the target contrast transformation portion 601 (see FIG. 24) performs processing with respect to each of these components of the input signal IS. In this case, the processed RGB color space signal can be transformed into a YCbCr color space signal in which [Yin] is the value of the Y component, [CBin] is the value for the Cb component, and [CRin] is the value of the Cr component.

Further, if the output signal OS is a signal in RGB color space, then derived values for [Yout], [CBout], and [CRout] are transformed into an RGB color space, and each of these components is transformed by the actual contrast transformation portion 603 to produce the output signal OS.

<<2>>

It is also possible for the color difference correcting portion 608 to use the ratio of the signal values before and after processing by the transformed signal processing portion 602 to correct each of the R, G, and B components that are input to the color difference correcting portion 608.

Figure 39:
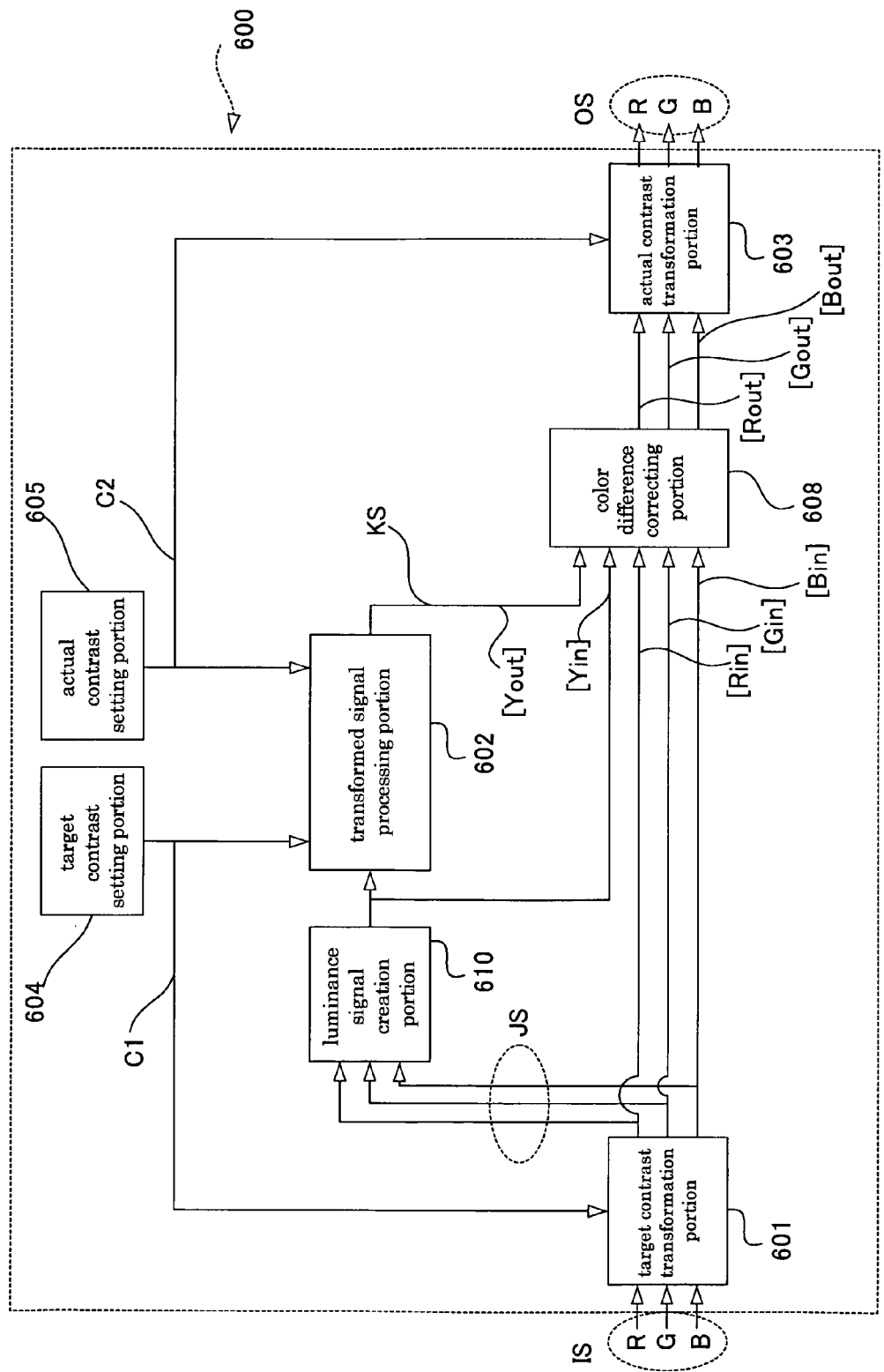
FIG. 39 is a block diagram describing the structure of the visual processing device 600 as a modified example (second embodiment).

A modified example of the structure of the visual processing device 600 is described using FIG. 39. It should be noted that portions that attain substantially the same function as those of the visual processing device 600 shown in FIG. 36 are assigned identical reference numerals and shall not be described here. A feature of the configuration of the visual processing device 600 of this modified example is that it is provided with a luminance signal creation portion 610.

Each component of the input signal IS, which is a signal in RGB color space, is transformed to a target contrast signal JS, which is a signal in RGB color space, in the target contrast transformation portion 601. This process is described in detail above and thus will not be described here. Here, [Rin], [Gin], and [Bin] serve as the values of the respective components of the target contrast signal JS.

The luminance signal creation portion 610 creates a luminance signal having the value [Yin] from the various components of the target contrast signal JS. The luminance signal is found by taking the sum of the values of the R, G, and B components in a particular proportion. For example, the value [Yin] can be found by the equation [Yin]=0.299*[Rin]+ 0.587*[Gin]+0.114*[Bin].

The transformed signal processing portion 602 processes the luminance signal having the value [Yin] and outputs the result as a visually processed signal KS having the value [Yout]. More specifically, this processing is the same as the processing by the transformed signal processing portion 602 (see FIG. 36), which outputs the visually processed signal KS from the target contrast signal JS, and thus will not be described here further.

The color difference correcting portion 608 uses the luminance signal (value [Yin]), the visually processed signal KS (value [Yout]), and the target contrast signal JS (value [Rin], [Gin], and [Bin]) to output a color difference correction signal (value [Rout], [Gout], [Bout]), which is a signal in RGB color space.

More specifically, the color difference correcting portion 608 calculates the value [Yin] to value [Yout] ratio (the value [[Yout]/[Yin]]). The calculated ratio is multiplied to each component of the target contrast signal JS (values [Rin], [Gin], and [Bin]) as a color difference correction coefficient. Accordingly, a color difference correction signal (values [Rout], [Gout], and [Bout]) is output.

The actual contrast transformation portion 603 transforms each component of the color difference correction signal, which is a signal in RGB color space, transforming it into an output signal OS, which is a signal in RGB color space. The details for this processing have been discussed before, and this will not be described here.

With the visual processing device 600 of this modified example, the transformed signal processing portion 602 performs processing only with respect to the luminance signal, and thus it is not necessary to process each RGB component. Thus, the visual processing burden per input signal IS in RGB color space is reduced.

<<3>>

The "CB equation" and "CR equation" are only examples, and other equations can also be used.

(vii) Visual Processing Portion 623

The visual processing portion 623 shown in FIG. 24 can also be constituted by a two-dimensional LUT.

In this case, the two-dimensional LUT stores the values of the visually processed signal KS with respect to the values of the target contrast signal JS and the values of the unsharp signal US. More specifically, the values of the visual processing signal KS are determined based on "Eq. M2," which was described in [First Embodiment]<Profile Data> (2)<<Second Profile Data>>. It should be noted that in the "Eq. M2" the value of the target contrast signal JS serves as the A value and the value of the unsharp signal US is used as the value B.

The visual processing device 600 is provided with a plurality of such two-dimensional LUTs in a memory device (not shown). Here, the memory device can be internally provided in the visual processing device 600, or it can be connected to an external portion thereof through a wired or wireless connection. Each two-dimensional LUT stored on the memory device is correlated to the values of the target contrast C1 and the values of the actual contrast C2. That is, the same computation as that described above in [Second Embodiment] <Transformed Signal Processing Portion 602><<Action of Transformation Signal Processing Portion 602>> is performed with respect to each combination of the value of the target contrast C1 and the value of the actual contrast C2, and stores the result as a two-dimensional LUT.

When the visual processing portion 623 obtains the values of the target contrast C1 and the actual contrast C2, the two-dimensional LUT that corresponds to those values that have been obtained from among the two-dimensional LUTs stored on the memory device is read out. Then, the visual processing portion 623 uses the two-dimensional LUT that has been read out and performs visual processing. More specifically, the visual processing portion 623 obtains the value of the target contrast signal JS and the value of the unsharp signal US, and reads the value of the visually processed signal KS corresponding to those obtained values from the two-dimensional LUT and outputs the visually processed signal KS.

Third Embodiment

<1>

Applied examples of the visual processing devices, visual processing methods, and visual processing programs described above in the first and second embodiments, and a system using the same, are described below as a third embodiment of the present invention.

The visual processing device is a device for processing images that is provided in or connected to a machine that handles images, such as a computer, a television, a digital camera, a portable telephone, a PDA, a printer, or a scanner, and is achieved by an integrated circuit such as an LSI.

More specifically, each functional block of the foregoing embodiments can each be separately achieved as single chips, or can be achieved by a single chip that incorporates some or all of those functions. It should be noted that here reference is made to LSIs, but depending on the degree of integration, these may also be referred to as ICs, system LSIs, super LSIs, or ultra LSIs.

Further, the manner in which the circuit integration is achieved is not limited to LSIs, and it is also possible to use a dedicated circuit or a general purpose processor. After LSI manufacturing, it is also possible to employ a programmable FPGA (Field Programmable Gate Array) or a reconfigurable processor in which the connections and settings of the circuit cells within the LSI can be reconfigured.

Further, if other technologies that improve upon or are derived from semiconductor technology enable integration technology to replace LSIs, then naturally it is also possible to integrate the functional blocks using that technology. Biotechnology applications are one such foreseeable example.

The various blocks of the visual processing devices described above in the first and second embodiments are for example processed by a central processing unit (CPU) provided in the visual processing device. Also, a program for performing those processes is stored on a memory device such as a hard disk or a ROM, and this program is run on the ROM, or read to and run on a RAM.

The two-dimensional LUT 4 in the visual processing device 1 of FIG. 1 is stored on a memory device such as a hard disk or ROM, and is referenced when necessary. Further, the visual processing device 3 receives profile data that are provided to it from the profile data registration device 8, which is connected to the visual processing device 1 directly or indirectly over a network, and these are registered as the two-dimensional LUT 4.

The visual processing device can also be a device that performs gradation processing of the images of each frame (each field) that is provided in or is connected to a device that handles moving images.

The visual processing method described in the first embodiment is executed on the visual processing device 1.

The visual processing program is a program for executing visual processing of images, and is stored on a memory device such as a hard disk or ROM in a device provided in or connected to a machine that handles images, such as a computer, a television, a digital camera, a portable telephone, a PDA, a printer, or a scanner. The program is for example provided via a storage medium such as a CD-ROM or via a network.

<2>

Figure 40:
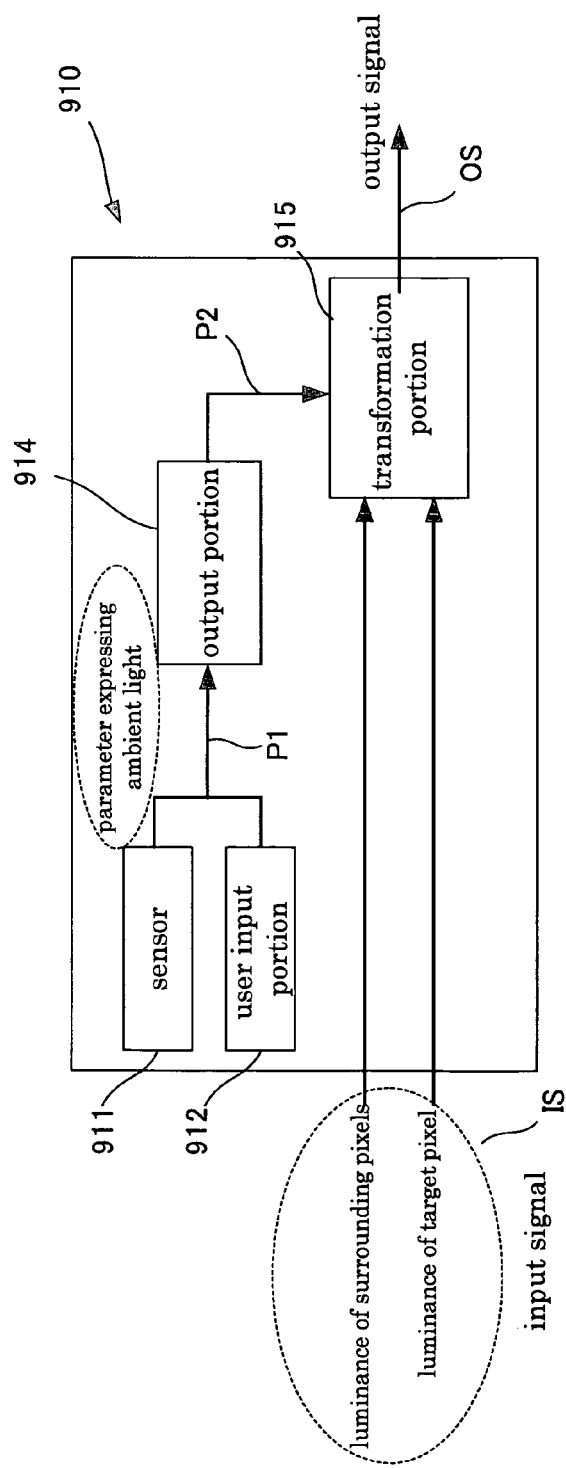
FIG. 40 is a block diagram describing the structure of the visual processing device 910 (third embodiment).
Figure 41:
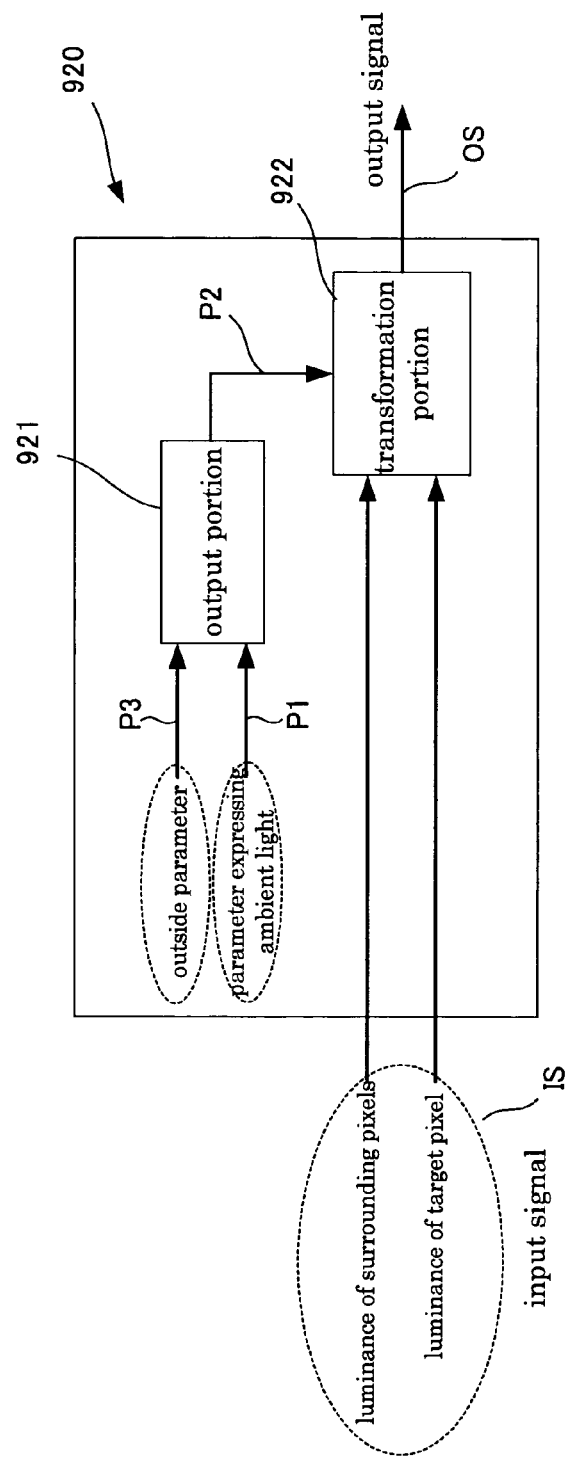
FIG. 41 is a block diagram describing the structure of the visual processing device 920 (third embodiment).

It is also possible for the visual processing devices described above in the first and second embodiments to be expressed by the configurations shown in FIG. 40 and FIG. 41.

(1)

<<Configuration>>

FIG. 40 is a block diagram that shows the configuration of a visual processing device 910 that achieves the same functions as the visual processing device 525 shown using FIG. 7 for example.

In the visual processing device 910, a sensor 911 and a user input portion 912 have the same functions as the input device 527 (see FIG. 7). More specifically, the sensor 911 is a sensor that detects the ambient light in the environment in which the visual processing device 910 has been placed, or in the environment in which the output signal OS from the visual processing device 910 is displayed, and outputs the detected value as a parameter P1 that expresses the ambient light. The user input portion 912 is a device through which the user can set the intensity of the ambient light in a stepwise manner, such as "strong, medium, weak," or in a non-stepwise manner (i.e. in a continuous manner), and outputs the value that is set as a parameter P1 that expresses the ambient light.

An output portion 914 has the same function as the profile data registration portion 526 (see FIG. 7). More specifically, the output portion 914 is provided with data of a plurality of profiles corresponding to the values of the parameter P1, which expresses the ambient light. Here, the profile data are data in a table format that give a value of an output signal OS with respect to the input signal IS and the signal obtained by spatially processing the input signal IS. Further, the output portion 914 outputs profile data corresponding to the value of the parameter P1, which expresses the ambient light, which has been obtained to a transformation portion 915 as a luminance adjustment parameter P2.

The transformation portion 915 has the same function as the spatial processing portion 2 and the visual processing portion 3 (see FIG. 7). The transformation portion 915 receives the luminance of the pixel in question (target pixel) to be subjected to visual processing, the luminance of the surrounding pixels positioned around the target pixel, and the luminance adjustment parameter P2 as input, transforms the luminance of the target pixel, and outputs the result as the output signal OS.

More specifically, the transformation portion 915 spatially processes the target pixel and the surrounding pixels. The transformation portion 915 also reads the value of the output signal OS corresponding to the pixel being processed and the result of the spatial processing from the values of the luminance adjustment parameter P2, which are in a table format, and outputs this as the output signal OS.

<<Modified Examples>>

(1)

In the above configuration, the luminance adjustment parameter P2 is not limited to the above-described profile data. For example, it is also possible for the luminance adjustment parameter P2 to be coefficient matrix data used when computing the value of the output signal OS from the luminance of the pixel being processed and the luminance of the surrounding pixels. Here, coefficient matrix data are data storing the coefficient portion of the function used when computing the value of the output signal OS from the luminance of the pixel being processed and the luminance of the surrounding pixels.

(2)

It is not necessary for the output portion 914 to be provided with profile data or coefficient matrix data for all the values of the parameter P1, which expresses the ambient light. In this case, it is also possible to suitably interpolate or extrapolate the profile data e.g. that have been provided in correspondence with the parameter P1, which expresses the ambient light, which has been obtained, so as to create appropriate profile data e.g.

(2)

<Configuration>

FIG. 41 is a block diagram that shows the configuration of a visual processing device 920 that has the same functions as the visual processing device 600 shown using FIG. 24.

With the visual processing device 920, the output portion 921 further obtains an outside parameter P3 in addition to the parameter P1, which expresses the ambient light, and outputs the luminance adjustment parameter P2 based on the parameter P1, which expresses the ambient light, and the outside parameter P3.

Here, the parameter P1 that expresses the ambient light is the same as that described in (1) above.

The outside parameter P3 is a parameter expressing e.g. the visual effect desired by the user who will view the output signal OS. More specifically, it is a value such as the contrast desired by the user who will view the image (target contrast). Here, the outside parameter P3 is set by the target contrast setting portion 604 (see FIG. 24). Alternatively, it is set using a default value stored on the output portion 921 in advance.

The output portion 921 calculates the value of the actual contrast through the configuration shown in FIG. 33 and FIG. 34 from the parameter P1, which expresses the ambient light, and outputs the result as the luminance adjustment parameter P2. The output portion 921 outputs the outside parameter P3 (target contrast) as the luminance adjustment parameter P2. The output portion 921 also stores data of a plurality of profiles stored in the two-dimensional LUT described in [Second Embodiment]<Modified Example> (vii), and selects profile data based on the actual contrast that has been calculated from the outside parameter P3 and the parameter P1, which expresses the ambient light, and outputs this data, which is in the form of a table, as the luminance adjustment parameter P2.

A transformation portion 922 has the same function as the target contrast transformation portion 601, the transformed signal processing portion 602, and the actual contrast transformation portion 603 (for these, see FIG. 24). More specifically, the transformation portion 922 receives the input signal IS (luminance of the pixel being processed and luminance of the surrounding pixels) and the luminance adjustment parameter P2 as input, and outputs an output signal OS. For example, the input signal IS is transformed into the target contrast signal JS (see FIG. 24) using the target contrast obtained as the luminance adjustment parameter P2. It then spatially processes the target contrast signal JS, thus deriving the unsharp signal US (see FIG. 24).

The transformation portion 922 is provided with the visual processing portion 623 of the modified example described in [Second Embodiment]<Modified Example> (vii), and outputs the visually processed signal KS (see FIG. 24) from the profile data obtained as the luminance adjustment parameter P2, the target contrast signal JS, and the unsharp signal US. The visually processed signal KS is then transformed into the output signal OS using the actual contrast that is obtained as the luminance adjustment parameter P2.

With the visual processing device 920, it is possible to select the profile data to be used for visual processing based on the outside parameter P3 and the parameter P1, which expresses the ambient light, and also, it is possible to compensate for the effect of the ambient light to improve the local contrast, even in an environment where ambient light is present, bringing the contrast closer to the contrast desired by the user who will view the output signal OS.

<<Modified Examples>>

It should be noted that it is possible to perform the same modifications as those discussed in (1) with this configuration as well.

Where necessary, it is also possible to switch the configuration described in (1) and the configuration described in (2). This switching can be performed using a switch signal from the outside. It is also possible to determine which of the configurations to use based on whether or not the outside parameter P3 is present.

Although the actual contrast was described as being calculated by the output portion 921, it is also possible to adopt a configuration in which the value of the actual contrast is directly input to the output portion 921.

(3)

With the configuration shown in FIG. 41, it is further possible to adopt means for keeping the input from the output portion 921 to the transformation portion 922 from changing abruptly.

Figure 42:
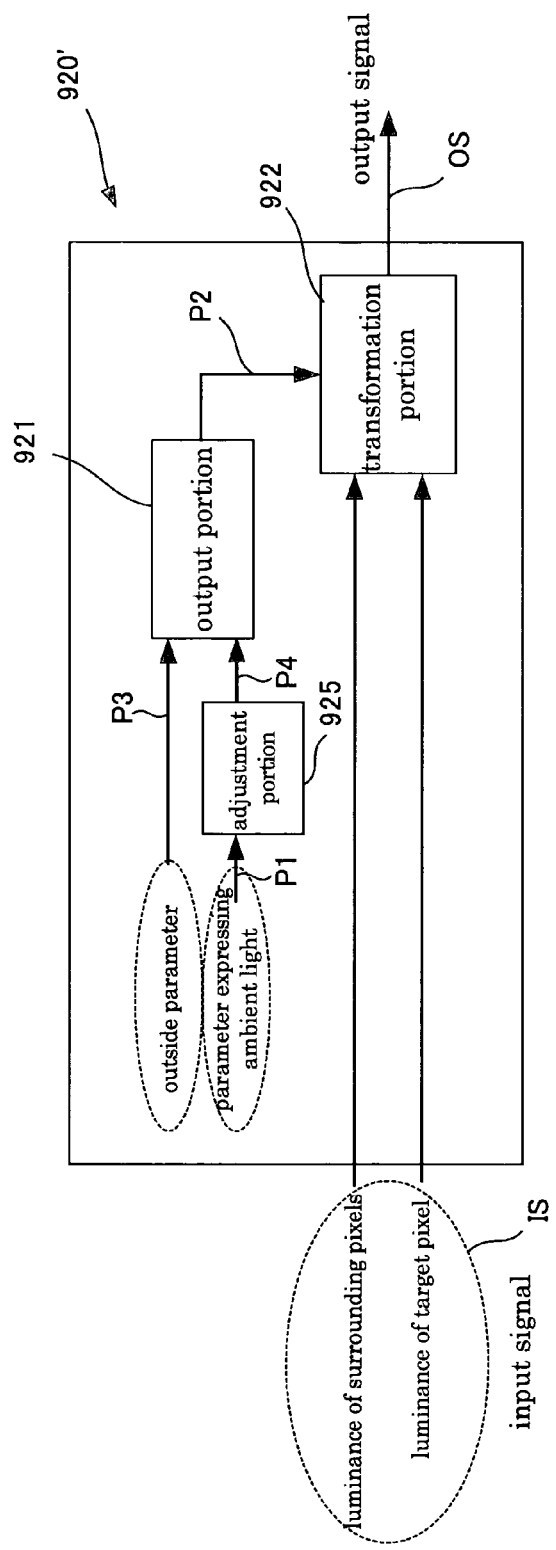
FIG. 42 is a block diagram describing the structure of the visual processing device 920' (third embodiment).

A visual processing device 920' shown in FIG. 42 differs from the visual processing device 920 shown in FIG. 41 in that it is further provided with an adjustment portion 925 that eases the change over time in the parameter P1, which expresses the ambient light. The adjustment portion 925 receives the parameter P1 expressing the ambient light as input and outputs a post-adjustment output P4.

By doing this, it becomes possible for the output portion 921 to obtain a parameter P1 that expresses the ambient light that does not change abruptly, and as a result, the change in the output of the output portion 921 over time also becomes gentle.

The adjustment portion 925 is achieved by an IIR filter, for example. Here, with an IIR filter, the value [P4] of the output P4 of the adjustment portion 925 is calculated by [P4]=k1*[P4]'+k2*[P1]. In the equation, k1 and k2 are each parameters that take a positive value, [P1] is the value of the parameter P1, which expresses the ambient light, and [P4]' is the value of the delay output (for example, the previous output) of the output P4 of the adjustment portion 925. It should be noted that the processing in the adjustment portion 925 can also be performed using a component other than an IIR filter.

Figure 43:
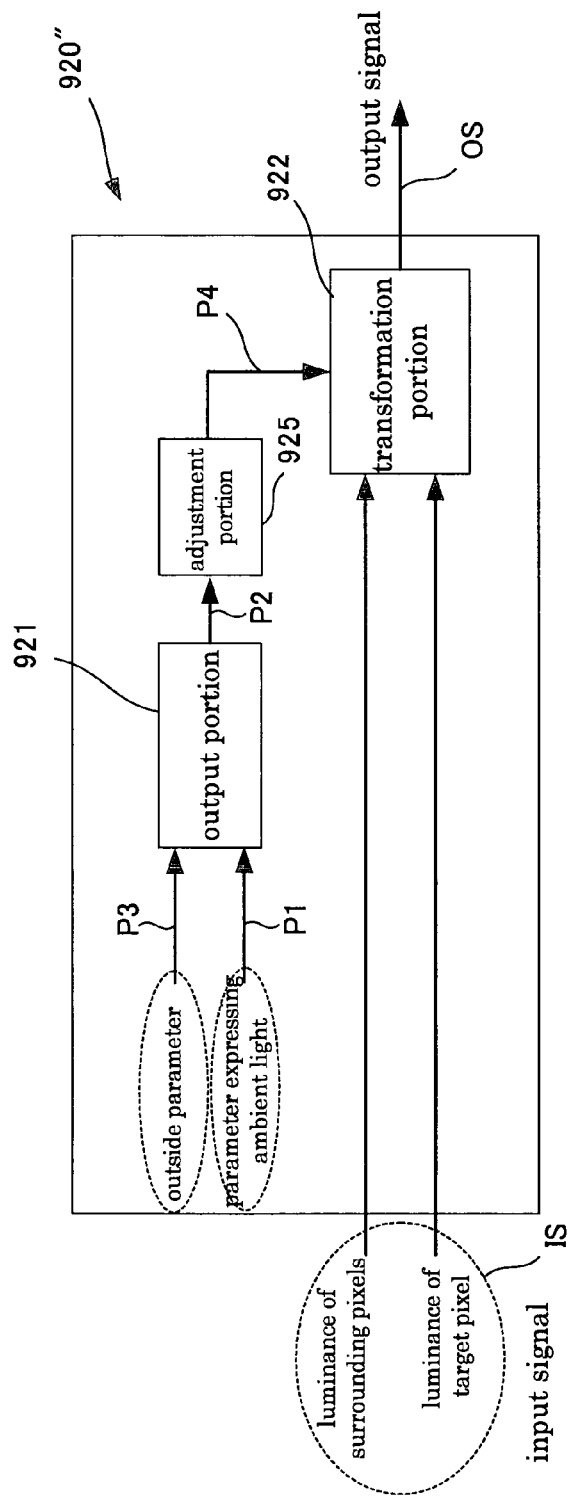
FIG. 43 is a block diagram describing the structure of the visual processing device 920" (third embodiment).

Further, it is also possible for the adjustment portion 925 to be means that directly smoothes the change in the luminance adjustment parameter P2 over time that is provided on the output side of the output portion 921, as in the visual processing device 920" shown in FIG. 43. Here, the operation of the adjustment portion 925 is the same as that described above. More specifically, the value [P4] of the output P4 of the adjustment portion 925 is calculated by [P4]=k3*[P4]'+k4*[P2]. In the equation, k3 and k4 are each parameters that take a positive value, [P2] is the value of the luminance adjustment parameter P2, and [P4]' is the value of the delay output (for example, the previous output) of the output P4 of the adjustment portion 925. It should be noted that the processing in the adjustment portion 925 can also be performed using a component other than an IIR filter.

With the configuration shown in FIGS. 42 and 43, for example, it is possible to control the change over time of the parameter P1 expressing the ambient light or the luminance adjustment parameter P2. Thus, it is possible to inhibit sudden parameter fluctuations, even if the sensor 911 for detecting the ambient light responds to a person who has moved in front of the sensor and for a brief moment the parameters significantly change. As a result, flickering in the display screen can be inhibited.

Fourth Embodiment

With the fourth through sixth embodiments, it becomes possible to solve the following issues of the conventional gradation processing described using FIGS. 104 to 107.

<Issues in Conventional Gradation Processing>

With the histogram creation portion 302 (see FIG. 104), a gradation transformation curve Cm is created from a brightness histogram Hm of the pixels in the image region Sm. To more properly create a gradation transformation curve Cm to adopt for the image region Sm, it is necessary to include the entire range from the dark portions (shadows) to the light portions (highlights) of the image, thus requiring a larger number of pixels to be referenced. For this reason, it is not possible to make the individual image regions Sm particularly small, that is, the n partitions of the original image cannot be made particularly large. Although the number of partitions n differs depending on the image content, from experience the partition number tends to be in the range of four to sixteen partitions.

In this way, the individual image regions Sm cannot be made particularly small, and therefore the following problems occur in the output signal OS after gradation processing. That is, gradation processing is executed using a single gradation transformation curve Cm for each image region Sm, and thus there are instances in which the junction at the border between image regions Sm is noticeably unnatural or a pseudo-border results within the image region Sm. Further, at a partition number of at most four to sixteen partitions the image region Sm is large, and therefore significant changes in the gray concentration between image regions occurs in images in which there are extreme differences between the image regions, and this makes it difficult to prevent pseudo-borders from occurring. For example, as in FIG. 105(b) and FIG. 105(c), there is an extreme change in darkness due to the positional relationship between the image (for example, an object e.g. in the image) and the image regions Sm.

Visual processing devices that are capable of solving the above problems present in conventional gradation processing are described in the fourth through sixth embodiments using FIGS. 44 to 64.

<Characteristics of a Visual Processing Device 101 as a Fourth Embodiment>

A visual processing device 101 serving as a fourth embodiment of the present invention is described below using FIGS. 44 to 48. The visual processing device 101 is a device that performs gradation processing of an image, and is provided in or connected to a device that handles images, such as a computer, a television, a digital camera, a portable telephone, or a PDA. The visual processing device 101 is characterized in that it performs gradation processing with respect to each image region that is obtained by partitioning an image more finely than has been the case conventionally.

<Configuration>

Figure 44:
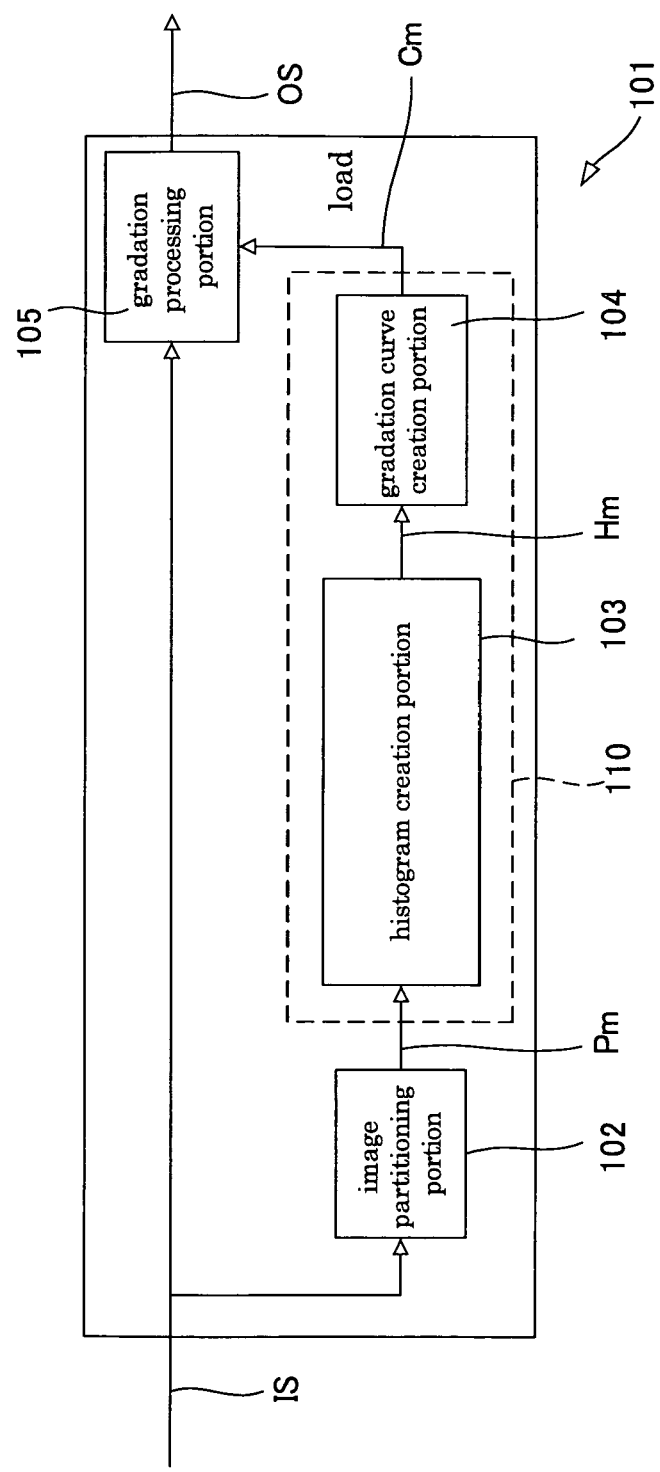
FIG. 44 is a block diagram describing the structure of the visual processing device 101 (fourth embodiment).

FIG. 44 shows a block diagram for describing the structure of the visual processing device 101. The visual processing device 101 has an image partitioning portion 102 that partitions an original image that has been input as an input signal IS into a plurality of image regions Pm ($1 \leq m \leq n$; where n is the number of partitions of the original image), a gradation transformation curve derivation portion 110 that derives a gradation transformation curve Cm for each image region Pm, and a gradation processing portion 105 that loads the gradation transformation curves Cm and outputs an output signal OS that is obtained by performing gradation processing with respect to each image region Pm. The gradation transformation curve derivation portion 110 comprises a histogram creation portion 103 that creates a brightness histogram Hm for the pixels of a wide area image region Em, which includes an image region Pm and the image regions surrounding the image region Pm, and a gradation curve creation portion 104 that creates a gradation transformation curve Cm for each image region Pm from the brightness histogram Hm that has been created.

<Action>

Figure 45:
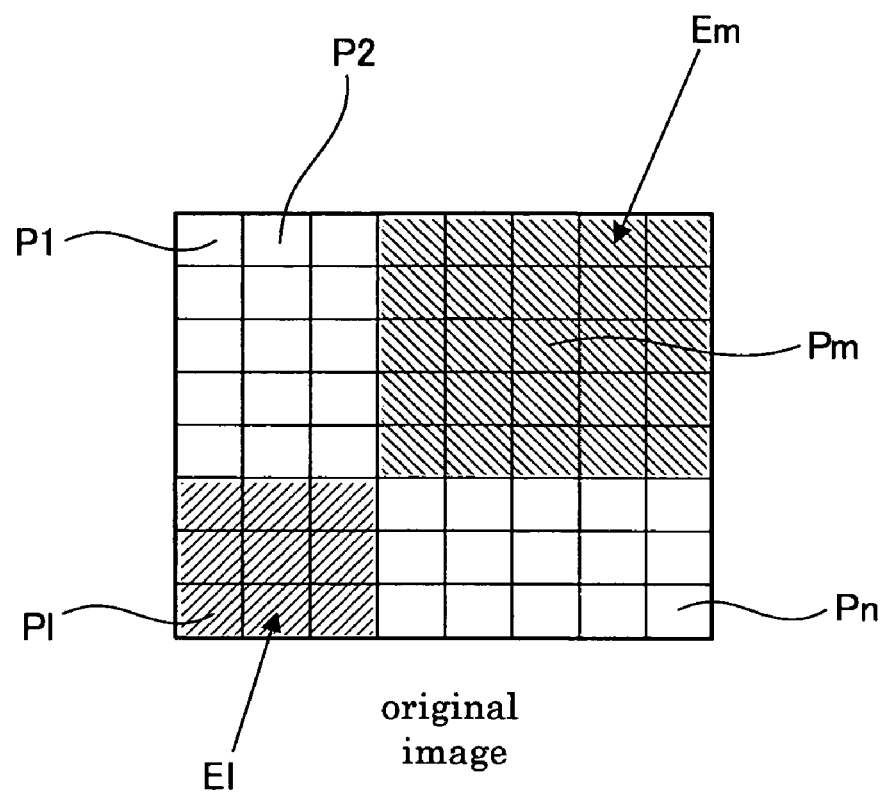
FIG. 45 is an explanatory diagram describing the image region Pm (fourth embodiment).
Figure 46:
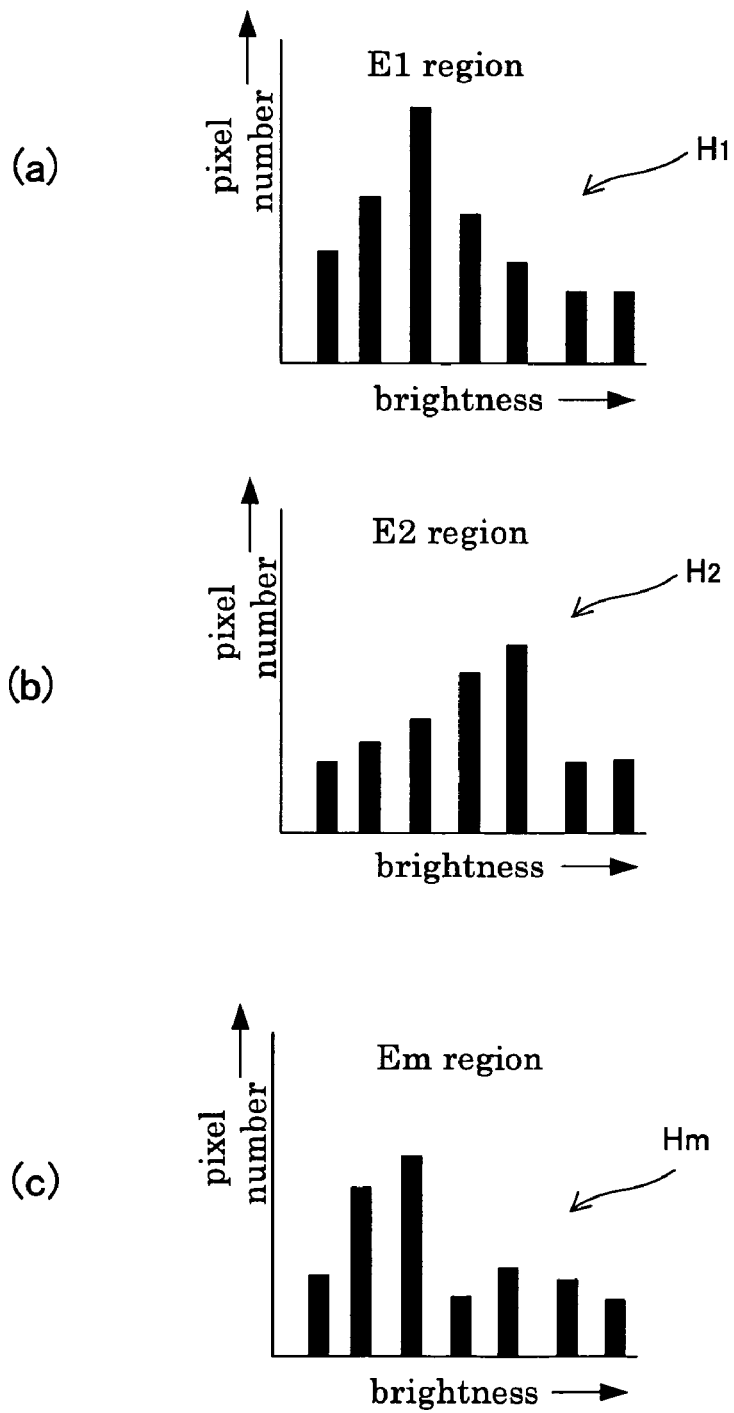
FIG. 46 is an explanatory diagram describing the brightness histogram Hm (fourth embodiment).
Figure 47:
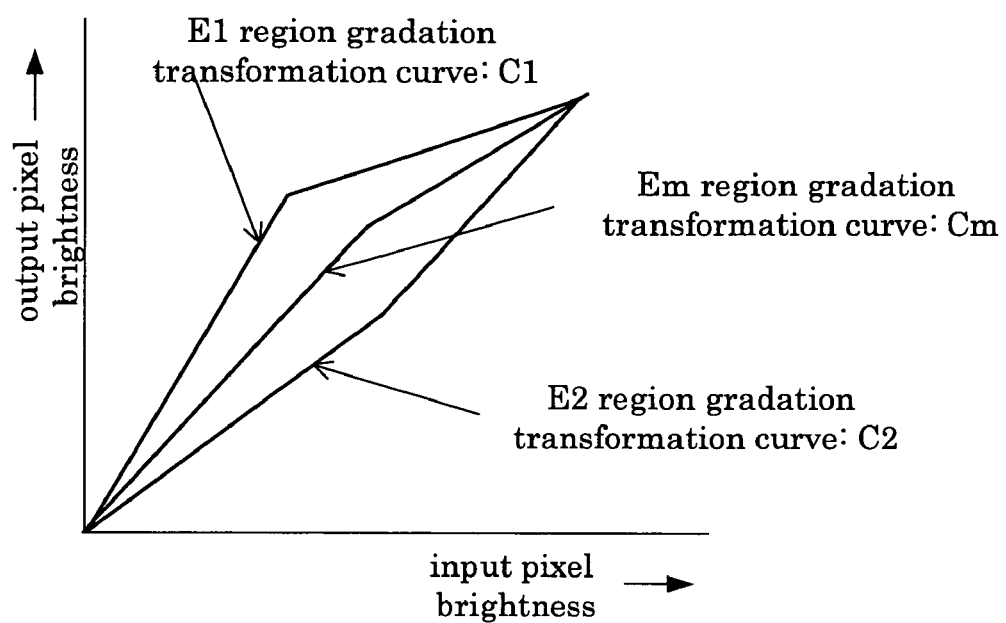
FIG. 47 is an explanatory diagram describing the gradation transformation curves Cm (fourth embodiment).

The operations of the various portions are described using FIGS. 45 to 47. The image partitioning portion 102 partitions an original image that has been input as an input signal IS into a plurality (n) of image regions Pm (see FIG. 45). Here, the number of partitions of the original image is greater than the partition number (e.g. 4 to 16 partitions) of the conventional visual processing device 300 shown in FIG. 104, and for example is 4800 partitions of 80 partitions in the horizontal direction by 60 partitions in the vertical direction.

The histogram creation portion 103 creates a brightness histogram Hm of the wide area image region Em for each image region Pm. Here, the wide area image region Em is a collection of a plurality of image regions including the respective image region Pm, and for example is a collection of 25 image regions of five blocks in the vertical direction by five blocks in the horizontal direction with the image region Pm at the center. It should be noted that depending on the position of the image region Pm, it may not be possible to take a wide area image region Em having five blocks in the vertical direction by five blocks in the horizontal direction about the image region Pm. For example, in the case of the image region Pl positioned near the original image, it is not possible to obtain a wide area image region El having five blocks in the vertical direction by five blocks in the horizontal direction around the image region Pl. In this case, a region in which five blocks in the vertical direction by five blocks in the horizontal direction about the image region P1 at the center that overlaps the original image is adopted as the wide area image region El. The brightness histogram Hm that is created by the histogram creation portion 103 shows the distribution of the brightness values of all of the pixels in the wide area image region Em. That is, in the brightness histograms Hm shown in FIGS. 46(*a*) to (*c*), the horizontal axis shows the brightness level of the input signal IS and the vertical axis shows the pixel number.

The gradation curve creation portion 104 cumulates the "pixel number" of the brightness histogram Hm of the wide area image region Em in the order of brightness and adopts this cumulative curve as the gradation transformation curve Cm of the image region Pm (see FIG. 47). In the gradation transformation curves Cm shown in FIG. 47, the horizontal axis shows the brightness value of the pixels of the image region Pm in the input signal IS, and the vertical axis shows the brightness value of the pixels of the image region Pm in the output signal OS. The gradation processing portion 105 loads the gradation transformation curve Cm, and based on that gradation transformation curve Cm, transforms the brightness value of the pixels of the image region Pm in the input signal IS.

<Visual Processing Method and Visual Processing Program>

Figure 48:
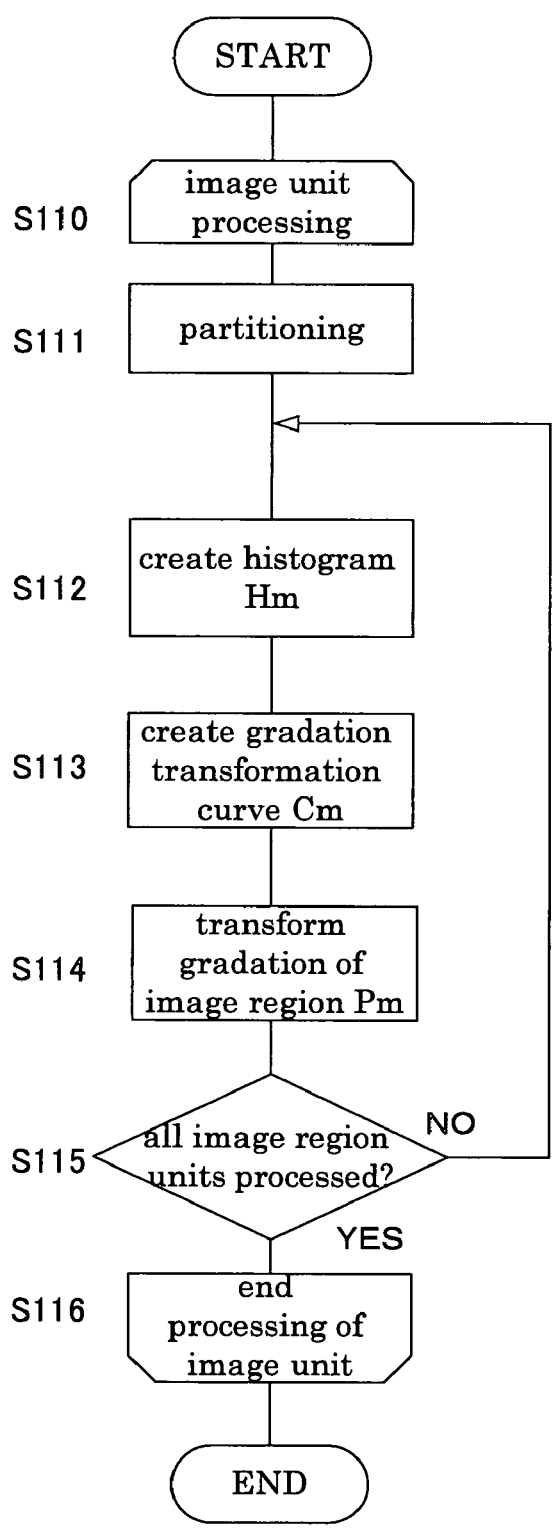
FIG. 48 is a flowchart describing the visual processing method (fourth embodiment).

FIG. 48 shows a flowchart for describing the visual processing method of the visual processing device 101. The visual processing method shown in FIG. 48 is achieved by hardware in the visual processing device 101, and is a method for performing gradation processing of an input signal IS (see FIG. 1). With the visual processing method shown in FIG. 48, the input signal IS is provided in image units (steps S110 to S116). An original image that has been input as the input signal IS is partitioned into a plurality of image regions Pm ($1 \leq m \leq n$; where n is the number of partitions of the original image) (step S111), and gradation processing is performed for each image region Pm (steps S112 to 5115).

A brightness histogram Hm of the pixels of a wide area image region Em including the respective image region Pm and the image regions surrounding that image region Pm is created (step S112). A gradation transformation curve Cm for that image region Pm is then created based on the brightness histogram Hm (step S113). Description of the brightness histogram Hm and the gradation transformation curve Cm is omitted here (see the section <Action> above). The gradation transformation curve Cm that is created is used to perform gradation processing with respect to the pixels of the image region Pm (step S114). Next it is determined whether or not processing of all of the image regions Pm is finished (step S115), and until it is determined that processing is finished, the processing of steps S112 to S115 is repeated, the number of time it is repeated being equal to the number of partitions of the original image. With this, processing in image units is finished (step S116).

It should be noted that each step of the visual processing method shown in FIG. 48 can also be achieved as a visual processing program by a computer or the like.

<Effects>

(1)

A gradation transformation curve Cm is created for each image region Pm. Thus, it is possible to perform more suitable gradation processing than if the same gradation transformation is performed with respect to the entire original image.

(2)

The gradation transformation curve Cm created for each image region Pm is created based on the brightness histogram Hm of the wide area image region Em. Thus, it is possible to sufficiently sample the brightness values even though each image region Pm is small. As a result, it is possible to create a suitable gradation transformation curve Cm even for small image regions Pm.

(3)

The wide area image regions corresponds to adjacent image regions are overlapped. Thus, the gradation transformation curves for adjacent image regions often show similar trends. For this reason, a spatial processing effect can be added to the gradation processing of each image region, allowing the junction at the border between adjacent image regions to be kept from standing out unnaturally.

(4)

The size of each image region Pm is smaller than the conventional case. This allows pseudo-borders to be kept from occurring within the image regions Pm.

<Modified Examples>

The present invention is not limited to the foregoing embodiment, and various modifications are possible without departing from the gist thereof.

(1)

In the foregoing embodiment, 4800 partitions was given as an example of the partition number of the original image, but the effect of the present invention is not limited to instances where this is the case, and the same effects can be obtained with other partition numbers. It should be noted that with regard to the partition number there is a tradeoff between the amount of gradation processing and the visual effects. That is, increasing the partition number increases the processing amount of gradation processing but on the other hand yields better visual effects (e.g. the inhibition of a pseudo-border).

(2)

In the above embodiment, 25 was given as an example of the number of image regions making up the wide area image region, but the effects of the present invention are not limited to instances where this is the case, and the same effects can be achieved with other numbers.

Fifth Embodiment

Characteristics of a Visual Processing Device 111 as a Fifth Embodiment

A visual processing device 111 serving as a fifth embodiment of the present invention is described below using FIGS. 49 to 61. The visual processing device 111 is a device that performs gradation processing of an image, and is provided in or connected to a device that handles images, such as a computer, a television, a digital camera, a portable telephone, or a PDA. The visual processing device 111 is characterized in that it switches between and uses a plurality of gradation transformation curves stored in advance as a LUT.

<Configuration>

Figure 49:
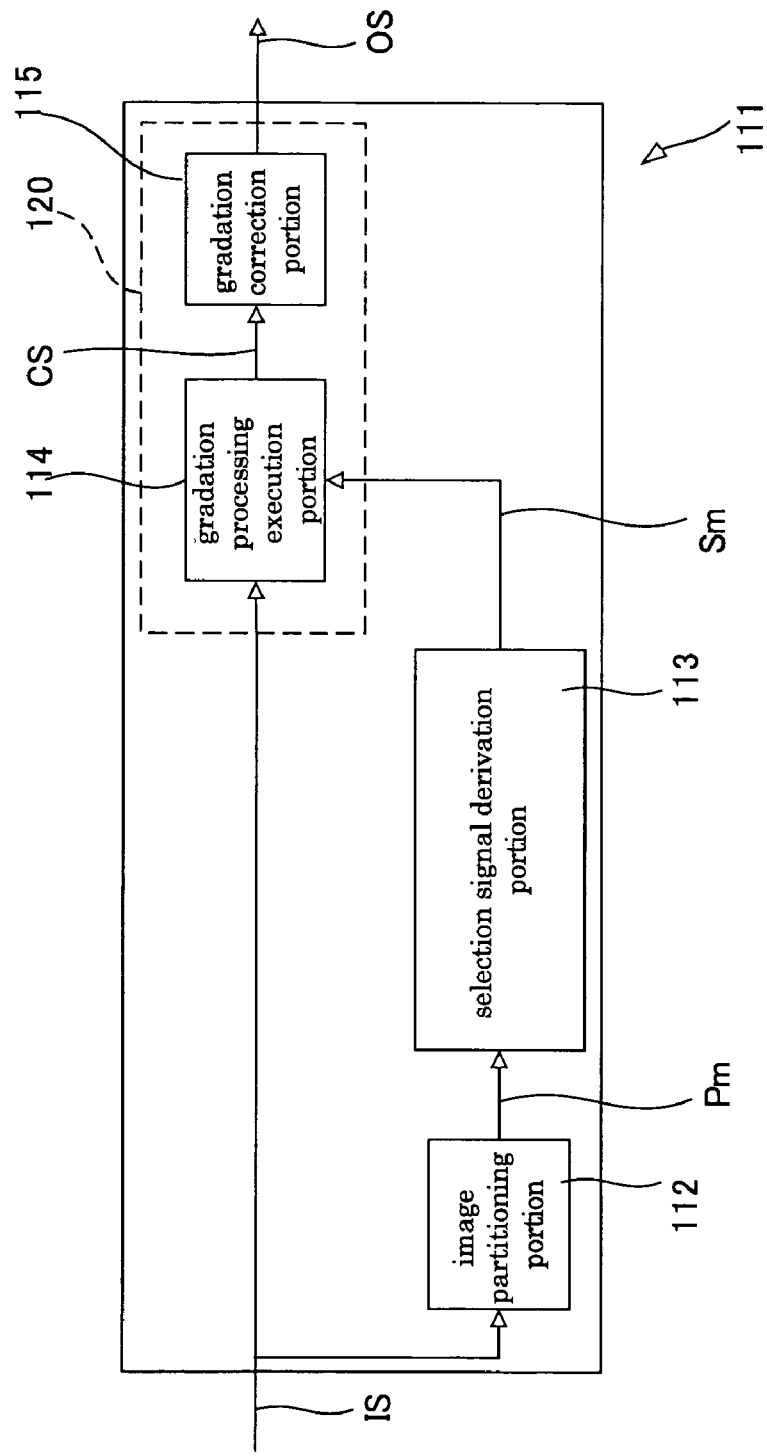
FIG. 49 is a block diagram describing the structure of the visual processing device 111 (fifth embodiment).

FIG. 49 shows a block diagram that describes the structure of the visual processing device 111. The visual processing device 111 is provided with an image partitioning portion 112, a selection signal derivation portion 113, and a gradation processing portion 120. The image partitioning portion 112 receives an input signal IS as an input and partitions the original image that is input as the input signal IS into a plurality of image regions Pm ($1 \leq m \leq n$; where n is the number of partitions of the original image), and outputs these. The selection signal derivation portion 113 outputs a selection signal Sm for selecting a gradation transformation curve Cm to be adopted for gradation processing for each image region Pm. The gradation processing portion 120 is provided with a gradation processing execution portion 114 and a gradation correction portion 115. The gradation processing execution portion 114 is provided with a plurality of gradation transformation curve candidates G1 to Gp (where p is the candidate number) as a two-dimensional LUT, and receives the input signal IS and a selection signal Sm as input and outputs a gradation processed signal CS that is obtained by performing gradation processing of the pixels within that image region Pm. The gradation correction portion 115 receives the gradation processed signal CS as input, corrects the gradation of the gradation processed signal CS, and then outputs the result as an output signal OS.

<Regarding the Gradation Transformation Curve Candidates>

Figure 50:
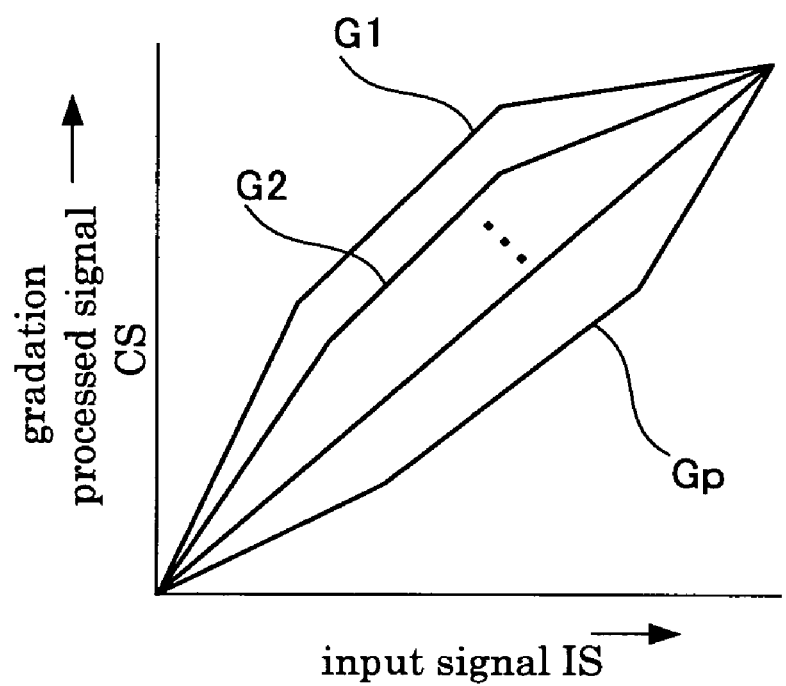
FIG. 50 is an explanatory diagram describing the gradation transformation curve candidates G1 to Gp (fifth embodiment).

The gradation transformation curve candidates G1 to Gp are described using FIG. 50. The gradation transformation curve candidates G1 to Gp are curves that give the relationship between the brightness values of the pixels of the input signal IS and the brightness values of the pixels of the gradation processed signal CS. In FIG. 50, the horizontal axis shows the brightness values of the pixels in the input signal IS, and the vertical axis shows the brightness values of the pixels in the gradation processed signal CS. The gradation transformation curve candidates G1 to Gp decrease monotonically in correspondence with their subscript, and the relationship $G1 \geq G2 \geq \ldots \geq Gp$ is achieved with regard to the brightness values of all pixels of the input signal IS. For example, the gradation transformation curve candidates G1 to Gp each are "power functions" whose variable is the brightness value of the pixels of the input signal IS, and if represented by $Gm=x^{\wedge}(\delta m)$ ($1 \leq m \leq p$; where x is a variable and $\delta m$ is constant), then $\delta 1 \leq \delta 2 \leq \ldots \leq \delta p$. Here, the brightness value of the input signal IS is a value in the range [0.0 to 1.0].

It should be noted that it is also possible for the above relationship of the gradation transformation curve candidates G1 to Gp to not hold for gradation transformation curve candidates whose subscript is large if the input signal IS is small, or for gradation transformation curve candidates whose subscript is small if the input signal IS is large. This is because such cases are rare and the effect on picture quality is small.

The gradation processing execution portion 114 is provided with the gradation transformation curve candidates G1 to Gp as a two-dimensional LUT. That is, the two-dimensional LUT is a lookup table (LUT) that gives a brightness value of the pixels of the gradation processed signal CS, with respect to the brightness value of the pixels of the input signal IS and the selection signal Sm for selecting a gradation transformation curve candidate G1 to Gp. FIG. 51 shows an example of this two-dimensional LUT. The two-dimensional LUT 141 shown in FIG. 51 is a matrix of 64 rows by 64 columns, the gradation transformation curve candidates G1 to G64 lined up in the row direction (horizontal direction). In the column direction (vertical direction) of the matrix are lined up the pixel values of the gradation processed signals CS corresponding to the value of the upper six bits of the pixel value of the input signal IS, which is for example expressed with 10 bits, that is, to the value of an input signal IS that has been segregated into 64 levels. The pixel value of the gradation processed signals CS has a value in the range of [0.0 to 1.0] if the gradation transformation curve candidates G1 to Gp are "power functions."

<Action>

The operations of the various portions are described here. The image partitioning portion 112 has substantially the same operation as the image partitioning portion 102 of FIG. 44, and partitions an original image that has been received as an input signal IS into a plurality (n) of image regions Pm (see FIG. 45). Here, the number of partitions of the original image is greater than the number of partitions (e.g. 4 to 16 partitions) of the conventional visual processing device 300 shown in FIG. 104, and for example is 4800 partitions of 80 partitions in the horizontal direction by 60 partitions in the vertical direction.

The selection signal derivation portion 113 selects a gradation transformation curve Cm to be adopted for each image region Pm from among the gradation transformation curve candidates G1 to Gp. More specifically, the selection signal derivation portion 113 calculates the mean brightness value of the wide area image region Em that includes the image region Pm and selects one of the gradation transformation curve candidates G1 to Gp in accordance with that mean brightness value that is calculated. That is, each gradation transformation curve candidate G1 to Gp corresponds to a mean brightness value of the wide area image region Em, and the larger the mean brightness value, the larger the subscript of the gradation transformation curve candidate G1 to Gp that is selected.

Here, the wide area image region Em is the same as that described in [Fourth Embodiment] using FIG. 45. That is, the wide area image region Em is a collection of a plurality of image regions including the image region Pm, and for example is a collection of 25 image regions of five blocks in the vertical direction by five blocks in the horizontal direction with the image region Pm at the center. It should be noted that depending on the position of the image region Pm, it may not be possible to acquire a wide area image region Em having five blocks in the vertical direction by five blocks in the horizontal direction around the image region Pm. For example, in the case of the image region P1, which is positioned near the original image, it is not possible to take a wide area image region El having five blocks in the vertical direction by five blocks in the horizontal direction around the image region P1. In this case, a region in which five blocks in the vertical direction by five blocks in the horizontal direction about the image region P1 that overlaps the original image is adopted as the wide area image region El.

The selection by the selection signal derivation portion 113 is output as a selection signal Sm that specifies one of the gradation transformation curve candidates G1 to Gp. More specifically, the selection signal Sm is output as the value of the subscript (1 to p) of the gradation transformation curve candidate G1 to Gp.

The gradation processing execution portion 114 receives as input the brightness values of the pixels of the image region Pm included in the input signal IS and the selection signal Sm, and for example using the two-dimensional LUT 141 shown in FIG. 51, outputs the brightness values of the gradation processed signal CS.

The gradation correction portion 115 corrects the brightness values of the pixels of the image portion Pm included in the gradation processed signal CS based on the pixel position and the gradation transformation curve that has been selected for the image region Pm and the image regions around the image region Pm. For example, the gradation transformation curve Cm that has been adopted for the pixels of the image region Pm and the gradation transformation curve that has been adopted for the image regions around the image region Pm are corrected by the internal division ratio of the pixel positions, obtaining post-correction brightness values of the pixels.

Figure 52:
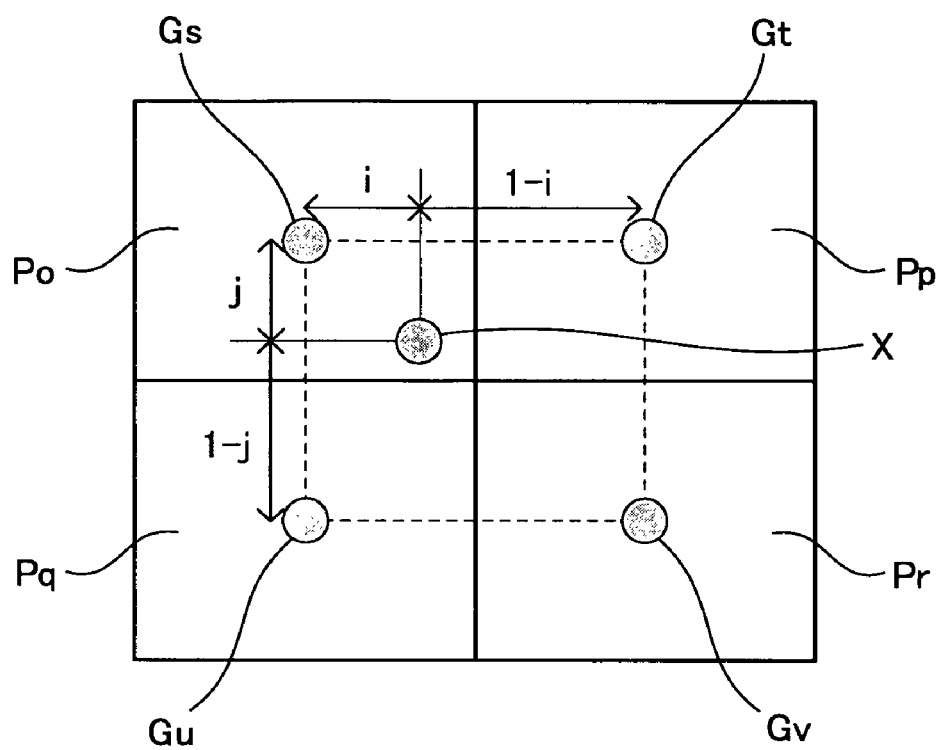
FIG. 52 is an explanatory diagram describing the operation of the gradation correction portion 115 (fifth embodiment).

The operation of the gradation correction portion 115 is described in greater detail using FIG. 52. FIG. 52 shows that the gradation transformation curve candidates Gs, Gt, Gu, and Gv (where s, t, u, and v are positive integers that are not more than the candidate number p of the gradation transformation curves) have been selected as the gradation transformation curves Co, Cp, Cq, and Cr of the image regions Po, Pp, Pq, and Pr (where o, p, q, and r are positive integers not more than the partition number n (see FIG. 45)).

Here, the position of the pixel x (having the brightness value [x]) of the image region Po, whose gradation is to be corrected, shall be the position obtained by interpolating the center of the image region Po and the center of the image region Pp by [i:1−i] and interpolating the center of the image region Po and the center of the image region Pq by [j:1−j]. In this case, the brightness value [x] of the pixel x after gradation correction is obtained by $[x]=\{(1-j)\cdot(1-i)\cdot[Gs]+(1-j)\cdot(i)\cdot[Gt]+(j)\cdot(1-i)\cdot[Gu]+(j)-(i)-[Gv]\}\cdot\{[x]/[Gs]\}$. It should be noted that [Gs], [Gt], [Gu], and [Gv] are the brightness values in a case where the gradation transformation curve candidates Gs, Gt, Gu, and Gv are applied to the brightness value [x].

<Visual Processing Method and Visual Processing Program>

Figure 53:
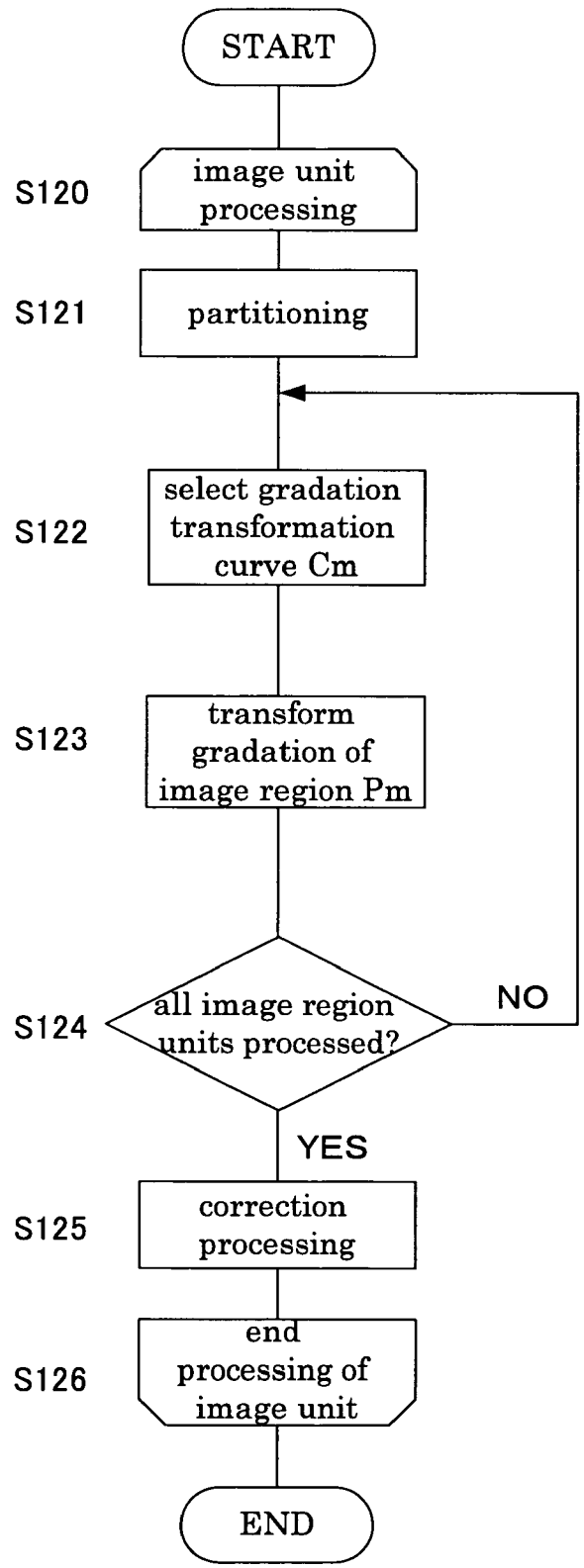
FIG. 53 is a flowchart describing the visual processing method (fifth embodiment).

FIG. 53 shows a flowchart describing the visual processing method of the visual processing device 111. The visual processing method shown in FIG. 53 is achieved by the hardware in the visual processing device 111, and is a method of performing gradation processing of an input signal IS (see FIG. 49). With the visual processing method shown in FIG. 53, the input signal IS is processed in image units (steps S120 to S126). An original image that is input as the input signal IS is partitioned into a plurality of image regions Pm ($1 \leq m \leq n$; where n is the number of partitions of the original image) (step S121), and gradation processing is performed for each image region Pm (steps S122 to S124).

In processing of each image region Pm, a gradation transformation curve Cm to be adopted for that image region Pm is selected from among the gradation transformation curve candidates G1 to Gp (step S122). More specifically, the mean brightness value of the wide area image region Em for the image region Pm is calculated and one of the gradation transformation curve candidates G1 to Gp is selected in accordance with that mean brightness value that is calculated. The gradation transformation curve candidates G1 to Gp are correlated to a mean brightness value of the wide area image region Em, and the larger the mean brightness value, the larger the subscript of the gradation transformation curve candidate G1 to Gp that is selected. Description of the wide area image region Em is omitted here (see the <Actions> section above).

The brightness value of the gradation processed signal CS corresponding to the brightness value of the pixels of the image region Pm of the input signal IS and the selection signal Sm that indicates the gradation transformation curve candidate that has been selected in step S122 from among the gradation transformation curve candidates G1 to Gp, is obtained using the two-dimensional LUT 141 shown in FIG. 51, for example, and output (step S123). Then, it is determined whether or not processing of all image regions Pm has finished (step S124), and until it is determined that processing is finished, the processes of steps S122 to S124 are repeated, for a number of times equal to the number of partitions of the original image. With this, processing of the image region units is finished.

The brightness value of the pixels of the image region Pm included in the gradation processed signal CS is then corrected based on the position of the pixels and the gradation transformation curves selected for the image region Pm and the image regions surrounding the image region Pm (step S125). For example, the gradation transformation curve Cm that has been adopted for the pixels of the image region Pm and the gradation transformation curves that have been selected for the image regions around the image region Pm are corrected by the internal division ratio of the pixel positions, finding the brightness value of the pixels after correction. The specific details of this correction are omitted here (see above section <Action>, FIG. 52).

With this, processing of the image units is finished (step S126).

It should be noted that the steps of the visual processing method shown in FIG. 53 can also be accomplished by a computer as a visual processing program, for example.

<Effects>

With the present invention, it is possible to obtain substantially the same effects as those discussed under [Fourth Embodiment]<Effects>. Only those effects that are unique to the fifth embodiment are discussed below.

(1)

The gradation transformation curves Cm that are selected for the respective image regions Pm are created based on the mean brightness value of the wide area image region Em. Thus, sufficient sampling of the brightness value is possible even though the size of the image region Pm is small. As a result, even for small image regions Pm it is possible to select and apply an appropriate gradation transformation curve Cm.

(2)

The gradation processing execution portion 114 has a two-dimensional LUT that has been created in advance. The processing burden required for gradation processing, and more specifically the processing burden required for creation of the gradation transformation curves Cm, can thus be reduced. This allows the image regions Pm to be gradation processed faster.

(3)

The gradation processing execution portion 114 executes gradation processing using a two-dimensional LUT. The two-dimensional LUT is read from a memory device such as a hard disk or a ROM provided in the visual processing device 111 and is used for the gradation processing. By changing the content of the two-dimensional LUT that is read out, it is possible to execute a variety gradation processing without changing the hardware configuration. That is, gradation processing that is more suited to the characteristics of the original image can be accomplished.

(4)

The gradation correction portion 115 uses a single gradation transformation curve Cm to correct the gradation of pixels of the image region Pm that have been subjected to gradation processing. Thus, it is possible to obtain an output signal OS that has been more suitably gradation processed. For example, it becomes possible to inhibit the occurrence of pseudo-borders. It also becomes possible to further prevent the junction between borders of the various image regions Pm from standing out unnaturally in the output signal OS.

<Modified Examples>

The present invention is not limited to the foregoing embodiment, and various modifications and improvements thereof are possible without departing from the gist of the invention.

(1)

In the foregoing embodiment, 4800 partitions was given as an example of the number of partitions of the original image, but the effect of the present invention is not limited to instances where this is the case, and the same effects can be obtained with other numbers of partitions. It should be noted that with regard to the partition number there is a tradeoff between the gradation processing burden and the visual effects. That is, increasing the partition number increases the processing burden of gradation processing but on the other hand leads to a better visual effect (e.g. the inhibition of pseudo-borders).

(2)

In the above embodiment, 25 was given as an example of the number of image regions making up the wide area image region, but the effects of the present invention are not limited to instances where this is the case, and the same effects can be achieved with other numbers.

(3)

In the foregoing embodiment, a two-dimensional LUT 141 comprising a 64 row x 64 column matrix served as an example of the two-dimensional LUT. The effects of the invention, however, are not limited to a two-dimensional LUT of this size. For example, it is also possible for the two-dimensional LUT to be a matrix in which an even greater number of gradation transformation curve candidates are arranged in the row direction. Alternatively, it is also possible for the pixel values of the gradation processed signals CS corresponding to values obtained by separating the pixel values of the input signal IS in finer stages to be arranged in the column direction of the matrix. More specifically, the matrix can be include the pixel values of the gradation processed signal CS arranged corresponding to the pixel values of an input signal IS that is expressed with 10 bits.

A large two-dimensional LUT allows more suitable gradation processing to be performed, whereas a small two-dimensional LUT allows the amount of memory for storing the two-dimensional LUT to be reduced.

(4)

In the foregoing embodiment, it was explained that the pixel values of the gradation processing signals CS corresponding to the upper six bit values of the pixel values of the input signal IS, which is for example expressed with 10-bits, that is, the values of the input signal IS after being divided into 64 levels, are lined up. Here, it is also possible for the gradation processed signal CS to be output as a component of the matrix obtained by linear interpolation with the value of the lower four bits of the pixel value of the input signal IS by the gradation processing execution portion 114. That is, the components of the matrix corresponding to the value of the upper six bits of the pixel value of the input signal IS, which is for example expressed with 10 bits, are arranged in the column direction of the matrix, and the components of the matrix corresponding to the value of the upper six bits of the pixel value of the input signal IS and the components of the matrix corresponding to the values obtained by adding a [1] to the value of the upper six bits of the pixel value of the input signal IS (for example, in FIG. 51, the components of one row) are linearly interpolated using the value of the lower four bits of the pixel value of the input signal IS, and the result is output as the gradation processed signal CS.

By doing this, more suitable gradation processing can be performed even though the two-dimensional LUT 141 (see FIG. 51) is small in size.

(5)

In the foregoing embodiment, it was explained that a gradation transformation curve Cm to be adopted for the image region Pm is selected based on the mean brightness value of the wide area image region Em. Here, the method of selecting the gradation transformation curve Cm is not limited to this method. For example, it is also possible to select the gradation transformation curve Cm to be adopted for the image region Pm based on the maximum brightness value or the minimum brightness value of the wide area image region Em. It should be noted that when selecting the gradation transformation curve Cm, the value [Sm] of the selection signal Sm can be the mean brightness value, the maximum brightness value, or the minimum brightness value of the wide area image region Em. In this case, the gradation transformation curve candidates G1 to G64 are correlated to the respective values obtained by dividing into 64 levels the value that can be taken by the selection signal Sm.

For example, it is also possible to select the gradation transformation curve Cm to be adopted for the image region Pm in the following manner. That is, the mean brightness value is found for each of the image regions Pm and then from these mean brightness values, a provisional selection signal Sm' is found for each image region Pm. Here, the value of the provisional selection signal Sm' is the number of the subscript of the gradation transformation curve candidates G1 to Gp.

Then, for the image regions included in the wide area image region Em, the values of the provisional selection signals Sm' are averaged to find the value [Sm] of the selection signal Sm for the image region Pm, and the candidate of the gradation transformation curve candidates G1 to Gp whose subscript is the integer closest to the value [Sm] is selected as the gradation transformation curve Cm.

(6)

Figure 54:
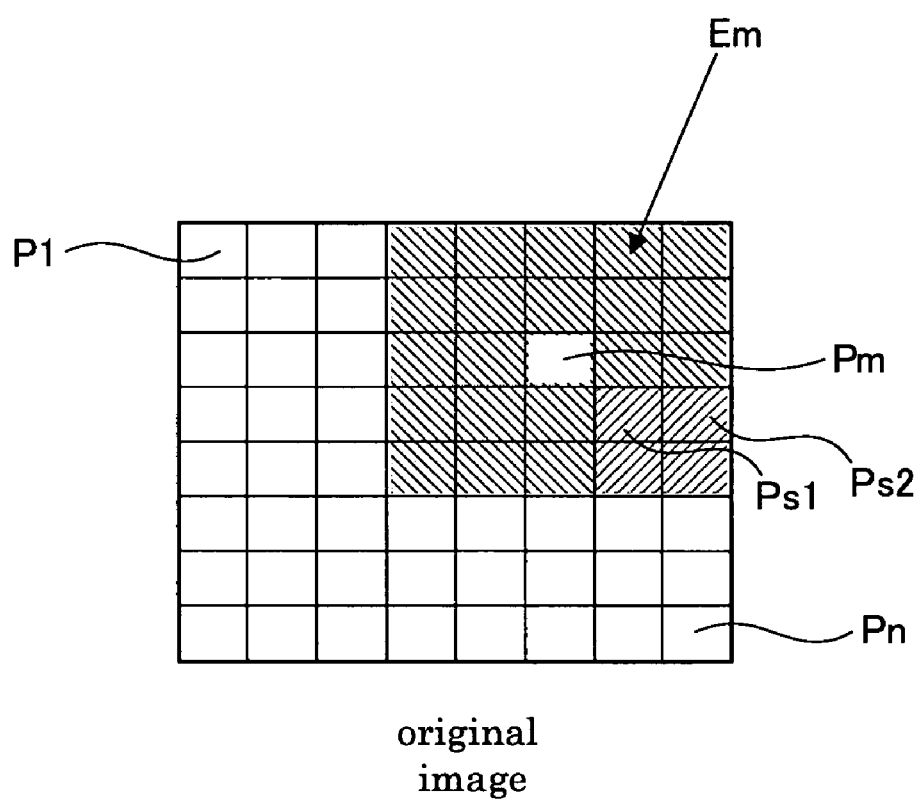
FIG. 54 is an explanatory diagram describing a modified example of selection of the gradation transformation curve Cm (fifth embodiment).

In the foregoing embodiment, it was explained that the gradation transformation curve Cm to be adopted for the image region Pm is selected based on the mean brightness value of the wide area image region Em. Here, it is also possible for the gradation transformation curve Cm to be adopted for the image region Pm to be selected based on a weighted mean rather than a simple mean of the wide area image region Em. For example, as shown in FIG. 54, it is possible to find the mean brightness value of each of the image regions making up the wide area image region Em, and then reduce the weight or exclude the image regions Ps1, Ps2, . . . that have a mean brightness value that significantly differs from the mean brightness value of the image region Pm, and have the result serve as the mean brightness value of the wide area image region Em.

By doing this, if the wide area image region Em includes regions with a peculiar brightness (for example, a case in which the wide area image region Em includes the border between two objects with different brightness values), the effect that the brightness values of those peculiar regions has on selection of the gradation transformation curve Cm to be adopted for the image region Pm is reduced, and this allows more suitable gradation processing to be performed.

(7)

In the foregoing embodiment, the gradation correction portion 115 is optional. That is, even if the gradation processed signal CS is output, the same effects as those set forth under [Fourth Embodiment]<Effects> and those set forth under [Fifth Embodiment]<Effects> (1) and (2) can be obtained over those of the conventional visual processing device 300 (see FIG. 104).

(8)

In the foregoing embodiment, it was explained that the gradation transformation curve candidates G1 to Gp decrease monotonically in correspondence with their subscript, satisfying the relationship G1≧G2≧ . . . ≧Gp with respect to the brightness values of all the pixels of the input signal IS. Here, it is also possible for the gradation transformation curve candidates G1 to Gp provided in the two-dimensional LUT to not satisfy the relationship G1≧G2≧ . . . ≧Gp for some of the brightness values of the pixels of the input signal IS. That is, it is also possible for some of the gradation transformation curve candidates G1 to Gp to intersect one another.

For example, in cases where the value of the input signal IS is large but the mean brightness value of the wide area image region Em is small, such as small bright spots within a dark nighttime scene (such as neon spots in an evening scene), the value of the image signal after gradation processing has little impact on the picture quality. In such a case, it is not necessary for the gradation transformation curve candidates G1 to Gp of the two-dimensional LUT to satisfy the relationship G1≧G2≧ . . . ≧Gp with respect to some of the brightness values of the pixels of the input signal IS. That is, any value stored in the two-dimensional LUT can be adopted for portions where the value after gradation processing has little impact on the picture quality.

It should be noted that even in a case where any value can be stored in the two-dimensional LUT, it is preferable to maintain the relationship of the values that are stored with respect to a same input signal IS and a selection signal Sm monotonically decreasing or monotonically increasing with respect to the values of the input signal IS and the selection signal Sm.

Further, in the foregoing embodiment it was explained that the gradation transformation curve candidates G1 to Gp of the two-dimensional LUT are "power functions." Here, it is not absolutely necessary for the gradation transformation curve candidates G1 to Gp to be formulated as "power functions." For example, they can also be functions that have an S-shape or an inverted S-shape.

(9)

It is also possible for the visual processing device 111 to be further provided with a profile data creation portion for creating profile data, which are the values stored in the two-dimensional LUT. More specifically, the profile data creation portion comprises the image partitioning portion 102 and the gradation transformation curve derivation portion 110 of the visual processing device 101 (see FIG. 44), and stores a collection of a plurality of gradation transformation curves that have been created in the two-dimensional LUT as profile data.

It also does not matter if each of the gradation transformation curves stored in the two-dimensional LUT is correlated to the spatially processed input signal IS. In this case, in the visual processing device 111 it is possible to replace the image partitioning portion 112 and the selection signal derivation portion 113 with a spatial processing portion that spatially processes the input signal IS.

(10)

In the foregoing embodiment, it is not necessary for the brightness value of the pixel of the input signal IS to be a value in the range of [0.0 to 1.0]. If an input signal IS is input as a value in another range, then the values of that range can be normalized to [0.0 to 1.0]. It is also possible to not perform normalization and instead suitably change the values that are handled in the above processing.

(11)

It is also possible for each of the gradation transformation curve candidates G1 to Gp to be gradation transformation curves for gradation processing an input signal IS having a dynamic range that is wider than a normal dynamic range and outputting a gradation processed signal CS that has an ordinary dynamic range.

Recently, there has been progress in the development of devices capable of handling dynamic ranges that are one to three orders of magnitude wider than an ordinary dynamic range through the use of a method such as narrowing the light amount and using a CCD with a good S/N ratio, opening an electron shutter long and short twice, or using a sensor that has low-sensitivity or high-sensitivity pixels.

In conjunction with this, it is necessary to appropriately perform gradation processing when the input signal IS has a dynamic range that is wider than the ordinary dynamic range (for example, a signal having a value range of [0.0 to 1.0]).

Figure 55:
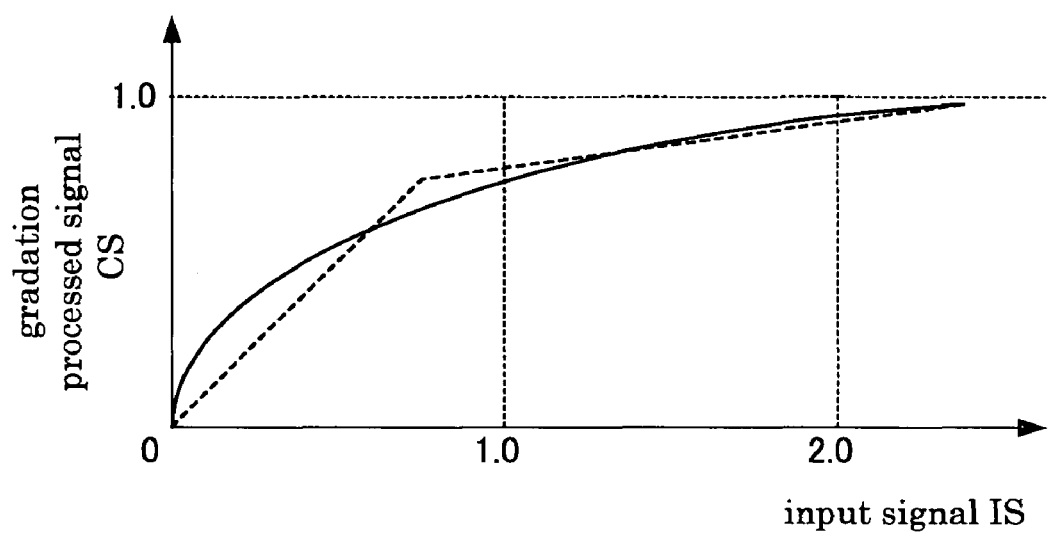
FIG. 55 is an explanatory diagram describing the gradation processing according to a modified example (fifth embodiment).

Here, as shown in FIG. 55, the gradation transformation curve that is used leads to the output of a gradation processed signal CS having a value in the range of [0.0 to 1.0] even for an input signal IS having a range that exceeds [0.0 to 1.0].

Due to this, it becomes possible to appropriately gradation process even an input signal IS that has a wide dynamic range and then output a gradation processed signal CS that has a normal dynamic range.

Also, in the foregoing embodiment, it was mentioned that "the pixel value of the gradation processed signals CS is a value in the range of [0.0 to 1.0] if the gradation transformation curve candidates G1 to Gp are 'power functions." Here, the pixel value of the gradation processed signals CS is not limited to this range. For example, it is also possible for the gradation transformation curve candidates G1 to Gp to perform dynamic range compression with respect to an input signal IS having a value of [0.0 to 1.0].

(12)

In the foregoing embodiment, it was explained that "the gradation processing execution portion 114 includes a plurality of gradation transformation curve candidates G1 to Gp as a two-dimensional LUT." Here, it is also possible for the gradation processing execution portion 114 to have a one-dimensional LUT that stores the relationship between a curve parameter for specifying a gradation transformation curve candidate G1 to Gp and the selection signal Sm.

<<Configuration>>

Figure 56:
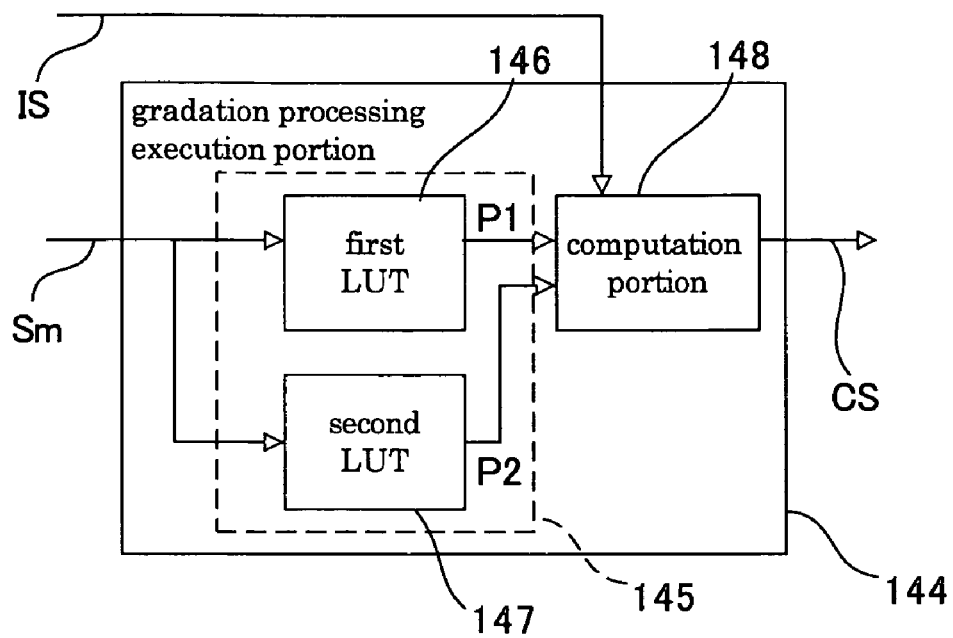
FIG. 56 is a block diagram describing the structure of the gradation processing execution portion 144 (fifth embodiment).

FIG. 56 shows a block diagram for describing the structure of a gradation processing execution portion 144, which serves as a modified example of the gradation processing execution portion 114. The gradation processing execution portion 144 receives an input signal IS and a selection signal Sm as input, and outputs a gradation processed signal CS, which is obtained by processing the input signal IS. The gradation processing execution portion 144 is provided with a curve parameter output portion 145 and a computation portion 148.

The curve parameter output portion 145 comprises a first LUT 146 and a second LUT 147. The first LUT 146 and the second LUT 147 receive the selection signal Sm as input and output a curve parameter P1 and P2, respectively, of the gradation transformation curve candidate Gm specified by the selection signal Sm.

The computation portion 148 receives the curve parameters P1 and P2 and the input signal IS as input, and outputs a gradation processed signal CS.

<<Regarding the One-Dimensional LUT>>

The first LUT 146 and the second LUT 147 are one-dimensional LUTs storing the values of the curve parameters P1 and P2, respectively, with respect to the selection signal Sm. Before describing the first LUT 146 and the second LUT 147 in detail, the content of the curve parameters P1 and P2 shall be described.

Figure 57:
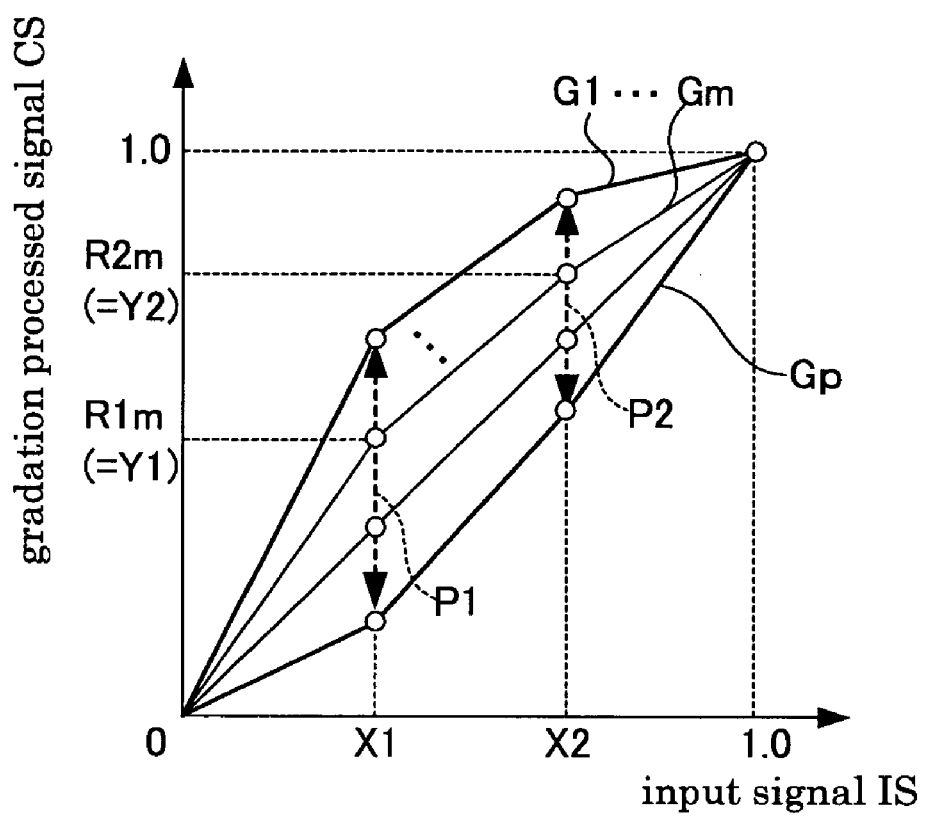
FIG. 57 is an explanatory diagram describing the relationship between the curve parameters P1 and P2, and the gradation transformation curve candidates G1 to Gp (fifth embodiment).

The relationship between the curve parameters P1 and P2 and the gradation transformation curve candidates G1 to Gp is described using FIG. 57. FIG. 57 shows the gradation transformation curve candidates G1 to Gp. Here, the gradation transformation curve candidates G1 to Gp decrease monotonically in correspondence with their subscript, and satisfy the relationship G1≧G2≧ . . . ≧Gp with regard to the brightness values of the pixels of all the input signals IS. It should be noted that it is possible also for the above relationship of the gradation transformation curve candidates G1 to Gp to not hold for gradation transformation curve candidates whose subscript is large if the input signal IS is small, or for gradation transformation curve candidates whose subscript is small if the input signal IS is large.

The curve parameters P1 and P2 each are output as a value of the gradation processed signal CS with respect to a predetermined value of the input signal IS. That is, if the gradation transformation curve candidate Gm is specified by the selection signal Sm, then the value of the curve parameter P1 is output as the value [R1m] of the gradation transformation curve candidate Gm with respect to a predetermined value [X1] of the input signal IS, and the value of the curve parameter P2 is output as the value [R2m] of the gradation transformation curve candidate Gm with respect to a predetermined value [X2] of the input signal IS. Here, the value [X2] is larger than the value [X1].

The first LUT 146 and the second LUT 147 are described next.

The first LUT 146 and the second LUT 147 respectively store the values of the curve parameters P1 and P2 with respect to each of the selection signals Sm. More specifically, the values of the curve parameters P1 and P2 each are given in six bits with respect to selection signals Sm, each of which is given as a six bit signal. Here, the bit number that is secured for the selection signals Sm and the curve parameters P1 and P2 is not limited to this.

Figure 58:
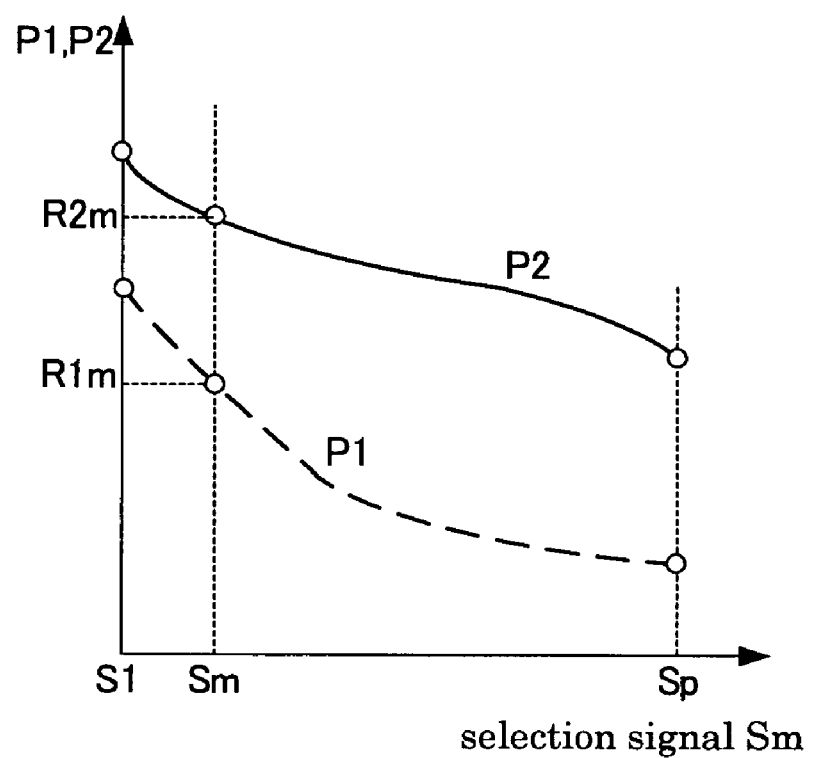
FIG. 58 is an explanatory diagram describing the relationship between the curve parameters P1 and P2, and the selection signal Sm (fifth embodiment).

The relationship between the curve parameters P1 and P2 and the selection signal Sm is described using FIG. 58. FIG. 58 shows the change in the values of the curve parameters P1 and P2 with respect to the selection signal Sm. The first LUT 146 and the second LUT 147 store the values of the curve parameters P1 and P2 with respect to each selection signal Sm. For example, the value [R1m] is stored as the value of the curve parameter P1, and the value [R2m] is stored as the value of the curve parameter P2, for the selection signal Sm.

With the above first LUT 146 and second LUT 147, curve parameters P1 and P2 are output with respect to the selection signal Sm that has been received as input.

<<Regarding the Computation Portion 148>>

The computation portion 148 derives a gradation processed signal CS for the input signal IS based on the curve parameters P1 and P2 (value [R1m] and value [R2m]) that are obtained. This procedure is described in greater detail below. Here, the value of the input signal IS is given in the value range of [0.0 to 1.0]. Also, the gradation transformation curve candidates G1 to Gp are for transforming the input signal IS that has been given in value range of [0.0 to 1.0] to a gradation in a value range of [0.0 to 1.0]. It should be noted that the gradation transformation curve candidates G1 to Gp also can be adopted in a case where the input signal IS is not limited to this range.

First, the computation portion 148 performs a comparison of the value of the input signal IS and the predetermined values [X1] and [X2].

If the value of the input signal IS (the value [X]) is at least [0.0] but less than [X1], then the value (this shall be the value [Y]) of the gradation processed signal CS with respect to the value [X] on the line segment joining the origin and the coordinate ([X1], [R1m]) in FIG. 57 is found. More specifically, the value [Y] is found by the equation [Y]=([X]/[X1])*[R1m].

If the value of the input signal IS is equal to or greater than [X1] but less than [X2], then the value [Y] corresponding to the value [X] on the line segment joining the coordinate ([X1], [R1m]) and the coordinate ([X2], [R2m]) in FIG. 57 is found. More specifically, the value [Y] is found by the equation [Y]=[R1m]+{([R2m]−[R1m])/([X2]−[X1])}* ([X]−[X1]).

If the value of the input signal IS is at least [X2] but not more than [1.0], then the value [Y] corresponding to the value [X] on the line segment joining the coordinate ([X2], [R2m]) and the coordinate ([1.0], [0.1]) in FIG. 57 is found. More specifically, the value [Y] is found by the equation [Y]=[R2m]+{([1.0]−[R2m])/([1.0]−[X2])}*([X]−[X2]).

The computation portion 148 drives the gradation processed signal CS for the input signal IS through the above computations.

<<Gradation Processing Method and Program>>

The above-described processing can also be accomplished as a gradation processing program by a computer. The gradation processing program is a program for causing a computer to execute the gradation processing method discussed below.

The gradation processing method is a method of obtaining the input signal IS and the selection signal Sm and outputting a gradation processed signal CS, and is characterized in that the gradation of the input signal IS is processed using one-dimensional LUTs.

First, when the selection signal Sm is obtained, the curve parameters P1 and P2 are output from the first LUT 146 and the second LUT 147. Detailed description of the first LUT 146, the second LUT 147, and the curve parameters P1 and P2 is omitted here.

Then, the gradation of the input signal IS is transformed based on the curve parameters P1 and P2. The details of this gradation processing are discussed in the description relating to the computation portion 148, and thus will not be described here.

A gradation processed signal CS that corresponds to the input signal IS is derived through the above gradation processing method.

<Effects>

In the gradation processing execution portion 144 serving as a modified example of the gradation processing execution portion 114, two one-dimensional LUTs are provided instead of a two-dimensional LUT. Thus, the memory amount for storing the lookup tables can be reduced.

<<Modified Examples>>

(1)

In the above modified example, it was explained that "the curve parameters P1 and P2 are the values of the gradation transformation curve candidate Gm with respect to predetermined values of the input signal IS." Here, it is also possible for the curve parameters P1 and P2 to be other curve parameters of the gradation transformation curve candidate Gm. This is described in more specific terms below.

(1-1)

The curve parameters can also be the slope of the gradation transformation curve candidate Gm. This will be described more specifically using FIG. 57. If the gradation transformation curve candidate Gm has been specified by the selection signal Sm, then the value of the curve parameter P1 is the value [K1$m$] of the slope of the gradation transformation curve candidate Gm in the predetermined range [0.0 to X1] of the input signal IS, and the value of the curve parameter P2 is the value [K2$m$] of the slope of the gradation transformation curve candidate Gm in the predetermined range [X1 to X2] of the input signal IS.

Figure 59:
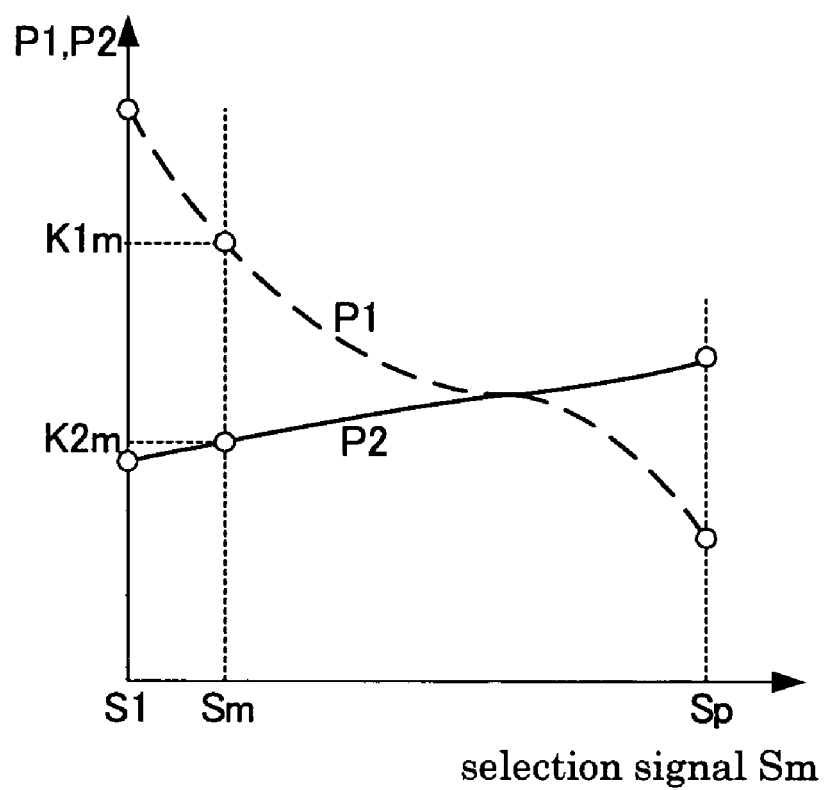
FIG. 59 is an explanatory diagram describing the relationship between the curve parameters P1 and P2, and the selection signal Sm (fifth embodiment).
Figure 60:
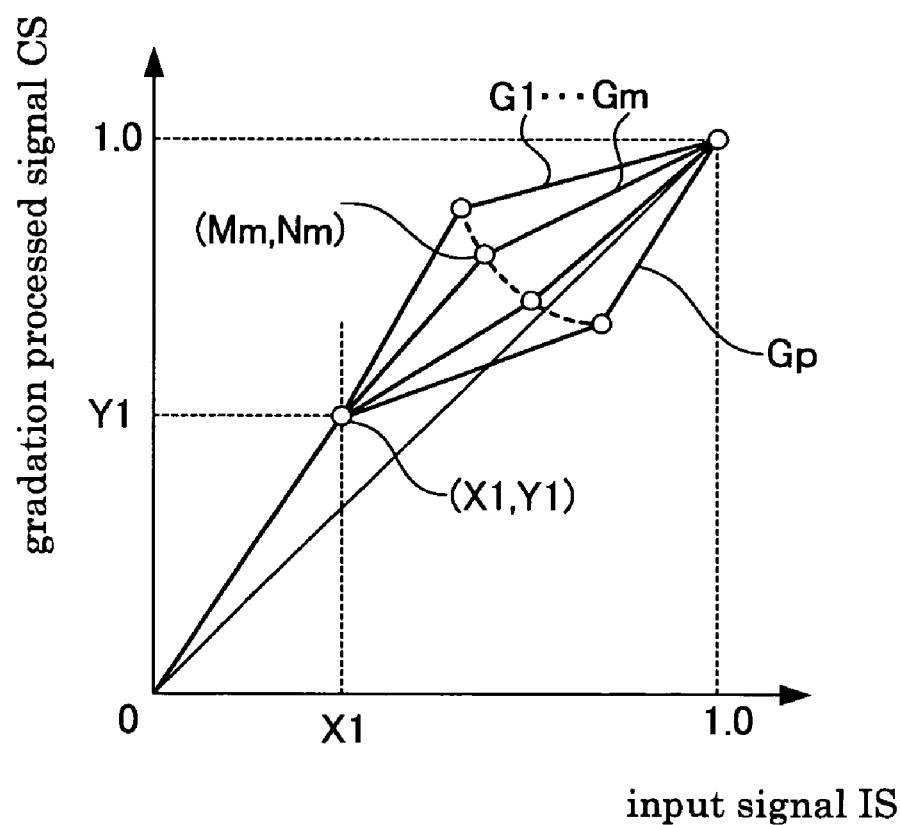
FIG. 60 is an explanatory diagram describing the relationship between the curve parameters P1 and P2, and the gradation transformation curve candidates G1 to Gp (fifth embodiment).

The relationship between the curve parameters P1 and P2 and the selection signal Sm is described using FIG. 59. FIG. 59 shows the change in the values of the curve parameters P1 and P2 with respect to the selection signal Sm. The values of the curve parameters P1 and P2 with respect to each selection signal Sm are stored on the first LUT 146 and the second LUT 147. For example, the value [K1$m$] is stored as the value of the curve parameter P1, and the value [K2$m$] is stored as the value of the curve parameter P2, for the selection signal Sm.

Due to the above first LUT 146 and second LUT 147, curve parameters P1 and P2 are output with respect to the selection signal Sm that has been input.

The computation portion 148 derives a gradation processed signal CS for the input signal IS based on the curve parameters P1 and P2 that have been obtained. This procedure is described in greater detail below.

First, the computation portion 148 performs a comparison of the input signal IS and the predetermined values [X1] and [X2].

If the value of the input signal IS (the value [X]) is at least [0.0] but less than [X1], then the value of the gradation processed signal CS (this shall be the value [Y]) with respect to the value [X] on the line segment joining the origin and the coordinate ([X1], [K1$m$]*[X1] (hereinafter, written as [Y1])) in FIG. 57 is found. More specifically, the value [Y] is found by the equation [Y]=[K1$m$]*[X].

If the value of the input signal IS is equal to or greater than [X1] but less than [X2], then the value [Y] corresponding to the value [X] on the line segment joining the coordinate ([X1], [Y1]) and the coordinate ([X2], [K1$m$]*[X1]+[K2$m$]*([X2]−[X1]) (hereinafter, written as [Y2])) in FIG. 57 is found. More specifically, the value [Y] is found by the equation [Y]=[Y1]+[K2$m$]*([X]−[X1]).

If the value of the input signal IS is at least [X2] but not more than [1.0], then the value [Y] corresponding to the value [X] on the line segment joining the coordinate ([X2], [Y2]) and the coordinate (1.0, 1.0) in FIG. 57 is found. More specifically, the value [Y] is found by the equation [Y]=[Y2]+{([1.0]−[Y2])/([1.0]−[X2])}*([X]−[X2]).

Through the above computations, the computation portion 148 derives the gradation processed signal CS for the input signal IS.

(1-2)

It is also possible for the curve parameters to be coordinates on the gradation transformation curve candidate Gm. This is described in greater detail using FIG. 60. When the gradation transformation curve candidate Gm has been selected by the selection signal Sm, the value of the curve parameter P1 is the value [Mm] of one of the components of a coordinate on the gradation transformation curve candidate Gm, and the value of the curve parameter P2 is the value [Nm] of the other component of a coordinate on the gradation transformation curve candidate Gm. All gradation transformation curve candidates G1 to Gp are curves that pass through the coordinate (X1, Y1).

Figure 61:
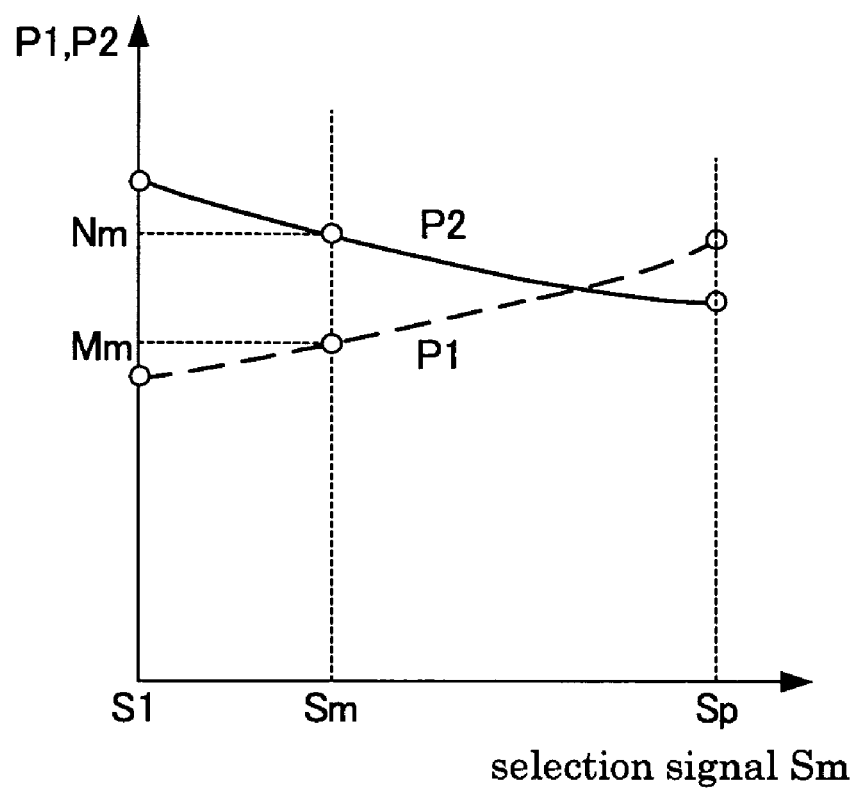
FIG. 61 is an explanatory diagram describing the relationship between the curve parameters P1 and P2, and the selection signal Sm (fifth embodiment).

The relationship between the curve parameters P1 and P2 and the selection signal Sm is described using FIG. 61. FIG. 61 shows the change in the values of the curve parameters P1 and P2 with respect to the selection signal Sm. The first LUT 146 and the second LUT 147 store the values of the curve parameters P1 and P2 with respect to each selection signal Sm. For example, with respect to the selection signal Sm, the value [Mm] is stored as the value of the curve parameter P1, and the value [Nm] is stored as the value of the curve parameter P2.

Due to the above first LUT 146 and second LUT 147, curve parameters P1 and P2 are output for the selection signal Sm that has been input.

With the computation portion 148, a gradation processed signal CS is derived from the input signal IS through the same procedure as that of the modified example described using FIG. 57. Detailed description of this procedure is thus omitted here.

(1-3)

The above modified example is only one example, and it is also possible for the curve parameters P1 and P2 to be yet other parameters of the gradation transformation curve candidate Gm.

Further, there is no limitation to the above as regards the number of the curve parameters. That number can be smaller or greater than that described above.

In the description of the computation portion 148, the computations described were for a case in which the gradation transformation curve candidates G1 to Gp are curves having straight line segments. Here, if the coordinates of the gradation transformation curve candidates G1 to Gp are given as curve parameters, then it is also possible to create a smooth curve that passes through the given coordinates (curve fitting), and to perform gradation transformation using this curve that is created.

(2)

In the above modified example, it was explained that "the curve parameter output portion 145 comprises a first LUT 146 and a second LUT 147." Here, it is also possible for the curve parameter output portion 145 to not be provided with LUTs for storing the values of the curve parameters P1 and P2 for the values of the selection signals Sm.

In this case, the curve parameter output portion 145 calculates the values of the curve parameters P1 and P2. More specifically, the curve parameter output portion 145 stores parameters representing graphs of the curve parameters P1 and P2 as shown in FIG. 58, FIG. 59, and FIG. 61, for example. The curve parameter output portion 145 specifies the graphs of the curve parameters P1 and P2 from the stored parameters. Further, using the graphs of the curve parameters P1 and P2, it outputs the values of the curve parameters P1 and P2 with respect to the selection signal Sm.

Here, the parameters for specifying the graphs of the curve parameters P1 and P2 can be coordinates on a graph, the slope of a graph, or the curvature. For example, the curve parameter output portion 145 stores the coordinates of two points on each graph of the curve parameters P1 and P2 shown in FIG. 58, and uses a straight line that joins these two coordinates as the respective graphs of the curve parameters P1 and P2.

Here, when specifying the graphs of the curve parameters P1 and P2 from the parameters, it is possible to use not only collinear approximation but also broken-line approximation and curve approximation.

Thus, it is possible to output the curve parameters without using a memory for storing a LUT. That is, the capacity of the memory provided in the device can be reduced even further.

Sixth Embodiment

Characteristics of a Visual Processing Device 121 serving as a Sixth Embodiment

Figure 62:
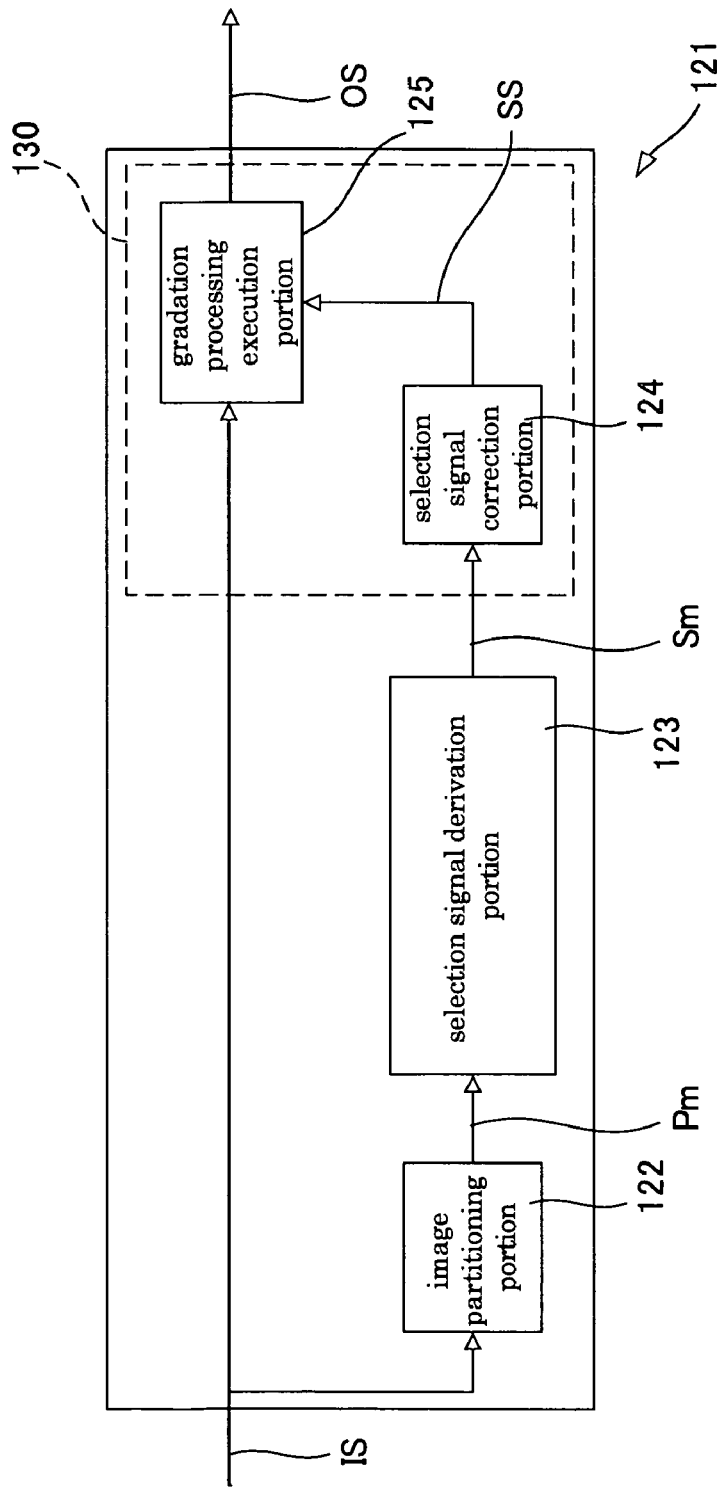
FIG. 62 is a block diagram describing the structure of the visual processing device 121 (sixth embodiment).
Figure 63:
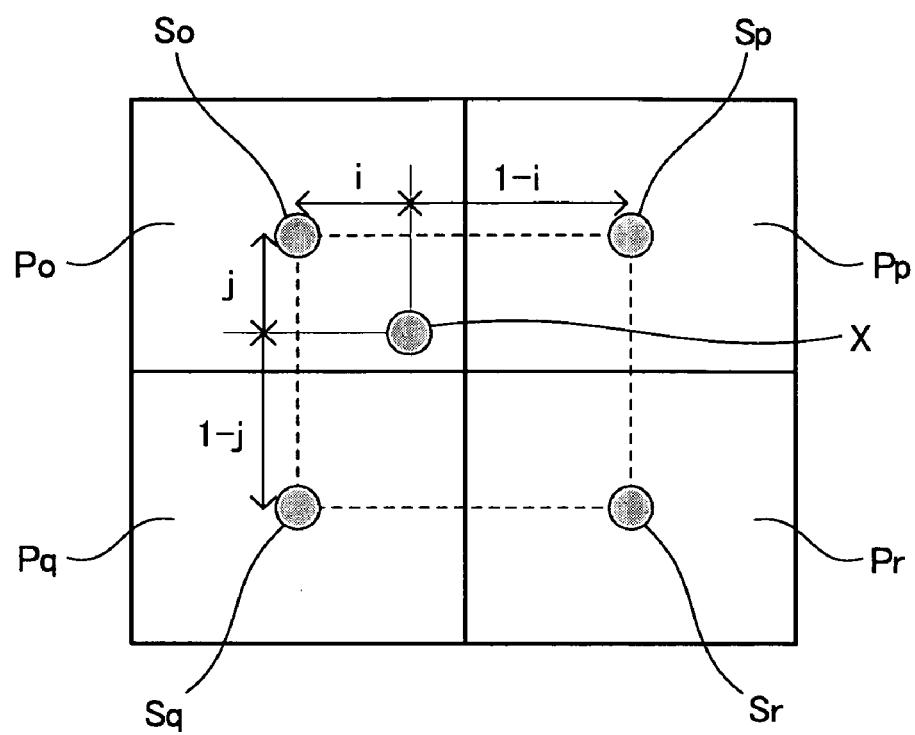
FIG. 63 is an explanatory diagram describing the operation of the selection signal correction portion 124 (sixth embodiment).
Figure 64:
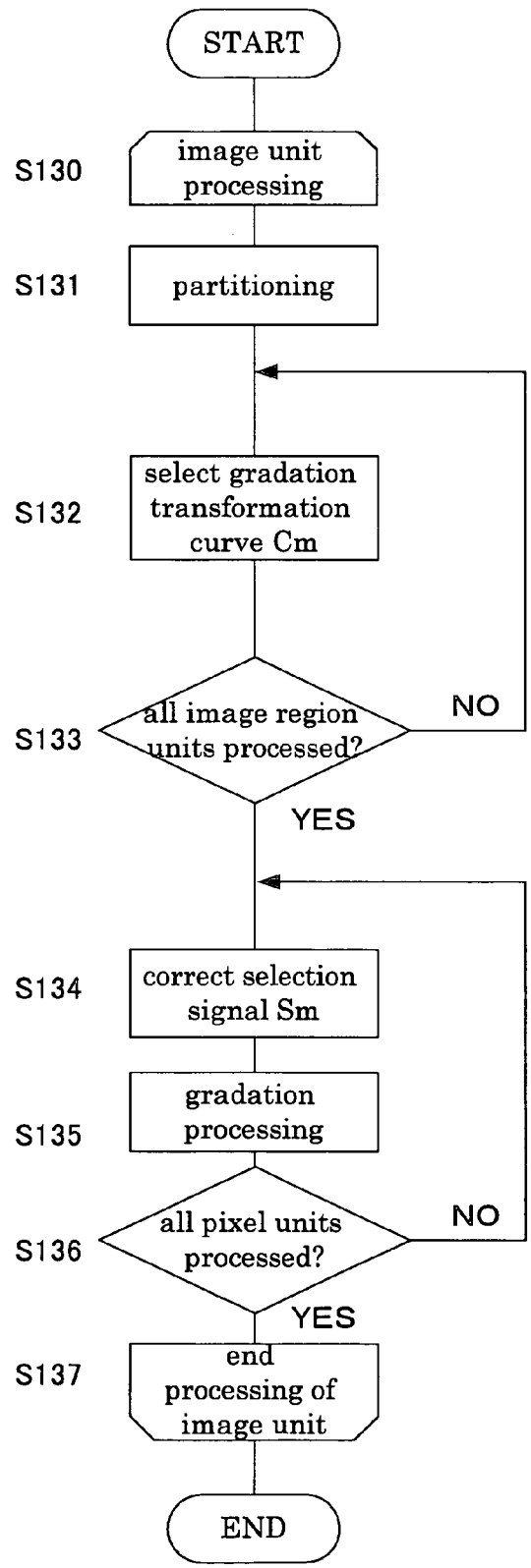
FIG. 64 is a flowchart describing the visual processing method (sixth embodiment).

A visual processing device 121 serving as a sixth embodiment of the present invention is described using FIGS. 62 to 64. The visual processing device 121 is a device that performs gradation processing of an image, and is provided in or connected to a device that handles images, such as a computer, a television, a digital camera, a portable telephone, or a PDA. The visual processing device 121 is characterized in that it switches between a plurality of gradation transformation curves stored in advance as a LUT, for each pixel to be subjected to gradation processing.

<Configuration>

FIG. 62 shows a block diagram that describes the structure of the visual processing device 121. The visual processing device 121 is provided with an image partitioning portion 122, a selection signal derivation portion 123, and a gradation processing portion 130. The image partitioning portion 122 receives an input signal IS as input and partitions the original image that is input as the input signal IS into a plurality of image regions Pm ($1 \leq m \leq n$; where n is the number of partitions of the original image), and outputs these. The selection signal derivation portion 123 outputs a selection signal Sm for selecting a gradation transformation curve Cm for each image region Pm. The gradation processing portion 130 is provided with a selection signal correction portion 124 and a gradation processing execution portion 125. The selection signal correction portion 124 receives the selection signal Sm as input and for each pixel outputs a selection signal SS, which is a signal that is obtained by correcting the selection signal Sm for each of the respective image regions Pm. The gradation processing execution portion 125 is provided with a plurality of gradation transformation curve candidates G1 to Gp (where p is the candidate number) as a two-dimensional LUT, and receives the input signal IS and the selection signal SS for each pixel as input and for each pixel outputs an output signal OS that has been subjected to gradation processing.

<Regarding the Gradation Transformation Curve Candidates>

The gradation transformation curve candidates G1 to Gp are substantially the same as those described using FIG. 50 in [Fifth Embodiment], and thus are not described here. However, in this embodiment, the gradation transformation curve candidates G1 to Gp are curves that give the relationship between the brightness value of the pixels of the input signal IS and the brightness value of the pixels of the output signal OS.

The gradation processing execution portion 125 is provided with the gradation transformation curve candidates G1 to Gp as a two-dimensional LUT. That is, the two-dimensional LUT is a lookup table (LUT) that gives the brightness value of the pixels of the output signal OS with respect to the brightness value of the pixels of the input signal IS and the selection signal SS for selecting a gradation transformation curve candidate G1 to Gp. The specific examples of this portion are substantially the same as those described in [Fifth Embodiment] using FIG. 51, and thus will not be described here. However, in the present embodiment, the pixel values of the output signal OS corresponding to the values of the upper six bits of the pixel value of the input signal IS, which for example is expressed with 10 bits, are arranged in the column direction of the matrix.

<Action>

The operations of the various portions is described here. The image partitioning portion 122 has substantially the same operation a s the image partitioning portion 102 of FIG. 44, and partitions an original image that has been received as an input signal IS into a plurality (n) of image regions Pm (see FIG. 45). Here, the number of partitions of the original image is greater than the number of partitions (e.g. 4 to 16 partitions) of the conventional visual processing device 300 shown in FIG. 104, and for example is 4800 partitions of 80 partitions in the horizontal direction by 60 partitions in the vertical direction.

The selection signal derivation portion 123 selects a gradation transformation curve Cm for each image region Pm from among the gradation transformation curve candidates G1 to Gp. More specifically, the selection signal derivation portion 123 calculates the mean brightness value of the wide area image region Em that includes the image region Pm and selects one of the gradation transformation curve candidates G1 to Gp in accordance with that mean brightness value that has been calculated. That is, each gradation transformation curve candidate G1 to Gp corresponds to a mean brightness value of the wide area image region Em, and the larger the mean brightness value, the larger the subscript of the gradation transformation curve candidate G1 to Gp that is selected.

Here, the wide area image region Em is the same as that described in [Fourth Embodiment] using FIG. 45. That is, the wide area image region Em is a collection of a plurality of image regions including the respective image region Pm, and for example is a collection of 25 image regions of five blocks in the vertical direction by five blocks in the horizontal direction about the image region Pm. It should be noted that depending on the position of the image region Pm, it may not be possible to acquire a wide area image region Em having five blocks in the vertical direction by five blocks in the horizontal direction around the image region Pm. For example, in the case of the image region P1, which is positioned near the original image, it is not possible to obtain a wide area image region El that has five blocks in the vertical direction by five blocks in the horizontal direction around the image region Pl. In this case, a region in which five blocks in the vertical direction by five blocks in the horizontal direction about the image region P1 that overlaps the original image is adopted as the wide area image region El.

The selection by the selection signal derivation portion 123 is output as the selection signal Sm, which specifies one of the gradation transformation curve candidates G1 to Gp. More specifically, the selection signal Sm is output as the value of the subscript (1 to p) of the gradation transformation curve candidate G1 to Gp.

The selection signal correction portion 124, through correction using the selection signals Sm that have been output for the respective image regions Pm, outputs a selection signal SS for each pixel for selection of a gradation transformation curve for each pixel making up the input signal IS. For example, the selection signal SS for pixels included in the image region Pm is found by correcting the values of the selection signals output for the image region Pm and the image regions surrounding the image region Pm using the internal division ratio of the pixel positions.

The operation of the selection signal correction portion 124 is described in further detail using FIG. 63. FIG. 63 shows a state in which the selection signals So, Sp, Sq, and Sr have been output in correspondence with the image regions Po, Pp, Pq, and Pr (where o, p, q, and r are positive integers less than the partition number n (see FIG. 45)).

Here, the position of a pixel x to be subjected to gradation correction shall be the position obtained by interpolating the center of the image region Po and the center of the image region Pp by [i:1−i] and interpolating the center of the image region Po and the center of the image region Pq by [j:1−j]. In this case, the value [SS] of the selection signal SS for the pixel x is found by $[SS]=\{(1-j)\cdot(1-i)[So]-(1-j)\cdot(i)\cdot[Sp]+(j)\cdot(1-i)\cdot[Sq]+(j)\cdot(i)\cdot[Sr]\}$. It should be noted that [So], [Sp], [Sq], and [Sr] are the values of the selection signals So, Sp, Sq, and Sr.

The gradation processing execution portion 125 receives the brightness value of the pixel included in the input signal IS and the selection signal SS, and using the two-dimensional LUT 141 shown in FIG. 51, for example, outputs the brightness value of the output signal OS.

It should be noted that if the value [SS] of the selection signal SS is not a value that is equal to the subscript (1 to p) of the gradation transformation curve candidates G1 to Gp of the two-dimensional LUT 141, then the gradation transformation curve candidate G1 to Gp whose subscript is the integer nearest the value [SS] is used for gradation processing of the input signal IS.

<Visual Processing Method and Visual Processing Program>

FIG. 64 shows a flowchart describing the visual processing method of the visual processing device 121. The visual processing method shown in FIG. 64 is achieved by hardware in the visual processing device 121, and is a method of performing gradation processing of an input signal IS (see FIG. 62). With the visual processing method shown in FIG. 64, the input signal IS is processed in image units (steps S130 to S137). An original image that is input as the input signal IS is partitioned into a plurality of image regions Pm ($1 \leq m \leq n$; where n is the number of partitions of the original image) (step S131), a gradation transformation curve Cm is selected for each image region Pm (steps S132 and S133), and a gradation transformation curve is selected for each pixel of the original image based on a selection signal Sm for selecting the gradation transformation curve Cm for the image region Pm and the gradation processing in image units is performed (steps S134 to S136).

A detailed description of each of these steps follows.

A gradation transformation curve Cm is chosen for each image region Pm from among the gradation transformation curve candidates G1 to Gp (step S132). More specifically, the mean brightness value of the wide area image region Em having the image region Pm is calculated and one of the gradation transformation curve candidates G1 to Gp is selected in accordance with the mean brightness value that is calculated. The gradation transformation curve candidates G1 to Gp are correlated to a mean brightness value of the wide area image region Em, and the larger the mean brightness value, the larger the subscript of the gradation transformation curve candidate G1 to Gp that is selected. Description of the wide area image region Em is omitted here (see the <Actions> section above). The result of this selection is output as a selection signal Sm that indicates one of the gradation transformation curve candidates G1 to Gp. More specifically, the selection signal Sm is output as the value of the subscript (1 to p) of the gradation transformation curve candidate G1 to Gp. Then, it is determined whether or not processing of all the image regions Pm has finished (step S133), and until it is determined that processing is finished, the processing of steps S132 to S133 are repeated, for a number of times equal to the number of partitions of the original image. With this, processing in image region units is finished.

Through correction using the selection signals Sm that have been output for the respective image regions Pm, a selection signal SS for each pixel for selecting a gradation transformation curve for each pixel making up the input signal IS is output (step S134). For example, the selection signals SS for the pixels included in the image region Pm are found by correcting the values of the selection signals output for the image region Pm and the image regions surrounding the image region Pm using the internal division ratio of the pixel positions. Description of the details of this correction are omitted here (see <Action> above; FIG. 63).

The brightness value of a pixel included in the input signal IS and the selection signal SS are received as input, and using the two-dimensional LUT 141 shown in FIG. 51, for example, a brightness value of the output signal OS is output (step S135). It is then determined whether or not processing is finished for all of the pixels (step S136), and until it is determined that processing is finished, the processes of steps S134 to S136 are repeated, the number of repeats being equal to the number of pixels. With this, processing in image units is finished.

It should be noted that each of the steps of the visual processing method shown in FIG. 64 can also be achieved by a computer, for example, as a visual processing program.

<Effects>

With the present invention, it is possible to obtain the same effects as those discussed under <Effects> in [Fourth Embodiment] and [Fifth Embodiment]. Below only the effects that are unique to the sixth embodiment are discussed.

(1)

Each gradation transformation curve Cm that is selected for a respective image region Pm is created based on the mean brightness value of the wide area image region Em. Thus, sufficient sampling of the brightness value is possible even though the size of the image region Pm is small. As a result, it is possible to select an appropriate gradation transformation curve Cm even for small image regions Pm.

(2)

The selection signal correction portion 124, through correction based on the selection signals Sm output in image region units, for each pixel outputs a selection signal SS. The pixels of the original image making up the input signal IS are gradation processed using the gradation transformation curve candidates G1 to Gp, which are specified by the selection signal SS for each pixel. Thus, it is possible to obtain an output signal OS that has been more appropriately gradation processed. For example, it becomes possible to inhibit pseudo-borders from occurring. Also, in the output signal OS it becomes possible to further prevent the junction between borders of the various image regions Pm from standing out unnaturally.

(3)

The gradation processing execution portion 125 has a two-dimensional LUT that has been created in advance. The processing burden required for gradation processing, and more specifically the processing burden required for creation of the gradation transformation curves Cm, can thus be reduced. This allows gradation processing to be carried out faster.

(4)

The gradation processing execution portion 125 executes gradation processing using a two-dimensional LUT. The content of the two-dimensional LUT is read from a memory device such as hard disk or a ROM provided in the visual processing device 121 and is used in gradation processing. By changing the content of the two-dimensional LUT that is read out, it is possible to execute various gradation processing without changing the hardware configuration. That is, it becomes possible to achieve gradation processing that is more suited to the characteristics of the original image.

<Modified Examples>

The present invention is not limited to the foregoing embodiment, and various modifications and improvements thereof are possible without departing from the gist of the invention. For example, it is possible to adopt substantially the same modifications as those of [Fifth Embodiment] <Modified Examples> in to this sixth embodiment. In particular, by regarding the selection signal Sm and the gradation processed signal CS in the [Fifth Embodiment]<Modified Examples> (10) through (12) as the selection signal SS and the output signal OS, respectively, those modifications can be similarly adopted for the sixth embodiment.

Modified examples that are unique to the sixth embodiment are discussed below.

(1)

In the foregoing embodiment, a two-dimensional LUT 141, which comprises a 64 row×64 column matrix, serves as an example of the two-dimensional LUT. The effects of the invention, however, are not limited to a two-dimensional LUT of this size. For example, it is also possible to adopt a matrix in which a greater number of gradation transformation curve candidates are arranged in the row direction. Alternatively, it is also possible for the pixel values of the output signal OS corresponding to values obtained by separating the pixel values of the input signal IS in finer stages to be arranged in the column direction of the matrix. For example, the matrix can include the pixel values of the output signal OS arranged with respect to the pixel values of an input signal IS that is expressed with 10-bits.

A large two-dimensional LUT allows more suitable gradation processing can be performed, whereas a small two-dimensional LUT allows the amount of memory for storing the two-dimensional LUT to be reduced.

(2)

In the foregoing embodiment, it was explained that if the value [SS] of the selection signal SS is not a value that is equal to the subscript (1 to p) of a gradation transformation curve candidate G1 to Gp provided in the two-dimensional LUT 141 (see FIG. 51), then the gradation transformation curve candidate G1 to Gp having as its subscript the integer that is nearest to the value [SS] is used for gradation processing of the input signal IS. Here, it is also possible to adopt a configuration in which if the value [SS] of the selection signal SS is not a value that is equal to the subscript (1 to p) of a gradation transformation curve candidate G1 to Gp provided in the two-dimensional LUT 141, then both a gradation transformation curve candidate Gk ($1 \leq k \leq p-1$) whose subscript is the maximum integer (k) that does not exceed the value [SS] of the selection signal SS and the gradation transformation curve candidate Gk+1 whose subscript is the minimum integer (k+1) that exceeds [SS] are used to take a weighted average (internal division) of the pixel values of the input signal IS that has been gradation processed using the value after the decimal point of the value [SS] of the selection signal SS, and the result is output as the output signal OS.

(3)

In the foregoing embodiment, it was explained that the pixel values of the output signal OS corresponding to the value of the top six bits of the pixel values of the input signal IS, which is expressed with 10-bits, for example, are arranged in the column direction of the matrix. Here, it is also possible for the output signal OS to be output as the matrix component obtained by linear interpolation with the value of the bottom four bits of the pixel values of the input signal IS performed by the gradation processing execution portion 125. That is, the components of the matrix corresponding to the value of the upper six bits of the pixel values of the input signal IS, which is expressed with 10-bits, for example, are arranged in the column direction of the matrix, and the components of the matrix corresponding to the value of the upper six bits of the pixel values of the input signal IS and the components of the matrix corresponding to the values obtained by adding a [1] to the upper six bits of the pixel values of the input signal IS (for example, in FIG. 51, the components of one row) are linearly interpolated using the value of the lower four bits of the pixel values of the input IS, and the result is output as the output signal OS.

By doing this, more suitable gradation processing can be performed even if the two-dimensional LUT 141 (see FIG. 51) is small in size.

(4)

In the foregoing embodiment, it was explained that a selection signal Sm for the image region Pm is output based on the mean brightness value of the wide area image region Em. Here, the method of outputting the selection signal Sm is not limited to this method. For example, it is also possible to output the selection signal Sm for the image region Pm based on the maximum brightness value or the minimum brightness value of the wide area image region Em. It should be noted that the value [Sm] of the selection signal Sm can itself be the mean brightness value, the maximum brightness value, or the minimum brightness value of the wide area image region Em.

For example, it is also possible to output the selection signal Sm for the image region Pm in the following manner. That is, the mean brightness value is found for each image region Pm and then from these mean brightness values, a provisional selection signal Sm' for each of the image regions Pm is found. Here, the value of the provisional selection signal Sm' is the number of the subscript of the gradation transformation curve candidate G1 to Gp. Then, for each of the image regions included in the wide area image region Em, the values of the provisional selection signals Sm' are averaged and the result is regarded as the selection signal Sm for the image region Pm.

(5)

In the foregoing embodiment, it was explained that the selection signal Sm for the image region Pm is output based on the mean brightness value of the wide area image region Em. Here, it is also possible for the selection signal Sm for the image region Pm to be output based on the weighted mean rather than the simple mean of the wide area image region Em. For example, as was described in [Fifth Embodiment] using FIG. 54, the mean brightness value of each of the image regions making up the wide area image region Em is found, and then the weight of the image regions Ps1, Ps2, . . . that have a mean brightness value that significantly differs from the mean brightness value of the image region Pm is reduced and the mean brightness value of the wide area image region Em is found.

By doing this, if the wide area image region Em includes regions with a peculiar brightness (for example, a case in which the wide area image region Em includes the border between two objects with different brightness values), the effect that the brightness values of those peculiar regions has on the output of the selection signal Sm is reduced, and this allows more appropriate selection signal Sm output to be performed.

(6)

It is also possible for the visual processing device 121 to be further provided with a profile data creation portion for creating profile data, which are the values stored in the two-dimensional LUT. More specifically, the profile data creation portion comprises the image partitioning portion 102 and the gradation transformation curve derivation portion 110 of the visual processing device 101 (see FIG. 44), and stores in the two-dimensional LUT a group of a plurality of gradation transformation curves that have been created as profile data.

It also does not matter if each of the gradation transformation curves stored in the two-dimensional LUT are correlated to the spatially processed input signal IS. In this case, in the visual processing device 121 it is possible to replace the image partitioning portion 122, the selection signal derivation portion 123, and the selection signal correction portion 124 with a spatial processing portion for spatially processing the input signal IS.

Seventh Embodiment

A visual processing device 161 serving as a seventh embodiment of the present invention is described using FIGS. 65 to 71.

Figure 65:
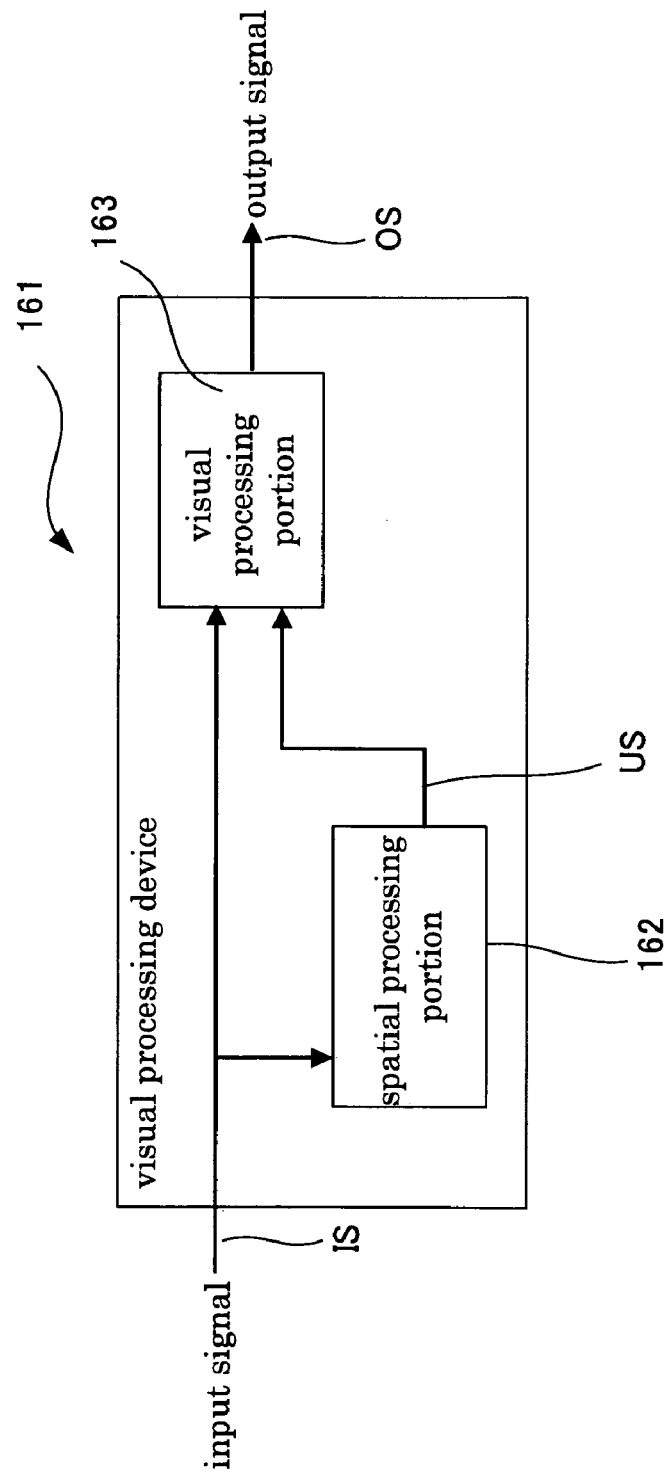
FIG. 65 is a block diagram describing the structure of the visual processing device 161 (seventh embodiment).

The visual processing device 161 shown in FIG. 65 is a device that performs visual processing such as spatial processing or gradation processing of the image signal. The visual processing device 161, together with a device that performs color processing of an image signal, constitutes an image processing device in a machine that handles images, such as a computer, a television, a digital camera, a portable telephone, a PDA, a printer, or a scanner.

The visual processing device 161 is characterized in that it is a device that performs visual processing using an image signal and a blur signal that is obtained by spatially processing (blur filtering) the image signal, and has this characteristic in spatial processing.

Conventionally, when deriving a blur signal using the pixels surrounding a pixel being processed, if the surrounding pixels include pixels that significantly differ from the pixel being processed in their darkness, then the blur signal will be affected by those pixels having a different darkness. That is, when spatially processing the pixels near an edge portion of an object in an image, pixels originally not part of the edge are affected by the darkness of the edge. Thus, this spatial processing for example causes pseudo-borders to occur.

Accordingly, there is a need to perform spatial processing that is suited to the content of the image. To meet this need, JP H10-75395A proposes creating a plurality of blur signals each with a different degree of blur, and by synthesizing or switching between those blur signals, outputting a suitable blur signal. By doing this, its aim is to change the filter size of the spatial processing and thereby inhibit the effect of pixels having different darkness.

On the other hand, with the configuration of this published patent application, a plurality of blur signals are created and these blur signals are either synthesized or switched between, and this results in a large circuit structure scale or processing burden of the device.

Accordingly, it is an object of the visual processing device 161 serving as a seventh embodiment of the present invention to output an appropriate blur signal, and to reduce the circuit structure scale or processing burden of the device.

<Visual Processing Device 161>

FIG. 65 shows the basic structure of the visual processing device 161, which performs visual processing of an image signal (input signal IS) and outputs the result as a visually processed image (output signal OS). The visual processing device 161 is provided with a spatial processing portion 162 that spatially processes the brightness value of each pixel of the original image obtained as the input signal IS and outputs the result as an unsharp signal US, and a visual processing portion 163 that uses the input signal IS and the unsharp signal US for the same pixel to perform visual processing of the original image and outputs the result as the output signal OS.

<Spatial Processing Portion 162>

Figure 66:
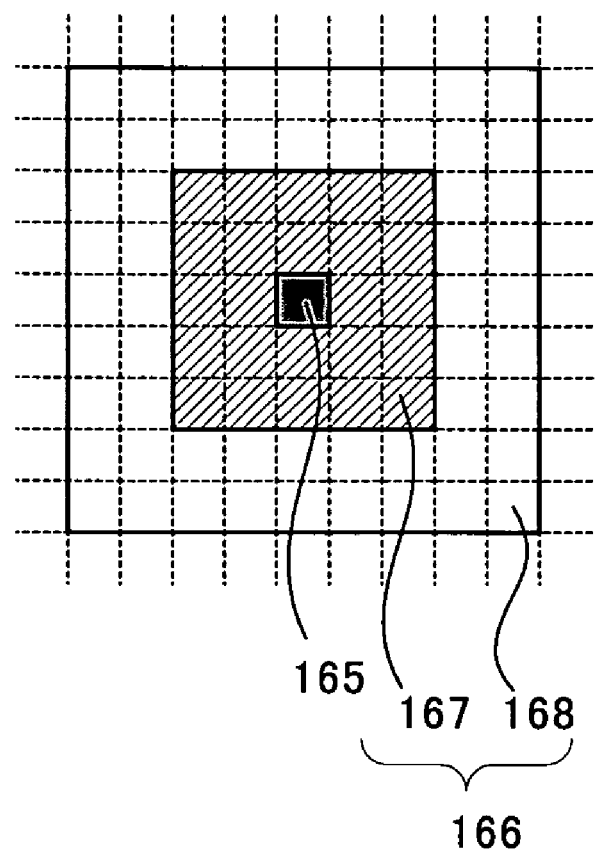
FIG. 66 is an explanatory diagram describing the spatial processing of the spatial processing portion 162 (seventh embodiment).

The spatial processing by the spatial processing portion 162 is described using FIG. 66. The spatial processing portion 162 obtains the pixel values of a target pixel 165 to be spatially processed and the pixels in the region surrounding the target pixel 165 (hereinafter, referred to as surrounding pixels 166) from the input signal IS.

The surrounding pixels 166 are pixels located in the region around the target pixel 165, and are the pixels included in a surrounding region of nine pixels vertically by nine pixels horizontally expanding out from the target pixel 165 at the center. It should be noted that the size of the surrounding region is not limited to this size, and it can be smaller or larger than this. Further, the surrounding pixels 166 can be divided into first surrounding pixels 167 and second surrounding pixels 168 based on their proximity to the target pixel 165. In FIG. 66, the pixels in the region of five vertical pixels by five horizontal pixels about the target pixel 165 are regarded as the first surrounding pixels 167. The pixels positioned around the first surrounding pixels 167 are regarded as the second surrounding pixels 168.

The spatial processing portion 162 performs a filter computation with respect to the target pixel 165. With the filter computation, a weighted mean of the pixel values of the target pixel 165 and the surrounding pixels 166 is taken using a weight based on the difference in the pixel values and distance between the target pixel 165 and the surrounding pixels 166. The weighted average is calculated based on the equation $F=(\Sigma[Wij]*[Aij])/(\Sigma[Wij])$. Here, [Wij] is the weight coefficient of the pixel that is positioned in the i-th row and j-th column in the target pixel 165 and the surrounding pixels 166, and [Aij] is the pixel value of the pixel that is positioned in the i-th row and j-th column in the target pixel 165 and the surrounding pixels 166. Also, "i" means to find the sum of the target pixel 165 and the surrounding pixels 166.

Figure 67:
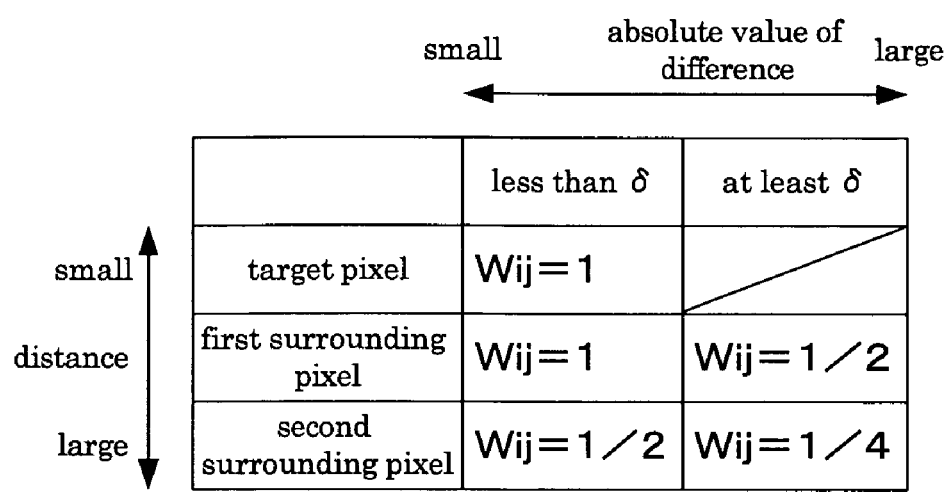
FIG. 67 is a chart describing the weight coefficient [Wij] (seventh embodiment).
Figure 68:
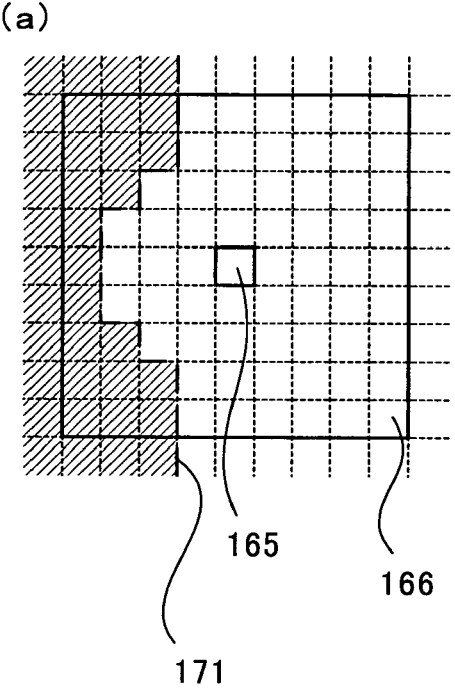
FIG. 68 is an explanatory diagram describing the effects of visual processing by the visual processing device 161 (seventh embodiment).
Figure 68:
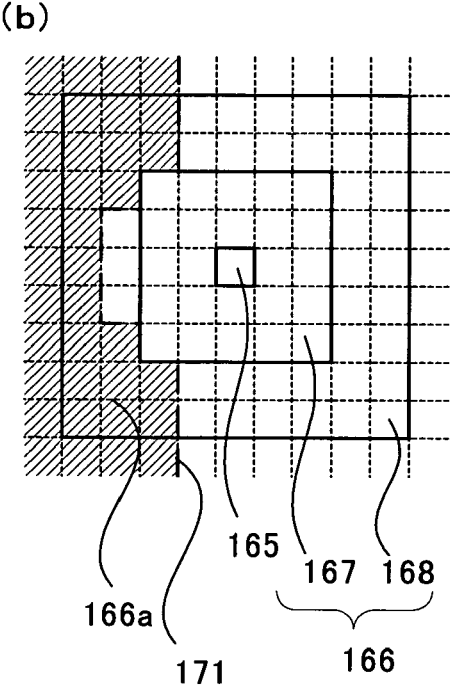

The weight coefficient [Wij] is described using FIG. 67. The weight coefficient [Wij] is a value that is determined based on the difference in the pixel values of the target pixel 165 and the surrounding pixels 166 and the distance between them. More specifically, the larger the absolute value of the difference in pixel value, the smaller the value of weight coefficient that is given. Also, the greater the distance, the smaller the weight coefficient that is given.

For example, the weight coefficient [Wij] for the target pixel 165 is the value [1].

For those pixels of the first surrounding pixels 167 that have a pixel value with which the absolute value of its difference with respect to the pixel value of the target pixel 165 is smaller than a predetermined threshold value, the weight coefficient [Wij] is the value [1]. For those pixels of the first surrounding pixels 167 that have a pixel value with which the absolute value of that difference is greater than the predetermined threshold value, the weight coefficient [Wij] is the value [1/2]. That is, the pixels of the first surrounding pixels 167 may be given different weight coefficients depending on their pixel value.

For those pixels of the second surrounding pixels 168 that have a pixel value with which the absolute value of its difference with respect to the pixel value of the target pixel 165 is smaller than a predetermined threshold value, the weight coefficient [Wij] is the value [1/2]. For those pixels of the second surrounding pixels 168 that have a pixel value with which the absolute value of that difference is greater than a predetermined threshold value, the weight coefficient [Wij] is the value [1/4]. That is, the pixels of the second surrounding pixels 168 may be given different weight coefficients depending on their pixel value. Also, the second surrounding pixels 168 are assigned smaller weight coefficients because they are farther from the target pixel 165 than the first surrounding pixels 167.

Here, the predetermined value is for example a value in the range of [20/256 to 60/256] with respect to pixel value of the target pixel 165, which takes a value in the range of [0.0 to 1.0].

The weighted mean calculated in this way is output as an unsharp signal US.

<Visual Processing Portion 163>

With the visual processing portion 163, visual processing is performed using the values of the input signal IS and the unsharp signal US for the same pixel. The visual processing that is performed here is processing such as contrast enhancement or dynamic range compression of the input signal IS. With contrast enhancement, the image is made sharper by using the difference between the input signal IS and the unsharp signal US, or using a function to enhance the ratio between the two, to obtain an enhanced signal that is then added to the input signal IS. With dynamic range compression, the unsharp signal US is subtracted from the input signal IS.

The processing in the visual processing portion 163 can also be performed using a two-dimensional LUT with which the input signal IS and the unsharp signal US are received as input and an output signal OS is output.

<Visual Processing Method and Program>

The above processing can also be can executed as a visual processing program by a computer or the like. The visual processing program is a program that causes a computer to execute the visual processing method described below.

The visual processing method includes a spatial processing step of performing spatial processing of the brightness value of the pixel of an original image that is obtained as an input signal IS and outputting the result as an unsharp signal US, and a visual processing step of using the input signal IS and the unsharp signal US for the same pixel to perform visual processing of the original image and then outputting the result as an output signal OS.

In the spatial processing step, a weighted mean is taken for each pixel of the input signal IS as discussed in the description of the spatial processing portion 162, and the result is output as an unsharp signal US. The specific details of this are described above and thus will not be discussed here.

In the visual processing step, the input signal IS and the unsharp signal US for the same pixel are used to perform the visual processing discussed in the description of the visual processing portion 163, and the result is output as an output signal OS. The specific details of this are described above and thus will not be discussed here.

<Effects>

The effects of the visual processing performed by the visual processing device 161 are described using FIGS. 68(a) and (b). FIG. 68(a) and FIG. 68(b) shows the processing performed using a conventional filter. FIG. 68(b) shows the processing performed using the filter of the present invention.

FIG. 68(a) shows a field including an object 171 in which the surrounding pixels 166 have different darkness. A smoothing filter that has a predetermined filter coefficient is used to spatially process the target pixel 165. Thus, the target pixel 165, which is not actually a part of the object 171, is affected by the darkness of the object 171.

FIG. 68(b) shows the appearance of the spatial processing of the present invention. With the spatial processing of the present invention, spatial processing is performed with respect to each of the portion 166a in which the surrounding pixels 166 include the object 171, the first surrounding pixels 167, which do not include the object 171, the second surrounding pixels 168, which do not include the object 171, and the target pixel 165, using different weight coefficients. For this reason, it is possible to keep the spatially processed target pixel 165 from being affected by pixels having a completely different darkness, making more suitable spatial processing possible.

Also, with the visual processing device 161, it is not necessary to create a plurality of blur signals as in JP H10-75395A. Thus, the circuit scale or the processing burden of the device can be reduced.

Further, with the visual processing device 161, it is possible to suitably change in a substantive manner the filter size of the space filter and the shape of the image referenced by the filter in accordance with the image content. Thus, it is possible to perform spatial processing that is suited for the image content.

<Modified Examples>

(1)

The size of the surrounding pixels 166, the first surrounding pixels 167, and the second surrounding pixels 168 discussed above is only one example, and they may also be other sizes.

The weight coefficient mentioned above is only one example, and it may be other values as well. For example, in a case where the absolute value of the difference between the pixel values exceeds a predetermined threshold, then the value [0] can be given as the weight coefficient. By doing this, it is possible to eliminate the effect that pixels with significantly different darkness have on the spatially processed target pixel 165. In an application where contrast enhancement is the goal, this has the effect that the contrast of areas originally having a relatively large contrast is not over-enhanced.

The weight coefficient can also be given as the value of a function such as that shown below.

(1-a)

It is also possible to give the value of the weight coefficient by a function whose variable is the absolute value of difference between pixel values. The function can for example be a function that monotonically decreases with respect to the absolute value of the difference between pixel values, as in the weight coefficient increasing (approaching 1) when the absolute value of the difference between pixel values is small, and the weight coefficient decreasing (approaching 0) when the absolute value of the difference between pixel values is large.

(1-b)

It is also possible to give the value of the weight coefficient with a function whose variable is the distance from the target pixel 165. The function can for example be a function that monotonically decreases with respect to the distance from the target pixel 165, as in the weight coefficient increasing (approaching 1) when the distance from the target pixel 165 is small, and the weight coefficient decreasing (approaching 0) when the distance from the target pixel 165 is large.

In (1-a) and (1-b) above, the weight coefficient is given in a more continuous manner. Thus, it is possible to give a more suitable weight coefficient than in a case where a threshold value is used, and this allows excessive contrast enhancement to be inhibited and the occurrence of pseudo-borders, for example, to be inhibited. As a result, it is possible to accomplish processing that yields a better visual effect.

(2)

The above-described processing performed with respect to each of the pixels can also be performed with respect to a unit of blocks that includes a plurality of pixels. More specifically, the mean pixel value of a target block to be subjected to spatial processing and the mean pixel values of surrounding blocks surrounding the target block are calculated, and then a weighted mean is taken of the mean pixel values using the same weight coefficients as discussed above. By doing this, the mean pixel value of the target block is subjected to further spatial processing.

In such a case, it is possible also to use the spatial processing portion 162 as either the selection signal derivation portion 113 (see FIG. 49) or the selection signal derivation portion 123 (see FIG. 62). Doing this yields the same result as that described in [Fifth Embodiment]<Modified Example> (6) or [Sixth Embodiment]<Modified Example> (5).

This will be described using FIGS. 69 to 71.

<<Configuration>>

Figure 69:
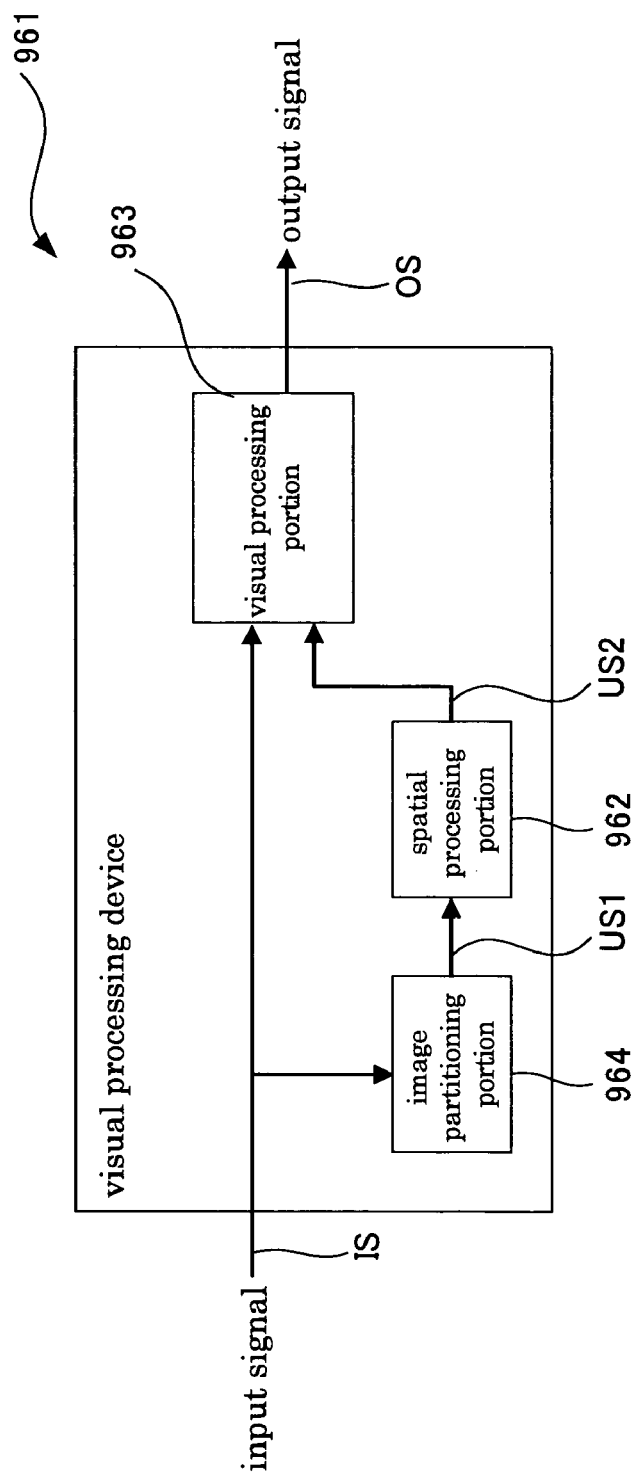
FIG. 69 is a block diagram describing the structure of the visual processing device 961 (seventh embodiment).

FIG. 69 is a block diagram showing the configuration of a visual processing device 961 that performs the processing described using FIGS. 65 to 68 in units of blocks each including a plurality of pixels.

The visual processing device 961 comprises an image partitioning portion 964 that partitions an image that has been input as an input signal IS into a plurality of image blocks, a spatial processing portion 962 that spatially processes each image block that has been obtained by partitioning, and a visual processing portion 963 that performs visual processing using the input signal IS and a spatially processed signal US2, which is the output of the spatial processing portion 962. The image partitioning portion 964 partitions an image that has been input as an input signal IS into a plurality of image blocks. Then, a processed signal US1 that includes a characteristic parameter is derived for each image block that has been obtained by partitioning. The characteristic parameter is a parameter that expresses a characteristic of the image in each image block that has been obtained by partitioning, and for example is a mean value (simple mean, weighted mean, etc.) or a representative value (maximum value, minimum value, median value, etc.).

The spatial processing portion 962 obtains a processed signal US1 that includes the characteristic parameter of each image block and performs spatial processing.

Figure 70:
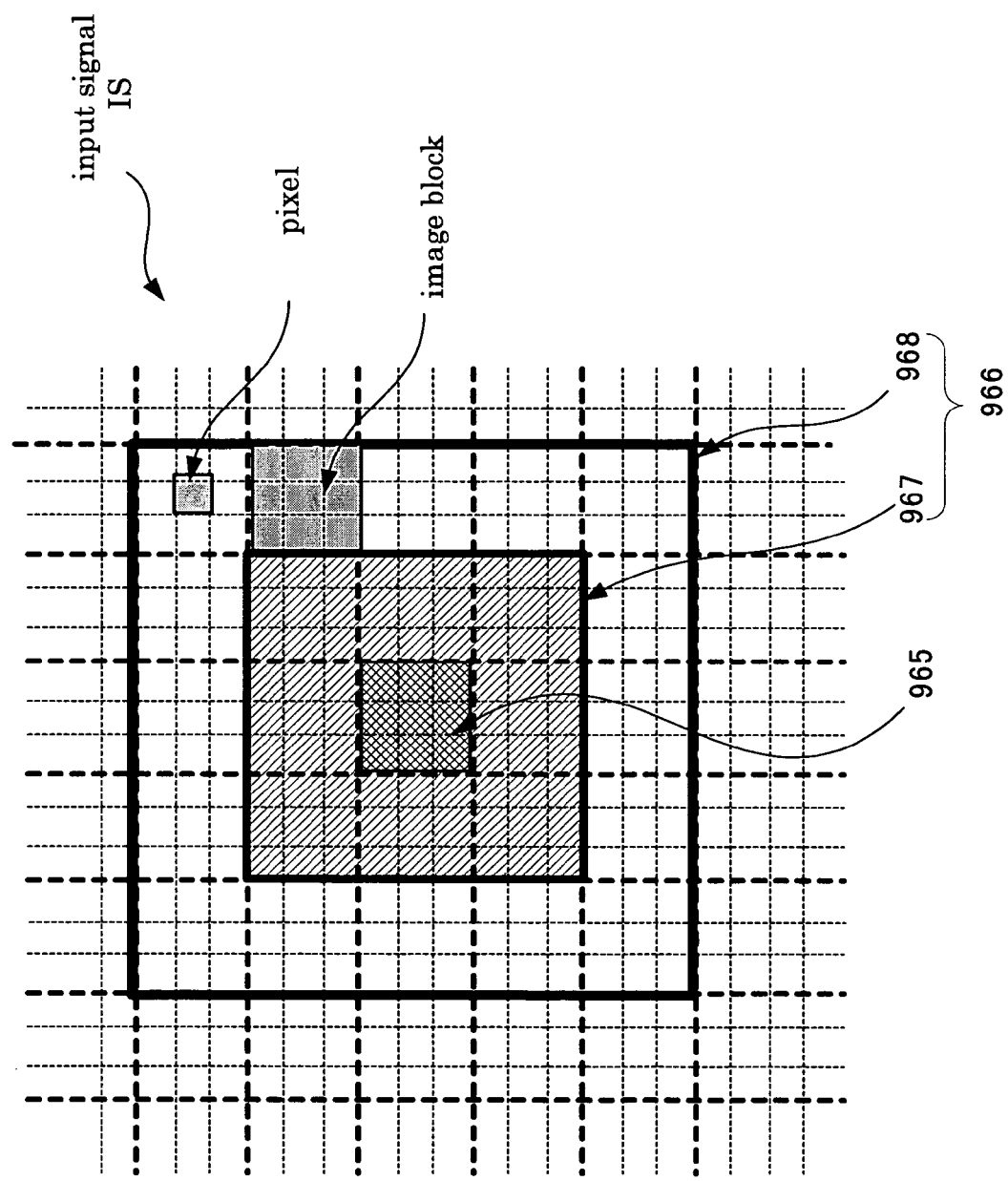
FIG. 70 is an explanatory diagram describing the spatial processing of the spatial processing portion 962 (seventh embodiment).

The spatial processing of the spatial processing portion 962 is described using FIG. 70. FIG. 70 shows an input signal IS that has been partitioned into image blocks, each of which includes a plurality of pixels. Here, each one of the image blocks has been obtained as a region that includes nine pixels, three pixels vertically by three pixels horizontally. It should be noted that this partitioning method is only one example, and there is no limitation to this partitioning method. Also, to attain a sufficient visual processing effect, it is preferable that the spatially processed signal US2 is created for a significantly wide region.

The spatial processing portion 962 obtains the characteristic parameter from the target image block 965 to be subjected to spatial processing and each surrounding image block included in the surrounding region 966, which is located around the target image block 965, from the processed signal US1.

The surrounding region 966 is a region that is located around the target image block 965 and is a region composed of five vertical blocks by five horizontal blocks spreading out from the target image block 965 at the center. It should be noted that the size of the surrounding region 966 is not limited to this, and it can be smaller or larger. The surrounding region 966 also is divided into a first surrounding region 967 and a second surrounding region 968 based on the distance from the target image block 965.

In FIG. 70, the first surrounding region 967 is defined as the three vertical block by three horizontal block region about the target image block 965. Further, the second surrounding region 968 is defined as the region located surrounding the first surrounding region 967.

The spatial processing portion 962 performs a filter computation with respect to the characteristic parameter of the target image block 965.

With the filter computation, a weighted mean is taken of the characteristic parameter of the target image block 965 and the surrounding image blocks of the surrounding region 966. Here, the weight of the weighted mean is determined based on the distance, and difference in characteristic parameter values, between the target image block 965 and the surrounding image blocks.

More specifically, the weighted mean is calculated based on the equation $F=(\Sigma[Wij]*[Aij])/(\Sigma[Wij])$.

Here, [Wij] is the weight coefficient of the image block that is positioned in the i-th row and j-th column in the target image block 965 and the surrounding region 966, and [Aij] is the value of the characteristic parameter of the image block positioned in the i-th row and j-th column in the target image block 965 and the surrounding region 966. Also, "$\Sigma$" means to take the sum of the image blocks of the target image block 965 and the surrounding region 966.

Figure 71:
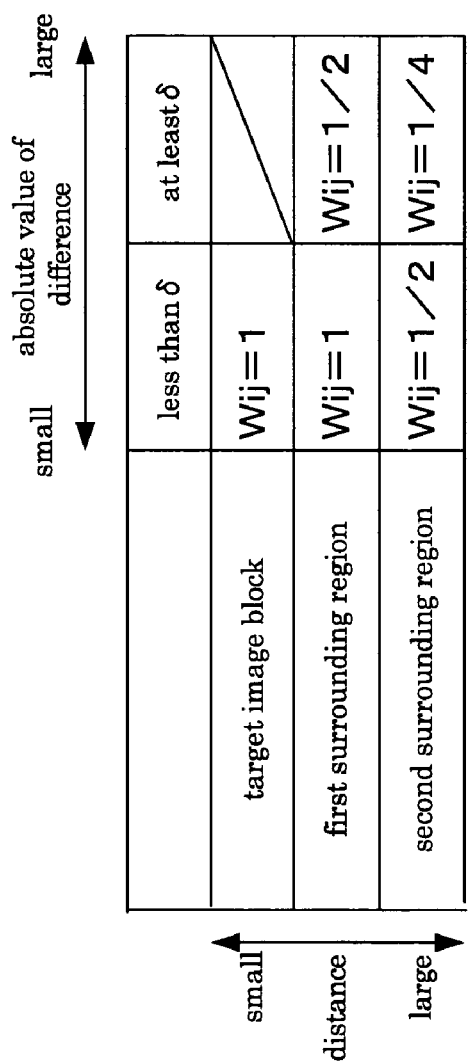
FIG. 71 is a chart describing the weight coefficient [Wij] (seventh embodiment).

The weight coefficient [Wij] is described using FIG. 71.

The weight coefficient [Wij] is a value that is determined based on the distance, and difference in characteristic parameter values, between the surrounding image blocks of the target image block 965 and the surrounding region 966. More specifically, the larger the absolute value of the difference in the value of the characteristic parameter, the smaller the value of weight coefficient that is given. Further, the greater the distance, the smaller the weight coefficient that is given.

For example, the weight coefficient [Wij] for the target image block 965 is the value [1].

For those surrounding image blocks of the first surrounding region 967 that have a characteristic parameter value with which the absolute value of its difference with respect to the value of the characteristic parameter of the target image block 965 is smaller than a predetermined threshold value, the weight coefficient [Wij] is the value [1]. For those surrounding image blocks of the first surrounding region 967 that have a characteristic parameter value with which the absolute value of that difference is greater than a predetermined threshold value, the weight coefficient [Wij] is the value [1/2]. That is, the surrounding image blocks included in the first surrounding region 967 can have different weight coefficients depending on the value of the characteristic parameter.

For those surrounding image blocks of the second surrounding region 968 that have a characteristic parameter value with which the absolute value of its difference with respect to the value of the characteristic parameter of the target image block 965 is smaller than a predetermined threshold value, the weight coefficient [Wij] is the value [1/2]. For those surrounding image blocks of the second surrounding region 968 that have a characteristic parameter value with which the absolute value of that difference is greater than a predetermined threshold value, the weight coefficient [Wij] is the value [1/4]. That is, the surrounding image blocks included in the second surrounding region 968 can have different weight coefficients depending on the value of the characteristic parameter. Also, the second surrounding region 968 is assigned smaller weight coefficients because it is farther from the target image block 965 than the first surrounding region 967.

Here, the predetermined value is for example a value in the range of [20/256 to 60/256] with respect to values of the characteristic parameter of the target image block 965 within the range of [0.0 to 1.0].

The weighted mean calculated in the above manner is output as the spatially processed signal US2.

The visual processing portion 963 performs the same visual processing as that of the visual processing portion 163 (see FIG. 65). However, it differs from the visual processing portion 163 in that instead of an unsharp signal US, it uses a spatially processed signal US2 of the target image block including the target pixel to be subjected to visual processing.

Also, the processing by the visual processing portion 963 can be performed at once for all target image block units, which include a target pixel, or alternatively, the processing can be performed in the order of the pixels that are obtained from the input signal IS, switching between the spatially processed signals US2.

The above processing is performed for all of the pixels included in the input signal IS.

<<Effects>>

With the processing of the spatial processing portion 962, processing is performed in image block units. For this reason, the processing amount of the spatial processing portion 962 can be reduced and this makes it possible to achieve faster visual processing. It also becomes possible to reduce the scale of the hardware.

<<Modified Examples>>

In the above it was explained that processing is performed in square block units. Here, the shape of the block is not limited to this.

Further, the weight coefficient and threshold values can be suitably altered.

Here, it is also possible for some weight coefficient values to be [0]. This is the same as adopting any shape as the shape of the surrounding region 966.

Further, it was explained that the spatial processing portion 962 performs spatial processing using the characteristic parameters of the target image block 965 and the surrounding region 966, but it is also possible for spatial processing to be performed using the characteristic parameters of the surrounding region 966 only. That is, the target image block 965 is set to a weight [0] as its weighted mean for the spatial processing.

(3)

The processing in the visual processing portion 163 is not limited to the above. For example, it is also possible for the visual processing portion 163 to use the value A of the input signal IS, the value B of the unsharp signal US, the dynamic range compression function F4, and the enhancement function F5 to calculate C through the equation C=F4(A)*F5(A/B), and output the resulting value as the output signal OS. Here, the dynamic range compression function F4 is a monotonically increasing function such as a concave power function. For example, it can be expressed by $F4(x)=x^\gamma$ $(0 \leq \gamma \leq 1)$. The enhancement function F5 is a power function. It is for example expressed by $F5(x)=x^\alpha$ $(0 \leq \alpha \leq 1)$.

In a case where this processing is performed in the visual processing portion 163, it is possible to compress the dynamic range of the input signal IS while enhancing local contrast by using a suitable unsharp signal US that is output by the spatial processing portion 162 of the present invention.

On the other hand, if the unsharp signal US is not suitable and there is too little blur, then the edges will be enhanced but enhancement of the contrast cannot be performed suitably. Conversely, if there is too much blur, then the contrast can be enhanced but compression of the dynamic range cannot be performed suitably.

Eighth Embodiment

Applied examples of the visual processing devices, visual processing method, and visual processing program described in the fourth to seventh embodiment, and a system using these, are described below as a eighth embodiment of the present invention.

The visual processing device is a device that performs gradation processing of an image, and is provided in or connected to a device that handles images, such as a computer, a television, a digital camera, a portable telephone, or a PDA, and is attained as an integrated circuit such as an LSI.

More specifically, each functional block of the foregoing embodiments can be independently achieved as a single chip, or can be achieved by a single chip that incorporates some or all of those functions. It should be noted that here reference is made to an LSI, but based on the degree of integration, the term IC, system LSI, super LSI, or ultra LSI may also be used.

Further, the manner in which the integrated chip is achieved is not limited to an LSI, and it is also possible to use a dedicated circuit or a general purpose processor. After LSI manufacturing, it is also possible to employ a programmable FPGA (Field Programmable Gate Array) or a reconfigurable processor in which the connections and settings of the circuit cells within the LSI can be reconfigured.

Further, if other technologies that accomplish integration that by improving upon or that are derived from semiconductor technology come to replace LSIs, then naturally it is also possible to integrate the functional blocks using that technology. Applications in biotechnology represent one such potential example.

The processing of the various blocks of the visual processing devices of FIG. 44, FIG. 49, FIG. 62, FIG. 65, and FIG. 69 is for example performed by a central processing unit (CPU) provided in the visual processing device. Also, a program for performing that processing is stored on a memory device such as a hard disk or ROM, and this program is run on the ROM, or read to and run on a RAM. Further, the two-dimensional LUT that is referenced by the gradation processing execution portion 114 and 125 of FIG. 49 and FIG. 62 is stored on a memory device such as a hard disk or ROM, and is referenced when necessary. Further, the two-dimensional LUT can also be supplied from a two-dimensional LUT supply device that is directly connected to, or is indirectly connected over a network, to the visual processing device. The same applies for the one-dimensional LUT that is referenced by the gradation processing execution portion 144 of FIG. 56.

The visual processing device can also be a device that performs gradation processing of the images of each frame (each field) that is provided in or is connected to a device that handles moving images.

The visual processing method described in the fourth through seventh embodiments is executed in each of the visual processing devices.

The visual processing program is a program for executing gradation processing of images that is stored on a memory device such as a hard disk or ROM in a device provided in or connected to a machine that handles images, such as a computer, a television, a digital camera, a portable telephone, or a PDA. The program is for example furnished through a storage medium such as a CD-ROM or over a network.

In the above embodiments, it was explained that the brightness value of each of the pixels is converted. Here, the present invention is not limited to the color space of the input signal IS. That is, the processing of the above embodiments can also be similarly applied to the luminance and brightness value of each of the color spaces in a case where the input signal IS is expressed in YCbCr color space, YUV color space, Lab color space, Luv color space, YIQ color space, XYZ color space, YPbPr color space, or RGB color space.

If the input signal IS is expressed in RGB color space, then the processing of this embodiment can be independently performed for each of the RGB components.

Ninth Embodiment

An example of the application of the visual processing devices, the visual processing methods and the visual processing programs, as well as a system using the same according to a ninth example of the present invention are described with reference to FIGS. 72 to 75.

Figure 72:
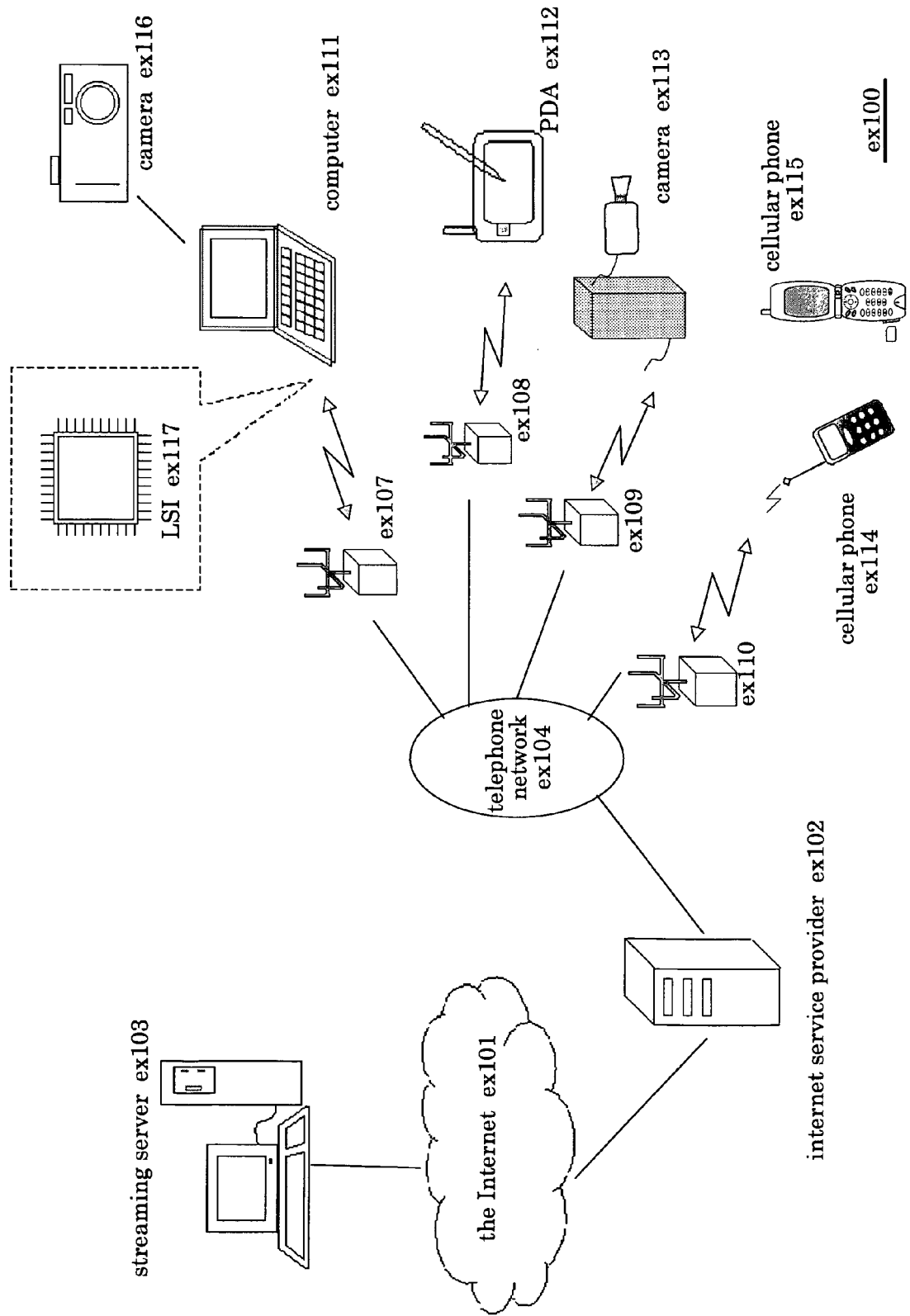
FIG. 72 is a block diagram describing the overall configuration of the content supply system (ninth embodiment).

FIG. 72 is a block diagram showing an overall structure of a content providing system ex100 that realizes a content delivering service. An area where a communication service is provided is divided into cells of a desired size, and base stations ex107-ex110 that are fixed radio stations are provided in the cells.

This content providing system ex100 includes a computer ex111, a personal digital assistant (PDA) ex112, a camera ex113, a cellular phone ex114, a cellular phone with camera ex115 and other equipment that are connected to the Internet ex101 for example via an internet service provider ex102, a telephone network ex104 and base stations ex107-ex110.

However, the content providing system ex100 can adopt any combination for connection without being limited to the combination shown in FIG. 72. In addition, each of the devices can be connected directly to the telephone network ex104 without the base stations ex107-ex110 that are fixed radio stations.

The camera ex113 is a device such as a digital video camera that can obtain a moving image. In addition, the cellular phone may be any type of PDC (Personal Digital Communications) method, CDMA (Code Division Multiple Access) method, W-CDMA (Wideband-Code Division Multiple Access) method, or GSM (Global System for Mobile Communications) method, or a cellular phone of PHS (Personal Handyphone System).

In addition, the streaming server ex103 is connected to the camera ex113 via the base station ex109 and the telephone network ex104, so that live delivery can be performed on the basis of coded data transmitted by a user of the camera ex113. The coding process of the obtained data may be performed by the camera ex113 or by a server for transmitting data. In addition, the moving image data obtained by the camera ex116 may be transmitted to the streaming server ex103 via the computer ex111. The camera ex116 is a device that can take a still image like a digital camera and a moving image. In this case, coding of the moving image data may be performed by the camera ex116 or by the computer ex111. In addition, the coding process may be performed by an LSI ex117 in the computer ex111 or the camera ex116. Note that it is possible to incorporate software for coding and decoding images into a storage medium (a CD-ROM, a flexible disk, a hard disk or the like) that is a recording medium readable by the computer ex111. Furthermore, the cellular phone with camera ex115 may transmit the moving image data. In this case, the moving image data is coded by the LSI in the cellular phone ex115.

In this content providing system ex100, content (for example, a moving image of a music concert) that the user is recording with the camera ex113 or the camera ex116 are coded as shown in the above-described embodiments and transmitted to the streaming server ex103, while the streaming server ex103 delivers a stream of the content data to a client who made a request. The client may be the computer ex111, the PDA ex112, the camera ex113, the cellular phone ex114 or the like that can decode the coded data. Thus, in the content providing system ex100, the client can receive and reproduce the coded data. The system can realize personal broadcasting when the client receives, decodes and reproduces the stream in real time.

To display the content, the visual processing devices, the visual processing methods and the visual processing programs may be used. For example, the computer ex111, the PDA ex112, the camera ex113, the cellular phone ex114 or the like may be provided with the visual processing devices and execute the visual processing methods and the visual processing programs.

The streaming server ex103 may be a device that provides the visual processing device with the profile data through the Internet ex101. Moreover, a plurality of the streaming servers ex103 may exist and each of the streaming servers ex103 may provide different profile data. Furthermore, the streaming server ex103 may produce the profile data. If the visual processing device can obtain the profile data through the Internet ex101, it is not necessary for the visual processing device to store a large number of profiles for the visual processing in advance, and this allows the storage capacity for the profiles to be reduced. Further, by obtaining the profiles from different servers, which locate on the Internet ex101, it is possible for the visual processing device to execute different image processing.

An example regarding a cellular phone will now be described.

Figure 73:
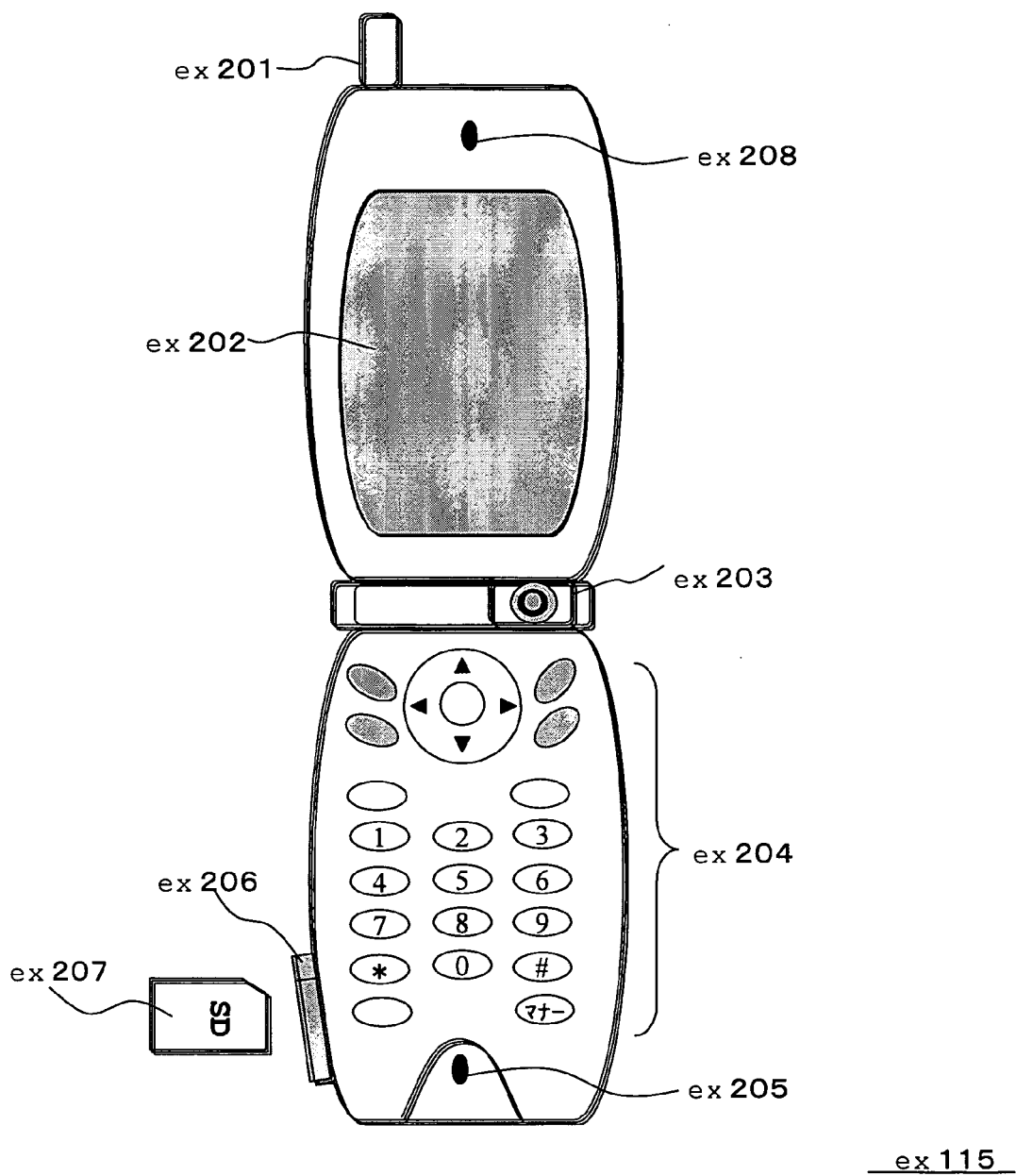
FIG. 73 is an example of a portable telephone furnished with the visual processing device of the present invention (ninth embodiment).

FIG. 73 shows the cellular phone ex115 that utilizes the visual processing devices of the present invention. The cellular phone ex115 includes an antenna ex201 for transmitting and receiving radio waves with the base station ex110, a camera portion ex203 such as a CCD camera that can take a still image, a display portion ex202 such as a liquid crystal display for displaying images obtained by the camera portion ex203 or images received by the antenna ex201 after the image data are decoded, a main body portion including a group of operating keys ex204, a sound output portion ex208 such as a speaker for producing sounds, a sound input portion ex205 such as a microphone for receiving sounds, a recording medium ex207 for storing coded data or decoded data such as data of taken moving images or still images, data of received e-mails, moving images or still images, and a slot portion ex206 that enables the recording medium ex207 to be attached to the cellular phone ex115. The recording medium ex207 such as an SD card includes a plastic case housing a flash memory element that is one type of EEPROM (Electrically Erasable and Programmable Read Only Memory) non-volatile memory that is electronically rewritable and erasable.

Furthermore, the cellular phone ex115 will be described with reference to FIG. 74. The cellular phone ex115 includes a main controller portion ex311 for controlling each portion of the main body portion having the display portion ex202 and the operating keys ex204, a power source circuit portion ex310, an operational input controller portion ex304, an image coding portion ex312, a camera interface portion ex303, an LCD (Liquid Crystal Display) controller portion ex302, an image decoding portion ex309, a multiplex separation portion ex308, a recording and reproduction portion ex307, a modem circuit portion ex306 and a sound processing portion ex305, which are connected to each other via a synchronizing bus ex313.

When the user turns on a clear and power key, the power source circuit portion ex310 supplies power from a battery pack to each portion so that the digital cellular phone with camera ex115 is activated.

The cellular phone ex115 converts a sound signal collected by the sound input portion ex205 during a sound communication mode into digital sound data by the sound processing portion ex305 under control of the main controller portion ex311 that includes a CPU, a ROM and a RAM. The digital sound data are processed by the modem circuit portion ex306 as a spectrum spreading process and are processed by the transmission and reception circuit portion ex301 as a digital to analog conversion process and a frequency conversion process. After that, the data are transmitted via the antenna ex201. In addition, the cellular phone ex115 amplifies a signal that is received by the antenna ex201 during the sound communication mode and performs the frequency conversion process and an analog to digital conversion process on the data, which is processed by the modem circuit portion ex306 as a spectrum inverse spreading process and is converted into a analog sound signal by the sound processing portion ex305. After that, the analog sound signal is delivered by the sound output portion ex208.

Furthermore, when transmitting electronic mail during a data communication mode, text data of the electronic mail are entered by using the operating keys ex204 of the main body portion and are given to the main controller portion ex311 via the operational input controller portion ex304. The main controller portion ex311 performs the spectrum spreading process on the text data by the modem circuit portion ex306 and performs the digital to analog conversion process and the frequency conversion process by the transmission and reception circuit portion ex301. After that, the data are transmitted to the base station ex110 via the antenna ex201.

When transmitting image data during the data communication mode, the image data obtained by the camera portion ex203 are supplied to the image coding portion ex312 via the camera interface portion ex303. In addition, if the image data are not transmitted, it is possible to display the image data obtained by the camera portion ex203 directly by the display portion ex202 via the camera interface portion ex303 and an LCD controller portion ex302.

The image coding portion ex312 converts the image data supplied from the camera portion ex203 into the coded image data by compressing and coding the data, and the coded image data are supplied to the multiplex separation portion ex308. In addition, the cellular phone ex115 collects sounds by the sound input portion ex205 while the camera portion ex203 is taking the image, and the digital sound data is supplied from the sound processing portion ex305 to the multiplex separation portion ex308.

The multiplex separation portion ex308 performs multiplexing of the coded image data supplied from the image coding portion ex312 and the sound data supplied from the sound processing portion ex305 by a predetermined method. Multiplexed data obtained as a result are processed by the modem circuit portion ex306 as a spectrum spreading process and are processed by the transmission and reception circuit portion ex301 as a digital to analog conversion process and a frequency conversion process. After that, the data are transmitted via the antenna ex201.

When receiving moving image file data that are linked to a web page during the data communication mode, a signal received from the base station ex110 via the antenna ex201 is processed by the modem circuit portion ex306 as a spectrum inverse spreading process. Multiplexed data obtained as a result are supplied to the multiplex separation portion ex308.

In addition, in order to decode multiplexed data received via the antenna ex201, the multiplex separation portion ex308 separates a coded bit stream of image data in the multiplexed data from a coded bit stream of sound data. Then, the multiplex separation portion ex308 supplies the coded image data to the image decoding portion ex309 via the synchronizing bus ex313 and supplies the sound data to the sound processing portion ex305.

Next, the image decoding portion ex309 generates reproduction moving image data by decoding the coded bit stream of the image data and supplies the data to the display portion ex202 via the LCD controller portion ex302. Thus, the moving image data included in a moving image file that is linked to a home page can be displayed. In this case, the sound processing portion ex305 converts the sound data into an analog sound signal, which is supplied to the sound output portion ex208. Thus, sound data included in the moving image file that is linked to a home page can be reproduced.

Note that the image decoding portion ex309 may be provided with the visual processing device shown in the above-described embodiments.

Figure 75:
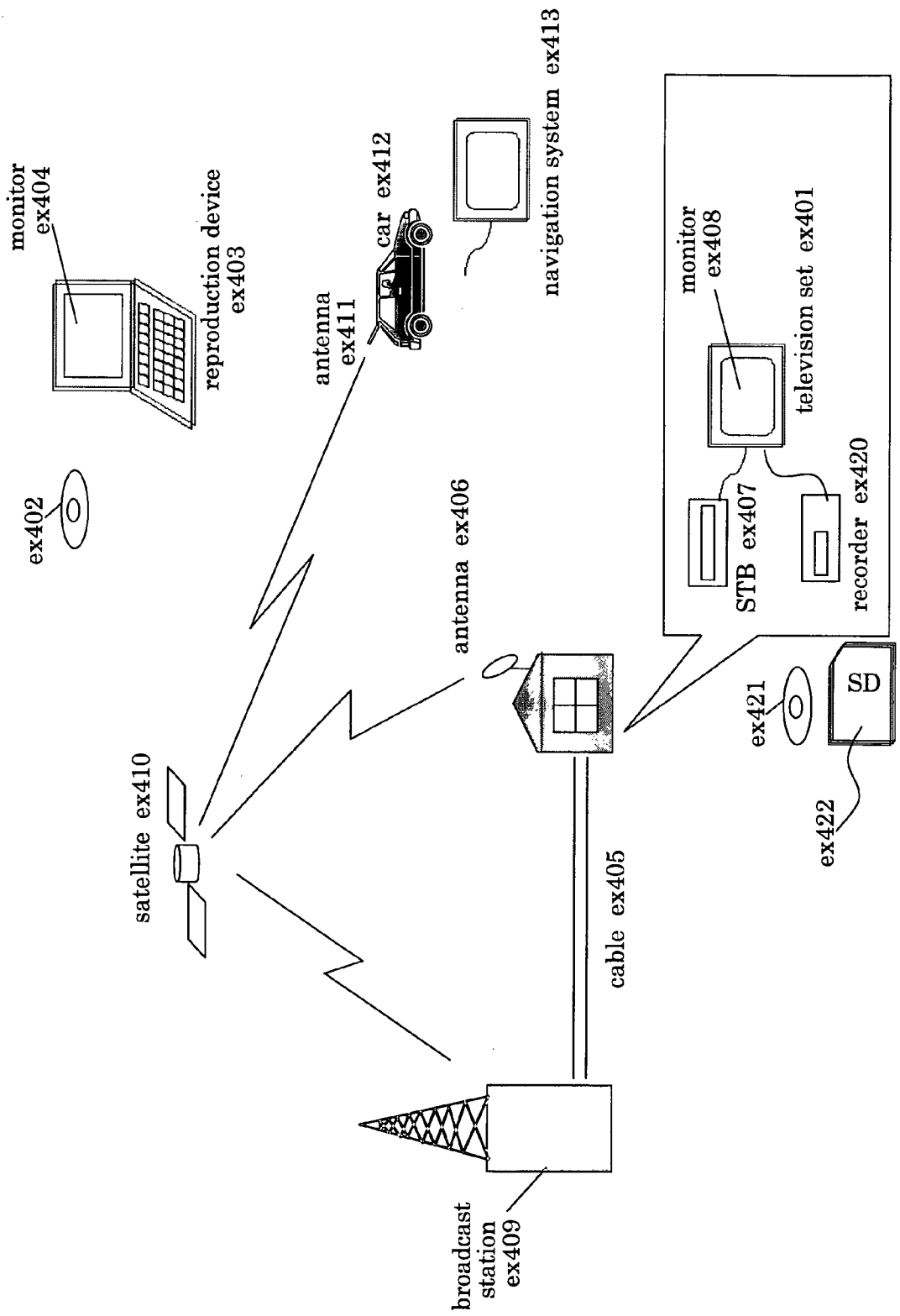
FIG. 75 is an example of the system for digital broadcast (ninth embodiment).

Note that the present invention is not limited to the example of the system described above. Digital broadcasting by satellite or terrestrial signals has been a recent topic of discussion. As shown in FIG. 75, the visual processing devices, the visual processing methods and the visual processing programs of the present invention can be incorporated into the digital broadcasting system, too.

More specifically, in a broadcast station ex409, a coded bit stream of image information is sent to a communication or a broadcasting satellite ex410 via a radio wave. The broadcasting satellite ex410 that received the coded bit stream of image information sends radio waves for broadcasting. These radio waves are received by an antenna ex406 of a house equipped with a satellite broadcasting reception facility, and a device such as a television set (a receiver) ex401 or a set top box (STB) ex407 decodes the coded bit stream and reproduces the same. In addition, the television set (the receiver) ex401 or the set top box (STB) ex407 may be provided with the visual processing devices shown in the above-described embodiments, use the visual processing methods shown in the above-described embodiments or execute the visual processing programs shown in the above-described embodiments. In addition, a reproduction device ex403 for reading and decoding a coded bit stream that is recorded on a storage medium ex402 such as a CD or a DVD that is a recording medium may be equipped with the visual processing devices, the visual processing methods or the visual processing programs shown in the above-described embodiments. In this case, the reproduced image signal and text track are displayed on a monitor ex404. In addition, it is possible to mount the visual processing devices, the visual processing methods or the visual processing programs shown in the above-described embodiments, in a set top box ex407 that is connected to a cable ex405 for a cable television or the antenna ex406 for a satellite or surface wave broadcasting, so that the image can be reproduced on a monitor ex408 of the television set. In this case, it is possible to incorporate the visual processing devices shown in the above-described embodiments not into the set top box but into the television set. In addition, it is possible that a car ex412 equipped with an antenna ex411 receives a signal from the broadcasting satellite ex410 or the base station ex107 and reproduces the moving image on a display of a navigation system ex413 in the car ex412.

Furthermore, it is possible to encode the image signal and record the encoded image signal in a recording medium. As a specific example, there is a recorder ex420 such as a DVD recorder for recording image signals on a DVD disk ex421 or a disk recorder for recording image signals on a hard disk. Furthermore, it is possible to record on an SD card ex422. In addition, in case that the recorder ex420 includes the decoding apparatus of the present invention, it is possible to reproduce image signals recorded on a DVD disk ex421 or a SD card ex422 via the image signal processing device, so as to display on the monitor ex408.

Figure 74:
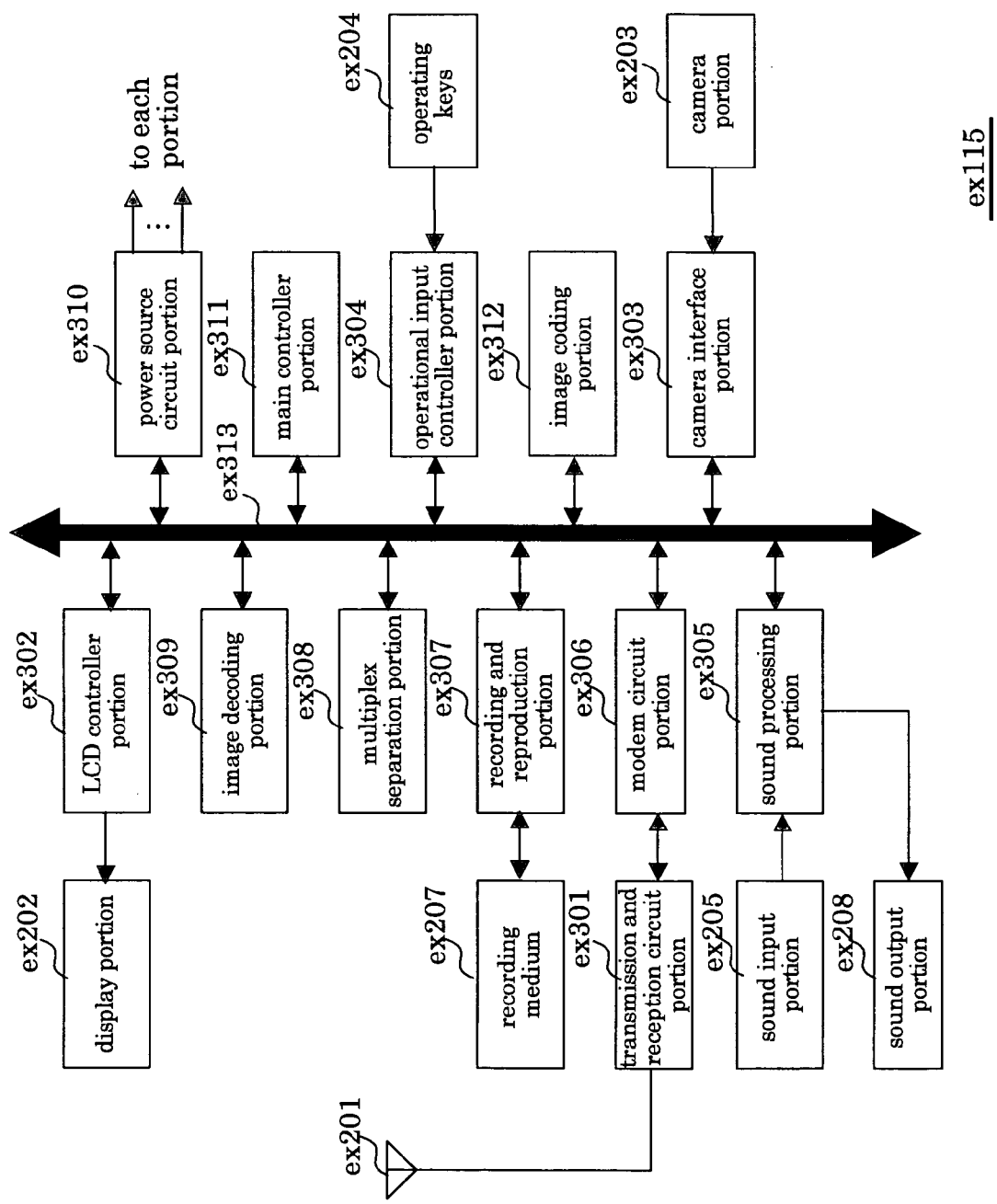
FIG. 74 is a block diagram describing the configuration of the portable telephone (ninth embodiment).

Note that in the structure of the navigation system ex413 shown in FIG. 74, the camera portion ex203, the camera interface portion ex303 and the image coding portion ex312 can be omitted. This can be also applied to the computer ex111 and the television set (the receiver) ex401.

In addition, the terminal device such as the cellular phone ex114 may include three types of assemblies. A first type is a transmission and reception terminal having both the coder and the decoder, a second type is a transmission terminal having only a coder and a third type is a reception terminal having only a decoder.

Thus, the visual processing devices, the visual processing methods or the visual processing programs shown in the above-described embodiments can be used for any device and system described above, so that effects described above can be obtained.

Tenth Embodiment

A display device 720 serving as a tenth embodiment of the present invention is described using FIGS. 76 to 94.

Figure 76:
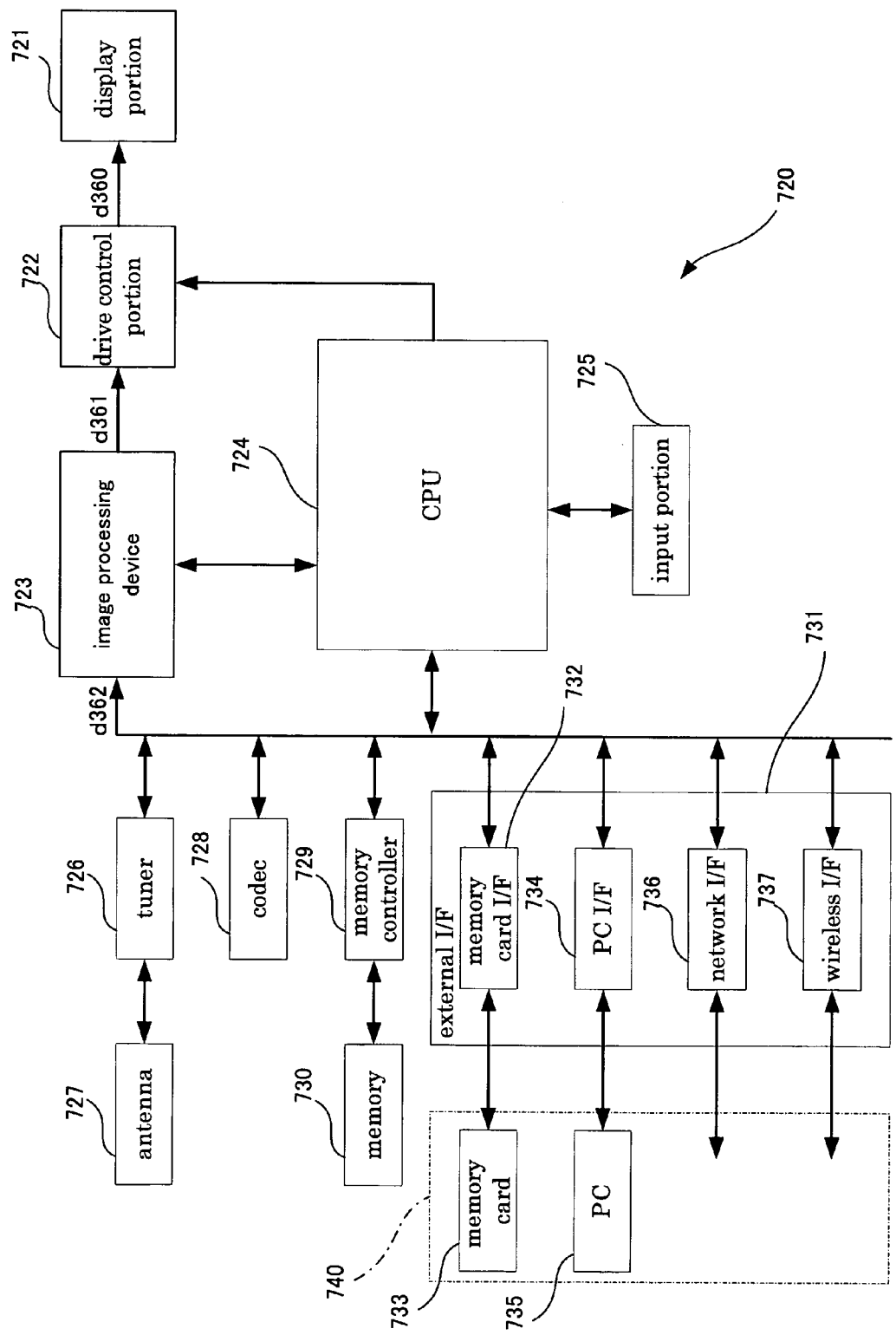
FIG. 76 is a block diagram describing the structure of the display device 720 (tenth embodiment).

The display device 720 shown in FIG. 76 is a display device for displaying images, such as a PDP, LCD, CRT, or projector. The display device 720 is characterized in that it includes an image processing device 723 that includes a visual processing device described in an above embodiment, and in that the profile data that are used in the visual processing can be switched automatically or manually. It should be noted that the display device 720 can be an independent device as well as a device that is provided in a portable telephone or a portable information terminal such as a PDA or PC.

<Display Device 720>

The display device 720 is provided with a display portion 721, a drive control portion 722, an image processing device 723, a CPU 724, an input portion 725, a tuner 726, an antenna 727, a codec 728, a memory controller 729, a memory 730, an external interface (I/F) 731, and an external device 740.

The display portion 721 is a display device that displays image information d360 that has been read out from the drive control portion 722. The drive control portion 722 due to control by the CPU 724 reads to the display device 721 an output image signal d361 that has been output from the image processing device 723, and also drives the display portion 721. More specifically, due to control by the CPU 724, the drive control portion 722 gives a voltage value that corresponds to the value of the output image signal d361 to the display device 721 and causes the display portion 721 to display the image.

Figure 77:
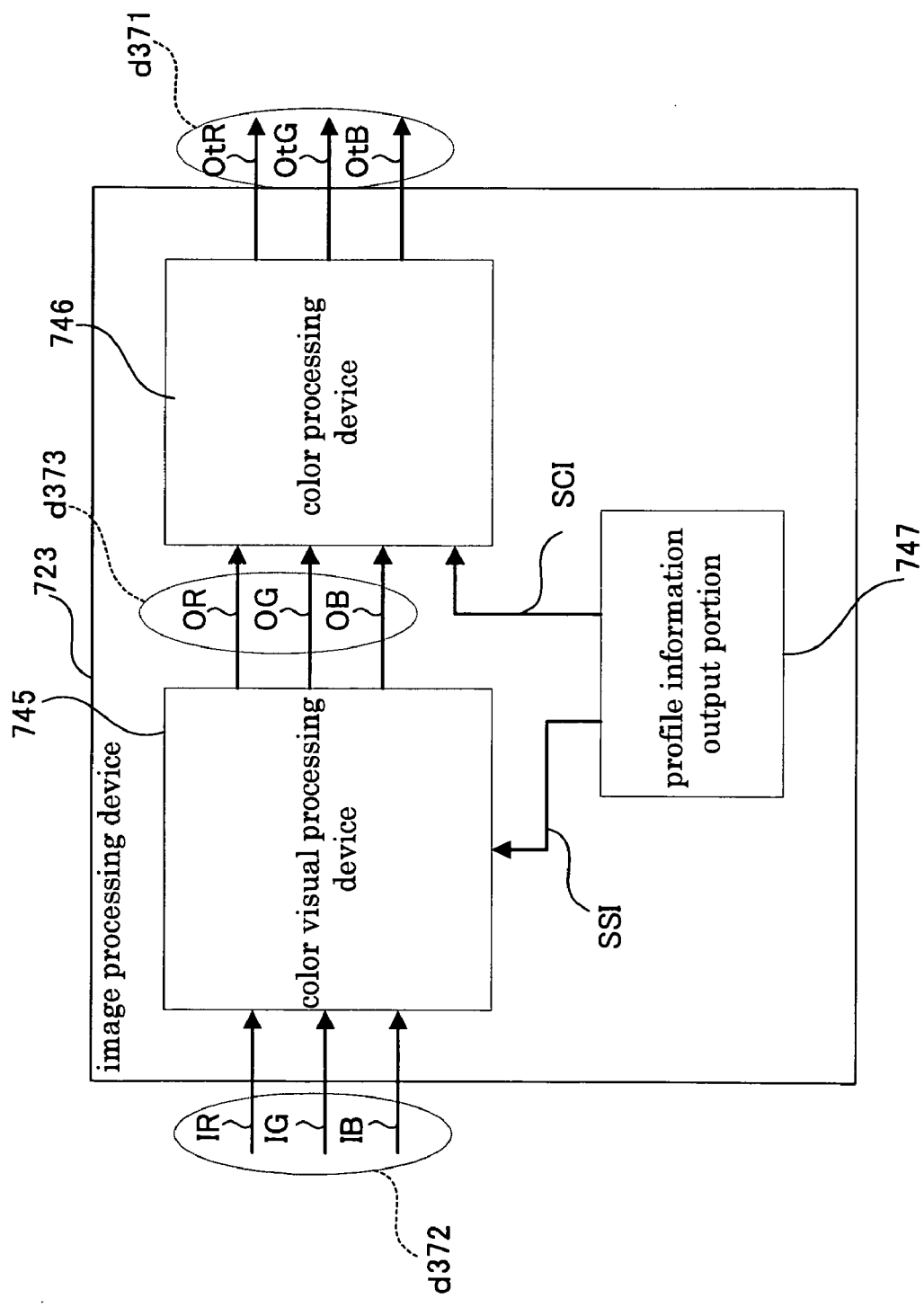
FIG. 77 is a block diagram describing the structure of the image processing device 723 (tenth embodiment).

The image processing device 723 is a device that receives a control from the CPU 724 and based on this, processes the image of the input image data d372 included in the input image signal d362 (see FIG. 77), and outputs an output image signal d361 that includes output image data d371 (see FIG. 77). The image processing device 723 also is characterized in that it includes a visual processing device described in an above embodiment and performs image processing using profile data. This will be described in greater detail later.

The CPU 724 is a device for performing computations related to the data processing of the various portions of the display device 720, and controls the various portions. The input portion 725 is a user interface through which the user can operate the display device 720, and is made of keys, knobs, and a remote control, for example, for controlling the portions.

The tuner 726 demodulates a signal that is received wirelessly or through a wired connection, and outputs digital data. More specifically, the tuner 726 receives ground wave (digital/analog) broadcasts, and BS (digital/analog) and CS broadcasts, for example, through the antenna 727 or a cable (not shown). The codec 728 decodes the digital data that have been obtained by demodulation by the tuner 726, and outputs the input image signal d362 to be input to the image processing device 723.

The memory controller 729 performs control of the address and access timing of the task memory 730 of the CPU, which is made of a DRAM, for example.

The external I/F 731 is an interface for obtaining image data or profile information, for example, from an external device 740 such as a memory card 733 or a PC 735 and outputting this as the input image signal d362. The profile information is information related to the profile data for performing image processing, and is described in greater detail later. The external I/F 731 is for example constituted by a memory card I/F 732, PC I/F 734, network I/F 736, and wireless I/F 737. It should be noted that it is not absolutely necessary for the external I/F 731 to be provided with all of the components illustrated here.

The memory card I/F 732 is an interface for connecting the memory card 733, which stores image data or profile information, for example, and the display device 720. The PC I/F 734 is an interface for connecting the PC 735, which is an external device such as a personal computer that stores image data or profile information, for example, and the display device 720. The network I/F 736 is an interface for connecting the display device 720 to a network and obtaining image data or profile information, for example. The wireless I/F 737 is an interface for connecting the display device 720 to an external device via wireless LAN or the like and obtaining image data or profile information, for example. It should be noted that the external I/F 731 is not limited to the configuration shown here, and it can also be an interface for connecting the display device 720 to a USB or an optical fiber.

The image data or profile information obtained via the external I/F 731 are decoded by the codec 728 as necessary and then are input to the image processing device 723 as an input image signal d362.

<Image Processing Device 723>

(1) Configuration of the Image Processing Device 723

The configuration of the image processing device 723 is described using FIG. 77. The image processing device 723 performs visual and color processing of the input image data d372 included in the input image signal d362, and outputs an output image signal d361 that includes output image data d371. Here, the input image data d372 and the output image data d371 are image data having RGB components, where (IR, IG, IB) are the components of the RGB color space of the input image data d372 and (OtR, OtG, OtB) are the components of the RGB color space of the output image data d371.

The image processing device 723 is provided with a color visual processing device 745 that performs color visual processing with respect to the input image data d372, a color processing device 746 that performs color processing with respect to the color visual processed signal d373, which is the output of the color visual processing device 745, and a profile information output portion 747 that outputs profile information SSI and SCI for specifying the profile data to be used in color visual processing and color processing. Here, the color visual processed signal d373 is image data having RGB components, where (OR, OG, OB) are the components of the RGB color space.

Below, the structures of the profile information output portion 747, the color visual processing device 745, and the color processing device 746 are described in detail in that order.

(2) Profile Information Output Portion 747 and Profile Information SSI and SCI <<2-1>> Overview of the Profile Information Output Portion 747

Figure 78:
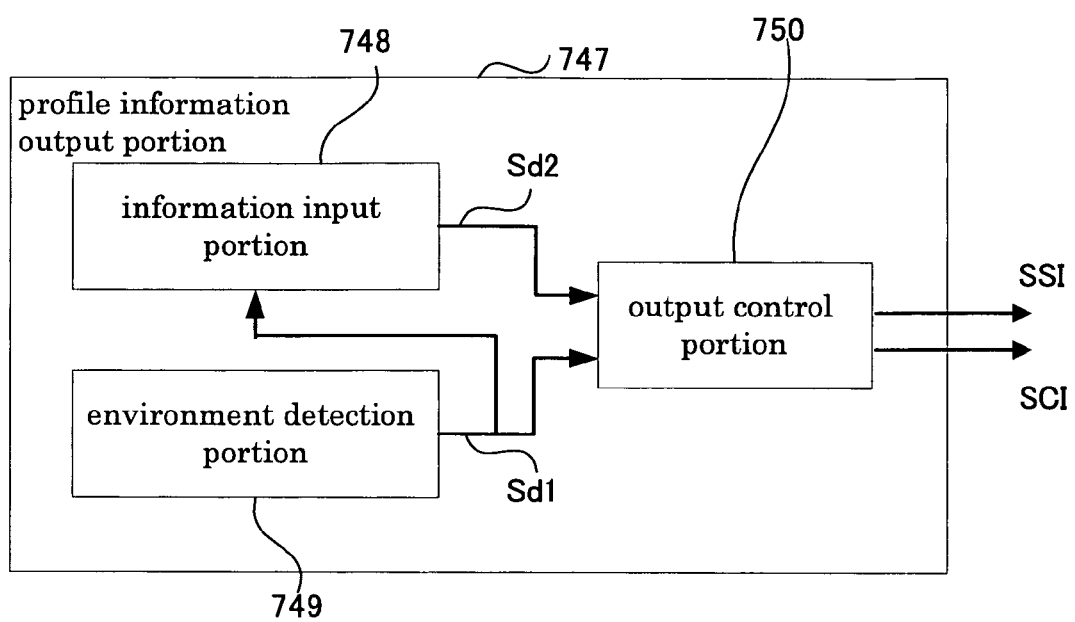
FIG. 78 is a block diagram describing the structure of the profile information output portion 747 (tenth embodiment).

The profile information output portion 747, which outputs profile information SSI and SCI, is described next using FIG. 78.

The profile information output portion 747 is a device for outputting the profile information SSI and SCI to the color visual processing device 745 and the color processing device 746, respectively (see FIG. 77), and comprises an environment detection portion 749, an information input portion 748, and an output control portion 750. The environment detection portion 749 automatically detects at least some of the environment information described later, and outputs this as detected information Sd1. The information input portion 748 obtains the detected information Sd1 and has the user input environment information other than environment information included in the detected information Sd1, and outputs this as input information Sd2. The output control portion 750 obtains the detected information Sd1 and the input information Sd2 and outputs the profile information SSI and SCI to the color visual processing device 745 and the color processing device 746, respectively.

Before describing these portions in greater detail, first we will describe the profile information SSI and SCI.

<<2-1>> Profile Information SSI and SCI

The profile information SSI and SCI are information for specifying the profile data to be used by the color visual processing device 745 and the color processing device 746, respectively. More specifically, the profile information SSI and SCI include at least one of profile data, tag information such as a number that specifies profile data, parameter information that indicates the features of the processing of the profile data, and environment information related to the display environment of the display portion 721 (see FIG. 76) or the viewing environment in which the image displayed on the display portion 721 is to be viewed.

The profile data are data used for image processing on the color visual processing device 745 or the color processing device 746, and are coefficient matrix data storing transformation coefficients for the image data to be processed or table data that give image data after processing with respect to the image data to be processed (e.g. a two-dimensional LUT).

The tag information is identifying information for identifying given profile data from other profile data, and for example is a number allocated to each of the data of a plurality of profiles registered to the color visual processing device 745 and the color processing device 746.

The parameter information is information that indicates the features of the processing of the profile data, and for example is information that is obtained by digitizing the extent of processing of for example the contrast enhancement processing, dynamic range compression processing, or color conversion processing, achieved by the profile data.

The environment information is information relating to the environment in which the image-processed image data are displayed and viewed, and for example is information such as ambient light information on the brightness of the ambient light or the color temperature where the display device 720 is located, product information of the display portion 721 (such as the product number), information on the image size displayed by the display portion 721, position information related to the distance between the image that is displayed and the user who will be viewing that image, and user information related to the user, such as his or her age and gender.

It should be noted that the following description is for a case in which the profile information SSI and SCI include tag information.

<<2-2>> Environment Detection Portion 749

The environment detection portion 749 is a device that detects environment information using a sensor, for example. The environment detection portion 749 is a device such as an optical sensor that detects the brightness or color temperature of the ambient light, a device that reads product information attached to the display portion 721 either wirelessly or over a wired connection (for example, a wireless tag reading device, a barcode reading device, or a device that reads information from a database managing the information of the various portions provided in the display device 720), a wireless or infrared sensor that measures the distance to the user, or a camera that obtains information relating to the user.

The environment detection portion 749 outputs the information that has been detected to the information input portion 748 and the output control portion 750 as detected information Sd1.

<<2-3>> Information Input Portion 748

The information input portion 748 is an input device for the user to input environment information, and outputs this environment information that has been input as input information Sd2. The information input portion 748 can for example be made of a switch and a circuit that senses input from the switch, or can be constituted by software that operates an input user interface that is displayed on the display portion 721 or on the information input portion 748 itself. It is also possible for the information input portion 748 to be provided inside the display device 720, or for it to receive information input over a network.

With the information input portion 748, environment information other than the environment information included in the detected information Sd1 is input. For example, with the information input portion 748, the environment information that the user can input is restricted according to the environment information that is included in the detected information Sd1.

It should be noted that the information input portion 748 can also input all environment information regardless of the detected information Sd1. In this case, it is possible for the information input portion 748 to not receive detected information Sd1, or for it to obtain detected information Sd1 while allowing the user to input more specific information.

<<2-4>> Output Control Portion 750

The output control portion 750 obtains the detected information Sd1 and the input information Sd2 and outputs the profile information SSI and SCI. More specifically, the output control portion 750 selects profile data that are preferable based on the environment information obtained from the detected information Sd1 and the input information Sd2, and outputs that tag information. Yet more specifically, the output control portion 750 references a database that correlates the values of the candidates for the profile data to be selected and the environment information, and selects the profile data that are favorable based on the environment information that is obtained.

This correlation between the environment information and the profile data is described in further detail below.

For example, if the brightness of the ambient light affecting the display device 720 is high, then it is preferable that visual processing that enhances local contrast is performed. As a result, the output control portion 750 outputs the tag information of profile data for further enhancing the local contrast.

Also, a large distance between the user and the display device 720 reduces the viewing angle of the image that is displayed on the display device 721, and this leads to the image appearing small. Different viewing angle sizes make it feel as if the brightness of the image also is different. Thus, the output control portion 750 outputs the tag information of profile data for changing the gradation or contrast based on the size of the viewing angle. It should be noted that differences in the size of the display portion 721 of the display device 720 also can affect the size of the viewing angle.

An example of the operation of the output control portion 750 is described below.

There is a tendency in human vision to interpret larger display image sizes as brighter, and thus the viewer may feel that it is preferable to keep dark regions from being fixed. Taking this into account, if it has been determined from the environment information that is obtained that a large image size is displayed by the display portion 721, then the tag information of profile data resulting in processing that inhibits dark region improvement over the entire image and boosts local contrast improvement is output as profile information SSI to the color visual processing device 745. Additionally, the tag information of profile data resulting in color processing that is in accordance with the profile information SSI and other environment information is output to the color processing device 746 as profile information SCI. Here, "color processing that is in accordance with the profile information SSI and other environment information" for example is color processing for reproducing the color of an image that has been visually processed by the profile data specified by the profile information SSI in a manner that is suitable for the ambient light conditions.

It should be noted that if the output control portion 750 obtains environment information that is overlapping from the detected information Sd1 and the input information Sd2, then it can preferentially use one of either the detected information Sd1 or the input information Sd2.

(3) Color Visual Processing Device 745

<<3-1>> Configuration of the Color Visual Processing Device 745

Figure 79:
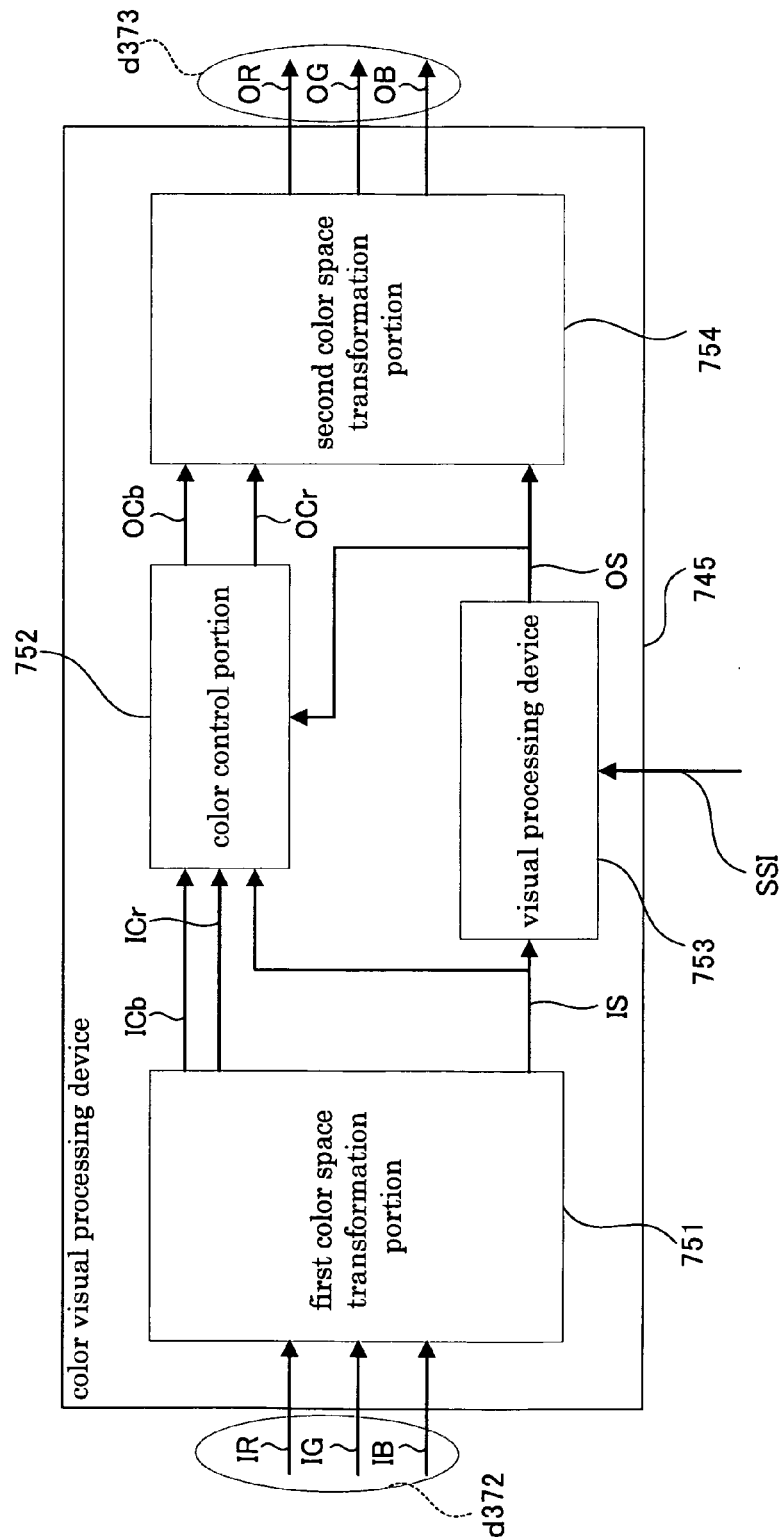
FIG. 79 is a block diagram describing the structure of the color visual processing device 745 (tenth embodiment).

The configuration of the color visual processing device 745 is described using FIG. 79. The color visual processing device 745 is characterized in that it is provided with a visual processing device 753 that is capable of executing the visual processing described in the foregoing embodiments and performs this visual processing with respect to the luminance component of input image data d372, and in that it is provided with a color control portion 752 with which it expands the visual processing performed with respect to the luminance component to include the color component as well.

The color visual processing device 745 is provided with a first color space transformation portion 751, the visual processing device 753, the color control portion 752, and a second color space transformation portion 754.

The first color space transformation portion 751 transforms input image data d372 in RGB color space into a luminance component and a color component. For example, the first color space transformation portion 751 transforms the input image data d372 in RGB color space into a signal in YCbCr color space. The signal of the luminance component after transformation is taken as an input signal IS, and the signals of the color components are taken as color signals ICb and ICr.

The visual processing device 753 is a device that performs visual processing of the input signal IS, which is the luminance component of the input image data d372, and outputs an output signal OS. The visual processing device 753 receives the profile information SSI from the profile information output portion 747 (see FIG. 77), and performs visual processing using the profile data that are specified by the profile information SSI that have been received as input. The visual processing device 753 will be described in further detail later.

The color control portion 752 receives the color signals ICb and ICr, the input signal IS, and the output signal OS, and outputs corrected color signals OCb and OCr, which are color signals that have been corrected. For example, the color control portion 752 performs this correction using the ratio between the input signal IS and the output signal OS. More specifically, it multiplies the signal values of the color signals ICb and ICr by the ratio of the signal value of the output signal OS to the signal value of the input signal IS, and outputs the result of this computation as the values of the corrected color signals OCb and OCr, respectively.

The second color space transformation portion 754 transforms the output signal OS and the corrected color signals OCb and OCr, which are signals in YCbCr color space, into a color visual processed signal d373 in RGB color space.

<<3-2>> Configuration of the Visual Processing Device 753

A visual processing device like the visual processing device 1 described in the foregoing embodiments (see FIG. 1) can be used as the visual processing device 753.

Figure 80:
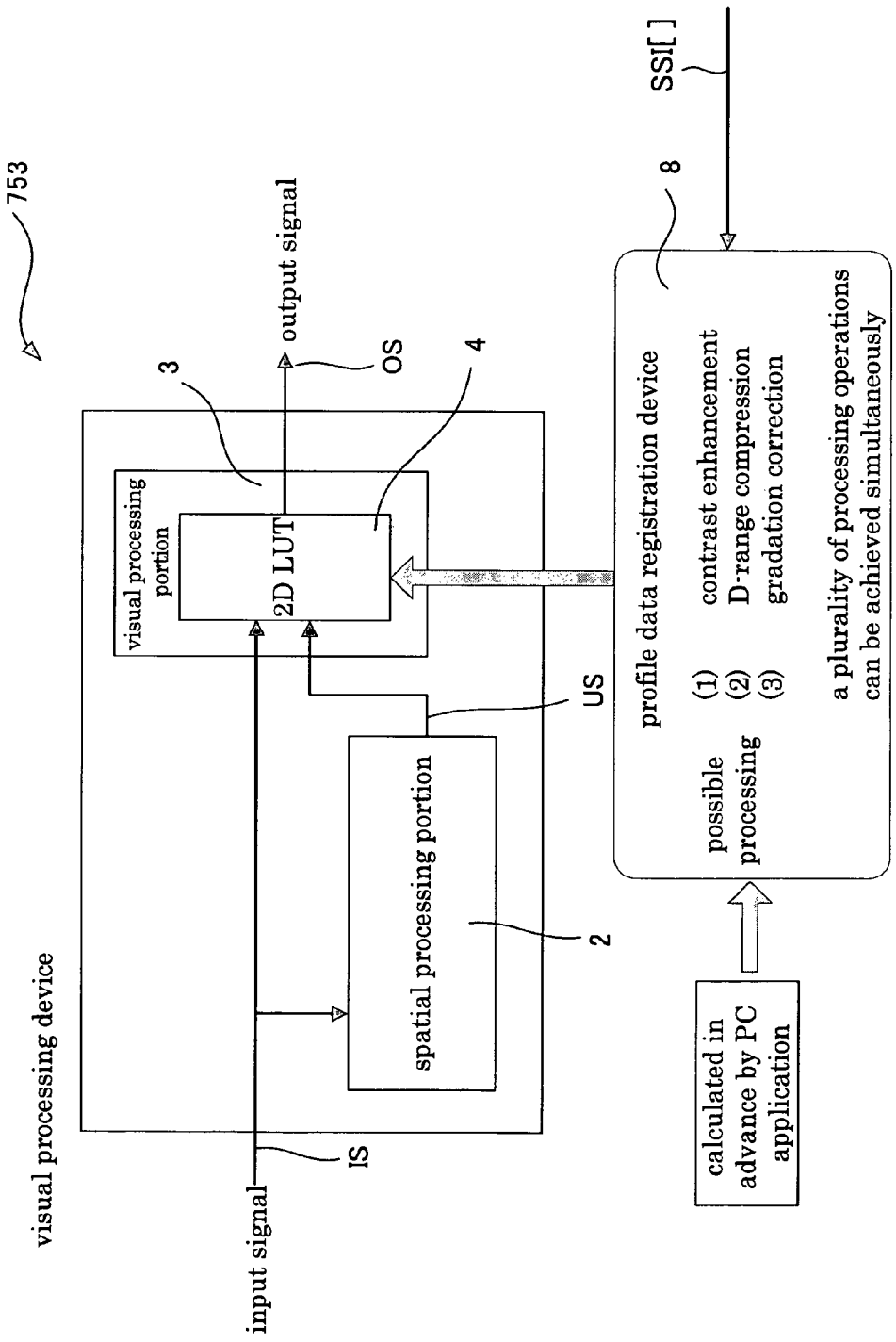
FIG. 80 is a block diagram describing the structure of the visual processing device 753 (tenth embodiment).

The configuration of the visual processing device 753 is described using FIG. 80.

The visual processing device 753 shown in FIG. 80 is a visual processing device having the same configuration as that of the visual processing device 1 shown in FIG. 1. The sections that achieve substantially the same functions as those of the visual processing device 1 have been assigned identical reference numerals. The visual processing device 753 shown in FIG. 80 differs from the visual processing device 1 shown in FIG. 1 in that the profile data registration device 8 registers the profile data that have been specified by the profile information SSI that is obtained to the two-dimensional LUT 4. The description for the other portions is the same as above, and thus will be omitted.

The visual processing device 753 shown in FIG. 80 uses the profile data registered to the two-dimensional LUT 4 to perform visual processing of the input signal IS and outputs the result as the output signal OS.

(4) Color Processing Device 746

The color processing device 746 uses the profile data that have been specified by the profile information SCI that have been obtained to perform color processing of the color visual processed signal d373, which is the output of the color visual processing device 745. The profile data used by the color processing device 746 for example are three three-dimensional lookup tables or 3-row by 3-column transformation coefficient matrix data that give the components (OtR, OtG, OtB) of the output image data d371 with respect to the components (OR, OG, OB) of the color visual processed signal d373.

<Effect of the Display Device 720>

(1)

With the display device 720, it is possible to perform image processing using profile data that are ideal for the environment information that is obtained. In particular, the profile data are selected based on environment information that have been input by the user in addition to environment information detected automatically, and thus image processing resulting in a more favorable visual effect from the standpoint of the user can be accomplished.

Using a lookup table as the profile data results in image processing being performed in reference to the table, and this allows faster image processing to be achieved.

With the display device 720, different image processing can be performed by changing the profile data. That is, different image processing can be achieved without changing the hardware configuration.

With image processing in which profile data are used, the profile data can be created in advance, thus allowing complex image processing to be accomplished with ease.

(2)

With the profile information output portion 747, it is possible to output different profile information to the color visual processing device 745 and the color processing device 746. Thus, it is possible to prevent processing in which the respective image processing performed by the color visual processing device 745 and the color processing device 746 overlap or cancel out the effect of the other. That is, the image processing device 723 can suitably perform image processing.

<Modified Examples>

(1)

In the above embodiment, the input image data d372, the output image data d371, and the color visual processed signal d373 are described as signals in RGB color space, but they can alternatively be signals in other color spaces. For example, it is also possible for these signals to be expressed in YCbCr color space, YUV color space, Lab color space, Luv color space, YIQ color space, XYZ color space, or YPbPr color space, for example.

The same applies for the signals handled by the first color space transformation portion 751 and the second color space transformation portion 754, and there is no limitation to the description of the embodiment.

(2)

The above embodiment was described with regard to a case in which the profile information SSI and SCI both include tag information. Here, the operations of the various portions of the image processing device 723 in a case where the profile information SSI and SCI include other information (such as profile data, parameter information, or environment information) will be described.

<<2-1>>

If the profile information SSI and SCI include profile data, then the output control portion 750 is a device that registers and stores the profile data, or that is capable of creating profile data, and determines the profile data to be used by the color visual processing device 745 and the color processing device 746 from the detected information Sd1 and the input information Sd2 that have been obtained, and outputs these.

The color visual processing device 745 and the color processing device 746 perform image processing using the profile data that are thus obtained. For example, the profile data registration device 8 of the visual processing device 753 (see FIG. 80) registers the profile data included in the profile information SSI to the two-dimensional LUT 4 and then visual processing is performed. It should be noted that in this case, it is also possible for the visual processing device 753 to not be provided with the profile data registration device 8.

With this image processing device 723, the profile data are itself output from the profile information output portion 747 to the color visual processing device 745 and the color processing device 746, and thus the profile data that are used can be specified more reliably. Moreover, the memory capacity for the profile data in the color visual processing device 745 and the color processing device 746 can be reduced.

<<2-2>>

If the profile information SSI and SCI include parameter information, then the output control portion 750 is a device that has a database, for example, for outputting parameter information from the detected information Sd1 and the input information Sd2. The database stores the relationship between the value of the environment information and the image processing that is ideal for an environment indicating that value.

The color visual processing device 745 and the color processing device 746 select the profile data for achieving image processing that is near the value of the parameter information that is obtained, and then perform image processing. For example, the profile data registration device 8 of the visual processing device 753 (see FIG. 80) selects profile data using the parameter information included in the profile information SSI, registers the profile data that are selected to the two-dimensional LUT 4, and then performs visual processing.

With this image processing device 723, it is possible to reduce the amount of data in the profile information SSI and SCI.

<<2-3>>

If the profile information SSI and SCI include environment information, then the output control portion 750 is a device that outputs the detected information Sd1 and the input information Sd2 as profile information. Here, the output control portion 750 can output all of the environment information that is obtained from the detected information Sd1 and the input information Sd2 as profile information SSI and SCI, or it can selectively distribute this information between the profile file information SSI and the profile information SCI and then output these.

The color visual processing device 745 and the color processing device 746 select profile data that are favorable for the environment information and then perform image processing. For example, the profile data registration device 8 of the visual processing device 753 (see FIG. 80) may reference a database that corresponds each of the values of the environment information included in the profile information SSI with a candidate for the profile data to be selected, and by doing so selects favorable profile data for the environment information that is obtained, and registers this selected profile data to the two-dimensional LUT 4 and then performs visual processing.

If all of the environment information is output as profile information SSI and SCI, then it is possible to reduce the amount of processing performed by the output control portion 750. If the environment information is selectively output as profile information SSI and SCI, then it is possible to take into account the processing carried out by color visual processing device 745 and the color processing device 746, and this makes it possible to keep these from performing image processing having overlapping effects or effects that cancel each other out. Moreover, because the color visual processing device 745 and the color processing device 746 obtain only suitably selected environment information, it is possible to more appropriately and easily select the profile data.

<<2-4>>

It is only necessary for the profile information SSI and SCI to include at least one of profile data, tag information, parameter information, and environment information, and they may also simultaneously include more than one of these.

It is not absolutely necessary for the profile information SSI and the profile information SCI to be different information, and they can also be the same information.

(3)

It is also possible for the visual processing device 753 to be a device that includes the profile data registration device 701 (see FIG. 9) discussed in [First Embodiment]<Modified Example> (7), and that is capable of creating new profile data from the profile data selected using the profile information SSI and the degree of synthesis obtained form the profile information SSI.

Figure 81:
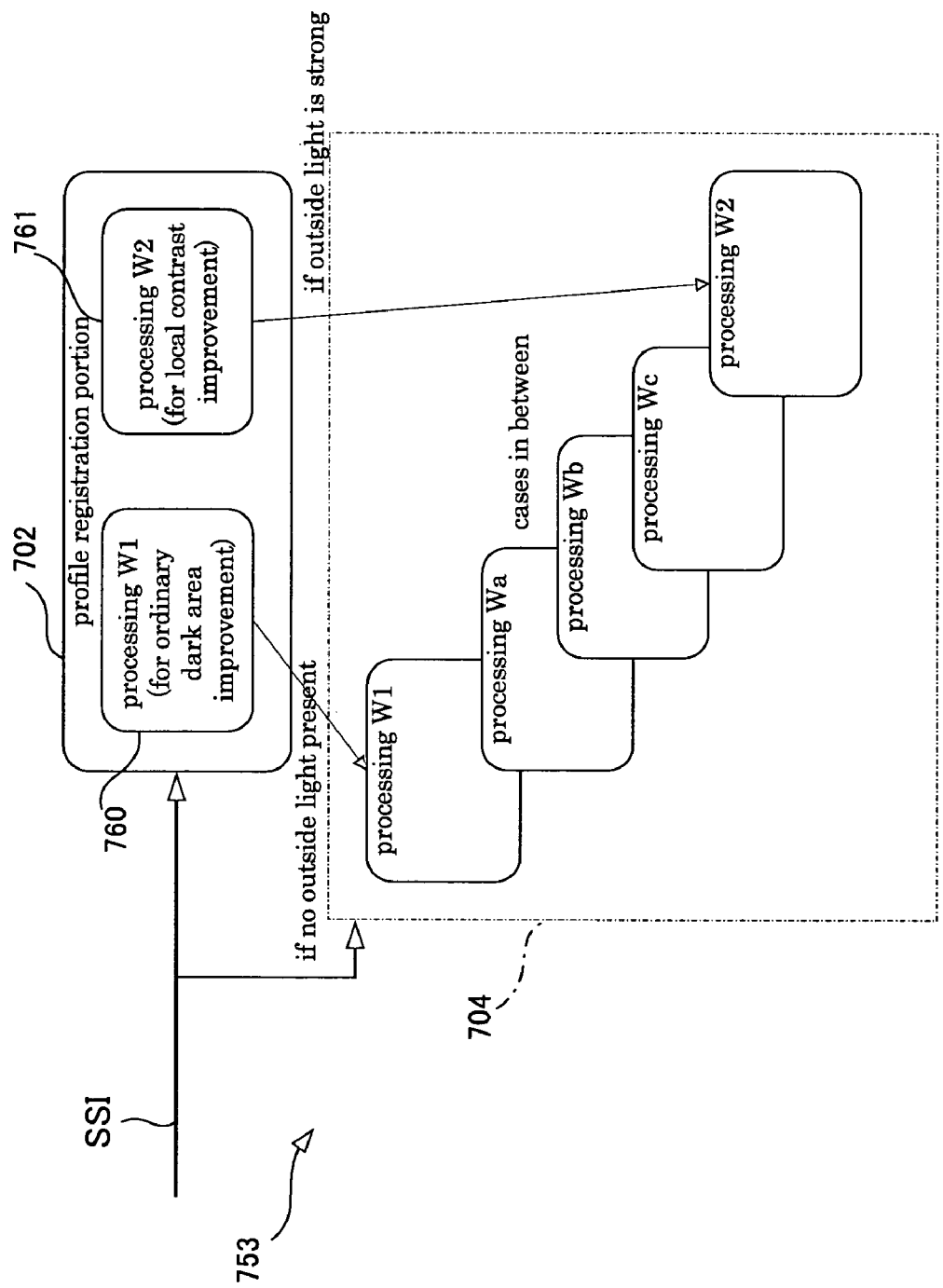
FIG. 81 is an explanatory diagram describing the operation of the visual processing device 753 serving as a modified example (tenth embodiment).

Using FIG. 81, the operation of this modified example of the visual processing device 753 will be described below.

With this modified example of the visual processing device 753, new profile data are created using the profile data that have been selected based on the profile information SSI of the profile data registered to the profile data registration portion 702.

In one implementation, the profile data registration portion 702 shall select the profile data 761 and the profile data 762 based on the tag information, for example, included in the profile information SSI. Here, the profile data 761 are profile data for improving dark areas and are selected when there is low ambient light, for example, and the profile data 762 are profile data for improving local contrast and are selected when there is strong ambient light, for example.

The profile creation portion 704 obtains the intensity of the ambient light from the environment information contained in the profile information SSI, and creates profile data for performing image processing suited for that intensity of ambient light from the profile data 761 and the profile data 762. More specifically, the values of the profile data 761 and the profile data 762 are interpolating using the value of the intensity of the ambient light that is included in the environment information.

In this way, the visual processing device 753 of this modified example creates new profile data that it can then use for visual processing. With the visual processing device 753 of this modified example, it is possible to create profile data and achieve many different types of visual processing without registering a large amount of profile data in advance.

(4)

The visual processing device 753 is not limited to the configuration shown in FIG. 80. For example, it can also be any one of the visual processing device 520 (see FIG. 6), the visual processing device 525 (see FIG. 7), or the visual processing device 530 (see FIG. 8) described in the above embodiments.

Each of these configurations is described below using FIGS. 82 to 84.

<<4-1>>

The configuration of a visual processing device 753a is described below using FIG. 82.

Figure 82:
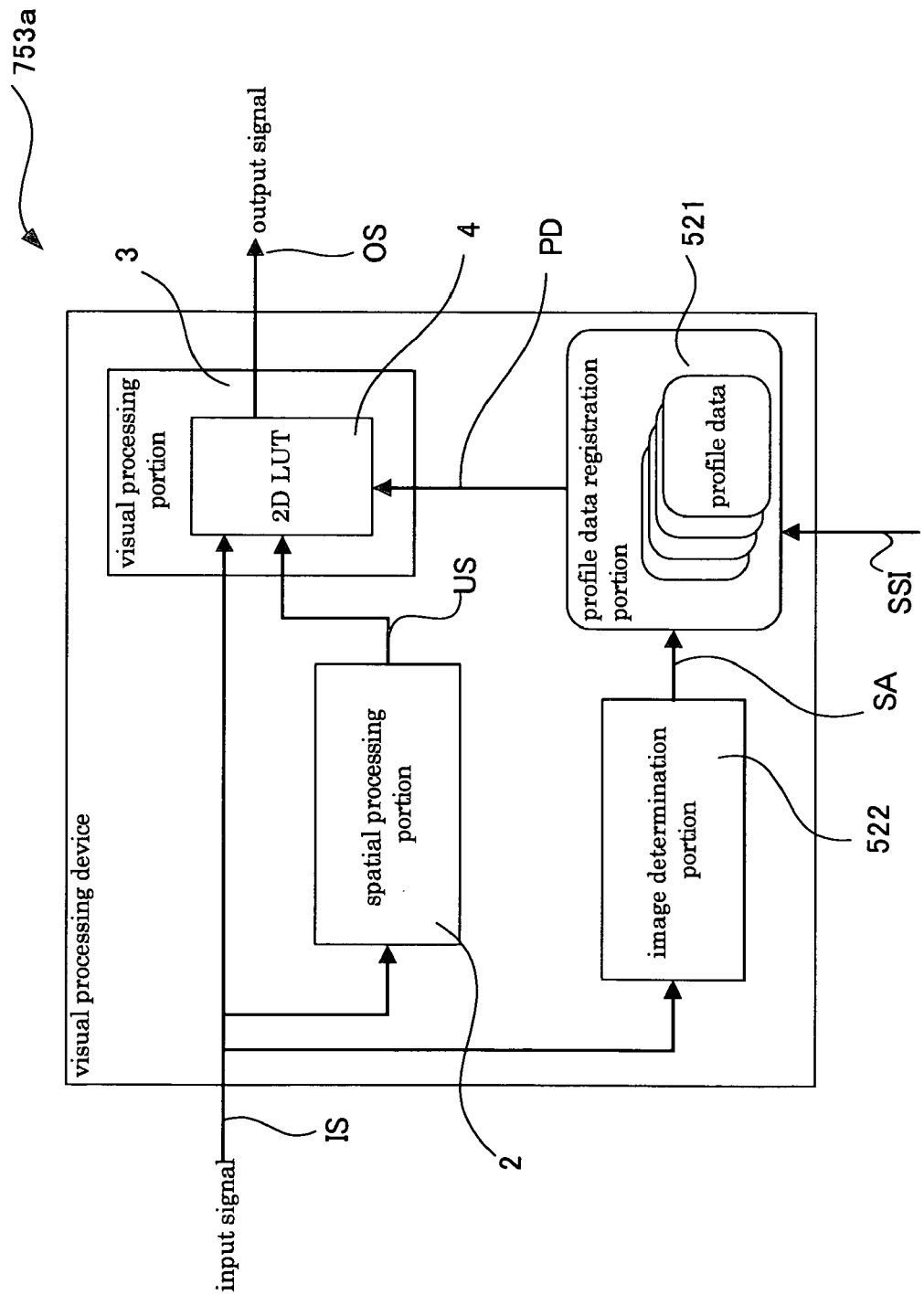
FIG. 82 is a block diagram describing the structure of the visual processing device 753a (tenth embodiment).

The visual processing device 753a shown in FIG. 82 is a visual processing device that has the same configuration as the visual processing device 520 shown in FIG. 6. Sections that have substantially the same function as those of the visual processing device 520 have been assigned identical reference numerals. The visual processing device 753a shown in FIG. 82 differs from the visual processing device 520 shown in FIG. 6 in that the profile data registration portion 521 registers to the two-dimensional LUT 4 profile data that are specified based on profile information SSI that has been obtained and determination results SA from the image determination portion 522. The description of portions other than these can be found in the above embodiments and thus is omitted.

With the visual processing device 753a, profile data are selected based on not only the profile information SSI but also on the determination results SA, and thus it is possible to achieve more appropriate visual processing.

<<4-2>>

The configuration of a visual processing device 753b is described below using FIG. 83.

Figure 83:
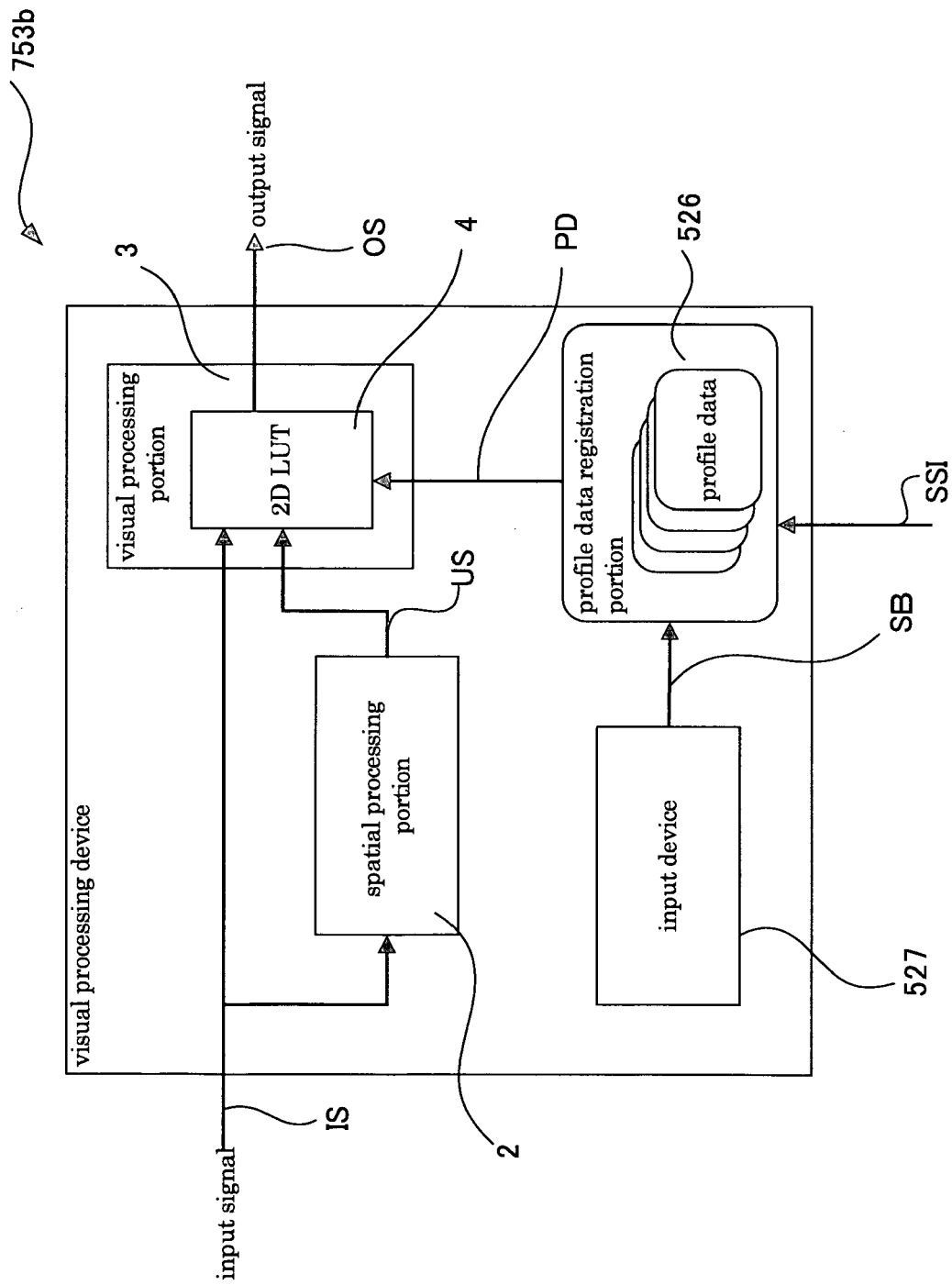
FIG. 83 is a block diagram describing the structure of the visual processing device 753b (tenth embodiment).

The visual processing device 753b shown in FIG. 83 is a visual processing device that has the same configuration as the visual processing device 525 shown in FIG. 7. Sections that have substantially the same function as those of the visual processing device 525 have been assigned identical reference numerals. The visual processing device 753b shown in FIG. 83 differs from the visual processing device 525 shown in FIG. 7 in that the profile data registration portion 526 registers to the two-dimensional LUT 4 profile data that are specified based on the profile information SSI that is obtained and input results SB from the input device 527. The description of portions other than these can be found in the above embodiments and thus is omitted.

With the visual processing device 753b, profile data are selected based on not only the profile information SSI but also on the input results SB, and thus it is possible to achieve more appropriate visual processing.

<<4-3>>

The configuration of a visual processing device 753c is described below using FIG. 84.

Figure 84:
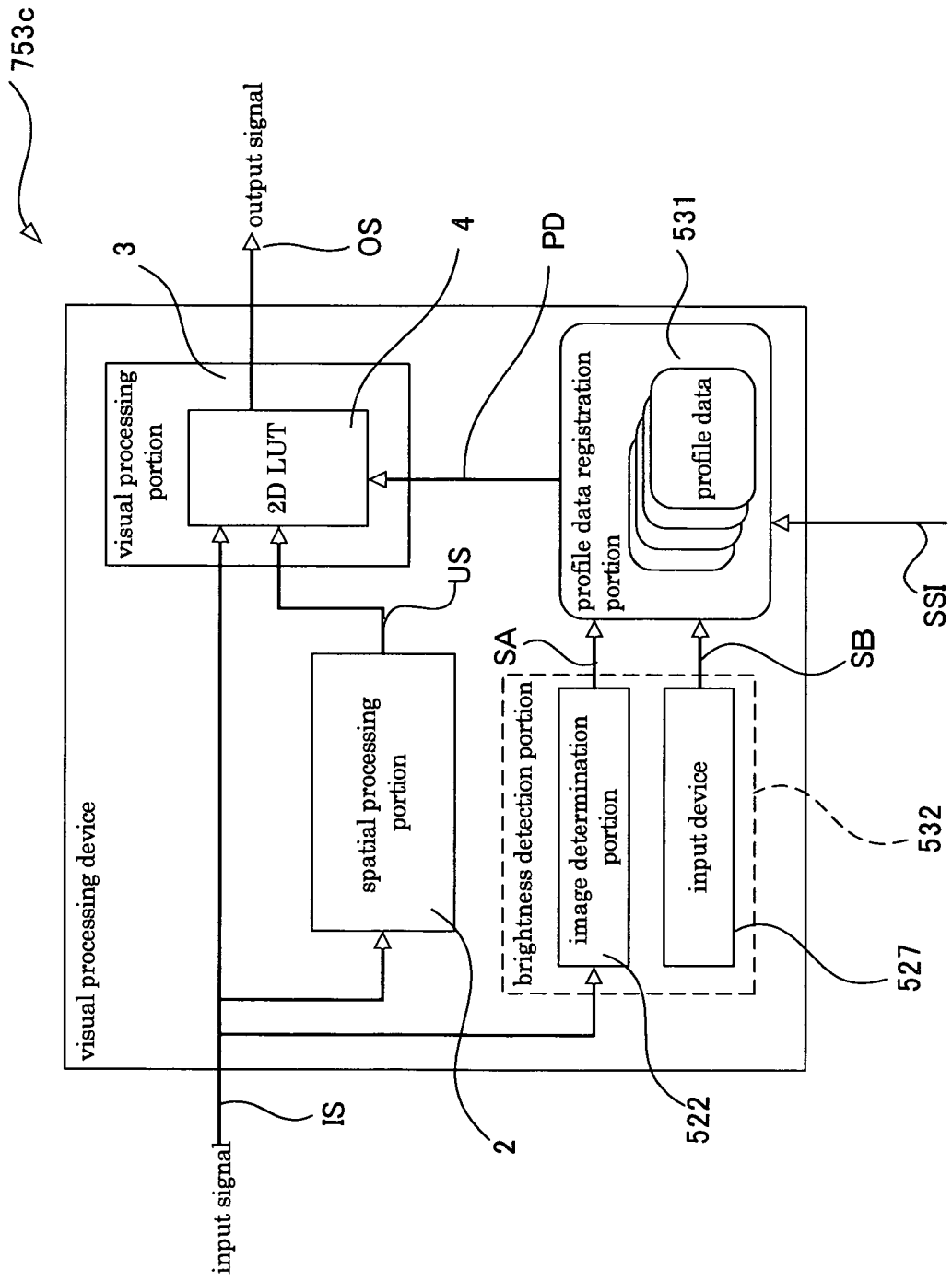
FIG. 84 is a block diagram describing the structure of the visual processing device 753c (tenth embodiment).

The visual processing device 753c shown in FIG. 84 is a visual processing device that has the same configuration as the visual processing device 530 shown in FIG. 8. Sections that have substantially the same function as those of the visual processing device 530 have been assigned identical reference numerals. The visual processing device 753c shown in FIG.

84 differs from the visual processing device 530 shown in FIG. 8 in that the profile data registration portion 531 registers to the two-dimensional LUT 4 profile data that are specified based on profile information SSI that has been obtained, determination results SA from the image determination portion 522, and input results SB from the input device 527. The description of portions other than these can be found in the above embodiments and thus is omitted.

With the visual processing device 753b, profile data are selected based on not only the profile information SSI but also on the determination results SA and the input results SB, and thus it is possible to achieve more appropriate visual processing.

(5)

Portions of the display device 720 described in the foregoing embodiment that achieve similar functions can be achieved by common hardware.

For example, the input portion 725 (see FIG. 76) of the display device 720 can be a device that also serves as the information input portion 748 of the profile information output portion 747, the input device 527 of the visual processing device 753b (see FIG. 83), or the input device 527 of the visual processing device 753c (see FIG. 84).

Further, the profile data registration device 8 of the visual processing device 753 (see FIG. 80), the profile data registration portion 521 of the visual processing device 753a (see FIG. 82), the profile data registration portion 526 of the visual processing device 753b (see FIG. 83), and the profile data registration portion 531 of the visual processing device 753c (see FIG. 84) can be provided outside of the image processing device 723 (see FIG. 76), and for example can be achieved by a memory 730 or an external device 740.

The profile data registered to the profile data registration portion and profile data registration device can be registered to these in advance or can be obtained from the external device 740 or the tuner 726.

The profile data registration portion and profile data registration device can also serve as a memory device in the color processing device 746 that stores profile data.

It is also possible for the profile information output portion 747 to be a device that is connected wirelessly or through a wired connection to a portion external to the image processing device 723 or to a portion external to the display device 720.

(6)

The profile data registration device 8 of the visual processing device 753 (see FIG. 80), the profile data registration portion 521 of the visual processing device 753a (see FIG. 82), the profile data registration portion 526 of the visual processing device 753b (see FIG. 83), and the profile data registration portion 531 of the visual processing device 753c (see FIG. 84), for example, can be devices that are capable of outputting the profile information of the profile data used in visual processing.

For example, the profile data registration device 8 of the visual processing device 753 (see FIG. 80) outputs the profile information of the profile data registered to the two-dimensional LUT 4. The profile information that is output is for example input to the color processing device 746 and in the color processing device 746 that is used to select the profile data.

Thus, it is possible for the color processing device 746 to determine the profile data used by the visual processing device 753 even if profile data other than the profile data specified by the profile information SSI are used by the visual processing device 753. Thus, it is possible to further prevent the color visual processing device 745 and the color processing device 746 from performing visual processing that is overlapping or that cancels out the other.

(7)

With the image processing device 723, it is also possible to provide a user input portion that allows the user to perform an input in lieu of the profile information output portion 747.

Figure 85:
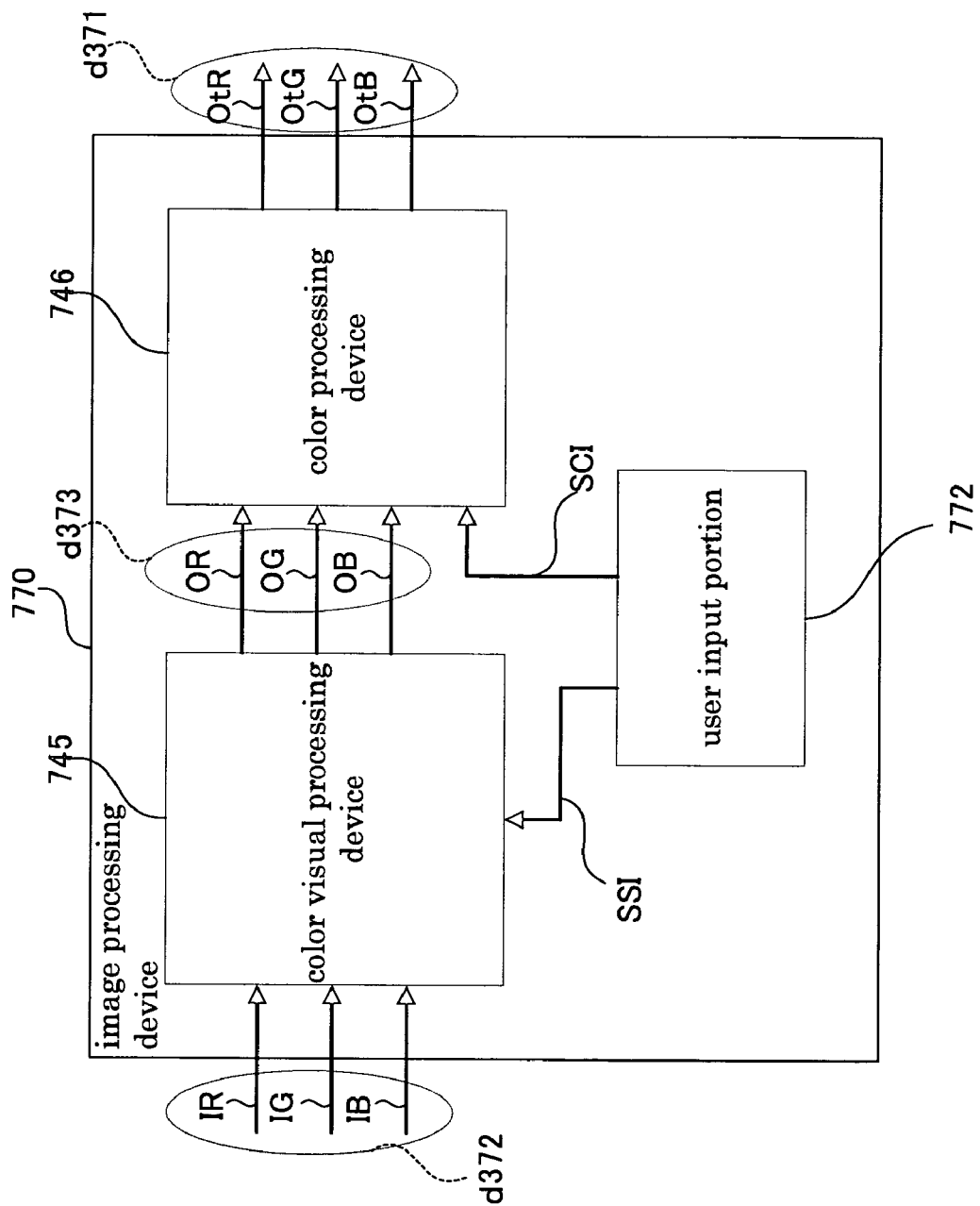
FIG. 85 is a block diagram describing the structure of the visual processing device 770 (tenth embodiment).

FIG. 85 shows an image processing device 770 that serves as a modified example of the image processing device 723 (see FIG. 77). The image processing device 770 is characterized in that it is provided with a user input portion 772 that allows the user to perform an input. Sections of the image processing device 770 that achieve substantially the same functions as those of the image processing device 723 are assigned identical reference numerals and description thereof is omitted.

The user input portion 772 outputs the profile information SSI and SCI to the color visual processing device 745 and the color processing device 746, respectively.

Figure 86:
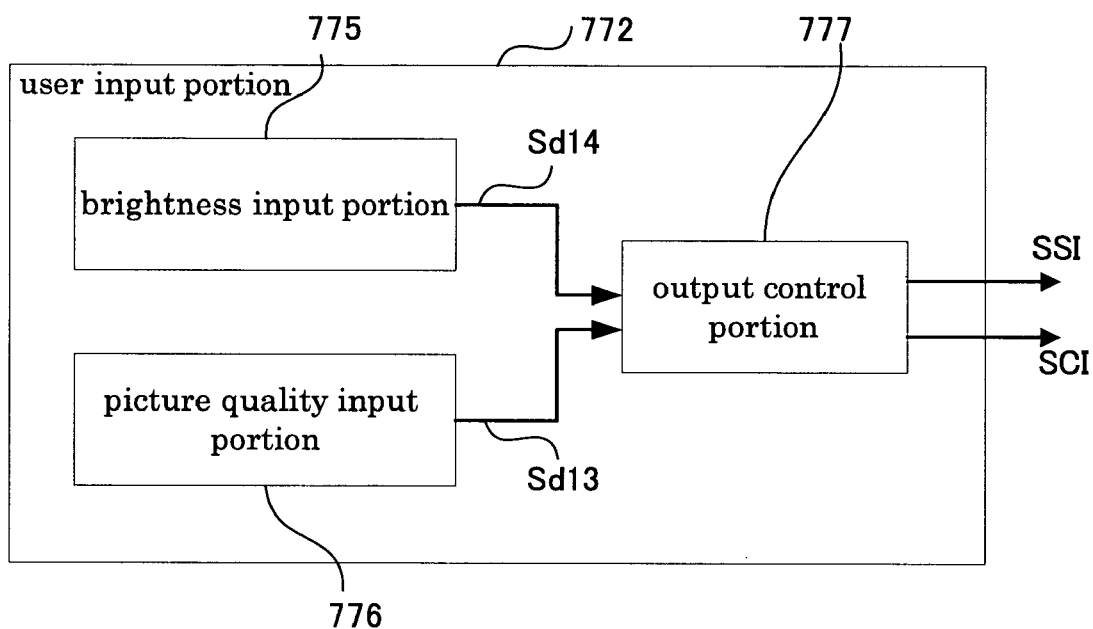
FIG. 86 is a block diagram describing the structure of the user input portion 772 (tenth embodiment).

The user input portion 772 is described below using FIG. 86.

The user input portion 772 includes a portion that allows the user to perform an input and a portion that outputs the profile information SSI and SCI based on the information that has been input.

The portion that allows the user to perform an input is constituted by a brightness input portion 775 that allows the user to input a preferred brightness, and a picture quality input portion 776 that allows the user to input a preferred picture quality.

The brightness input portion 775 is for example a switch for inputting the state of the light in the image to be displayed or a switch for inputting the state of the light in the environment in which the image will be displayed, and outputs the result of this input as a first input result Sd14. A switch for inputting the state of the light in the image to be displayed is for example a switch for inputting whether there is backlight or frontlight in the image, whether a strobe was used when the image was captured, or the state of the macro program used when the image was captured. Here, the macro program is a program for controlling the image-capturing device in accordance with the state of the object to be imaged. The switch for inputting the state of the light in the environment in which the image is to be displayed is a switch for inputting the brightness or the color temperature, for example, of the ambient light.

The picture quality input portion 776 is a switch for the user to input his or her preferred picture quality, and for example is a switch for inputting different visual effects such as default, dynamic, or classic. The picture quality input portion 776 outputs the result of this input as a second input result Sd13.

The portion for outputting the profile information SSI and SCI based on the information that has been input is made of the output control portion 777. The output control portion 777 obtains the first input result Sd14 and the second input result Sd13 and outputs the profile information SSI and SCI. More specifically, it outputs the profile information SSI and SCI of the profile data corresponding to the values of the first input result Sd14 and the second input result Sd13.

The operation of the output control portion 777 is described in greater detail below. For example, if a "backlight mode" that is "dynamic" has been input through the brightness input portion 775 and the picture quality input portion 776, then with the profile information SSI, profile information of the profile data for improving dark areas darkened by the backlight is output. On the other hand, with the profile information SCI, profile information of the profile data for not performing color processing in backlight portions is output, and thus the overall image processing of the image processing device 770 is more appropriate.

The effects attained by the image processing device 770 are described below.

With the image processing device 770, it is possible to achieve image processing with profile data that is suited for the preferences of the user. Further, because it is possible to output different profile information SSI and SCI to the color visual processing device 745 and the color processing device 746, the two can be kept from performing overlapping or deleterious image processing. Also, because different profile information SSI and SCI are output to the color visual processing device 745 and the color processing device 746, respectively, the amount of information of the profile information SSI and SCI that must be taken into account by each device can be reduced, and this allows selection of the profile data to be performed more easily.

(8)

It is also possible for the image processing device 723 to be a device that segregates the property information included in the input image signal d362 and selects profile data based on the segregated property information and uses these to perform image processing.

<<8-1>> Configuration of the Image Processing Device 800

Figure 87:
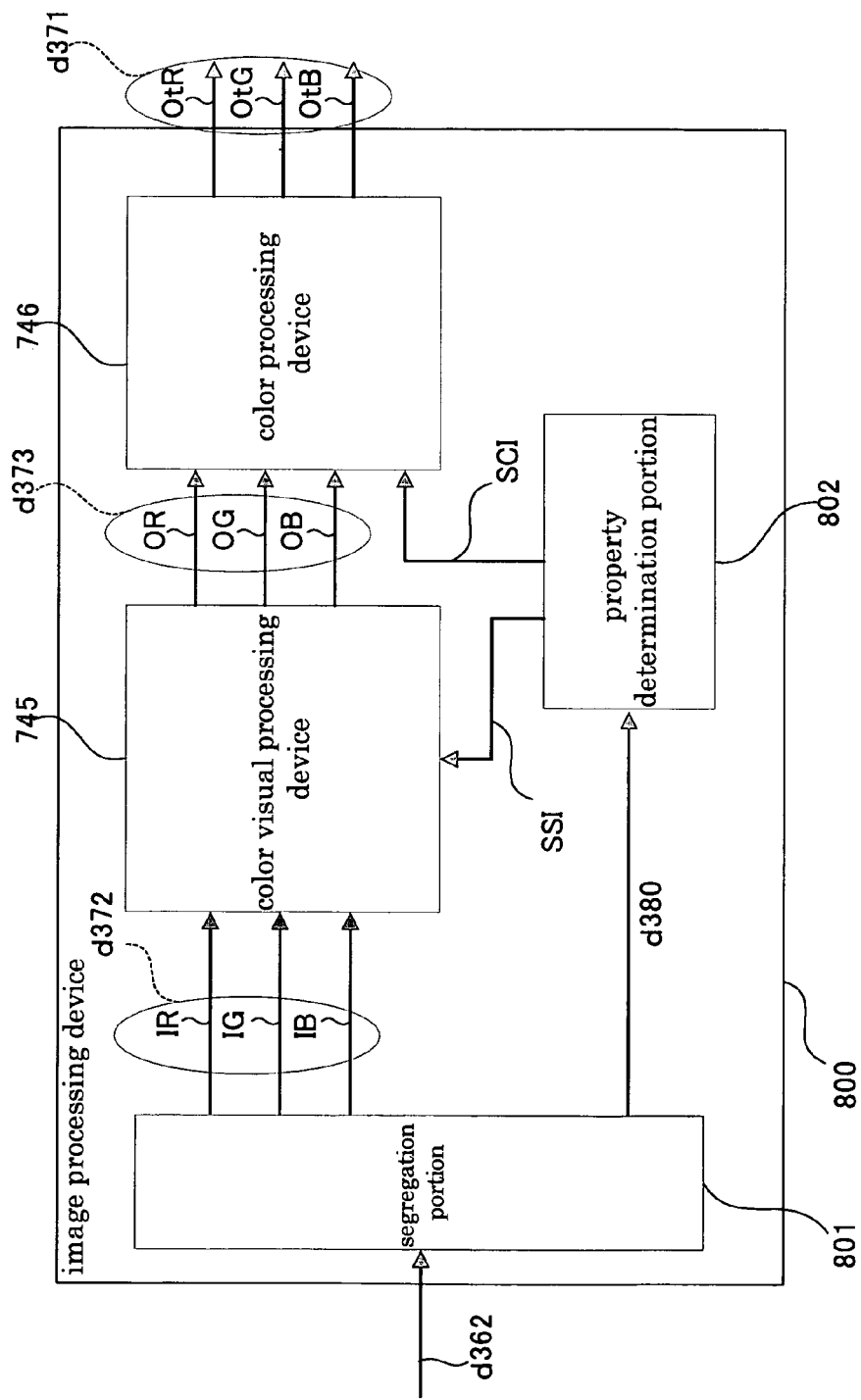
FIG. 87 is a block diagram describing the structure of the image processing device 800 (tenth embodiment).

FIG. 87 shows an image processing device 800 serves as a modified example of the image processing device 723. The image processing device 800 is characterized in that it is provided with a segregation portion 801 for segregating the property information d380 from the input image signal d362, and in that it outputs the profile information SSI and SCI based on the property information d380 that is obtained by segregation.

The image processing device 800 shown in FIG. 87 is provided with the segregation portion 801 for segregating the input image data d372 and the property information d380 from the input image signal d362, a property determination portion 802 for outputting profile information SSI and SCI based on the property information d380, the color visual processing device 745 for performing visual processing based on the input image data d372 and the profile information SSI, and the color processing device 746 for performing color processing based on the color visually processed signal d373 and the profile information SCI. It should be noted that sections that have substantially the same function as those of the foregoing embodiment are assigned identical reference numerals and are omitted from the following description.

The segregation portion 801 segregates the input image data d372 and the property information d380 from the input image signal d362. The property information d380 is information arranged at the header portion, for example, of the input image signal d362 that is related to the properties of the input image signal d362. The segregation portion 801 segregates the property information d380 by reading the input image signal d362 by a predetermined number of bits from its start. It should be noted that the property information d380 can also be information that is disposed at the rear end of the input image signal d362. Alternatively, it can also be disposed in a separable state along with flag information within the input image signal d362.

Figure 88:
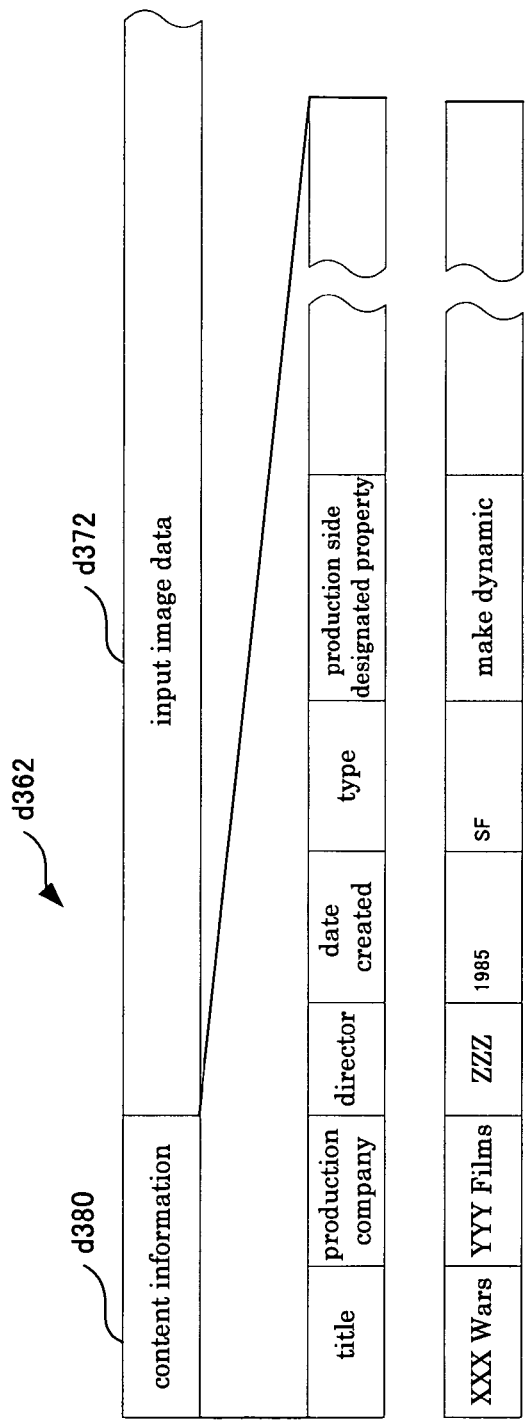
FIG. 88 is an example of the format of the input image signal d362 (tenth embodiment).

FIG. 88 shows an example of the format of the input image signal d362 including the property information d380. In the input image signal d362 shown in FIG. 88, content information serving as the property information d380 is disposed at the front end portion of the data, and subsequent to this the input image data d372 are disposed.

The content information is a property that relates to the overall content of the input image data d372, and includes such information as the title, production company, director, date created, type, and production side designated properties, for example, of the input image data d372. Here, "type" is information related to the type of the content, and for example includes information such as SF, action, drama, or horror. The "production side designated properties" are information related to the display characteristics designated by the content production side, and for example include information such as dynamic or frightening.

The property determination portion 802 outputs the profile information SSI and SCI based on the property information d380 that has been obtained by separation.

Figure 89:
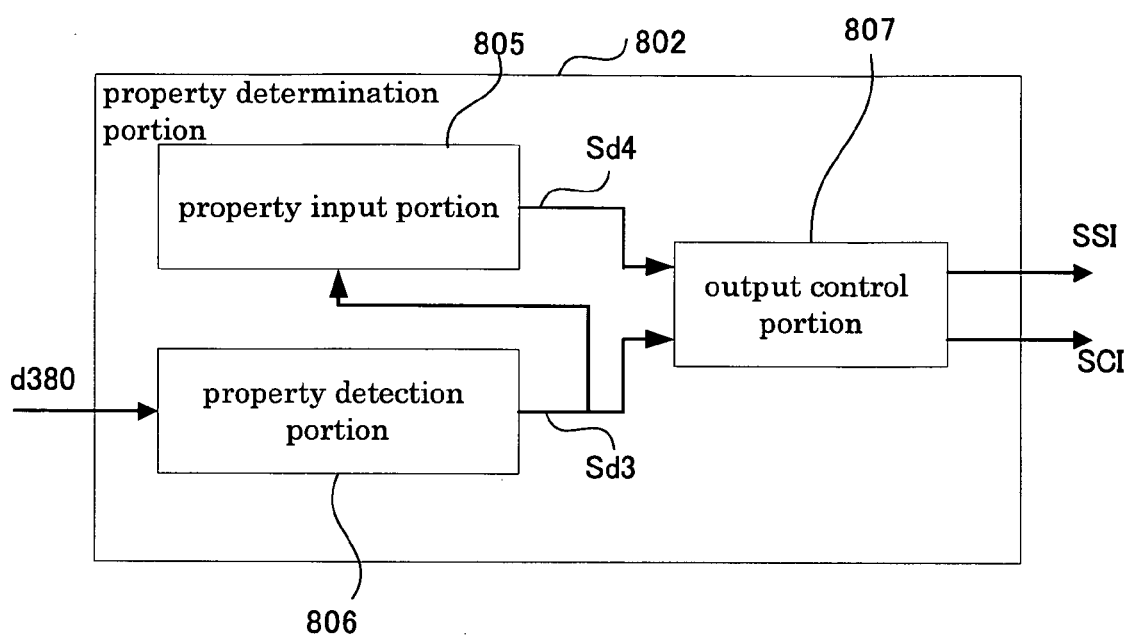
FIG. 89 is a block diagram describing the structure of the property determination portion 802 (tenth embodiment).

The structure of the property determination portion 802 is described using FIG. 89. The property determination portion 802 is provided with a property detection portion 806, a property input portion 805, and an output control portion 807.

The property detection portion 806 detects content information included in the property information d380 and outputs this as a detected information Sd3.

The property input portion 805 is a device that allows the user to input content information. The property input portion 805 obtains the detected information Sd3 and updates the information contained in the detected information Sd3, or adds information that is not included in the detected information Sd3, and outputs the result as an input information Sd4.

Here, the property input portion 805 is a device that allows the user to input content information, and outputs the content information that has been input as input information Sd4. The property input portion 805 for example can be a switch and a circuit that senses input from the switch, or can be software for operating an input user interface that is displayed on the display portion 721 or on the property input portion 805 itself. Further, it can be provided inside the display device 720 or it can be a device through which information is input over a network, for example.

It should be noted that with the property input portion 805, the content information that the user can input is restricted in accordance with the content information that is included in the detected information Sd3. For example, if the property detection portion 806 has detected that the input image data d372 type is "animation," then it can be possible to limit the content that can be input through the property input portion 805 to fields related to animation (e.g. animation director, animation title).

The output control portion 807 obtains the detected information Sd3 and the input information Sd4 and outputs the profile information SSI and SCI.

The following is a more detailed description of the operation of the output control portion 807. The output control portion 807 obtains the content of the property information d380 from the detected information Sd3 and the input information Sd4. It then chooses profile data for performing image processing that is favorable for an image having the property information d380. For example, the output control portion 807 references a database that stores the relationship between the various fields of the property information d380 and the profile data, and from this determines the profile data. Here, if the output control portion 807 has obtained different values for content information of the same field from the detected information Sd3 and the input information Sd4, then it can give priority to the information from one of two. For example, it is possible to always give priority to using the input information Sd4.

The output control portion 807 then outputs profile information SSI and SCI including at least one of the profile data that have been chosen, tag information such as the number specifying the profile data that have been chosen, and parameter information showing the characteristics of the processing of the profile data that have been chosen.

Detailed information on the profile information SSI and SCI can be found in the preceding embodiment and thus will not be repeated here.

The color visual processing device 745 and the color processing device 746 determine the profile data to be used for image processing from the profile information SSI and SCI, and then perform image processing. For example, if the profile information SSI and SCI include profile data, then those profile data are used to perform image processing. On the other hand, if the profile information SSI and SCI contain tag information or parameter information, then the profile data specified by that information unit are used to perform image processing.

It should be noted that it is also possible for the output control portion 807 to output the fields of the content information obtained from the detected information Sd3 and the input information Sd4 as the profile information SSI and SCI. In this case, the color visual processing device 745 and the color processing device 746 specify the profile data to be used for image processing from the profile information SSI and SCI and then perform image processing.

<<8-2>> Effects (1)

It is possible to perform image processing that uses appropriate profile data for the content information at the time of content creation. Thus, the original intent of the producers of the content can be reflected in the image processing that is performed.

More specifically, it is possible to determine the overall brightness and color temperature tendency of the image based on the title or production company, for example, and then to perform image processing that transforms the brightness or color temperature of the overall image. Also, the production side designated properties, for example, allow the image to be displayed in the way that the producers originally intended.

(2)

The property determination portion 802 is provided with not only the property detection portion 806, which automatically detects content information, but also with the property input portion 805, which allows content information to be input manually. Thus, should a problem arise in detection of the content information, it is possible to suitably input content information through the property input portion 805 and thereby perform suitable image processing. Moreover, the property input portion 805 also allows user preferences to be reflected in the image processing. For example, it is possible to reflect the user's preferences in the final image, such as obtaining an image with enhanced sharpness in the case of animation or a vivid image in the case of a feature film. It is additionally possible to correct the content information of an image that has been corrected, as with the digital master.

(3)

The profile information SSI and SCI can be independently given to the color visual processing device 745 and the color processing device 746. Thus, even in a case where a plurality of values have been specified as the content information type, such as a case in which "action and horror" have been specified, the color visual processing device 745 can suitably process areas where there is to be a great deal of movement, as in action scenes, while the color processing device 746 can suitably perform color processing of portions in which the coloring is to have a psychological effect, as in horror scenes.

Further, because different profile information SSI and SCI are output to the color visual processing device 745 and the color processing device 746, respectively, the information amount of the profile information SSI and SCI that must be taken into account by each of these devices can be reduced, and this allows the profile data to be selected more easily.

<<8-3>> Modified Examples (1)

It is also possible to repeatedly use content information that has already been obtained. In this case, the profile data to be used for image processing can be specified using the stored content information without obtaining all of the information again.

(2)

The image processing device 800 can also be a device that is not provided with one of either the property input portion 805 or the property detection portion 806. Also, it is not absolutely necessary that the segregation portion 801 is provided inside the image processing device 800.

(3)

It is not absolutely necessary for the profile information SSI and SCI to be different information, and they can also be the same information.

(4)

It is also possible for the property information d380 to include information other than content information. Specifically, it can also include scene property information on properties relating to some of the input image data, image-capture property information relating to the environment in which the input image signal d362 was created, broadcast property information relating to the media up to when the input image signal d362 is obtained by the display device 720, recording property information relating to the medium/device on which the input image signal d362 is recorded, and profile property information relating to the profile data to be used for image processing. Each of these will be described in more specific detail below.

It should be noted that the following description separately addresses cases in which the property information d380 includes only one of the scene property information, image-capture property information, broadcast property information, recording property information, and profile property information, but the property information d380 can include all or a combination of any number of these information types including the content information. In this case, the effect of each information is even greater.

(4-1) Scene Property Information (4-1-1)

Figure 90:
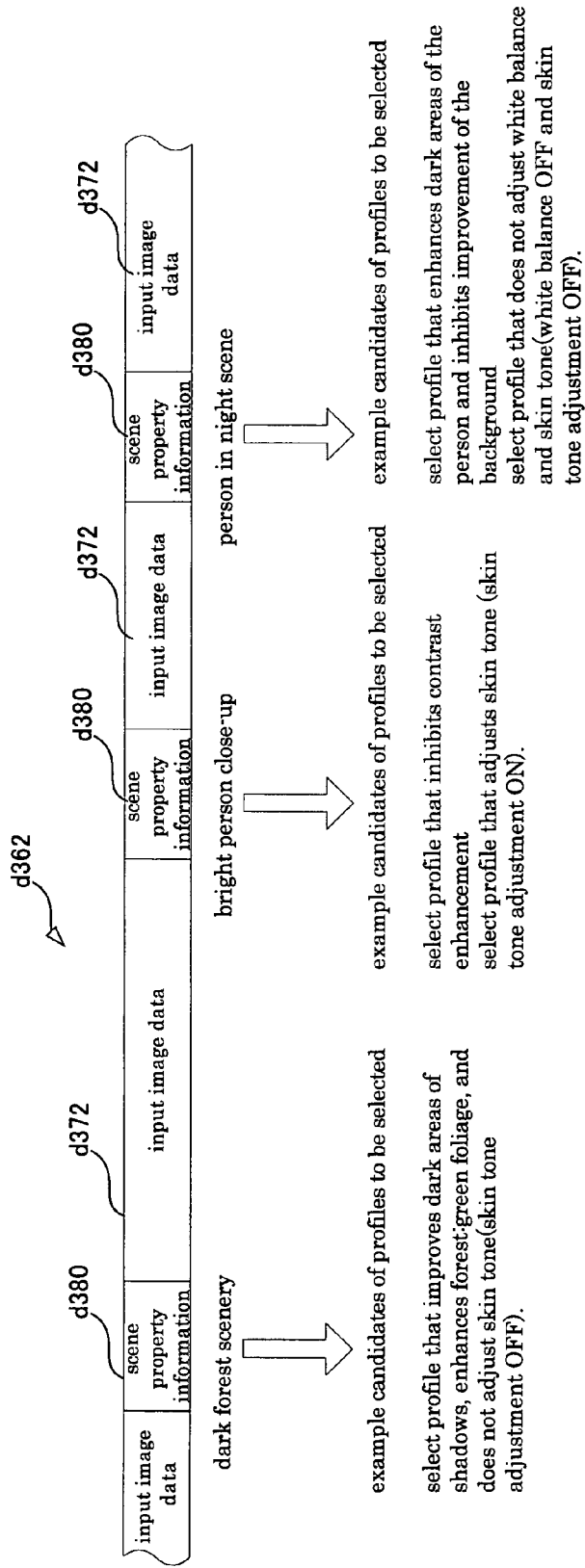
FIG. 90 is an example of the format of the input image signal d362 (tenth embodiment).

FIG. 90 shows the format of an input image signal d362 that includes scene property information as property information d380. In the input image signal d362 shown in FIG. 90, the scene property information is arranged in units of the scenes of the input image data d372. The scene property information is for example disposed along with flag information, for example, in a state where it can be segregated from the input image data d372.

The scene property information is information describing the scene content of the subsequent input image data d372. For example, the scene property information is described as a combination of fields such as "brightness," "target," "action," and "scene overview," and includes content such as "dark, forest, scenery," "bright, person, close-up," and "dark, person, scenery." It should be noted that these are only examples of scene property information and there is no limitation to these. For example, "scene overview" can specify information such as news, sports, soap opera, and action.

The image processing device for performing image processing of an input image signal d362 that includes scene property information is the same as the device obtained by configuring the image processing device 800 for scene property information.

The segregation portion 801 (see FIG. 87) segregates the property information d380 based on the format shown in FIG. 90.

The property detection portion 806 (see FIG. 89) detects the scene property information included in the property information d380 and outputs the result as detected information Sd3. The property input portion 805 allows the user to input scene property information.

The output control portion 807 (see FIG. 89) obtains the detected information Sd3 and the input information Sd4 and outputs profile information SSI and SCI. For example, the output control portion 807 references a database that stores the relationship between profile data and the various fields of the scene property information obtained from the detected information Sd3 and the input information Sd4 and chooses the profile data to be used by the color visual processing device 745 and the color processing device 746.

A detailed description of the profile information SSI and SCI can be found in the above embodiment and thus will not be repeated here. It should be noted that the profile information SSI and SCI can also include scene property information. In this case, the color visual processing device 745 and the color processing device 746 select the profile data to be used in the image processing from the scene property information that they have obtained and then perform image processing.

The operations of the various portions of the image processing device 800 are the same as those when the property information d380 includes content information, and thus will not be described here.

(4-1-2)

With the present aspect of the invention, it is possible to obtain the same effects as those discussed in the foregoing embodiment. The following is a discussion of the effects that are features of the present modified example.

It becomes possible to perform visual processing that utilizes profile data that are suited for the scene property information. Thus, image processing can be performed taking into consideration the original intent of the content production side.

The scene property information are disposed as necessary for each scene of the input image data d372. Thus, it becomes possible to switch the image processing with more detail, and this allows more suitable image processing to be performed.

For example, if the scene property information "dark, forest, scenery" is obtained from the detected information Sd3 and the input information Sd4, then the output control portion 807 outputs profile information SSI that specifies "profile data that improves dark shadow areas" and profile information SCI that specifies "profile data with which the memory color correction of foliage green is performed but the memory color correction of skin tone is not performed."

Alternatively, if the scene property information "bright, person, close-up" is obtained from the detected information Sd3 and the input information Sd4, then the output control portion 807 outputs profile information SSI that specifies "profile data that inhibits contrast enhancement" and profile information SCI that specifies "profile data with which the memory color correction of skin tone is performed."

Yet further, if the scene property information "dark, person, scenery" is obtained from the detected information Sd3 and the input information Sd4, then the output control portion 807 outputs profile information SSI that specifies "profile data that enhances dark areas of the person and inhibits dark area improvement of the background" and profile information SCI that specifies "profile data for not performing adjustment of the white balance and the memory color correction of skin tone."

Also, for example if the scene property information "person, drama" is obtained from the detected information Sd3 and the input information Sd4, then the main object to be processed in the image is a person. Thus, to the color visual processing device 745 the output control portion 807 outputs profile information SSI that specifies profile data with which the contrast of skin tone, low luminance regions is improved but the contrast of other low luminance regions is not improved. In contrast to this, to the color processing device 746 it outputs profile information SCI that specifies profile data with which the memory correction of skin tone is performed and the correction of the other memory colors, such as foliage green, is lessened.

The profile data are selected based on not only the scene property information that has been automatically detected by the property detection portion 806 but also on the scene property information that has been input by the user. It is thus possible to further improve the picture quality that is subjective to the user.

In the case of a series of scenes, such as a character movement scene in which the orientation of the sunlight in the background gradually changes, it is possible to add scene property information for each individual scene as well as to add scene property information to the initial scene only. Here, it is possible to first add scene property information to the initial scene and then to the subsequent continuous scenes add information on the change in brightness or the change in the target object from the initial scene as scene property information. By doing this, it is possible to suppress flickering or sudden changes in the picture quality when processing a moving image.

(4-2) Image-Capture Property Information (4-2-1)

Figure 91:
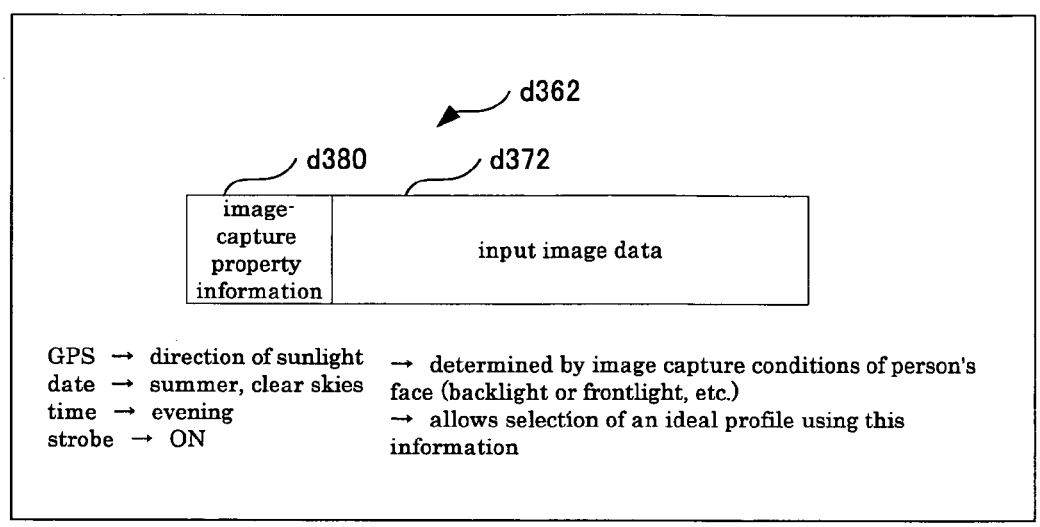
FIG. 91 is an example of the format of the input image signal d362 (tenth embodiment).

FIG. 91 shows the format of an input image signal d362 that includes image-capture property information as property information d380. In the input image signal d362 shown in FIG. 91, the image-capture property information is arranged at the header portion of the input image signal d362. It should be noted that the image-capture property information is not limited to this, and for example can be disposed along with flag information, for example, in a state where it can be segregated from the input image data d372.

The image-capture property information is information that gives a description of the image-capture conditions of the subsequent input image data d372. As an example, the image-capture property information is described by a combination of fields such as "position/direction," "date," "time," and "image-capturing device information." "Position/direction" is information that is obtained from a GPS, for example, at the time of image capture. "Image-capturing device information" is information on the device at the time of image capture, and includes information such as whether there is a strobe light, information on the stop and the shutter speed, and whether it is a macro shot (close-up shot). It should be noted that these are only examples of the image-capture property information, and there is no limitation to these. For example, the image-capture property information can also be information for specifying a macro program (a program for executing a combination of controls of for example the stop, the shutter speed, and whether or not there is a strobe, for example) that is used at the time of image capture.

The image processing device for performing image processing of an input image signal d362 that includes image-capture property information is the same as the device obtained by configuring the image processing device 800 for image-capture property information.

The segregation portion 801 (see FIG. 87) segregates the property information d380 based on the format shown in FIG. 91.

The property detection portion 806 (see FIG. 89) detects the image-capture property information included in the property information d380 and outputs the result as detected information Sd3. The property input portion 805 allows the user to input image-capture property information.

The output control portion 807 (see FIG. 89) obtains the detected information Sd3 and the input information Sd4 and outputs profile information SSI and SCI. For example, the output control portion 807 for example references a database that stores the relationship between profile data and the various fields of the image-capture property information obtained from the detected information Sd3 and the input information Sd4 and chooses the profile data to be used by the color visual processing device 745 and the color processing device 746. A detailed description of the profile information SSI and SCI can be found in the above embodiment and thus will not be repeated here.

It should be noted that the profile information SSI and SCI can also include image-capture property information. In this case, the color visual processing device 745 and the color processing device 746 select the profile data to be used in the image processing from the image-capture property information that they have obtained and then perform image processing.

The operations of the various portions of the image processing device 800 are the same as the case in which the property information d380 includes content information, and thus will not be described here.

(4-2-2)

With the present aspect of the invention, it is possible to obtain the same effects as those discussed in the foregoing embodiment. The following is a discussion of the effects that are features of the present modified example.

It becomes possible to perform visual processing that utilizes profile data that are suited for the image-capture property information. Thus, image processing can be performed taking into consideration the original intentions of the content production side.

For example, information such as "direction of sun," "season," "weather," "color of sunlight," and "strobe presence" of the environment in which the input image data d372 were created is obtained from fields such as "position/direction," "date," "time," and "image-capturing device information," and from this information it is possible to analyze the conditions under which the image of the object was captured (for example, in frontlight or backlight). Then, image processing can be performed using profile data that are suited for the analyzed image-capture conditions.

The profile data are selected based on not only the image-capture property information that has been automatically detected by the property detection portion 806 but also on the image-capture property information that has been input by the user. It is thus possible to further improve the picture quality that is subjective to the user.

(4-3) Broadcast Property Information (4-3-1)

Figure 92:
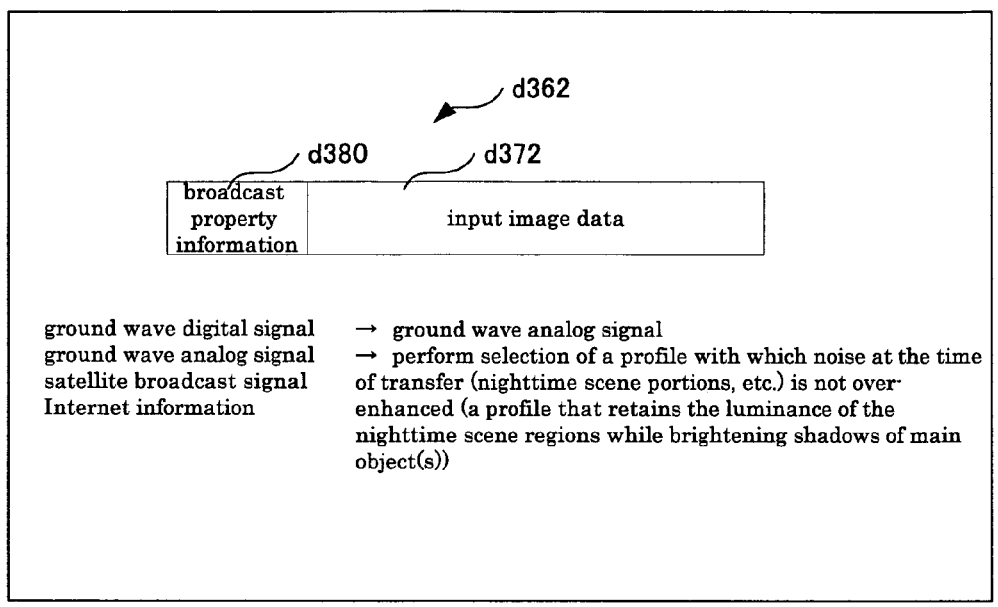
FIG. 92 is an example of the format of the input image signal d362 (tenth embodiment).

FIG. 92 shows the format of an input image signal d362 that includes broadcast property information as property information d380. With the input image signal d362 shown in FIG. 92, the broadcast property information is arranged at the header portion of the input image signal d362. It should be noted that the broadcast property information is not limited to this, and for example can also be disposed along with flag information, for example, in a state where it can be segregated from the input image data d372.

The broadcast property information is information that is related to the media up to reception of the input image signal d362 by the display device 720. In particular, it is information related to the broadcasting format in which the input image signal d362 is obtained. For example, the broadcast property information includes a value that indicates one of "ground wave digital broadcast," "ground wave analog broadcast," "satellite digital broadcast," "satellite analog broa dcast," and "Internet broadcast."

The image processing device for performing image processing of an input image signal d362 that includes broadcast property information is the same as the device obtained by configuring the image processing device 800 for broadcast property information.

The segregation portion 801 (see FIG. 87) segregates the property information d380 based on the format shown in FIG. 92.

The property detection portion 806 (see FIG. 89) detects the broadcast property information included in the property information d380 and outputs the result as detected information Sd3. The property input portion 805 allows the user to input broadcast property information.

The output control portion 807 (see FIG. 89) obtains the detected information Sd3 and the input information Sd4 and outputs profile information SSI and SCI. For example, the output control portion 807 for example references a database that stores the relationship between the profile data and the various fields of the broadcast property information obtained from the detected information Sd3 and the input information Sd4 and chooses the profile data to be used by the color visual processing device 745 and the color processing device 746. A detailed description of the profile information SSI and SCI can be found in the above embodiment and thus will not be repeated here.

It should be noted that the profile information SSI and SCI can also include broadcast property information. In this case, the color visual processing device 745 and the color processing device 746 select the profile data to be used in image processing from the broadcast property information that they have obtained and then perform image processing.

The operations of the various portions of the image processing device 800 are the same as the case in which the property information d380 includes content information, and thus will not be described here.

(4-3-2)

With the present aspect of the invention, it is possible to obtain the same effects as those discussed in the foregoing embodiment. The following is a discussion of the effects that are features of the present modified example.

It becomes possible to perform visual processing that utilizes profile data that are suited for the broadcast property information. For example, it is possible to correct for the impact that the broadcast route has on the image and thus perform image processing that takes into account the original intentions of the broadcast station.

As one specific example, profile data with which transmission noise is not over-enhanced are selected for images obtained through a ground wave analog broadcast or a satellite analog broadcast. Thus, it is possible to process images in which the captured object is present in a nighttime scene using profile data for maintaining the luminance of the nighttime scene region while adding brightness to the captured object.

The profile data are selected based on not only the broadcast property information that has been automatically detected by the property detection portion 806 but also on the broadcast property information that has been input by the user. It is thus possible to further improve the picture quality that is subjective to the user.

(4-4) Recording Property Information (4-4-1)

Figure 93:
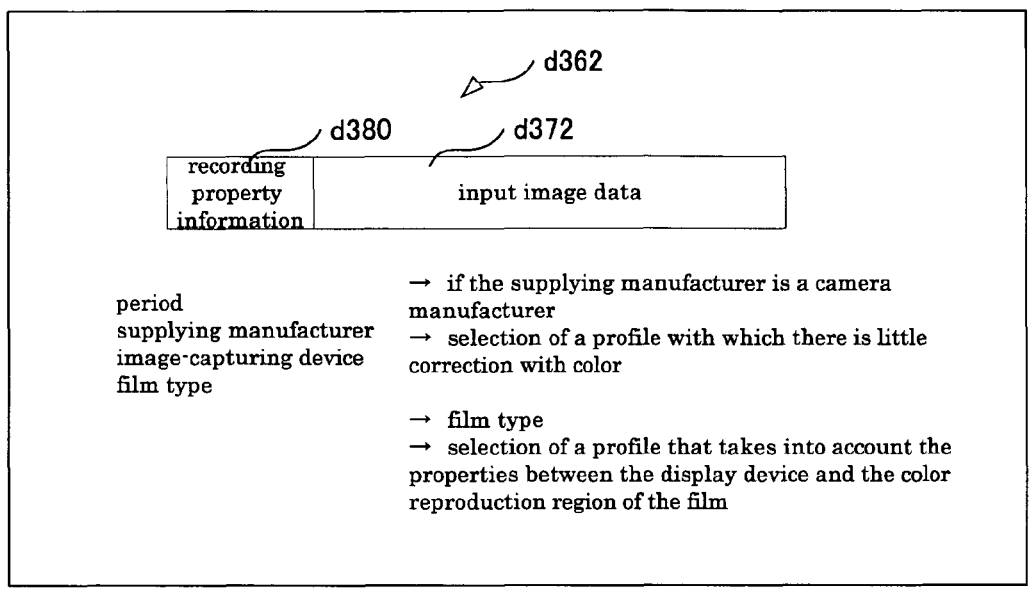
FIG. 93 is an example of the format of the input image signal d362 (tenth embodiment).

FIG. 93 shows the format of an input image signal d362 that includes recording property information as property information d380. With the input image signal d362 shown in FIG. 93, the recording property information is arranged at the header portion of the input image signal d362. It should be noted that the recording property information is not limited to this, and for example can also be disposed along with flag information, for example, in a state where it can be segregated from the input image data d372.

The recording property information is information that is related to the medium or device on which the input image signal d362 has been recorded. For example, the recording property information includes "period" in which the input image signal d362 was recorded, "supplying manufacturer" of the recording medium or device, and "product information" for specifying the recording medium or device.

The image processing device for performing image processing of an input image signal d362 that includes recording property information is the same as the device obtained by configuring the image processing device 800 for recording property information.

The segregation portion 801 (see FIG. 87) segregates the property information d380 based on the format shown in FIG. 93.

The property detection portion 806 (see FIG. 89) detects the recording property information included in the property information d380 and outputs the result as detected information Sd3. The property input portion 805 allows the user to input recording property information.

The output control portion 807 (see FIG. 89) obtains the detected information Sd3 and the input information Sd4 and outputs profile information SSI and SCI. For example, the output control portion 807 for example references a database that stores the relationship between the profile data and the recording property information obtained from the detected information Sd3 and the input information Sd4 and chooses the profile data to be used by the color visual processing device 745 and the color processing device 746. A detailed description of the profile information SSI and SCI can be found in the above embodiment and thus will not be reiterated here.

It should be noted that the profile information SSI and SCI can also include recording property information. In this case, the color visual processing device 745 and the color processing device 746 select the profile data to be used in image processing from the recording property information that they have obtained and then perform image processing.

The operations of the various portions of the image processing device 800 are the same as the case in which the property information d380 includes content information, and thus will not be described here.

(4-4-2)

With the present aspect of the invention, it is possible to obtain the same effects as those discussed in the foregoing embodiment. The following is a discussion of the effects that are features of the present modified example.

It becomes possible to perform visual processing using profile data that are suited for the recording property information. For example, if the "supplying manufacturer" is a camera manufacturer that handles color processing exclusively, then profile information SCI with which very little color processing is performed by the color processing device 746 is output. As another example, for input image data d372 recorded on film or the like, the profile information SCI that is output is for performing color processing taking into consideration the characteristics of the color expression region of the film. In this way, it is possible to correct for the effect that the recording medium or recording device has on the image so as to perform image processing that reflects the original aim of the producers.

The profile data are selected based on not only the recording property information that has been automatically detected by the property detection portion 806 but also on the recording property information that has been input by the user. It is thus possible to further improve the picture quality that is subjective to the user.

(4-5) Profile Property Information (4-5-1)

Figure 94:
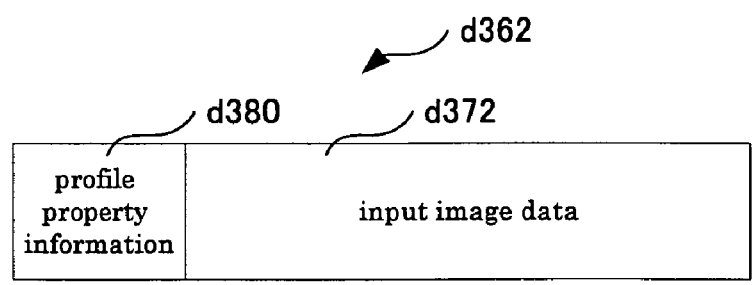
FIG. 94 is an example of the format of the input image signal d362 (tenth embodiment).

FIG. 94 shows the format of an input image signal d362 that includes profile property information as property information d380. With the input image signal d362 shown in FIG. 94, the profile property information is arranged at the header portion of the input image signal d362. It should be noted that the profile property information is not limited to this, and for example it can also be disposed along with flag information, for example, in a state where it can be segregated from the input image data d372.

The profile property information is information that is for specifying profile data, and for example is information for specifying profile data recommended by the image-capturing device that creates the input image data d372. The profile property information includes at least one of profile data, tag information such as a number that specifies profile data, and parameter information that shows the features of the processing of the profile data. The profile data, tag information, and parameter information are identical to those that were discussed when describing the profile information SSI and SCI in the above embodiment.

The profile data specified by the profile property information are profile data for performing any one image processing of the following image processing [a] to image processing [c]. Image processing [a] is the image processing determined to be favorable for the input image data d372 by the image-capturing device that creates the input image data d372, for example. The image processing [b] is image processing that, in addition to the image processing [a], is for correcting discrepancies between the properties of the display portion of the image-capturing device and the display device of the reference model. The image processing [c] is image processing that, in addition to the image processing [a], is for correcting discrepancies between the properties of the display portion of the image-capturing device and the display device 720 (see FIG. 76).

Additionally, the profile property information include process flag information on whether or not the input image data d372 included in the input image signal d362 are data that have already been processed by the image-capturing device, for example.

The image processing device performs image processing of an input image signal d362 that includes profile property information and is the same as the device obtained by configuring the image processing device 800 for profile property information.

The segregation portion 801 (see FIG. 87) segregates the property information d380 based on the format shown in FIG. 94.

The property detection portion 806 (see FIG. 89) detects the profile property information included in the property information d380 and outputs the result as detected information Sd3. The property input portion 805 allows the user to input profile property information.

The output control portion 807 (see FIG. 89) obtains the detected information Sd3 and the input information Sd4 and outputs profile information SSI and SCI. The profile information SSI and SCI can be output in the format of any one of profile data, tag information, and parameter information, regardless of the format of the profile property information (any one of profile data, tag information, or parameter information).

The operation of the output control portion 807 is described in detail below.

The output control portion 807 determines whether or not to output the information specifying the profile data, of the profile property information obtained from the detected information Sd3 or the input information Sd4, unchanged as profile information SSI and SCI.

For example, if profile data are specified by the input information Sd4, then the determination is to "output" regardless of the profile property information.

For example, if the profile property information includes information specifying profile data for performing image processing [a] or image processing [c] and the process flag information indicates "not processed," then the determination is to "output."

In all other cases the determination is to "not output."

In a case where the profile property information includes information specifying profile data for performing image processing [a] and the process flag information indicates "processed," then the output control portion 807 outputs information that specifies profile data for not performing image processing to the color visual processing device 745 and the color processing device 746 as the profile information SSI and SCI.

In a case where the profile property information includes information specifying profile data for performing image processing [b] and the process flag information indicates "not processed," then the output control portion 807 outputs information for specifying profile data that, in addition to the image processing [a], are for performing image processing for correcting discrepancies in properties between the display device of the reference model and the display device 720 as the profile information SSI and SCI.

In a case where the profile property information includes information specifying profile data for performing image processing [b] and the process flag information indicates "processed," then the output control portion 807 outputs information for specifying profile data that perform image processing for correcting discrepancies in properties between the display device of the reference model and the display device 720 as the profile information SSI and SCI.

In a case where the profile property information includes information specifying profile data for performing image processing [c] and the process flag information indicates "processed," then the output control portion 807 outputs information for specifying profile data that perform image processing for correcting discrepancies in device properties between the display portion of the image-capturing device and the display device 720 to the color visual processing device 745 and the color processing device 746 as the profile information SSI and SCI.

It should be noted that these are only examples of the processing, and there is no limitation to these.

Other than this, the operations of the various portions of the image processing device 800 are the same as the case in which the property information d380 includes content information, and thus will not be described here.

(4-5-2)

With the present aspect of the invention, it is possible to obtain the same effects as those discussed in the foregoing embodiment. The following is a discussion of the effects that are features of the present modified example.

It becomes possible to perform visual processing using profile data that are suited for the profile property information. For example, it is possible to perform image processing using the profile data recommended by the image-capturing side. Further, it is also possible to perform a display that is near the image that has been confirmed in the display portion on the image-capturing side. Thus, it is possible to perform image processing that reflects the intentions of the production side.

The profile data are selected based on not only the profile property information that has been automatically detected by the property detection portion 806 but also on profile property information that is input by the user. It is thus possible to further improve the picture quality that is subjective to the user.

Eleventh Embodiment

An image-capturing device 820 serving as an eleventh embodiment of the present invention is described using FIGS. 95 to 103.

Figure 95:
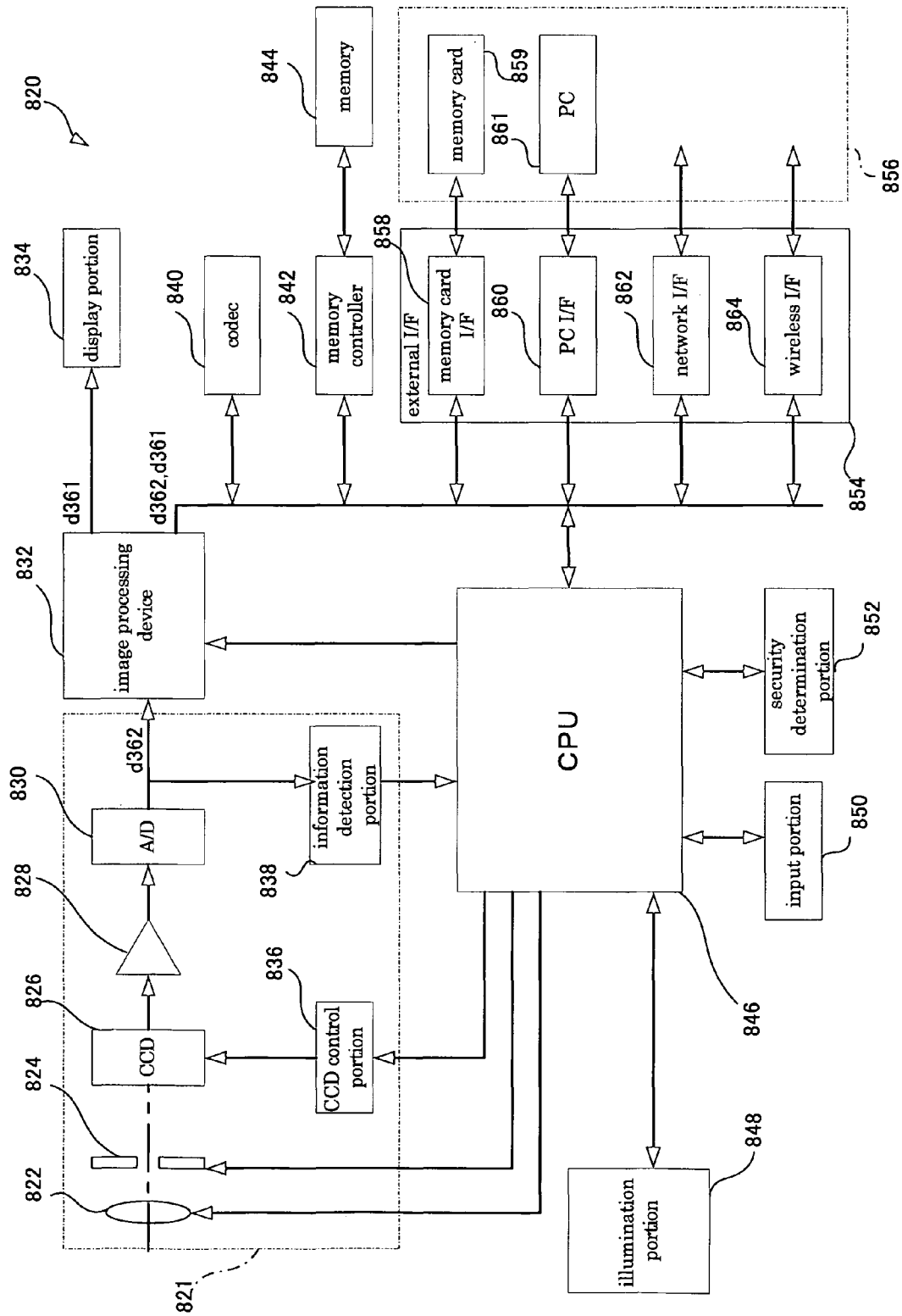
FIG. 95 is a block diagram describing the structure of the image-capturing device 820 (eleventh embodiment).

The image-capturing device 820 shown in FIG. 95 is an image-capturing device that captures images, and for example is a still camera or a video camera that performs capture of an image. The image-capturing device 820 is characterized in that it has an image processing device 832, which is inclusive of a visual processing device described in the foregoing embodiments, and in that it can automatically or manually switch between profile data to be used for visual processing. It should be noted that the image-capturing device 820 can be an independent device or a device provided in a portable information terminal such as a portable telephone, PDA, or PC.

<Image-Capturing Device 820>

The image-capturing device 820 is provided with an image-capturing portion 821, an image processing device 832, a display portion 834, a CPU 846, an illumination portion 848, an input portion 850, a security determination portion 852, a codec 840, a memory controller 842, a memory 844, an external interface (I/F) 854, and an external device 856.

The image-capturing portion 821 is a portion that captures an image and outputs an input image signal d362, and comprises a lens 822, a shop/shutter portion 824, a CCD 826, an amplifier 828, an A/D conversion portion 830, a CCD control portion 836, and an information detection portion 838.

The lens 822 is a lens for forming an image of a target object on the CCD 826. The stop/shutter portion 824 is a mechanism that controls the exposure by changing the range of transmission or the period of transmission of light beams that pass through the lens 822. The CCD 826 is an image sensor for converting the image of the object from light into an electric signal that it outputs as the image signal. The amplifier 828 is a device for amplifying the image signal that has been output from the CCD 826. The A/D conversion portion 830 is a device for converting the analog image signal that has been amplified by the amplifier 828 into a digital image signal. The CCD control portion 836 is a device for controlling the timing at which the CCD 826 is driven. The information detection portion 838 is a device that detects information such as the autofocus, stop, and exposure from the digital image signal and outputs this information to the CPU 846.

The image processing device 832 is the same image processing device as the image processing device 723 described using FIG. 77 in the [Tenth Embodiment]. The image processing device 832 is a device that receives control from the CPU 846 and performs image processing of the input image data d372 included in the input image signal d362 (see FIG. 96) and outputs the result as an output image signal d361 that includes output image data d371 (see FIG. 96). The image processing device 832 has the characteristic of including a visual processing device described in a foregoing embodiment and performing image processing using profile data. Its structure will be described in detail later using FIG. 96.

The display portion 834 is a device that displays thumbnails, for example, of the output image signals d361 output by the image processing device 832. The display portion 834 is often constituted by an LCD, but there are no particular limitations to the display portion 834 as long as it is a device that displays an image, and could also be a PDP, CRT, or projector, for example. It should be noted that it is possible for the display portion 834 to be provided inside the image-capturing device 820 as well as being connected to the image-capturing device 820 through a wired connection or over a wireless network, for example. The display portion 834 can also be connected to the image processing device 832 through the CPU 846.

The CPU 846 is connected to the image processing device 832, the codec 840, the memory controller 842, and the external I/F 854 via a bus line, and receives the result of the detection by the information detection portion 838, the result of the input through the input portion 850, information on the light emitted by the illumination portion 848, and the result of the determination by the security determination portion 852, as well as executes control of the lens 822, the stop/shutter portion 824, the CCD control portion 836, the image processing device 832, the illumination portion 848, the input portion 850, the security determination portion 852 and the various portions connected to the bus line, for example.

The illumination portion 848 is a strobe that emits illumination light to be irradiated on the target object.

The input portion 850 is a user interface for allowing the user to operate the image-capturing device 820, and is made of keys, knobs, and a remote control, for example, for controlling the various portions.

The security determination portion 852 is a portion that analyzes the security information that is obtained from the outside and performs control of the image processing device 832 via the CPU.

The codec 840 is a compression circuit that compresses the output image signal d361 from the image processing device 832 with JPEG or MPEG, for example.

The memory controller 842 performs control of the addresses and access timing of the memory 844 of the CPU, which is constituted by a DRAM, for example.

The memory 844 is constituted by a DRAM or the like, and is used as the task memory at the time of image processing, for example.

The external I/F 854 is an interface that outputs the output image signal d361, or the output signal d361 that has been compressed by the codec 840, to an external device 856 such as a memory card 859 or a PC 861, and obtains profile information, which is information on the profile data for performing image processing, and outputs this to the image processing device 832 as an input image signal d362. The profile information here is the same as that described in the [Tenth Embodiment]. The external I/F 854 includes a memory card I/F 858, a PC I/F 860, a network I/F 862, and a wireless I/F 864. It should be noted that it is not necessary for the external I/F 854 to be provided with all of the elements illustrated here.

The memory card I/F 858 is an interface for connecting the memory card 859, which stores image data or profile information, for example, and the image-capturing device 820. The PC I/F 860 is an interface for connecting the PC 861, which is an external device such as a personal computer that stores image data and profile information, for example, and the image-capturing device 820. The network I/F 862 is an interface for connecting the image-capturing device 820 to a network and sending and receiving image data or profile information, for example. The wireless I/F 864 is an interface for connecting the image-capturing device 820 to an external device via wireless LAN or the like and sending and receiving image data or profile information, for example. It should be noted that the external I/F 854 is not limited to the example shown here, and for example can also be an interface for connecting a USB or an optic fiber, for example, and the image-capturing device 820.

<Image Processing Device 832>

Figure 96:
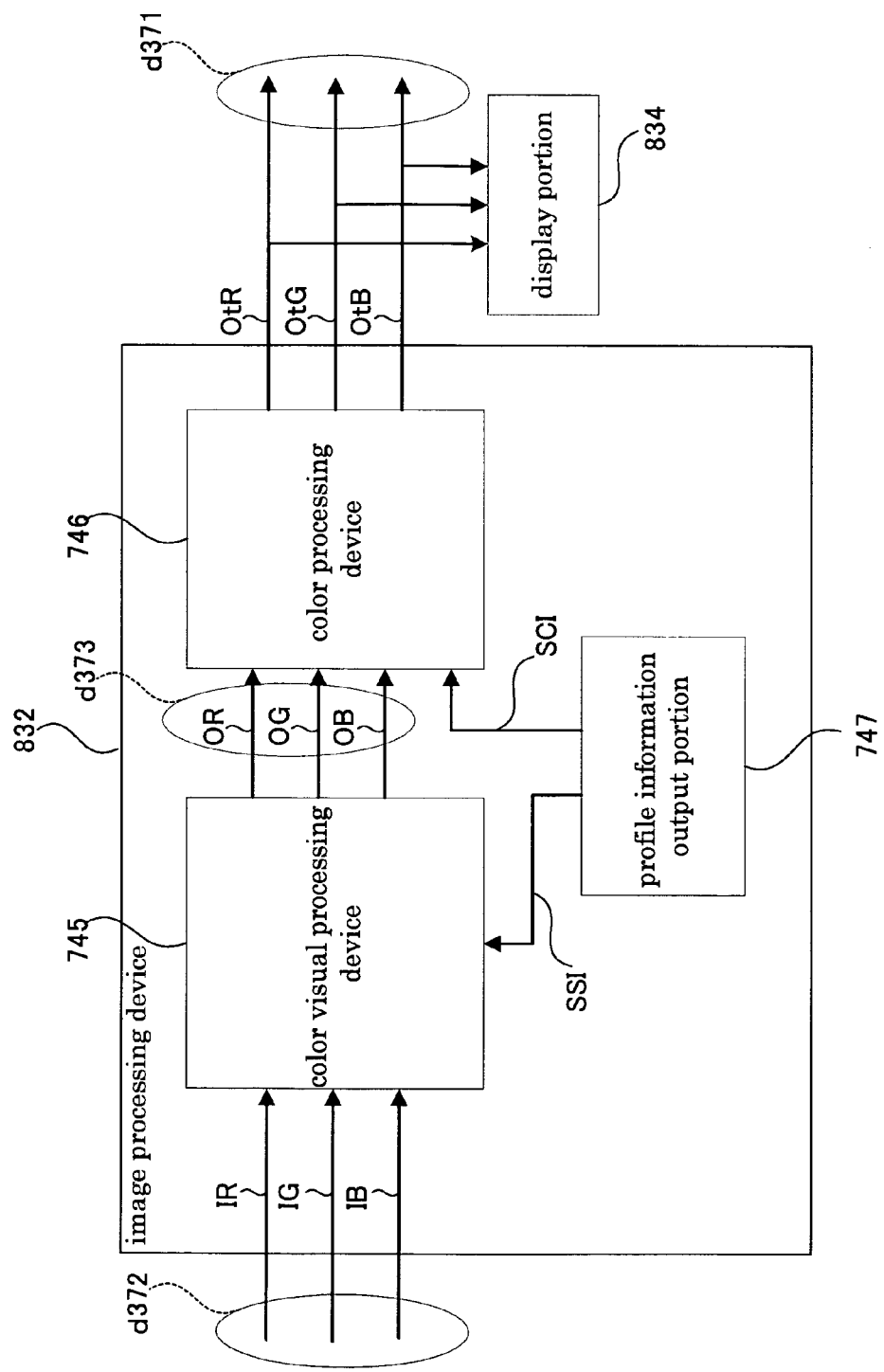
FIG. 96 is a block diagram describing the structure of the image processing device 832 (eleventh embodiment).

FIG. 96 shows the configuration of the image processing device 832. The image processing device 832 has the same configuration as the image processing device 723. In FIG. 96, portions of the image processing device 832 that have the same function as those of the image processing device 723 have been assigned identical reference numerals.

The image processing device 832 is provided with a color visual processing device 745 that performs color visual processing of the input image data d372, a color processing device 746 that performs color processing of the color visual processed signal d373, which is the output of the color visual processing device 745, and a profile information output portion 747 that outputs profile information SSI and SCI for specifying profile data to be used in color visual processing and color processing.

The operations of the various portions were described in the [Tenth Embodiment] and thus are not described in detail.

It should be noted that the environment information included in the profile information SSI and SCI in the [Tenth Embodiment] was described as "information that is related to the environment in which the processed image data are displayed and viewed," but it is also possible for the environment information to be related to the environment in which the image is captured.

<Effects of the Image-Capturing Device 820>

The image-capturing device 820 is provided with the image processing device 832, which is the same as the image processing device 723 described in the [Tenth Embodiment]. Thus, it can attain the same effects as those of the display device 720 provided with the image processing device 723 (see FIG. 76).

(1)

The image-capturing device 820 is provided with the profile information output portion 747 (see FIG. 78) and this can perform image processing using profile data that are ideal for the environment information that is obtained. In particular, the profile data are selected based on not only the automatically detected environment information but also on the environment information that is input by the user, and thus it is possible to perform image processing that has a greater visual effect from the perspective of the user.

If a lookup table is used as the profile data, then image processing is performed by referencing that table, and this makes it possible to accomplish faster image processing.

With the image-capturing device 820, different types of image processing can be achieved by changing the profile data. That is, it is possible to perform different image processing without changing the hardware configuration.

With image processing in which profile data are used, the profile data can be created in advance and thus complicated image processing can be achieved with ease.

(2)

The profile information output portion 747 of the image processing device 832 makes it possible to output different profile information to the color visual processing device 745 and the color processing device 746. Thus, it is possible to keep the color visual processing device 745 and the color processing device 746 from performing processing that overlaps or whose effects cancel each other out. That is, the image processing device 832 can suitably perform image processing.

(3)

The image-capturing device 820 is provided with a display portion 834, and this allows the appearance of the processed image to be confirmed while image capture is performed. Thus, the impression that the image gives when captured can be kept close to the impression when that captured image is displayed.

<Modified Examples>

With the image-capturing device 820, the same modifications as those described with regard to the image processing device 723 and the visual processing device 753 (see FIG. 79) in the above embodiment are possible. Those modified examples characteristic of the image-capturing device 820 are discussed below.

(1)

In the description of [Tenth Embodiment], it was explained that the information input portion 748 of the profile information output portion 747 (see FIG. 78) is an input device for the user to input environment information.

In the image-capturing device 820, it is also possible for the information input portion 748 to be a device with which it is possible to input other information in addition to or in place of environment information. For example, the information input portion 748 can be a device with which it is possible to input user input information such as the brightness or picture quality preferred by the user.

In a profile information output portion 747 of this modified example, it is possible to provide the user input portion 772 (see FIG. 86) discussed in [Tenth Embodiment]<Modified Example> (7) in addition to or in lieu of the information input portion 748. The user input portion 772 has already been described in detail in the above embodiment, and thus will not be described here further.

The output control portion 750 of the profile information output portion 747 of this modified example (see FIG. 78) outputs profile information SSI and SCI based on the user input information that has been input from the user input portion 772 and the environment information detected by the environment detection portion 749. More specifically, the output control portion 750 of this modified example outputs the profile information SSI and SCI after referencing a database of profile data associated with the value of the user input information and the value of the environment information.

Thus, with the image-capturing device 820, it is possible to achieve image processing with profile data that are suited for the preferences of the user.

(2)

Elements that achieve the same function as the portions of the image-capturing device 820 described in the foregoing embodiment can be achieved by common hardware.

For example, the input portion 850 (see FIG. 95) of the image-capturing device 820 can be a device that also serves as the information input portion 748 of the profile information output portion 747, the user input portion 772 of the profile information output portion 747 of the modified example, the input device 527 of the visual processing device 753b (see FIG. 83), and the input device 527 of the visual processing device 753c (see FIG. 84).

Further, the profile data registration device 8 of the visual processing device 753 (see FIG. 80), the profile data registration portion 521 of the visual processing device 753a (see FIG. 82), the profile data registration portion 526 of the visual processing device 753b (see FIG. 83), and the profile data registration portion 531 of the visual processing device 753c (see FIG. 84) can be provided external to the image processing device 832, and for example can be achieved by the memory 844 or the external device 856.

The profile data registered on the profile data registration portion and profile data registration device can be registered to these in advance or can be obtained from the external device 856.

The profile data registration portion and profile data registration device can also serve as a memory device storing profile data in the color processing device 746.

It is also possible for the profile information output portion 747 to be a device that is connected wirelessly or through a wired connection to portion external to the image processing device 832 or to a portion external to the image-capturing device 820.

(3)

The image processing device 832 of the image-capturing device 820 can also output profile information for specifying the profile data to be used for image processing as an output image signal d361 together with the input image data d372 or the input image data d372 after image processing.

This is described using FIGS. 97 to 101.

<<3-1>> Configuration of the Image Processing Device 886

Figure 97:
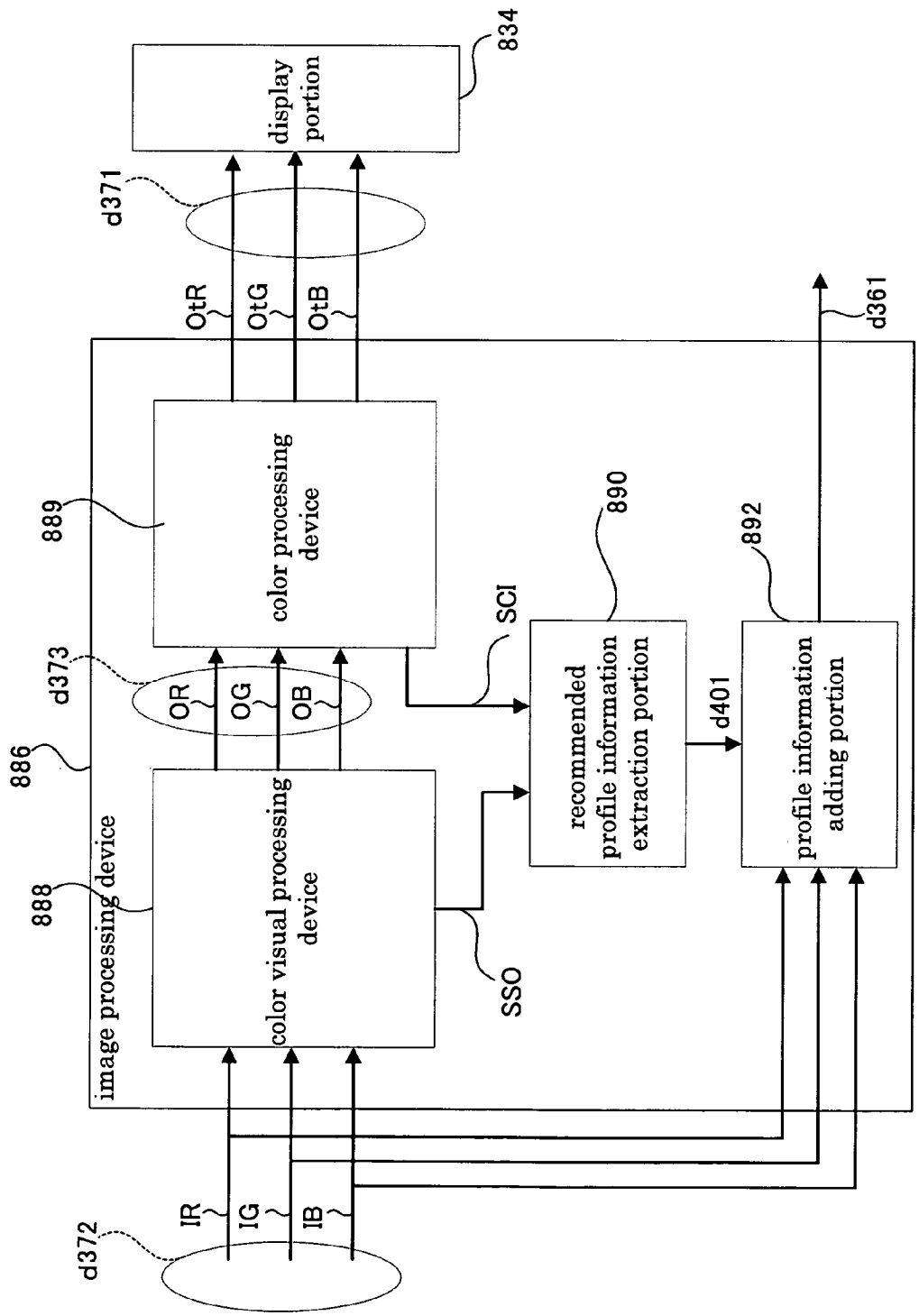
FIG. 97 is a block diagram describing the structure of the image processing device 886 (eleventh embodiment).

The configuration of the image processing device 886 serving as a modified example is described using FIG. 97. The image processing device 886 performs image processing of the input image data d372 and displays the result of this processing on the display portion 834, and also adds profile information d401 of the profile data that are favorable for image processing to the input image data d372 and outputs the result.

The image processing device 886 is provided with a color visual processing device 888, a color processing device 889, a recommended profile information extraction portion 890, and a profile information adding portion 892.

The color visual processing device 888 has substantially the same configuration as the color visual processing device 745 described in the [Tenth Embodiment], and like the color visual processing device 745, performs visual processing of the input image data d372 and outputs the result as a color visual processed signal d373.

The color visual processing device 888 differs from the color visual processing device 745 in that the visual processing device of the color visual processing device 888 is a visual processing device that is substantially the same as one of the visual processing device 1 (see FIG. 1), the visual processing device 520 (see FIG. 6), the visual processing device 525 (see FIG. 7), and the visual processing device 530 (see FIG. 8), and that also outputs recommended profile information SSO. The recommended profile information SSO is described in detail later.

The color processing device 889 has substantially the same configuration as the color processing device 746 described in [Tenth Embodiment], and like the color processing device 746 performs color processing of the color visual processed signal d373 and outputs the result as output image data d371.

The color processing device 889 differs from the color processing device 746 in that the color processing device 889 outputs the profile information of the profile data used for the color processing as recommended profile information SCO. The recommended profile information SCO is described in detail later.

The recommended profile information extraction portion 890 extracts the recommended profile information SSO and SCO and outputs that information as profile information d401.

The profile information adding portion 892 adds the profile information d401 to the input image data d372 and outputs the result as an output image signal d361.

Figure 98:
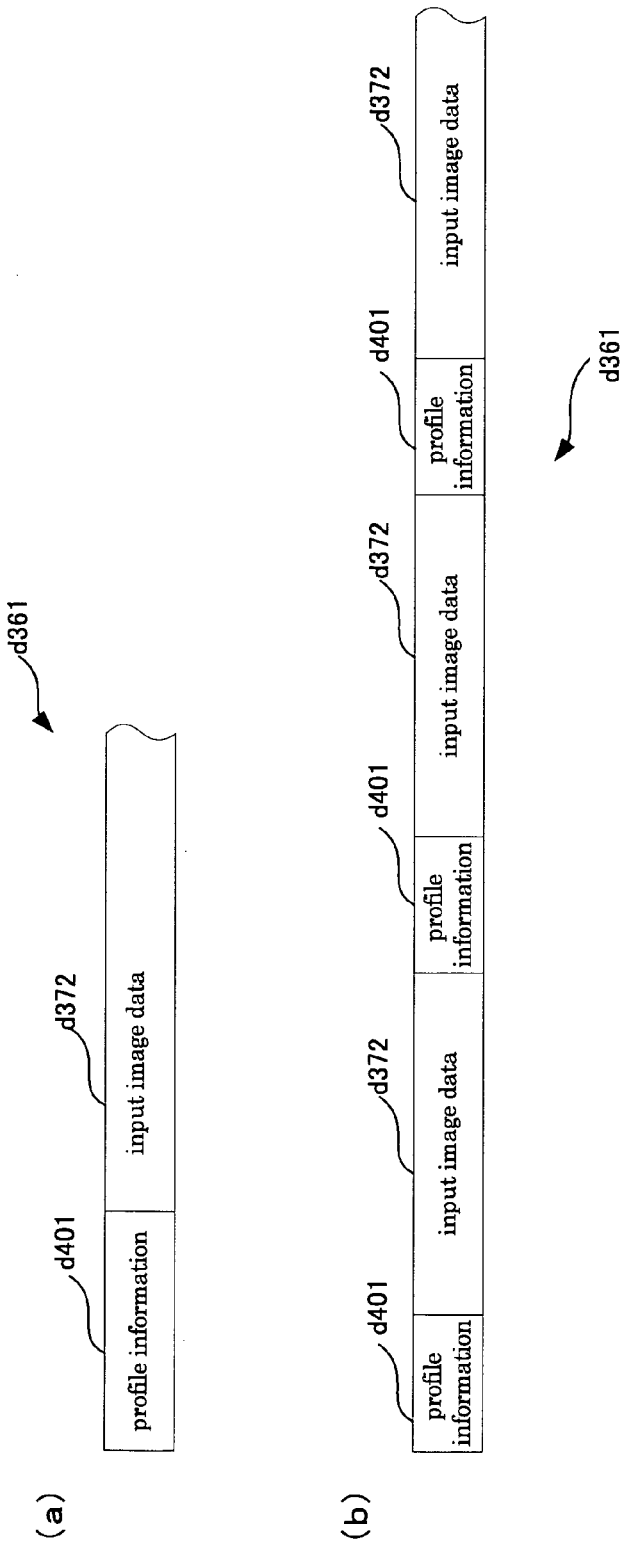
FIG. 98 is an example of the format of the output image signal d361 (eleventh embodiment).

FIG. 98 shows an example of the format of the output image signal d361 to which the profile information adding portion 892 has added the profile information d401.

In FIG. 98(a), the profile information d401 is disposed at the front portion of the output image signal d361, and the input image data d372 is disposed following the output image signal d361. With this format, all of the input image data d372 are processed using the profile information d401 at the head of the signal. Thus, the profile information d401 needs to be arranged at only one location in the output image signal d361, and therefore the proportion of the output image signal d361 composed of profile information d401 can be reduced.

In FIG. 98(b), profile information d401 is disposed for each of the plurality of input image data d372 obtained by partitioning. With this format, different profile data can be used for processing each of the input image data d372 obtained by partitioning. It is thus possible to perform image processing using different profile data for each scene of the input image data d372, allowing image processing to be carried out more appropriately.

Also, in the case of a series of continuously changing scenes, by first adding scene property information to the initial scene and then to the subsequent scenes adding only information on the fluctuation in brightness or information on the change in target object from the initial scene as scene property information, it is possible to inhibit flickering or sudden changes in picture quality, which can occur when processing moving images.

<<3-2>> Recommended Profile Information SSO, SCO

The recommended profile information SSO and SCO are information for specifying profile data, and include at least one of profile data, tag information such as a number that specifies profile data, and parameter information showing the features of the processing with the profile data. The profile data, tag information, and parameter information are the same as those discussed in the description of the profile information SSI and SCI.

The profile data specified by the recommended profile information SSO and SCO are profile data for performing any one image processing of the following image processing [a] to image processing [c]. Image processing [a] is the visual processing determined to be favorable for the input image data d372 by the color visual processing device 888, or is color processing determined to be favorable for the color visual processed signal d373 by the color processing device 889. Here, the image processing "determined to be favorable" in image processing [a] is the image processing used by the color visual processing device 888 and the color processing device 889. The image processing [b] is image processing that, in addition to the image processing [a], is for correcting discrepancies between the properties of the display portion 834 of the image-capturing device 820 and the display device of the reference model. The image processing [c] is image processing that, in addition to the image processing [a], is for performing image processing for correcting discrepancies between the properties of the display portion 834 of the image-capturing device 820 and the display device on which the image that is captured by the image-capturing device 820 is displayed.

The color visual processing device 888 and the color processing device 889 output the profile information of the profile data for performing image processing [a] as the recommended profile information SSO and SCO if the display properties are not known for the display portion 834 for confirming the image when the image is captured.

The color visual processing device 888 and the color processing device 889 output the profile information of the profile data for performing image processing [b] as the recommended profile information SSO and SCO if the display properties are known for the display portion 834 for displaying the image that is captured by the image-capturing device 820 but the display properties are not known for the display device for displaying the image that is captured by the image-capturing device 820 (such as the display device 720 for displaying captured and recorded images).

The color visual processing device 888 and the color processing device 889 output the profile information of the profile data for performing image processing [c] as the recommended profile information SSO and SCO if the display properties are known for the display portion 834 for displaying the image that is captured by the image-capturing device 820 and the display device for displaying the image that is captured by the image-capturing device 820 (such as the display device 720 for displaying captured and recorded images).

It should be noted that the above processing is only one example, and the image processing that is selected in each of these cases is not limited to the above.

<<3-3>> Effects of the Image Processing Device 886

With the image processing device 886, an output image signal d361 that includes profile information d401 is output. Thus, with the device that receives the output image signal d361, it is possible to perform image processing using preferable profile data when performing image processing of the input image data d372 of the output image signal d361.

Also, the profile information d401 includes profile information of the profile data for performing one of the image processing [a] to image processing [c]. Thus, it is possible to for example bring the image confirmed on the display portion 834 of the image-capturing device 820 and the image that is displayed by the display device that obtains the output image signal d361 to be close to one another. That is, with the display device that has obtained the profile information of the profile data for performing the image processing [b], the image processing [b] is performed with respect to the output image signal d361 in addition to image processing for correcting discrepancies with respect to the display device of the reference model, and this makes it possible to bring the displayed image closer to the image that has been confirmed on the display portion 834. Also, with the display device that has obtained the profile information of the profile data for performing the image processing [c], the image processing [c] is performed with respect to the output image signal d361, and this makes it possible to bring the displayed image closer to the image that has been confirmed on the display portion 834.

<<3-4>> Modified Examples (1) Process Flag Information

It is also possible for the output image signal d361 to further include process flag information on whether or not the input image data d372 included in the output image signal d361 are data that have been image processed by the image processing device 886. By doing this, the display device that obtains the output image signal d361 can determine whether or not the input image data d372 included in the output image signal d361 are image processed data. Thus, it is possible to keep excessive image processing or image processing whose effects are mutually deleterious from being performed by the display device.

(2) Image Processing Device

In the above description of the image processing device 886, it was explained that "the profile information adding portion 892 adds the profile information d401 to the input image data d372 and outputs the result."

Here, it is also possible for the profile information adding portion 892 to add profile information d401 to the output image data d371, which is the result obtained by image processing the input image data d372.

Figure 99:
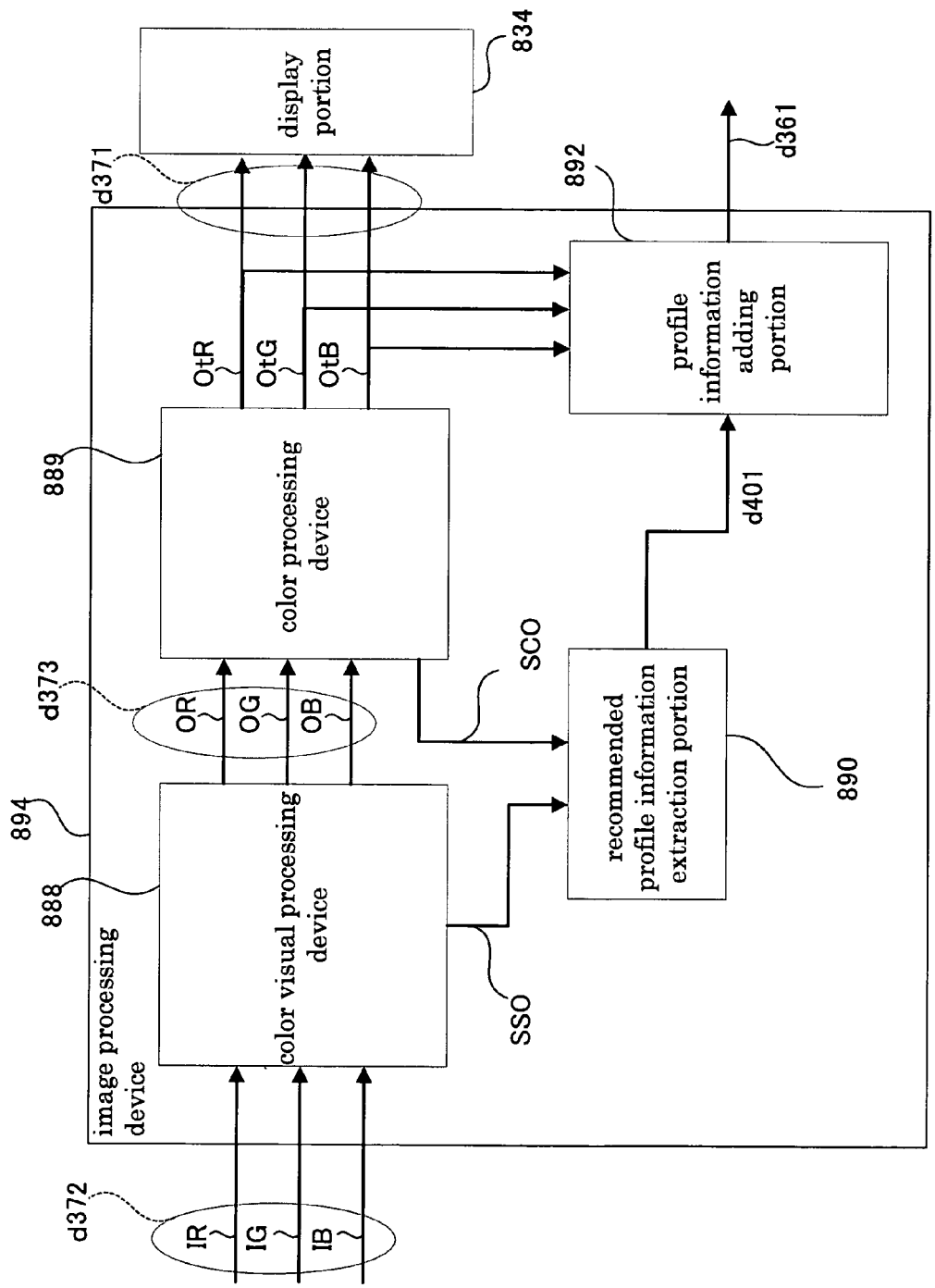
FIG. 99 is a block diagram describing the structure of the image processing device 894 (eleventh embodiment).

FIG. 99 shows an image processing device 894 serving as a modified example of the image processing device 886. Portions having the same functions as the portions of the image processing device 886 are shown assigned identical reference numerals. The image processing device 894 shown in FIG. 99 has the characteristic that the profile information adding portion 892 adds the profile information d401 to the output image data d371.

With the image processing device 894 of FIG. 99, the profile data specified by the recommended profile information SSO and SCO are profile data for performing any one of the following image processing [a'] to image processing [c']. Image processing [a'] is the visual processing determined to be favorable for the input image data d372 by the color visual processing device 888, or is color processing determined to be favorable for the color visual processed signal d373 by the color processing device 889. Here, the image processing "determined to be favorable" for image processing [a'] is the respective image processing used by the color visual processing device 888 and the color processing device 889. The image processing [b'] is image processing for correcting discrepancies between the properties of the display portion 834 of the image-capturing device 820 and the display device of the reference model. The image processing [c'] is image processing for correcting discrepancies between the properties of the display portion 834 of the image-capturing device 820 and the display device on which the image that is captured by the image-capturing device 820 is displayed.

The operations of the other portions will be omitted here.

With the image processing device 894, it is for example possible for the display device that has obtained the profile information of the profile data for performing the above image processing [a'] to reproduce the input image data d372 by performing the opposite transformation to that of the image processing [a']. It is also possible for the display device, when it has obtained the profile information of the profile data for performing the image processing [a'], to execute a command to keep further color visual processing or color processing from being performed. Further, with the display device, when it has obtained the profile information of the profile data for performing the above image processing [b'], by performing image processing to correct discrepancies with respect to the display device of the reference model it is possible to bring the displayed image closer to the image that has been confirmed on the display portion 834. Further, when the display device has obtained the profile information of the profile data for performing the above image processing [c'], by performing the image processing [c'], it can bring the displayed image closer to the image that has been confirmed on the display portion 834.

With the image processing device 894, it is also possible to output an output image signal d361 that includes the processed flag information discussed above in (4-1). By doing this, it becomes possible for the display device that has obtained the output image signal d361 to determine that the output image data d371 included in the output image signal d361 are data that have been image processed, and this makes it possible to prevent excessive image processing or image processing whose effects cancel each other out in the display device from being performed.

(3) Image Processing Device

The image processing device 886 and the image processing device 894 discussed above can also be devices that are provided with a user input portion 897 that is like the user input portion 772 (see FIG. 86) discussed in [Tenth Embodiment] <Modified Example> (7), and allow user input to be reflected in the selection of profile data.

Figure 100:
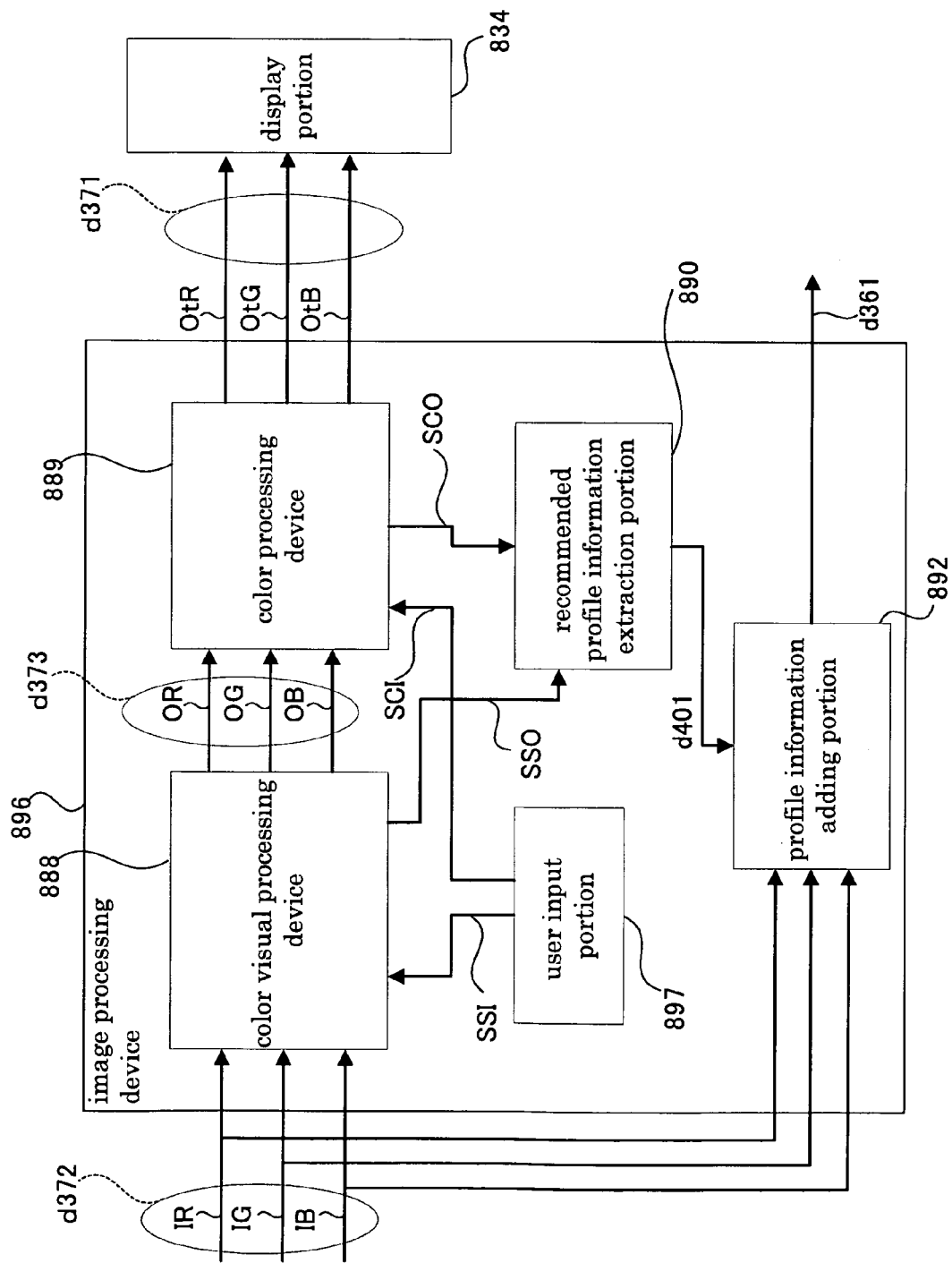
FIG. 100 is a block diagram describing the structure of the image processing device 896 (eleventh embodiment).
Figure 101:
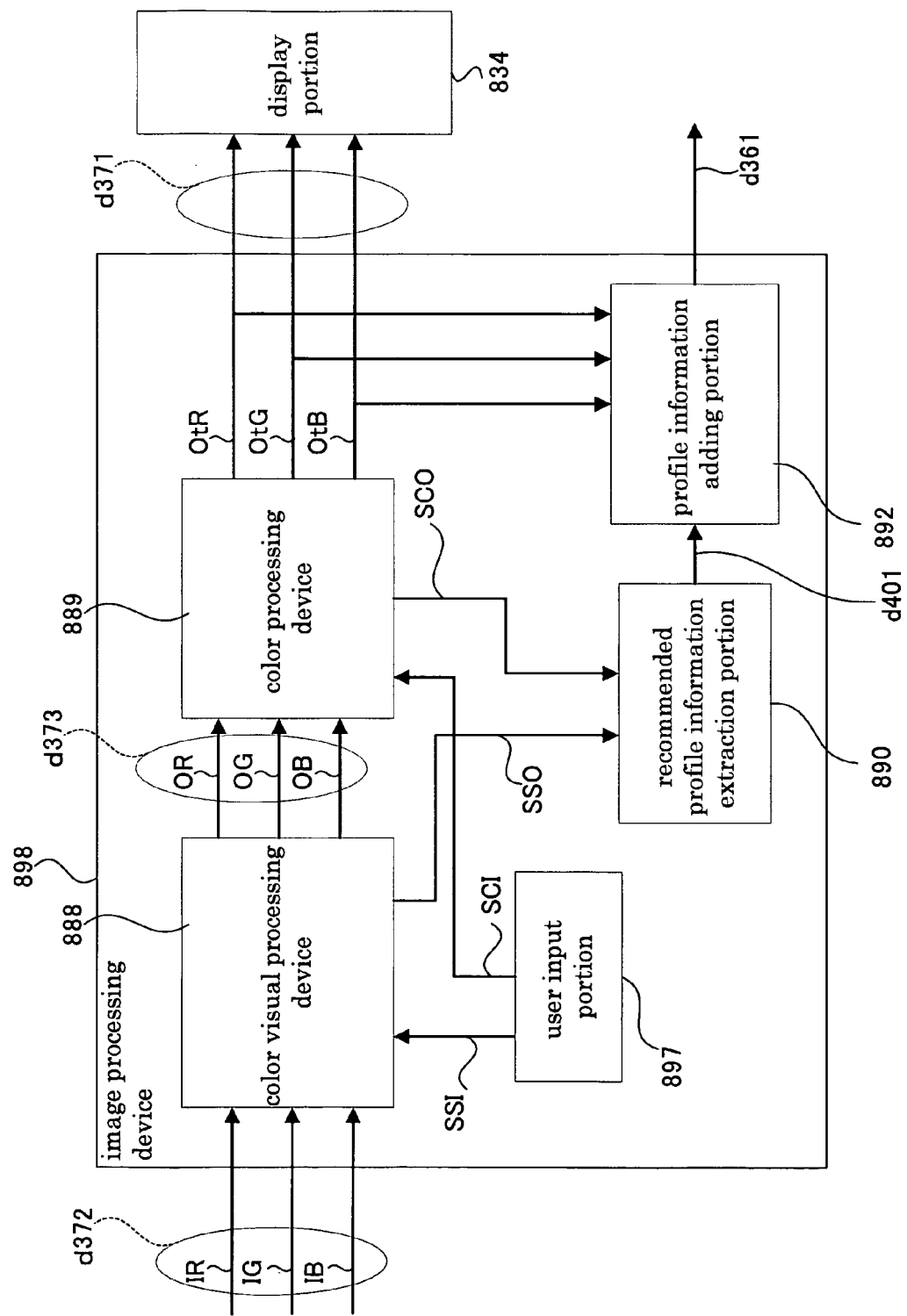
FIG. 101 is a block diagram describing the structure of the image processing device 898 (eleventh embodiment).

FIGS. 100 to 101 shows an image processing device 896 and an image processing device 898 provided with the user input portion 897. The operation of the user input portion 897 is identical to the operation of the user input portion 772 discussed in [Tenth Embodiment]<Modified Example> (7), and thus will not be described in detail here.

With the image processing device 896 and the image processing device 898, the color visual processing device 888 is a visual processing device that is substantially similar to any one of the visual processing device 753 (see FIG. 80), the visual processing device 753*a* (see FIG. 82), the visual processing device 753*b* (see FIG. 83), and the visual processing device 753*c* (see FIG. 84), and also can output recommended profile information SSO. That is, it can obtain profile information SSI from the user input portion 897 as well as output recommended profile information SSO.

With the image processing device 896 and the image processing device 898, the color processing device 889 can obtain profile information SCI from the user input portion 897 and also can output recommended profile information SCO.

Thus, with the image processing device 896 and the image processing device 898, it is possible to make the profile data used for image processing when capturing an image more appropriate while viewing the image that is displayed on the display portion 834. At this time it is possible to give the profile information SSI and SCI to the color visual processing device 888 and the color processing device 889, and thus the effects of the processing by these devices can be kept from being excessive or from canceling each other out. It is also possible to fine tune image processing with the user input portion 897. Further, by supplying only the profile information SSI and SCI required by the color visual processing device 888 and the color processing device 889, the amount of image processing by these devices can be reduced and this allows processing to be carried out more easily.

(4)

<4-1>>

In the image-capturing device 820, it is also possible for the image processing device 832 (see FIG. 96) to be a device that can obtain security information and switch the profile data to be used for image processing according to that security information. Here, the security information is information that expresses whether or not image capturing in the image-capture environment of the image-capturing device 820 is allowed or the extent to which it is allowed.

Figure 102:
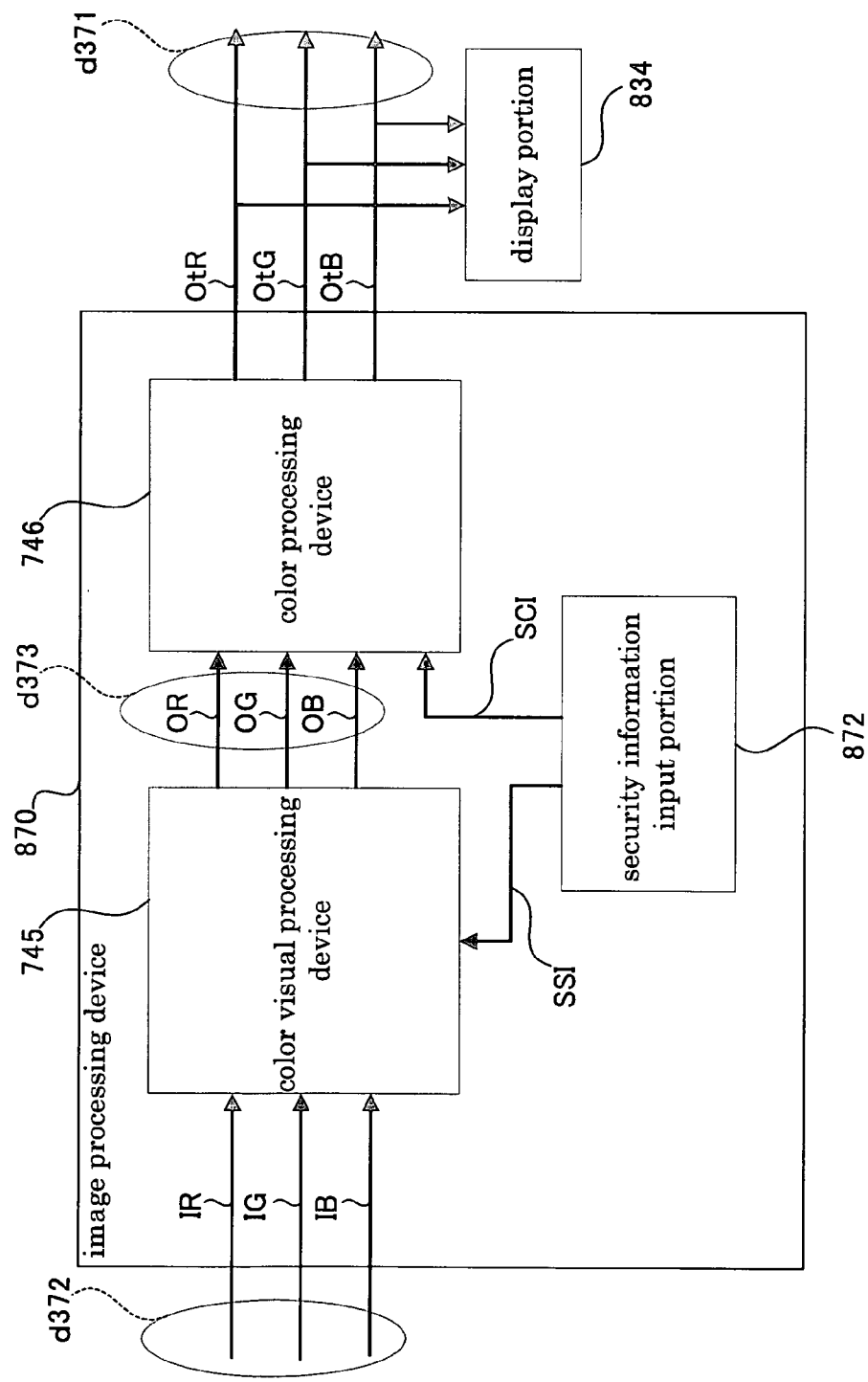
FIG. 102 is a block diagram describing the structure of the image processing device 870 (eleventh embodiment).

FIG. 102 shows an image processing device 870 serving as a modified example of the image processing device 832. The image processing device 870 is similar to the image processing device 832 in that it performs image processing of the input image data d372 and outputs output image data d371. The image processing device 870 differs from the image processing device 832 in that the image processing device 870 is provided with a security information input portion 872 that obtains security information for the image-capture environment. Other than this, portions that the image processing device 870 shares with the image processing device 832 are assigned the same reference numerals and description thereof is omitted.

The security information input portion 872 comprises primarily an input device that allows a user to directly input security information and a reception device for obtaining security information wirelessly, via infrared radiation, or via a wired connection. Further, the security information input portion 872 outputs profile information SSI and SCI based on the security information that it has obtained.

Here, each of the profile information SSI and SCI is information for specifying the profile data, and includes at least one of profile data, tag information such as a number that specifies profile data, and parameter information that indicates the features of the processing of the profile data. The profile data, tag information, and parameter information are the same as those discussed in the foregoing embodiments.

The profile information SSI and SCI that are output specify profile data that allow higher quality images to be captured the higher the degree of allowed image-capture that is indicated by the security information, and specifies profile data that allow only low-quality images to be taken the lower the degree of image capture that is allowed The operation of the image processing device 870 will be described in further detail using FIG. 103.

Figure 103:
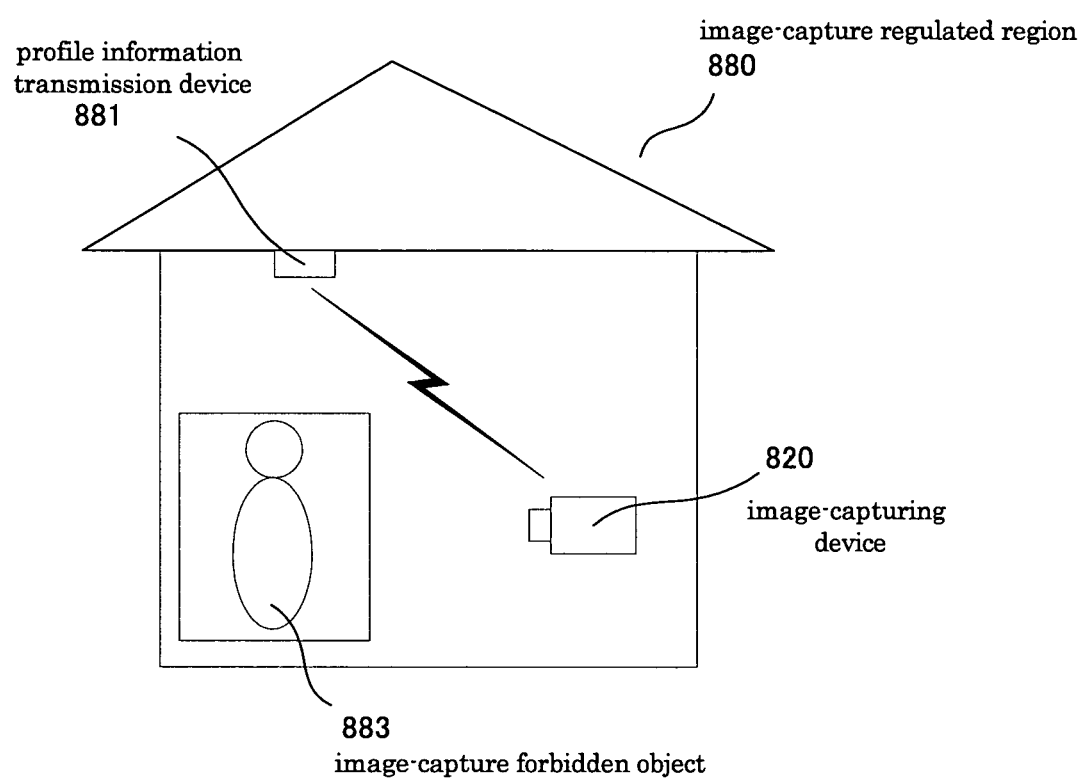
FIG. 103 is an explanatory diagram describing the operation of the image processing device 870 (eleventh embodiment).
Figure 104:
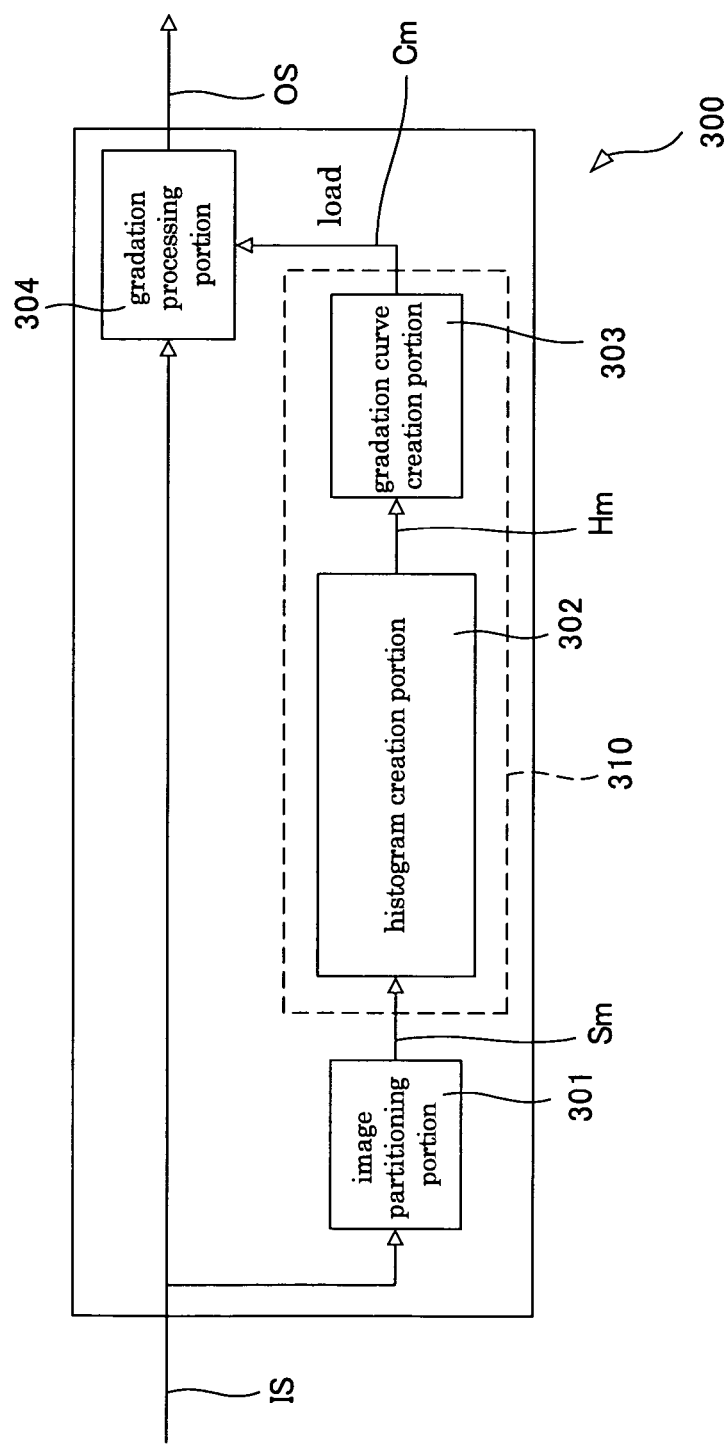
FIG. 104 is a block diagram describing the structure of the visual processing device 300 (background art).
Figure 105:
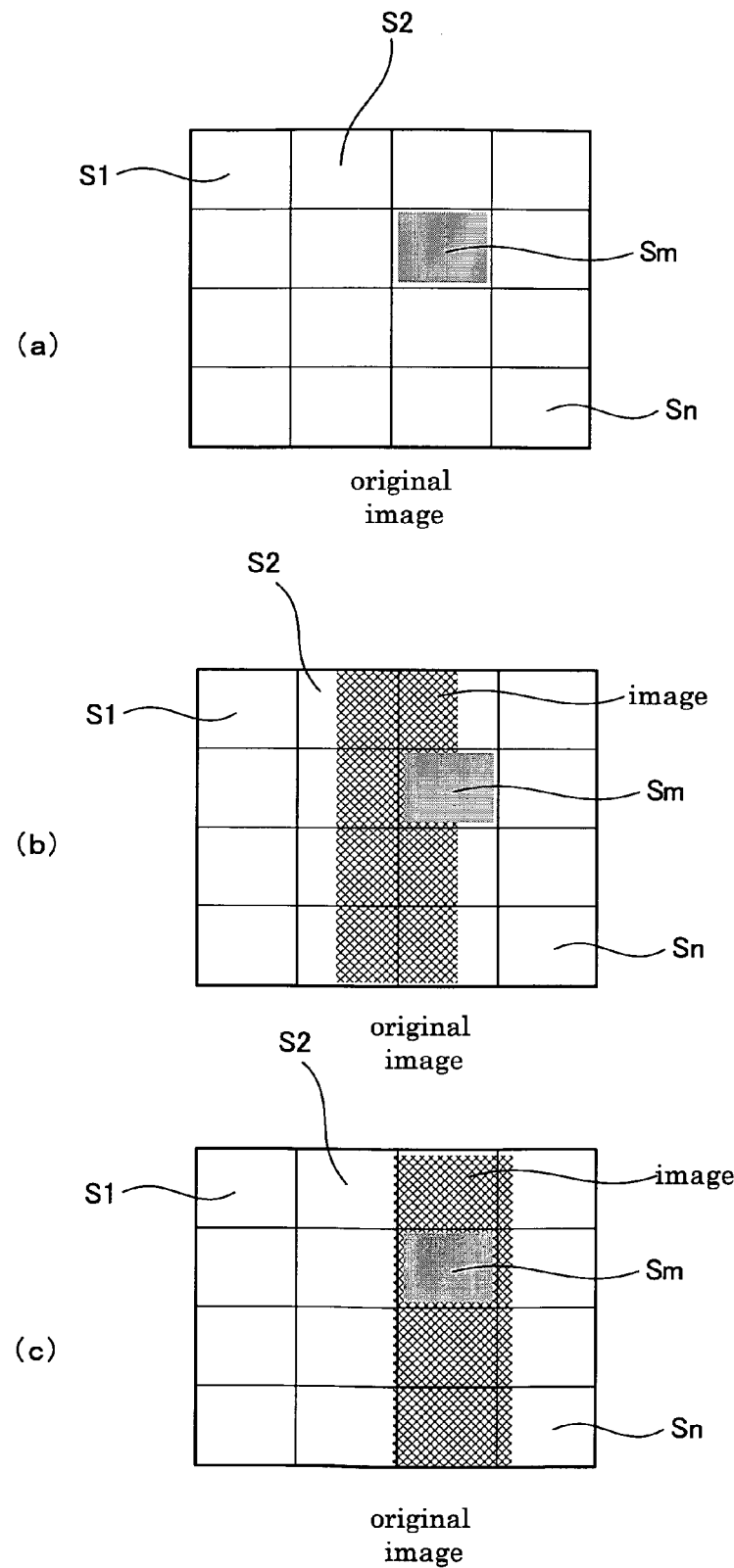
FIG. 105 is an explanatory diagram describing the image region Sm (background art).
Figure 106:
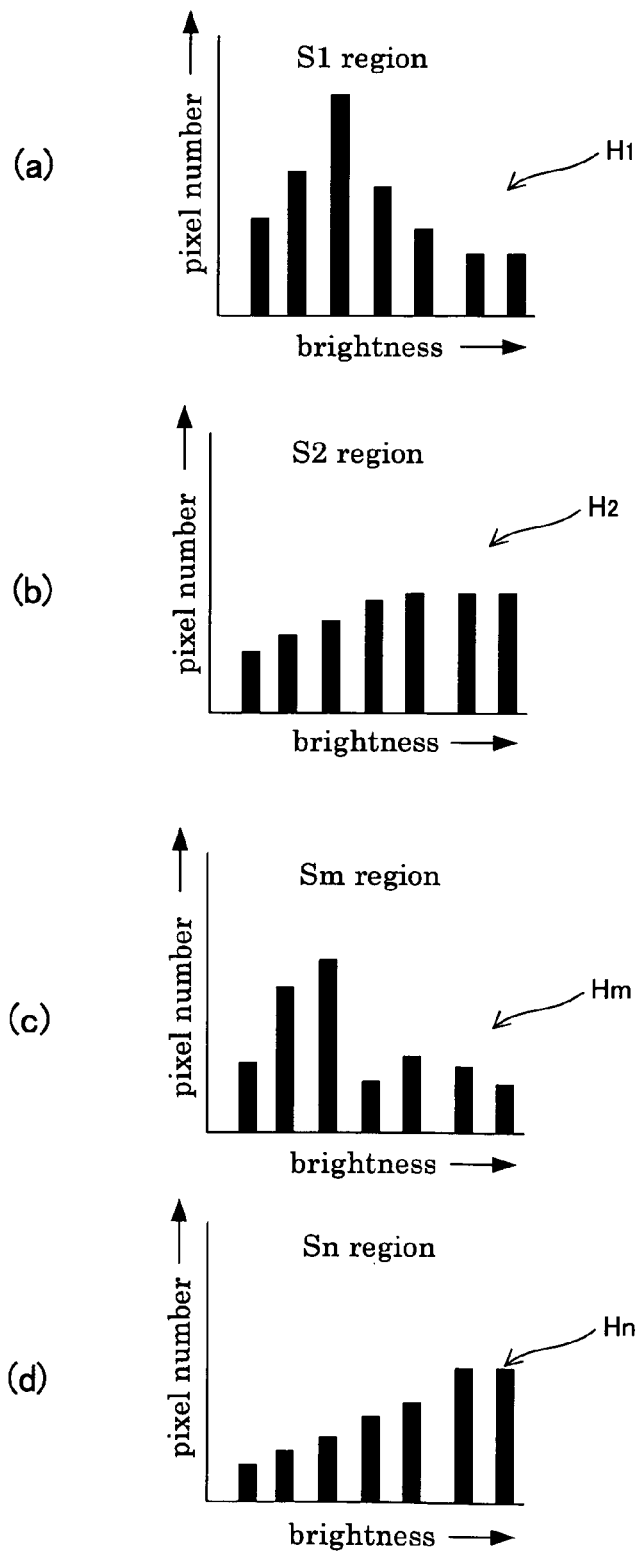
FIG. 106 is an explanatory diagram describing the brightness histogram Hm (background art).
Figure 107:
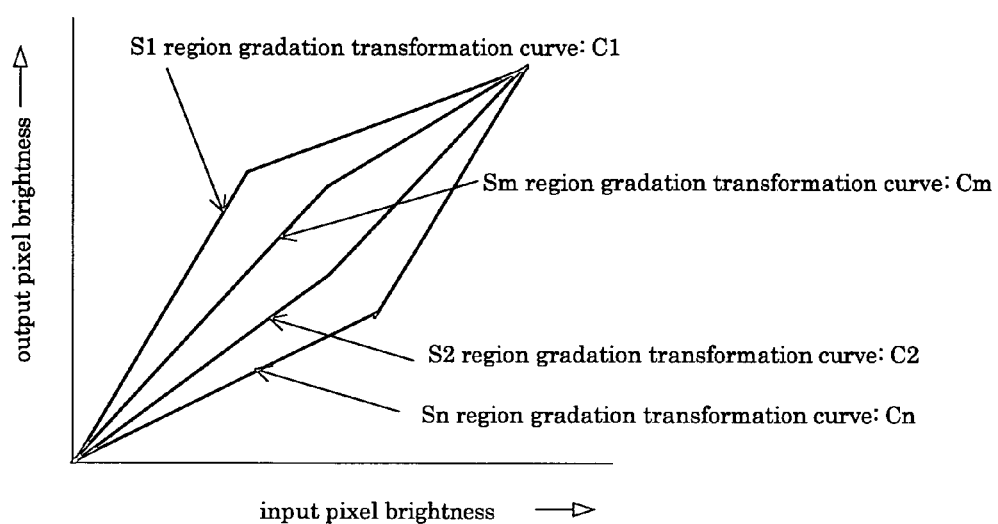
FIG. 107 is an explanatory diagram describing the gradation transformation curves Cm (background art).

FIG. 103 is an explanatory diagram for describing the operation of the image-capturing device 820 provided with the image processing device 870 in an image-capture regulated region 880 in which the capturing of images is regulated.

An image-capture forbidden object 883 for which image capture is forbidden is disposed within the image-capture regulated region 880. The image-capture forbidden object 883 is for example a person or a book protected under the right of portrait or copyright. A security information transmission device 881 is arranged in the image-capture regulated region 880. The security information transmission device 881 transmits security information through radio transmission or infrared radiation.

The image-capturing device 820 within the image-capture regulated region 880 receives security information from the security information input portion 872. The security information input portion 872 determines the degree of allowed image capture indicated by the security information. The security information input portion 872 then references a database or the like storing the relationship between the values of the degree of allowed image capture and the profile data, and outputs profile information SSI and SCI for specifying profile data corresponding to the value of the degree of allowed image capture. For example, in the database, profile data with which higher quality images can be captured are associated with higher values of the degree of allowed image capture.

More specifically, if the image-capturing device 820 has received security information with a low degree of allowed image capture from the security information transmission device 881, then the security information input portion 872 outputs profile information SSI for specifying profile data such as that for smoothing (or lowering the gray scale) of the area about the image or main regions of the image to the color visual processing device 745. The security information input portion 872 then outputs profile information SCI for specifying profile data for making the image colorless, for example, to the color processing device 746. Thus, it is no longer possible to capture an image at a suitable picture quality, and this allows rights such as the right of portrait or copyright to be protected.

<<4-2>> Others (1)

It is also possible for the security information input portion 872 that has received security information to stop some of the functions of the image processing device 870 or the image-capturing device 820 rather than switching between profile data according to the security information.

(2)

It is also possible for the security information input portion 872 that has received security information to further obtain user authentication information from the input portion 850, for example, of the image-capturing device 820, and if image capture by that user is permitted, to output profile information SSI and SCI for specifying profile data that increase the degree of allowed image capture.

The user authentication information is for example authentication information obtained by a fingerprint or iris scan, for example, of the user. The security information input portion 872 that has obtained this authentication information references a database of users who have image capture permission and determines whether or not the authenticated user is a user who has image capture permission. Further, at this time it is also possible to determine the degree of allowed image capture through user accounting information, for example, and if that degree is high, to allow the capture of high quality images.

It should be noted that the security information can also supply information for specifying the image-capturing devices 820 that have image capture permission.

(3)

The profile information SSI and SCI can also include security information. In this case, the color visual processing device 745 and the color processing device 746 that have obtained the profile information SSI and SCI then select profile data based on that security information.

(4)

The security information input portion 872 can also serve as the security determination portion 852.

[First Attachment]

The present invention (in particular the aspects of the present invention discussed in the fourth through seventh embodiments) can also be expressed as follows. It should be noted that dependant-type attachments set forth in this section ([First Attachment]) are dependent on attachments set forth in the First Attachment.

<Content of the First Attachment>

(Attachment 1)

A visual processing device comprising:

image region partitioning means that partitions an image signal that has been received as input into a plurality of image regions;

gradation transformation property derivation means that derives a gradation transformation property for each image region, and uses the gradation property of a target image region whose gradation transformation property is to be derived and surrounding image regions surrounding the target image region to derive the gradation transformation property of the target image region; and gradation processing means that transforms the gradation of the image signal based on the gradation transformation property that has been derived.

(Attachment 2)

The visual processing device according to attachment 1, wherein the gradation transformation property is a gradation transformation curve; and wherein the gradation transformation property derivation means has histogram creation means that uses the gradation properties to create a histogram, and gradation curve creation means that creates a gradation transformation curve based on the histogram that is created.

(Attachment 3)

The visual processing device according to attachment 1, wherein the gradation transformation property is a selection signal for selecting a single gradation transformation table from among a plurality of gradation transformation tables for transforming the gradation of the image signal; and wherein the gradation processing means has the plurality of gradation transformation tables as a two-dimensional LUT.

(Attachment 4)

The visual processing device according to attachment 3, wherein the two-dimensional LUT holds a plurality of gradation transformation tables in the order of monotonically increasing or monotonically decreasing values of the gradation processed image signals with respect to the values of the selection signals, for all of the values of the image signals.

(Attachment 5)

The visual processing device according to attachment 3 or 4, wherein the two-dimensional LUT can be altered by the registration of the profile data.

(Attachment 6)

The visual processing device according to any one of attachments 3 to 5, wherein the values of the selection signals are derived as the characteristic amount of an individual selection signal that is a selection signal that has been derived for the target image region and each image region of the surrounding image regions.

(Attachment 7)

The visual processing device according to any one of attachments 3 to 5, wherein the value of the selection signal is derived based on a gradation property characteristic amount that is a characteristic amount that has been derived using the gradation properties of the target image region and the surrounding image regions.

(Attachment 8)

The visual processing device according to any one of attachments 3 to 7, wherein the gradation processing means comprises gradation processing execution means that uses the gradation transformation table selected by the selection signal to transform the gradation of the target image region, and correction means that corrects the gradation of the gradation processed image signal, and based on the gradation processing table that has been selected for the image region including a target pixel to be corrected and adjacent image regions that are adjacent to the image region including the target pixel, corrects the gradation of the target pixel.

(Attachment 9)

The visual processing device according to any one of attachments 3 to 7, wherein the gradation processing means includes correction means that corrects the selection signal to derive a corrected selection signal for selecting a gradation processing table for each pixel of the image signal, and gradation processing execution means that uses the gradation transformation table selected by the corrected selection signal to transform the gradation of the image signal.

(Attachment 10)

A visual processing method comprising:

an image region partitioning step of partitioning an image signal that has been received as input into a plurality of image regions;

a gradation transformation property derivation step of deriving gradation transformation properties for each image region, and uses the gradation property of a target image region whose gradation transformation property is to be derived and surrounding image regions surrounding the target image region to derive the gradation transformation property of the target image region; and a gradation processing step of transforming the gradation of the image signal based on the gradation transformation property that has been derived.

(Attachment 11)

The visual processing method according to attachment 10, wherein the gradation transformation property is a gradation transformation curve; and wherein the gradation transformation property derivation step has a histogram creation step of using the gradation properties to create a histogram, and a gradation curve creation step of creating the gradation transformation curve based on the histogram that is created.

(Attachment 12)

The visual processing method according to attachment 10, wherein the gradation transformation property is a selection signal for selecting a single gradation transformation table from among a plurality of gradation transformation tables for transforming the gradation of the image signal; and wherein the gradation processing step has a gradation processing execution step of using the gradation transformation table selected by the selection signal to transform the gradation of the target image region, and a correction step of correcting the gradation of the gradation processed image signal, and based on the gradation processing table that has been selected for the image region including a target pixel to be corrected and an adjacent image region that is adjacent to the image region including the target pixel, correcting the gradation of the target pixel.

(Attachment 13)

The visual processing method according to attachment 10, wherein the gradation transformation property is a selection signal for selecting a single gradation transformation table from among a plurality of gradation transformation tables for transforming the gradation of the image signal; and wherein the gradation processing step includes a correction step of correcting the selection signal to derive a corrected selection signal for selecting a gradation processing table for each pixel of the image signal, and a gradation processing execution step of using the gradation transformation table selected by the corrected selection signal to transform the gradation of the image signal.

(Attachment 14)

A visual processing program for performing a visual processing method on a computer, the visual processing program causing the computer to perform a visual processing method that comprises:

an image region partitioning step of partitioning an image signal that has been received as input into a plurality of image regions;

a gradation transformation property derivation step of deriving gradation transformation properties for each image region, and using the gradation properties of a target image region whose gradation transformation property is to be derived and surrounding image regions surrounding the target image region to derive the gradation transformation property of the target image region; and a gradation processing step of transforming the gradation of the image signal based on the gradation transformation property that has been derived.

(Attachment 15)

The visual processing program according to attachment 14, wherein the gradation transformation property is a gradation transformation curve; and wherein the gradation transformation property derivation step has a histogram creation step of using the gradation properties to create a histogram, and a gradation curve creation step of creating the gradation transformation curve based on the histogram that is created.

(Attachment 16)

The visual processing program according to attachment 14, wherein the gradation transformation property is a selection signal for selecting a single gradation transformation table from among a plurality of gradation transformation tables for transforming the gradation of the image signal; and wherein the gradation processing step has a gradation processing execution step of using the gradation transformation table selected by the selection signal to transform the gradation of the target image region, and a correction step of correcting the gradation of the gradation processed image signal, in which based on the gradation processing table that has been selected for the image region including a target pixel to be corrected and an adjacent image region that is adjacent to the image region including the target pixel, the gradation of the target pixel is corrected.

(Attachment 17)

The visual processing program according to attachment 14, wherein the gradation transformation property is a selection signal for selecting a single gradation transformation table from among a plurality of gradation transformation tables for transforming the gradation of the image signal; and wherein the gradation processing step includes a correction step of correcting the selection signal to derive a corrected selection signal for selecting a gradation processing table for each pixel of the image signal, and a gradation processing execution step of using the gradation transformation table selected by the corrected selection signal to transform the gradation of the image signal.

(Attachment 18)

The visual processing device according to attachment 1, wherein the gradation processing means has parameter output means that outputs a curve parameter of a gradation transformation curve for transforming the gradation of the image signal based on the gradation transformation property, and gradation processes the image signal using the gradation transformation curve specified by the gradation transformation property and the curve parameter.

(Attachment 19)

The visual processing device according to attachment 18, wherein the parameter output means is a lookup table that stores the relationship between the gradation transformation properties and the curve parameters.

(Attachment 20)

The visual processing device according to attachment 18 or 19, wherein the curve parameter includes a value of a gradation processed image signal with respect to a predetermined value of the image signal.

(Attachment 21)

The visual processing device according to any one of attachments 18 to 20, wherein the curve parameter includes the slope of the gradation transformation curve in a predetermined section of the image signal.

(Attachment 22)

The visual processing device according to any one of attachments 18 to 21, wherein the curve parameter includes at least one coordinate point through which the gradation transformation curve passes.

(Attachment 23)

A visual processing device comprising:

spatial processing means that performs spatial processing of each of the plurality of image regions in an image signal that has been received as input to derive spatially processed signals, in the spatial processing, using a weighting based on the difference in gradation properties of a target image region to be subjected to spatial processing and surrounding image regions surrounding the target image region to take the weighted mean of the gradation properties of the target image region and the surrounding image regions; and visual processing means that performs visual processing of the target image region based on the gradation properties of the target image region and the spatially processed signal.

(Attachment 24)

The visual processing device according to attachment 23, wherein the weighting is smaller the greater the absolute value of the gradation property difference.

(Attachment 25)

The visual processing device according to attachment 23 or 24, wherein the weighting is smaller the greater the distance between the target image region and the surrounding image region.

(Attachment 26)

The visual processing device according to any one of attachments 23 to 25, wherein the image region having a plurality of pixels; and wherein the gradation properties of the target image region and the surrounding image regions are set as a characteristic amount of pixel values making up each of those image regions.

<Description of the First Attachment>

The visual processing device according to attachment 1 is provided with image region partitioning means, gradation transformation property derivation means, and gradation processing means. The image region partitioning means partitions an image signal that has been received as input into a plurality of image regions. The gradation transformation property derivation means derives gradation transformation properties for each image region, and uses the gradation properties of a target image region whose gradation transformation property is to be derived and surrounding image regions surrounding the target image region to derive the gradation transformation property of the target image region. The gradation processing means performs gradation processing of the image signal based on the gradation transformation property that has been derived.

Here, the gradation transformation property is a property of gradation processing for each image region. The gradation property is for example a pixel value such as the luminance or brightness of each pixel.

With the visual processing device of this invention, the gradation transformation property of each image region is determined using not only the gradation properties of each image region but also the gradation properties of image regions over a wide area that includes surrounding image regions. As a result, a spatial processing effect can be added to the gradation processing of each image region, this makes it possible to perform gradation processing that yields a better visual effect.

The visual processing device according to attachment 2 is the visual processing device according to attachment 1 in which the gradation transformation property is a gradation transformation curve. Also, the gradation transformation property derivation means has histogram creation means that uses the gradation properties to create a histogram, and gradation curve creation means that creates a gradation transformation curve based on the histogram that is created.

Here, the histogram is a distribution of the gradation properties of the pixels in the target image region and the surrounding image regions. The gradation curve creation means takes the cumulative curve of the cumulative histogram values as the gradation transformation curve.

With the visual processing device of this invention, the histogram is created using not only the gradation properties of each image region but also the gradation properties of image regions over a wide area that includes surrounding image regions. Thus, it is possible to increase the number of partitions of the image signal and reduce the size of the image regions, and this makes it possible to inhibit pseudo-borders due to gradation processing from occurring. Further, it allows the boundary between image regions to be kept from standing out unnaturally.

The visual processing device according to attachment 3 is the visual processing device according to attachment 1 in which the gradation transformation property is a selection signal for selecting a single gradation transformation table from among a plurality of gradation transformation tables for transforming the gradation of the image signal. Also, the gradation processing means holds the plurality of gradation transformation tables as a two-dimensional LUT.

Here, the gradation transformation table is for example a lookup table (LUT) storing the pixel values of the gradation processed image signals with respect to the pixel values of the image signals.

The selection signal for example has a value that has been assigned to a single gradation transformation table to be selected from among the values respectively assigned to each of a plurality of gradation transformation tables. The gradation processing means references the two-dimensional LUT from the value of the selection signal and the pixel value of the image signal and outputs the pixel value of the gradation processed image signal.

With the visual processing device of this invention, gradation processing is performed by referencing a two-dimensional LUT. Gradation processing thus can be performed faster. Also, because gradation processing is performed after selecting one gradation transformation table from among a plurality of gradation processing tables, appropriate gradation processing can be performed.

The visual processing device according to attachment 4 is the visual processing device according to attachment 3 in which the two-dimensional LUT stores a plurality of gradation transformation tables in the order of monotonically increasing or monotonically decreasing values of the gradation processed image signals with respect to the values of the selection signals, for all of the values of the image signals.

With the visual processing device of this invention, the value of the selection signal indicates the extent of gradation transformation.

The visual processing device according to attachment 5 is the visual processing device according to attachment 3 or 4 in which the two-dimensional LUT can be changed by the registration of the profile data.

Here, the profile data are the data stored in the two-dimensional LUT, whose elements are the pixel values of the gradation processed image signals.

With the visual processing device of this invention, by changing the two-dimensional LUT it is possible to make various changes to the gradation processing features without changing the hardware configuration.

The visual processing device according to attachment 6 is the visual processing device according to any one of attachments 3 to 5 in which the value of the selection signal is derived as the characteristic amount of an individual selection signal that is a selection signal that has been derived for each image region of the target image region and the surrounding image regions.

Here, the characteristic amount of the individual selection signal is for example the mean value (simple mean or weighted mean), maximum value, or minimum value of the selection signals derived for each image region.

With the visual processing device of this invention, the selection signal for the target image region is derived as the characteristic amount of the selection signals for a wide image region area that includes surrounding image regions. Thus, it is possible to add a spatial processing effect to the selection signal, and this allows the boundary between image regions to be kept from standing out unnaturally.

The visual processing device according to attachment 7 is the visual processing device according to any one of attachments 3 to 5 in which the value of the selection signal is derived based on a gradation property characteristic amount that is a characteristic amount that has been derived using the gradation properties of the target image region and the surrounding image regions.

Here, the gradation property characteristic amount is for example the mean value (simple mean or weighted mean), maximum value, or minimum value of the gradation properties of a wide area that includes the target image region and surrounding image regions.

With the visual processing device of this invention, the selection signal for the target image region is derived based on the gradation property characteristic amount for a wide area that includes surrounding image regions. Thus, it is possible to add a spatial processing effect to the selection signal, and this allows the boundary between image regions to be kept from standing out unnaturally.

The visual processing device according to attachment 8 is the visual processing device according to any one of attachments 3 to 7 in which the gradation processing means comprises gradation processing execution means and correction means. The gradation processing execution means uses the gradation transformation table selected by the selection signal to transform the gradation of the target image region. The correction means corrects the gradation of the gradation processed image signal, and based on the gradation processing table that has been selected for the image region including a target pixel to be corrected and adjacent image regions that are adjacent to the image region including the target pixel, corrects the gradation of the target pixel.

Here, the adjacent image regions can be the same image regions as the surrounding image regions when deriving the gradation transformation properties, or they can be different image regions. For example, as the adjacent image regions it is possible to select the three image regions, of the image regions adjacent to the image region that includes the target pixel, that have the shortest distance to the target pixel.

The correction means for example uses the same gradation transformation table for each target image region to correct the gradation of the gradation processed image signal. Correction of the target pixel is for example performed such that the effect that each gradation transformation table selected for the adjacent image regions has corresponds to the position of the target pixel.

With the visual processing device of this invention, it is possible to correct the gradation of the image signal for each pixel. Thus, the boundary between image regions can be further prevented from standing out unnaturally, and this allows the visual effect to be increased.

The visual processing device according to attachment 9 is the visual processing device according to any one of attachments 3 to 7 in which the gradation processing means includes correction means and gradation processing execution means. The correction means corrects the selection signal to derive a corrected selection signal for selecting a gradation processing table for each pixel of the image signal. The gradation processing execution means uses the gradation transformation table selected by the corrected selection signal to transform the gradation of the image signal.

The correction means for example corrects the selection signal that has been derived for each target image region based on the pixel position and the selection signals that have been derived for the image regions adjacent to the target image region, deriving a selection signal for each pixel.

With the visual processing device of this invention, it is possible to derive a selection signal for each pixel. Thus, the boundary between image regions can be further prevented from standing out unnaturally, and this allows the visual effect to be increased.

The visual processing method according to attachment 10 comprises an image region partitioning step, a gradation transformation property derivation step, and a gradation processing step. The image region partitioning step is a step of partitioning an image signal that has been received as input into a plurality of image regions. The gradation transformation property derivation step is a step of deriving a gradation transformation property for each image region, in which the gradation properties of a target image region whose gradation transformation property is to be derived and surrounding image regions surrounding the target image region are used to derive the gradation transformation property of the target image region. The gradation processing step is a step of transforming the gradation of the image signal based on the gradation transformation property that has been derived.

Here, the gradation transformation property is a property of gradation processing for each image region. The gradation property is for example a pixel value such as the luminance or brightness of each pixel.

With the visual processing method of this invention, the gradation transformation property of each image region is determined using not only the gradation properties of each image region but also the gradation properties of image regions over a wide area that includes surrounding image regions. As a result, a spatial processing effect can be added to the gradation processing of each image region, and this makes it possible to perform gradation processing that produces a better visual effect.

The visual processing method according to attachment 11 is the visual processing method according to attachment 10 in which the gradation transformation property is a gradation transformation curve. Also, the gradation transformation property derivation step has a histogram creation step of using the gradation properties to create a histogram, and a gradation curve creation step of creating the gradation transformation curve based on the histogram that is created.

Here, the histogram is a distribution of the gradation properties of the pixels in the target image region and the surrounding image regions. In the gradation curve creation step, the cumulative curve of the cumulative histogram values is taken as the gradation transformation curve.

With the visual processing method of this invention, the histogram is created using not only the gradation properties of each image region but also the gradation properties of image regions over a wide area that includes surrounding image regions. Thus, it is possible to increase the number of partitions of the image signal and reduce the size of the image regions, and this makes it possible to inhibit pseudo-borders from occurring due to gradation processing. Further, it allows the boundary between image regions to be kept from standing out unnaturally.

The visual processing method according to attachment 12 is the visual processing method according to attachment 10 in which the gradation transformation property is a selection signal for selecting a single gradation transformation table from among a plurality of gradation transformation tables for transforming the gradation of the image signal. Also, the gradation processing step has a gradation processing execution step and a correction step. The gradation processing execution step is a step of using the gradation transformation table selected by the selection signal to transform the gradation of the target image region The correction step is a step of correcting the gradation of the gradation processed image signal, in which based on the gradation processing table that has been selected for the image region including a target pixel to be corrected and an adjacent image region that is adjacent to the image region including the target pixel, the gradation of the target pixel is corrected.

Here, the gradation transformation table is for example a lookup table (LUT) storing the pixel values of the gradation processed image signals with respect to the pixel values of the image signals. The adjacent image regions can be the same image regions as the surrounding image regions when deriving the gradation transformation properties, or they can be different image regions. For example, as the adjacent image regions it is possible to select the three image regions, of the image regions adjacent to the image region that includes the target pixel, that have the shortest distance to the target pixel.

The selection signal for example has a value that has been assigned to a single gradation transformation table to be selected from among the values respectively assigned to each of a plurality of gradation transformation tables. The gradation processing step is a step of referencing the LUT from the value of the selection signal and the pixel values of the image signal and outputting the pixel values of the gradation processed image signal. The correction step is a step of for example using the same gradation transformation table for each target image region to correct the gradation of the gradation processed image signal. Correction of a target pixel is for example performed such that the effect that each gradation transformation table selected for the adjacent image regions has corresponds to the position of the target pixel.

With the visual processing method of this invention, gradation processing is performed with reference to a LUT. Thus, the speed of gradation processing can be increased. Also, gradation processing is performed by selecting a single gradation transformation table from among a plurality of gradation transformation tables, and thus it is possible to perform gradation processing that is appropriate. Moreover, the gradation of the image signal is corrected for each pixel. Thus, the boundary between image regions can be further prevented from standing out unnaturally, and this increases the visual effect.

The visual processing method according to attachment 13 is the visual processing method according to attachment 10 in which the gradation transformation property is a selection signal for selecting a single gradation transformation table from among a plurality of gradation transformation tables for transforming the gradation of the image signal. Further, the gradation processing step includes a correction step and a gradation processing execution step. The correction step is a step of correcting the selection signal to derive a corrected selection signal for selecting a gradation processing table for each pixel of the image signal. The gradation processing execution step is a step of using the gradation transformation table selected by the corrected selection signal to transform the gradation of the image signal.

Here, the gradation transformation table is for example a lookup table (LUT) storing the pixel values of gradation processed image signals with respect to the pixel values of image signals.

The selection signal for example has a value that has been assigned to a single gradation transformation table to be selected from among the values assigned to each of a plurality of gradation transformation tables. The gradation processing step is a step of referencing the two-dimensional LUT from the value of the selection signal and the pixel value of the image signal and outputting the pixel value of the gradation processed image signal. The correction step is a step of for example correcting the selection signal that has been derived for each target image region based on the pixel position and the selection signals that have been derived for the image regions adjacent to the target image region, thereby deriving a selection signal for each pixel.

With the visual processing method of this invention, gradation processing is performed with reference to a LUT. Thus, the speed of gradation processing can be increased. Also, gradation processing is performed by selecting a single gradation transformation table from a plurality of gradation transformation tables, and thus it is possible to perform gradation processing that is appropriate. Moreover, a selection signal is derived for each pixel. Thus, the boundary between image regions can be further prevented from standing out unnaturally, and this increases the visual effect.

The visual processing program according to attachment 14 is a visual processing program for causing a computer to perform a visual processing method that comprises an image region partitioning step, a gradation transformation property derivation step, and a gradation processing step. The image region partitioning step is a step of partitioning an image signal that has been received as input into a plurality of image regions. The gradation transformation property derivation step is a step of deriving a gradation transformation property for each image region, in which the gradation properties of a target image region whose gradation transformation property is to be derived and surrounding image regions surrounding the target image region are used to derive the gradation transformation property of the target image region. The gradation processing step is a step of transforming the gradation of the image signal based on the gradation transformation property that has been derived.

Here, the gradation transformation property is a property of gradation processing for each image region. The gradation property is for example a pixel value such as the luminance or brightness of each pixel.

With the visual processing program of this invention, the gradation transformation property of each image region is determined using not only the gradation properties of each image region but also the gradation properties of image regions over a wide area that includes surrounding image regions. As a result, a spatial processing effect can be added to the gradation processing of each image region, and this makes it possible to achieve gradation processing that produces a better visual effect.

The visual processing program according to attachment 15 is the visual processing program according to attachment 14 in which the gradation transformation property is a gradation transformation curve. Also, the gradation transformation property derivation step has a histogram creation step of using the gradation properties to create a histogram, and a gradation curve creation step of creating a gradation transformation curve based on the histogram that is created.

Here, the histogram is for example a distribution of the gradation properties of the pixels in the target image region and the surrounding image regions. In the gradation curve creation step, the cumulative curve of the cumulative histogram values is taken as the gradation transformation curve.

With the visual processing program of this invention, the histogram is created using not only the gradation properties of each image region but also the gradation properties of a wide area that includes surrounding image regions. Thus, it is possible to increase the number of partitions of the image signal and reduce the size of the image regions, and this makes it possible to inhibit pseudo-borders from occurring due to gradation processing. Further, it allows the boundary between image regions to be kept from standing out unnaturally.

The visual processing program according to attachment 16 is the visual processing program according to attachment 14 in which the gradation transformation property is a selection signal for selecting a single gradation transformation table from among a plurality of gradation transformation tables for transforming the gradation of the image signal. Also, the gradation processing step has a gradation processing execution step and a correction step. The gradation processing execution step is a step of using the gradation transformation table selected by the selection signal to transform the gradation of the target image region. The correction step is a step of correcting the gradation of the gradation processed image signal, in which based on the gradation processing table that has been selected for the image region including a target pixel to be corrected and an adjacent image region that is adjacent to the image region including the target pixel, the gradation of the target pixel is corrected.

Here, the gradation transformation table is for example a lookup table (LUT) storing the pixel values of gradation processed image signals with respect to the pixel values of image signals. The adjacent image regions can be the same image regions as the surrounding image regions when deriving the gradation transformation properties, or they can be different image regions. For example, as the adjacent image regions it is possible to select the three image regions, of the image regions adjacent to the image region that includes the target pixel, that have the shortest distance to the target pixel.

The selection signal for example has a value that has been assigned to a single gradation transformation table to be selected from among the values assigned to each of a plurality of gradation transformation tables. The gradation processing step is a step of referencing the LUT from the value of the selection signal and the pixel value of the image signal and outputting a pixel value of the gradation processed image signal. The correction step is a step of for example using the same gradation transformation table for each target image region to correct the gradation of the gradation processed image signal. Correction of a target pixel is for example performed such that the effect that each gradation transformation table selected for the adjacent image regions has corresponds to the position of the target pixel.

With the visual processing program of this invention, gradation processing is performed in reference to a LUT. Thus, the speed of gradation processing can be increased. Also, gradation processing is performed by selecting a single gradation transformation table from among a plurality of gradation transformation tables, and thus it is possible to perform gradation processing that is appropriate. Moreover, the gradation of the image signal can be corrected for each pixel. Thus, the boundary between image regions can be further prevented from standing out unnaturally, and this increases the visual effect.

The visual processing program according to attachment 17 is the visual processing program according to attachment 14 in which the gradation transformation property is a selection signal for selecting a single gradation transformation table from among a plurality of gradation transformation tables for transforming the gradation of the image signal. The gradation processing step includes a correction step and a gradation processing execution step. The correction step is a step of correcting the selection signal to derive a corrected selection signal for selecting a gradation processing table for each pixel of the image signal. The gradation processing execution step is a step of using the gradation transformation table selected by the corrected selection signal to transform the gradation of the image signal.

Here, the gradation transformation table is for example a lookup table (LUT) storing the pixel values of gradation processed image signals with respect to the pixel values of image signals.

The selection signal for example has a value that has been assigned to a single gradation transformation table to be selected from among the values assigned to each of a plurality of gradation transformation tables. The gradation processing step is a step of referencing the two-dimensional LUT from the value of the selection signal and the pixel value of the image signal and outputs the pixel value of the gradation processed image signal. The correction step is a step of for example correcting the selection signal that has been derived for each target image region based on the pixel position and the selection signals that have been derived for the image regions adjacent to the target image region, thereby deriving a selection signal for each pixel.

With the visual processing program of this invention, gradation processing is performed by referencing a LUT. Thus, the speed of gradation processing can be increased. Also, gradation processing is performed by selecting a single gradation transformation table from a plurality of gradation transformation tables, and thus it is possible to perform gradation processing that is appropriate. Moreover, a selection signal is derived for each pixel. Thus, the boundary between image regions can be further prevented from standing out unnaturally, and this increases the visual effect.

The visual processing device according to attachment 18 is the visual processing device according to attachment 1 in which the gradation processing means has parameter output means that outputs a curve parameter of a gradation transformation curve for transforming the gradation of the image signal based on the gradation transformation property. The gradation processing means transforms the gradation of the image signal using the gradation transformation property and the gradation transformation curve specified by the curve parameter.

Here, the gradation transformation curve includes a straight line in a least a portion thereof. The curve parameter is a parameter for discerning the gradation transformation curve from other gradation transformation curves, and for example is a coordinate on the gradation transformation curve or the slope or curvature of the gradation transformation curve. The parameter output means is a lookup table that stores curve parameters with respect to the gradation transformation properties or computing means that obtains the curve parameter through a computation such as curve approximation using the curve parameter for a predetermined gradation transformation property.

With the visual processing device of this invention, the gradation of the image signal is transformed in correspondence with the gradation transformation properties. Thus, it is possible to perform gradation processing that is more appropriate. Also, it is not necessary to store in advance the values of all the gradation transformation curves that are used in gradation processing, and the gradation processing curve is specified from the curve parameter that has been output and based on this, gradation processing is performed. Thus, the amount of storage for storing the gradation transformation curves can be reduced.

The visual processing device according to attachment 19 is the visual processing device according to attachment 18 in which the parameter output means is a lookup table that stores the relationship between the gradation transformation properties and the curve parameters.

The lookup table stores the relationship between the gradation processing properties and the curve parameters. The gradation processing means uses the gradation transformation curves that are specified to transform the gradation of the image signal.

With the image processing device of this invention, the gradation of the image signal is transformed in correspondence with the gradation transformation properties. Thus, it is possible to perform gradation processing that is more appropriate. Also, it is not necessary to store in advance the values of all the gradation transformation curves that are used in gradation processing, and it is only necessary to store the curve parameters. Thus, the amount of storage for storing the gradation transformation curves can be reduced.

The visual processing device according to attachment 20 is the visual processing device according to attachment 18 or 19 in which the curve parameter includes a value of a gradation processed image signal with respect to a predetermined value of the image signal.

The gradation processing means uses the relationship between the predetermined value of the image signal and the value of the image signal to be subjected to visual processing to perform non-linear or linear internal division of the value of the gradation processed image signal that is included in the curve parameter, deriving the value of the gradation processed image signal.

With the visual processing device of this invention, it is possible to specify a gradation transformation curve from the value of the gradation processed image signal with respect to the predetermined value of the image signal, and using this to perform gradation processing.

The visual processing device according to attachment 21 is the visual processing device according to any of attachments 18 to 20 in which the curve parameter includes the slope of the gradation transformation curve in a predetermined section of the image signal.

With this gradation processing means, the gradation transformation curve is specified based on the slope of the gradation transformation curve in a predetermined section of the image signal. Further, using the specified gradation transformation curve, the value of the gradation processed image signal with respect to the value of the image signal is derived.

With the visual processing device of this invention, it is possible to specify the gradation transformation curve based on the slope of the gradation transformation curve in a predetermined section of the image signal, and then use this to perform gradation processing.

The visual processing device according to attachment 22 is the visual processing device according to any of attachments 18 to 21 in which the curve parameter includes at least one coordinate point through which the gradation transformation curve passes.

The curve parameter specifies at least one coordinate point through which the gradation transformation curve passes. That is, at least one point of the value of the image signal after gradation processing of the value of the image signal is specified. With the gradation processing means, the relationship between the specified value of the image signal and the value of the image signal that is to be subjected to visual processing is used to nonlinearly or linearly interpolate the specified value of the image signal after gradation processing and thereby derive a gradation processed image signal.

With the visual processing device of this invention, it is possible to specify the gradation transformation curve based on at least one coordinate point through which the gradation transformation curve passes and with this to perform gradation processing.

The visual processing device according to attachment 23 comprises spatial processing means and visual processing means. The spatial processing means performs spatial processing of each of the plurality of image regions in an image signal that has been received as input to derive spatially processed signals. This spatial processing takes the weighted mean of the gradation properties of the target image region and the surrounding image regions using a weighting based on the difference in gradation properties of a target image region to be subjected to spatial processing and surrounding image regions surrounding the target image region. The visual processing means performs visual processing of the target image region based on the gradation properties of the target image region and the spatially processed signal.

Here, image region means a region including a plurality of pixels, or a pixel itself, in the image. The gradation property is a value that is based on the pixel value, such as the luminance or brightness of each pixel. For example, the gradation property of an image region can be the mean value (simple mean or weighted mean), the maximum value, or the minimum value of the pixel values of the pixels included in that image region.

The spatial processing means uses the gradation properties of surrounding image regions to spatially process the target image region. In this spatial processing, a weighted mean is taken of the gradation properties of the target image region and the surrounding image regions. The weight in this weighted mean is set based on the difference in gradation properties between the target image region and the surrounding image regions.

With the visual processing device of this invention, in the spatially processed signal it is possible to inhibit the impact from image regions that have significantly different gradation properties. For example, it is possible to derive a spatially processed signal that is appropriate even in an image where the surrounding image region includes the border of an object, for example, making its gradation property significantly different from that of the target image region. As a result, visual processing using this spatially processed signal can in particular suppress the occurrence of pseudo-borders or the like. It is thus possible to accomplish visual processing having an improved visual processing effect.

The visual processing device according to attachment 24 is the visual processing device according to attachment 23 in which the weighting is smaller the greater the absolute value of the gradation property difference.

Here, it is possible for the weight to be given as a value that monotonically decreases in correspondence with the difference in gradation properties, or it can be set to a predetermined value by comparing the difference in gradation properties with a predetermined threshold value.

With the visual processing device of this invention, in the spatially processed signal it is possible to inhibit the impact from image regions that have significantly different gradation properties. For example, it is possible to derive a spatially processed signal that is appropriate even in an image where the surrounding image region includes the border of an object, for example, making its gradation property significantly different from that of the target image region. As a result, visual processing using this spatially processed signal can in particular suppress the occurrence of pseudo-borders or the like. It is thus possible to accomplish visual processing having an improved visual processing effect.

The visual processing device according to attachment 25 is the visual processing device according to attachments 23 or 24 in which the weighting is smaller the greater the distance between the target image region and the surrounding image region.

Here, it is possible for the weight to be given as a value that monotonically decreases in correspondence with the size of the distance between the target image region and the surrounding image region, or it can be set to a predetermined value by comparing the size of the distance with a predetermined threshold value.

With the visual processing device of this invention, in the spatially processed signal it is possible to inhibit the impact from surrounding image regions that are away from the target image region. Thus, even in the case of an image where the surrounding image region includes the border of an object, for example, making its gradation property significantly different from that of the target image region, if the surrounding image region is away from the target image region, then the impact from the surrounding image region is inhibited and this allows a more appropriate spatially processed signal to be derived.

The visual processing device according to attachment 26 is the visual processing device according to any of attachments 23 to 25 in which the image region includes a plurality of pixels. Also, the gradation properties of the target image region and the surrounding image regions are set as a characteristic amount of pixel values making up each of those image regions.

With the visual processing device of this invention, each image region is spatially processed using the gradation properties of not only the pixels included in that image region but also the pixels included in image regions over a wide area that includes surrounding image regions. Thus, more appropriate spatial processing can be performed. As a result, it is possible to inhibit the occurrence of pseudo-borders or the like in particular, even in visual processing employing the spatially processed signal. Thus, it becomes possible to achieve visual processing that improves visual effect.

[Second Attachment]

The present invention can also be expressed as follows. It should be noted that dependant-type attachments set forth in this section ([Second Attachment]) are dependent on attachments set forth in the Second Attachment.

<Content of the Second Attachment>

(Attachment 1)

A visual processing device comprising:

input signal processing means that performs a fixed processing with respect to an image signal that has been received as input and outputs the result as a processed signal; and visual processing means that outputs an output signal based on a two-dimensional LUT that lists the relationship between the image signal that has been received as input and the processed signal, and an output signal, which is the image signal after visual processing.

(Attachment 2)

The visual processing device according to attachment 1, wherein the image signal and the output signal have a nonlinear relationship in the two-dimensional LUT.

(Attachment 3)

The visual processing device according to attachment 2, wherein in the two-dimensional LUT there is a nonlinear relationship between the output signal and both the image signal and processed signal.

(Attachment 4)

The visual processing device according to any one of attachments 1 to 3, wherein the value of each element of the two-dimensional LUT is determined based on a mathematical equation that includes a computation for enhancing the value that is calculated from the image signal and the processed signal.

(Attachment 5)

The visual processing device according to attachment 4, wherein the processed signal is a signal that has been obtained by performing the fixed processing with respect to the image signals of a pixel being processed and surrounding pixels that surround the pixel being processed.

(Attachment 6)

The visual processing device according to attachment 4 or 5, wherein the computation for enhancing is a nonlinear function.

(Attachment 7)

The visual processing device according to any one of attachments 4 to 6, wherein the computation for enhancing is an enhancement function that enhances the difference between each of the transformed values obtained by performing a predetermined transformation with respect to the image signal and the processed signal.

(Attachment 8)

The visual processing device according to attachment 7, wherein a value C of each element of the two-dimensional LUT is determined with respect to a value A of the image signal, a value B of the processed signal, a transformation function F1, an inverse transformation function F2 of the transformation function F1, and the enhancement function F3, according to the equation $F2(F1(A)+F3(F1(A)-F1(B)))$.

(Attachment 9)

The visual processing device according to attachment 8, wherein the transformation function F1 is a logarithmic function.

(Attachment 10)

The visual processing device according to attachment 8, wherein the inverse transformation function F2 is a gamma correction function.

(Attachment 11)

The visual processing device according to any one of attachments 4 to 6, wherein the computation for enhancing is an enhancement function that enhances the ratio between the image signal and the processed signal.

(Attachment 12)

The visual processing device according to attachment 11, wherein a value C of each element of the two-dimensional LUT is determined with respect to a value A of the image signal, a value B of the processed signal, a dynamic range compression function F4, and the enhancement function F5, according to the equation $F4(A)*F5(A/B)$.

(Attachment 13)

The visual processing device according to attachment 12, wherein the dynamic range compression function F4 is a monotonically increasing function.

(Attachment 14)

The visual processing device according to attachment 13, wherein the dynamic range compression function F4 is a concave power function.

(Attachment 15)

The visual processing device according to attachment 12, wherein the dynamic range compression function F4 is a power function.

(Attachment 16)

The visual processing device according to attachment 12, wherein the dynamic range compression function F4 is a direct proportion function of a proportion coefficient 1.

(Attachment 17)

The visual processing device according to any one of attachments 12 to 16, wherein the enhancement function F5 is a power function.

(Attachment 18)

The visual processing device according to attachment 11, wherein the mathematical equation further includes a computation for performing dynamic range compression with respect to the ratio between the image signal that has been enhanced by the enhancement function and the processed signal.

(Attachment 19)

The visual processing device according to any one of attachments 4 to 6, wherein the computation for enhancing includes a function that enhances the difference between the image signal and the processed signal in accordance with the value of the image signal.

(Attachment 20)

The visual processing device according to attachment 19, wherein the value C of each element of the two-dimensional LUT is determined with respect to the value A of the image signal, the value B of the processed signal, an enhancement amount adjustment function F6, an enhancement function F7, and a dynamic range compression function F8, according to the equation $F8(A)+F6(A)*F7(A-B)$.

(Attachment 21)
The visual processing device according to attachment 20, wherein the dynamic range compression function F8 is a monotonically increasing function.

(Attachment 22)
The visual processing device according to attachment 21, wherein the dynamic range compression function F8 is a concave function.

(Attachment 23)
The visual processing device according to attachment 20, wherein the dynamic range compression function F8 is a power function.

(Attachment 24)
The visual processing device according to attachment 20, wherein the dynamic range compression function F8 is a direct proportion function of a proportion coefficient 1.

(Attachment 25)
The visual processing device according to attachment 19, wherein the mathematical equation further includes a computation for adding a value that has been obtained by compressing the dynamic range of the image signal, to the value enhanced by the computation for enhancing.

(Attachment 26)
The visual processing device according to any one of attachments 4 to 6,
wherein the computation for enhancing is an enhancement function that enhances the difference between the image signal and the processed signal; and
wherein the mathematical equation further includes a computation for performing gradation correction of the value that is obtained by adding the value of the image signal to the value enhanced by the enhancement function.

(Attachment 27)
The visual processing device according to attachment 26, wherein the value C of each element of the two-dimensional LUT is determined with respect to the value A of the image signal, the value B of the processed signal, the enhancement function F9, and a gradation correction function F10, according to the equation $F10(A+F9(A-B))$.

(Attachment 28)
The visual processing device according to any one of attachments 4 to 6,
wherein the computation for enhancing is an enhancement function that enhances the difference between the image signal and the processed signal; and
wherein the mathematical equation further includes a computation for adding a value that has been obtained by correcting the gradation of the image signal, to the value enhanced by the enhancement function.

(Attachment 29)
The visual processing device according to attachment 28, wherein the value C of each element of the two-dimensional LUT is determined with respect to the value A of the image signal, the value B of the processed signal, the enhancement function F11, and a gradation correction function F12, according to the equation $F12(A)+F11(A-B)$.

(Attachment 30)
The visual processing device according to any one of attachments 1 to 29,
wherein the values stored in the two-dimensional LUT with respect to an image signal and a processed signal of the same value monotonically increase or monotonically decrease with respect to the values of the image signal and the processed signal.

(Attachment 31)
The visual processing device according to any one of attachments 1 to 3,
wherein the two-dimensional LUT stores the relationship between the image signal and the output signal as gradation transformation curve groups each having a plurality of gradation transformation curves.

(Attachment 32)
The visual processing device according to attachment 31, wherein each gradation transformation curve group monotonically increases with respect to the value of the image signal.

(Attachment 33)
The visual processing device according to attachment 31 or 32,
wherein the processed signal is a signal for selecting the relevant gradation transformation curve from the plurality of gradation transformation curve groups.

(Attachment 34)
The visual processing device according to attachment 33, wherein the value of the processed signal is associated with at least one gradation transformation curve included in the plurality of gradation transformation curve groups.

(Attachment 35)
The visual processing device according to any one of attachments 1 to 34,
wherein profile data that have been created in advance through a predetermined computation are registered to the two-dimensional LUT.

(Attachment 36)
The visual processing device according to attachment 35, wherein the two-dimensional LUT can be changed through the registration of profile data.

(Attachment 37)
The visual processing device according to attachment 35 or 36, further comprising:
profile data registration means for registering profile data to the visual processing means.

(Attachment 38)
The visual processing device according to attachment 35, wherein the visual processing means obtains profile data that have been created by an external device.

(Attachment 39)
The visual processing device according to attachment 38, wherein the two-dimensional LUT can be changed by the profile data that have been obtained.

(Attachment 40)
The visual processing device according to attachment 38 or 39,
wherein the visual processing means obtains the profile data over a communications network.

(Attachment 41)
The visual processing device according to attachment 35, further comprising:
profile data creation means that creates profile data.

(Attachment 42)
The visual processing device according to attachment 41, wherein the profile data creation means creates the profile data based on a histogram of the gradation properties of the image signal.

(Attachment 43)
The visual processing device according to attachment 35, wherein the profile data that are registered to the two-dimensional LUT are switched in accordance with a predetermined condition.

(Attachment 44)
The visual processing device according to attachment 43, wherein the predetermined condition is a condition relating to the brightness.

(Attachment 45)
The visual processing device according to attachment 44, wherein the brightness is the brightness of the image signal.

(Attachment 46)
The visual processing device according to attachment 45, further comprising:
brightness determination means that determines the brightness of the image signal;
wherein the profile data registered to the two-dimensional LUT are switched in accordance with results of a determination by the brightness determination means.

(Attachment 47)
The visual processing device according to attachment 44, further comprising:
brightness input means that allows a condition relating to the brightness to be input;
wherein the profile data registered to the two-dimensional LUT are switched in accordance with results of an input by the brightness input means.

(Attachment 48)
The visual processing device according to attachment 47, wherein the brightness input means allows the brightness of the output environment of the output signal, or the brightness of the input environment of the input signal, to be input.

(Attachment 49)
The visual processing device according to attachment 44, further comprising:
brightness detection means that detects at least two types of brightness;
wherein the profile data registered to the two-dimensional LUT are switched in accordance with results of a detection by the brightness detection means.

(Attachment 50)
The visual processing device according to attachment 49, wherein the brightness that is detected by the brightness detection means includes the brightness of the image signal, and the brightness of the output environment of the output signal or the brightness of the input environment of the input signal.

(Attachment 51)
The visual processing device according to attachment 43, further comprising:
profile data selection means that allows the profile data registered to the two-dimensional LUT to be selected;
wherein the profile data registered to the two-dimensional LUT are switched in accordance with results of a selection by the profile data selection means.

(Attachment 52)
The visual processing device according to attachment 51, wherein the profile data selection means is an input device for performing the selection of profile data.

(Attachment 53)
The visual processing device according to attachment 43, further comprising:
image property determination means that determines the image property of the image signal;
wherein the profile data registered to the two-dimensional LUT are switched in accordance with results of a determination by the image property determination means.

(Attachment 54)
The visual processing device according to attachment 43, further comprising:
user authentication means that authenticates the user;
wherein the profile data registered to the two-dimensional LUT are switched according to the result of the authentication by the user authentication means.

(Attachment 55)
The visual processing device according to any one of attachments 1 to 54,
wherein the visual processing means performs an interpolation computation of the values stored in the two-dimensional LUT and outputs the result as the output signal.

(Attachment 56)
The visual processing device according to attachment 55, wherein the interpolation computation is a linear interpolation based on the values of the lower bits of at least one of the image signal or the processed signal, which are expressed in binary form.

(Attachment 57)
The visual processing device according to any one of attachments 1 to 56,
wherein the input signal processing means performs spatial processing of the image signal.

(Attachment 58)
The visual processing device according to attachment 57, wherein the input signal processing means creates an unsharp signal from the image signal.

(Attachment 59)
The visual processing device according to attachment 57 or 58,
wherein with the spatial processing, a mean value, a maximum value, or a minimum value of the image signal is derived.

(Attachment 60)
The visual processing device according to any one of attachments 1 to 59,
wherein the visual processing means performs spatial processing and gradation processing using the image signal that has been received as input and the processed signal.

(Attachment 61)
A visual processing method, comprising:
an input signal processing step of performing a fixed processing with respect to an image signal that has been received as input and outputting the result as a processed signal; and
a visual processing step of outputting an output signal based on a two-dimensional LUT that lists the relationship between the image signal that has been received as input and the processed signal, and an output signal, which is the image signal after visual processing.

(Attachment 62)
A visual processing program for performing a visual processing method through a computer, the visual processing program causing a computer to perform a visual processing method that comprises:
an input signal processing step of performing a fixed processing with respect to an image signal that has been received as input and outputting the result as a processed signal; and
a visual processing step of outputting an output signal based on a two-dimensional LUT that lists the relationship between the image signal that has been received as input and the processed signal, and an output signal, which is the image signal after visual processing.

(Attachment 63)
An integrated circuit that includes a visual processing device according to any one of attachments 1 to 60.

(Attachment 64)
A display device comprising:
a visual processing device according to any one of attachments 1 to 60; and
display means that performs a display of the output signal that is output from the visual processing device.

(Attachment 65)

An image-capturing device comprising:

image-capturing means that captures an image; and a visual processing device according to any one of attachments 1 to 60 that visually processes the image that has been captured by the image-capturing means as the image signal.

(Attachment 66)

A portable information terminal comprising:

data reception means that receives image data that have been transmitted or broadcast;

a visual processing device according to any one of attachments 1 to 60 that visually processes the image data that have been received as the image signal; and display means that performs a display of the image signal that has been visually processed by the visual processing device.

(Attachment 67)

A portable information terminal comprising:

image-capturing means that captures an image;

a visual processing device according to any one of attachments 1 to 60 that visually processes the image that has been captured by the image-capturing means as the image signal; and data transmission means that transmits the visually-processed image signal.

(Attachment 68)

An image processing device that performs image processing of an input image signal that has been received as input, comprising:

profile data creation means that creates profile data to be used in image processing based on a plurality of profile data for performing different image processing; and image processing execution means that uses the profile data that have been created by the profile data creation means to perform image processing.

(Attachment 69)

An image processing device that performs image processing of an input image signal that has been received as input, comprising:

profile information output means that outputs profile information for specifying profile data to be used in the image processing; and image processing execution means that uses the profile data that have been specified based on the information output from the profile information output means to perform the image processing.

(Attachment 70)

The image processing device according to attachment 69, wherein the profile information output means outputs the profile information in accordance with the display environment in which the input image signal that has been subjected to image processing is to be displayed.

(Attachment 71)

The image processing device according to attachment 69, wherein the profile information output means outputs the profile information in accordance with information related to the profile data from among the information included in the input image signal.

(Attachment 72)

The image processing device according to attachment 69, wherein the profile information output means outputs the profile information in accordance with information related to the features of the image processing that has been obtained.

(Attachment 73)

The image processing device according to attachment 69, wherein the profile information output means outputs the profile information in accordance with information related to the environment in which the input image signal was created.

(Attachment 74)

The image processing device according to attachment 69, wherein the input image signal includes image data and property information of the input image signal; and wherein the profile information output means outputs the profile information in accordance with the property information.

(Attachment 75)

The image processing device according to attachment 74, wherein the property information includes overall property information that is related to the image data overall.

(Attachment 76)

The image processing device according to attachment 74 or 75, wherein the property information includes partial property information that is related to some of the image data.

(Attachment 77)

The image processing device according to attachment 74, wherein the property information includes creation environment property information that is related to the environment in which the input image signal was created.

(Attachment 78)

The image processing device according to attachment 74, wherein the property information includes medium property information that is related to the medium in which the input image signal was obtained.

(Attachment 79)

The image processing device according to any one of attachments 68 to 78, wherein the profile data are a two-dimensional LUT; and wherein the image processing execution means includes a visual processing device according to any one of attachments 1 to 60.

(Attachment 80)

An image processing device comprising:

image processing execution means that performs image processing of an input image signal that has been received as input; profile information output means that outputs profile information for specifying profile data with which to perform favorable image processing of the input image signal that has been received as input; and profile information adding means that adds the profile information to the input image signal or the input image signal after image processing by the image processing execution means, and outputs the result.

(Attachment 81)

An integrated circuit that includes an image processing device according to any one of attachments 68 to 80.

(Attachment 82)

A display device comprising:

an image processing device according to any one of attachments 68 to 80; and display means that performs a display of the input image signal that has been image processed by the image processing device.

(Attachment 83)

An image-capturing device comprising:

image-capturing means that captures an image; and an image processing device according to any one of attachments 68 to 80 that image processes the image that has been captured by the image-capturing means as the input image signal.

(Attachment 84)

A portable information terminal comprising:

data reception means that receives image data that have been transmitted or broadcast;

an image processing device according to any one of attachments 68 to 80 that image processes the image data that have been received as the input image signal; and display means that performs a display of the input image signal that has been image processed by the image processing device.

(Attachment 85)

A portable information terminal comprising:

image-capturing means that captures an image;

an image processing device according to any one of attachments 68 to 80 that performs image processing of the image that has been captured by the image-capturing means as the input image signal; and data transmission means that transmits the input image signal that has been image processed.

<Description of the Second Attachment>

The visual processing device according to attachment 1 is provided with input image processing means and visual processing means. The input signal processing means performs a fixed processing with respect to an image signal that has been received as input and outputs the result as a processed signal. The visual processing means outputs an output signal based on a two-dimensional LUT that lists the relationship between the image signal that has been received as input and the processed signal, and an output signal, which is the image signal after visual processing.

Here, the fixed processing is for example direct or indirect processing of the image signal, and includes processing such as spatial processing or gradation processing for adding a transformation to the pixel value of the image signal.

With the visual processing device of this invention, visual processing is performed using a two-dimensional LUT that stores the relationship between the image signal and the processed signal, and the output signal after visual processing. Thus, it is possible to achieve a hardware configuration that does not depend on the function of the two-dimensional LUT. That is, it is possible to achieve a hardware configuration that is independent of the visual processing achieved by the device overall.

The visual processing device according to attachment 2 is the visual processing device according to attachment 1 in which the image signal and the output signal have a nonlinear relationship in the two-dimensional LUT.

Here, the image signal and the output signal being in a nonlinear relationship means that the value of the each elements of the two-dimensional LUT is expressed by a nonlinear function with respect to the image signal, or cannot be easily formalized by a function.

With the visual processing device of this invention, it is for example possible to achieve visual processing suited for the visual characteristics of the image signal or visual processing that is suited for the nonlinear properties of the device for outputting the output signal.

The visual processing device according to attachment 3 is the visual processing device according to attachment 2 in which in the two-dimensional LUT there is a nonlinear relationship between the output signal and both the image signal and processed signal.

Here, both the image signal and the processed signal being in a nonlinear relationship with the output signal means that the value of each element of the two-dimensional LUT is expressed by a two-variable nonlinear function with respect to the image signal and the processed signal, or that it cannot be easily formalized by a function.

With the visual processing device of this invention, it is for example possible to achieve different visual processing that is in accordance with the value of the processed signal in a case where the image signal values are the same but the processed signal value is different.

The visual processing device according to attachment 4 is the visual processing device according to any one of attachments 1 to 3 in which the value of each element of the two-dimensional LUT is determined based on a mathematical equation that includes a computation for enhancing the value that is calculated from the image signal and the processed signal.

Here, the value that is calculated from the image signal and the processed signal is for example a value that is obtained by arithmetic computation of the image signal and the processed signal, or a value that is obtained by computing the value of the image signal or the processed signal transformed by a particular function. The computation for enhancing is for example a computation for adjusting the gain, a computation for inhibiting extreme contrasts, or a computation for suppressing small amplitude noise components.

With the visual processing device of this invention, it is possible to enhance the value calculated from the image signal and the processed signal.

The visual processing device according to attachment 5 is the visual processing device according to attachment 4 in which the processed signal is a signal that has been obtained by performing the fixed processing with respect to the image signals of a pixel being processed and pixels that surround the pixel being processed.

Here, the fixed processing is for example spatial processing using surrounding pixels with respect to the pixel being processed, and is processing for deriving the mean value, maximum value, or minimum value, for example, of the pixel being processed and the surrounding pixels.

With the visual processing device of this invention, it is possible to achieve different types of visual processing due to the effects of the surrounding pixels, even though the visual processing may be performed with respect to pixels being processed having the same value.

The visual processing device according to attachment 6 is the visual processing device according to attachment 4 or 5 in which the computation for enhancing is a nonlinear function.

With the visual processing device of this invention, it is for example possible to achieve enhancement suited for the visual characteristics of the image signal or enhancement that is suited for the nonlinear properties of the device that outputs the output signal.

The visual processing device according to attachment 7 is the visual processing device according to any one of attachments 4 to 6 in which the computation for enhancing is an enhancement function that enhances the difference between each of the transformed values obtained by performing a predetermined transformation with respect to the image signal and the processed signal.

Here, the enhancement function is for example a function for adjusting the gain, a function for inhibiting extreme contrasts, or a function for suppressing small amplitude noise components.

With the visual processing device of this invention, it is possible to transform the image signal and the processed signal into different spaces and then enhance the difference between them. Thus, it is for example possible to achieve enhancement that is suited for the visual characteristics.

The visual processing device according to attachment 8 is the visual processing device according to attachment 7 in which the value C of each element of the two-dimensional LUT is determined with respect to a value A of the image signal, a value B of the processed signal, a transformation function F1, an inverse transformation function F2 of the transformation function F1, and the enhancement function F3, according to the equation F2(F1(A)+F3(F1(A)−F1(B))).

Here, the two-dimensional LUT is a LUT that gives a value C for each element with respect to the two inputs of the value A of the image signal and the value B of the processed signal (the same applies in the description that follows). Also, the value of each signal can be the actual value of that signal or an approximation of that value (the same applies in the description that follows). The enhancement function F3 is for example a function for adjusting the gain, a function for inhibiting extreme contrasts, or a function for suppressing small amplitude noise components.

Here, the value C of each element indicates the following. That is, the value A of the image signal and the value B of the processed signal are transformed into values in different spaces by the transformation function F1. The difference between the value of the image signal and the value of the processed signal after transformation represents a sharp signal, for example, in the separate space. The difference between the image signal and the processed signal after transformation, in which they are enhanced by the enhancement function F3, is added to the image signal after transformation. Thus, the value C of each element indicates a value that is obtained by enhancing the sharp signal component in a separate space.

With the visual processing device of this invention, it is for example possible to use the value A of the image signal and the value B of the processed signal, which have been transformed to separate spaces, to perform processing such as edge enhancement or contrast enhancement in a separate space.

The visual processing device according to attachment 9 is the visual processing device according to attachment 8 in which the transformation function F1 is a logarithmic function.

Here, human visual performance in general is logarithmic. Thus, by processing the image signal and the processed signal transforming to logarithmic space, it is possible to perform visual processing that is suited for our visual characteristics.

With the visual processing device of this invention, it is possible to perform contrast enhancement having a high visual effect or dynamic range compression that maintains local contrast.

The visual processing device according to attachment 10 is the visual processing device according to attachment 8 in which the inverse transformation function F2 is a gamma correction function.

Here, image signals in general are subjected to gamma correction through a gamma correction function based on the gamma characteristics of the device that inputs and outputs the image signal.

With the visual processing device of this invention, with the transformation function F1 it is possible to exclude gamma correction of the image signal and perform processing using linear characteristics. Thus, it is possible to correct optical blurring.

The visual processing device according to attachment 11 is the visual processing device according to any one of attachments 4 to 6 in which the computation for enhancing is an enhancement function that enhances the ratio between the image signal and the processed signal.

With the visual processing device of this invention, the ratio between the image signal and the processed signal for example expresses the sharp component of the image signal. For this reason, visual processing for enhancing the sharp component, for example, can be performed.

The visual processing device according to attachment 12 is the visual processing device according to attachment 11 in which a value C of each element of the two-dimensional LUT is determined with respect to a value A of the image signal, a value B of the processed signal, a dynamic range compression function F4, and the enhancement function F5, according to the equation F4(A)*F5(A/B).

Here, the value C of each element indicates the following. That is, the value (A/B) obtained by dividing the value A of the image signal by the value B of the processed signal expresses the sharp signal, for example. Also, F5(A/B) expresses the enhancement amount of the sharp signal, for example. These show processing equivalent to transforming the value A of the image signal and the value B of the processed signal into logarithmic space and then enhancing the respective differences in each, performing enhancement processing that is suited for the visual characteristics.

With the visual processing device of this invention, it is possible to perform dynamic range compression where necessary while enhancing the local contrast.

The visual processing device according to attachment 13 is the visual processing device according to attachment 12 in which the dynamic range compression function F4 is a monotonically increasing function.

With the visual processing device of this invention, it is possible to use the dynamic range compression function F4, which is a monotonically increasing function, to perform dynamic range compression while enhancing local contrast.

The visual processing device according to attachment 14 is the visual processing device according to attachment 13 in which the dynamic range compression function F4 is a concave function.

With the visual processing device of this invention, it is possible to use the dynamic range compression function F4, which is a concave function, to perform dynamic range compression while enhancing local contrast.

The visual processing device according to attachment 15 is the visual processing device according to attachment 12 in which the dynamic range compression function F4 is a power function.

With the visual processing device of this invention, it is possible to use the dynamic range compression function F4, which is a power function, to transform the dynamic range while enhancing local contrast.

The visual processing device according to attachment 16 is the visual processing device according to attachment 12 in which the dynamic range compression function F4 is a direct proportion function of a proportion coefficient 1.

With the visual processing device of this invention, it is possible to enhance the contrast of the image signal uniformly across dark areas and bright areas alike. This contrast enhancement is enhancement processing that is suited for the visual characteristics.

The visual processing device according to attachment 17 is the visual processing device according to any one of attachments 12 to 16 in which the enhancement function F5 is a power function.

With the visual processing device of this invention, it is possible to use the enhancement function F5, which is a power function, to transform the dynamic range while enhancing local contrast.

The visual processing device according to attachment 18 is the visual processing device according to attachment 11 in which the mathematical equation further includes a computation for performing dynamic range compression with respect to the ratio between the image signal that has been enhanced by the enhancement function and the processed signal.

With the visual processing device of this invention, it is possible to enhance the sharp component of the image signal, which expresses the ratio between the image signal and the processed signal, while performing compression of the dynamic range.

The visual processing device according to attachment 19 is the visual processing device according to any one of attachments 4 to 6 in which the computation for enhancing includes a function that enhances the difference between the image signal and the processed signal in accordance with the value of the image signal.

With the visual processing device of this invention, it is possible to enhance for example the sharp component of the image signal, which is the difference between the image signal and the processed signal, in accordance with the value of the image signal. Thus, it is possible to perform appropriate enhancement over a range of dark areas to bright areas of the image signal.

The visual processing device according to attachment 20 is the visual processing device according to attachment 19 in which the value C of each element of the two-dimensional LUT is determined with respect to the value A of the input signal, the value B of the processed signal, an enhancement amount adjustment function F6, an enhancement function F7, and a dynamic range compression function F8, according to the equation $F8(A)+F6(A)*F7(A-B)$.

Here, the value C of each element shows the following. That is, the difference (A−B) between the value A of the image signal and the value B of the processed signal expresses the sharp signal, for example. Also, F7(A−B) for example expresses the enhancement amount of the sharp signal. The enhancement amount is adjusted by the enhancement amount adjustment function F6 in accordance with the value A of the image signal, and where necessary is added to the value of the image signal after its dynamic range has been compressed.

With the visual processing device of this invention, in areas where the value A of the image signal is large it is for example possible to maintain the contrast over dark areas to bright areas by reducing the enhancement amount. It is possible to maintain local contrast over a range spanning dark areas to bright areas even when dynamic range compression has been performed.

The visual processing device according to attachment 21 is the visual processing device according to attachment 20 in which the dynamic range compression function F8 is a monotonically increasing function.

With the visual processing device of this invention, it is possible to use the dynamic range compression function F8, which is a monotonically increasing function, to perform dynamic range compression while maintaining local contrast.

The visual processing device according to attachment 22 is the visual processing device according to attachment 21 in which the dynamic range compression function F8 is a concave function.

With the visual processing device of this invention, it is possible to use the dynamic range compression function F8, which is a concave function, to perform dynamic range compression while maintaining local contrast.

The visual processing device according to attachment 23 is the visual processing device according to attachment 20 in which the dynamic range compression function F8 is a power function.

With the visual processing device of this invention, it is possible to use the dynamic range compression function F8, which is a power function, to transform the dynamic range while maintaining local contrast.

The visual processing device according to attachment 24 is the visual processing device according to attachment 20 in which the dynamic range compression function F8 is a direct proportion function of a proportion coefficient 1.

With the visual processing device of this invention, it is possible to enhance the contrast of the image signal uniformly over a range spanning dark areas to bright areas.

The visual processing device according to attachment 25 is the visual processing device according to attachment 19 in which the mathematical equation further includes a computation for adding a value that has been obtained by compressing the dynamic range of the image signal, to the value enhanced by the computation for enhancing.

With the visual processing device of this invention, it is for example possible to enhance the sharp component, for example, of the image signal in accordance with the value of the image signal and also perform compression of the dynamic range.

The visual processing device according to attachment 26 is the visual processing device according to any one of attachments 4 to 6 in which the computation for enhancing is an enhancement function that enhances the difference between the image signal and the processed signal. The mathematical equation further includes a computation for performing gradation correction of the value that is obtained by adding the value of the image signal to the value enhanced by the enhancement function.

With the visual processing device of this invention, the difference between the image signal and the processed signal expresses the sharp component of the image signal. Thus, it is possible to accomplish visual processing for correcting the gradation of an image signal whose sharp component has been enhanced.

The visual processing device according to attachment 27 is the visual processing device according to attachment 26 in which the value C of each element of the two-dimensional LUT is determined with respect to the value A of the image signal, the value B of the processed signal, the enhancement function F9, and a gradation correction function F10, according to the equation $F10(A+F9(A-B))$.

Here, the value C of each element shows the following. That is, the difference (A−B) between the value A of the image signal and the value B of the processed signal expresses the sharp signal, for example. Also, F9(A−B) for example expresses the enhancement processing of the sharp signal. It also indicates that the sum of the value A of the image signal and the enhanced sharp signal has been gradation corrected.

With the visual processing device of this invention, it is possible to obtain the combined effect of contrast enhancement and gradation correction.

The visual processing device according to attachment 28 is the visual processing device according to any one of attachments 4 to 6 in which the computation for enhancing is an enhancement function that enhances the difference between the image signal and the processed signal. The mathematical equation further includes a computation for adding a value that has been obtained by correcting the gradation of the image signal, to the value enhanced by the enhancement function.

With the visual processing device of this invention, the difference between the image signal and the processed signal expresses the sharp component of the image signal. Also, enhancement of the sharp component and gradation correction of the image signal are performed independently. Thus, it is possible to perform enhancement of the sharp component that is constant regardless of the gradation correction amount of the image signal.

The visual processing device according to attachment 29 is the visual processing device according to attachment 28 in which the value C of each element of the two-dimensional LUT is determined with respect to the value A of the image signal, the value B of the processed signal, the enhancement function F11, and a gradation correction function F12, according to the equation F12(A)+F11(A−B).

Here, the value C of each element shows the following. That is, the difference (A−B) between the value A of the image signal and the value B of the processed signal expresses the sharp signal, for example. Also, F11(A−B) for example expresses the enhancement processing of the sharp signal. It also expresses that the value of the gradation-corrected image signal and the enhanced sharp signal have been added.

With the visual processing device of this invention, it is possible to perform a constant contrast enhancement regardless of the gradation correction.

The visual processing device according to attachment 30 is the visual processing device according to any one of attachments 1 to 29 in which the values stored in the two-dimensional LUT with respect to an image signal and a processed signal of the same value monotonically increase or monotonically decrease with respect to the values of the image signal and the processed signal.

Here, the values stored in the two-dimensional LUT with respect to image signals and the processed signals of the same value show an overview of the properties of the two-dimensional LUT.

With the visual processing device of this invention, the two-dimensional LUT stores monotonically increasing or monotonically decreasing values with respect to the image signals and the processed signals as values for the image signals and processed signals of the same value.

The visual processing device according to attachment 31 is the visual processing device according to any one of attachments 1 to 3 in which the two-dimensional LUT stores the relationship between the image signal and the output signal as gradation transformation curve groups each having a plurality of gradation transformation curves.

Here, the gradation transformation curve groups are collections of gradation transformation curves for executing gradation processing of pixel values such as the luminance or brightness of the image signal.

With the visual processing device of this invention, it is possible to perform gradation processing of an image signal using a gradation transformation curve that has been selected from a plurality of gradation transformation curves. Thus, it is possible to perform more appropriate gradation processing.

The visual processing device according to attachment 32 is the visual processing device according to attachment 31 in which each gradation transformation curve group monotonically increases with respect to the value of the image signal.

With the visual processing device of this invention, it is possible to perform gradation processing using a gradation transformation curve group that monotonically increases with respect to the value of the image signal.

The visual processing device according to attachment 33 is the visual processing device according to attachment 31 or 32 in which the processed signal is a signal for selecting the relevant gradation transformation curve from the plurality of gradation transformation curve groups.

Here, the processed signal is a signal for selecting a gradation transformation curve, and for example is the image signal after it has been subjected to spatial processing.

With the visual processing device of this invention, it is possible to transform the gradation of the image signal using a gradation transformation curve that has been selected by the processed signal.

The visual processing device according to attachment 34 is the visual processing device according to attachment 33 in which the value of the processed signal is associated with at least one gradation transformation curve included in the plurality of gradation transformation curve groups.

Here, at least one gradation transformation curve to be used in gradation processing is selected based on the value of the processed signal.

With the visual processing device of this invention, at least one gradation transformation curve is selected based on the value of the processed signal. Further, the gradation of the image signal is transformed using the gradation transformation curve(s) that has been selected.

The visual processing device according to attachment 35 is the visual processing device according to any one of attachments 1 to 34, in which profile data that have been created in advance through a predetermined computation are registered to the two-dimensional LUT.

With the visual processing device of this invention, visual processing is performed using a two-dimensional LUT to which profile data that have been created in advance have been registered. Thus, a process for creating profile data, for example, is not necessary at the time of visual processing, and this allows visual processing to be executed faster.

The visual processing device according to attachment 36 is the visual processing device according to attachment 35 in which the two-dimensional LUT can be changed through the registration of profile data.

Here, the profile data are data of the two-dimensional LUT that accomplish different types of visual processing.

With the visual processing device of this invention, the visual processing that is achieved can be varied widely due to the registration of profile data. That is, various manner of visual processing can be achieved without changing the hardware configuration of the visual processing device.

The visual processing device according to attachment 37 is the visual processing device according to attachment 35 or 36, further comprising profile data registration means for registering profile data to the visual processing means.

Here, the profile data registration means registers profile data that have been calculated in advance to the visual processing means in correspondence with the visual processing.

With the visual processing device of this invention, the visual processing that is achieved can be widely varied by registering profile data. That is, various manner of visual processing can be achieved without changing the hardware configuration of the visual processing device.

The visual processing device according to attachment 38 is the visual processing device according to attachment 35 in which the visual processing means obtains profile data that have been created by an external device.

The profile data are created in advance by an external device. The external device is for example a computer having a CPU and program capable of creating profile data. The visual processing means obtains the profile data. This obtaining is accomplished over a network or via a recording medium. The visual processing means uses the profile data that it has obtained to execute visual processing.

With the visual processing device of this invention, it is possible to execute visual processing using profile data that have been created by an external device.

The visual processing device according to attachment 39 is the visual processing device according to attachment 38 in which the two-dimensional LUT can be changed by the profile data that have been obtained.

With the visual processing device of this invention, the profile data that have been obtained are registered as a new two-dimensional LUT. Thus, it is possible to change the two-dimensional LUT and thereby achieve different visual processing.

The visual processing device according to attachment 40 is the visual processing device according to attachment 38 or 39 in which the visual processing means obtains the profile data over a communications network.

Here, a communications network refers to connection means that is capable of communication, such as a dedicated line, a public telephone line, the Internet, or a LAN, and can be a wired or wireless connection.

With the visual processing device of this invention, it is possible to achieve visual processing using profile data that have been obtained over a communications network.

The visual processing device according to attachment 41 is the visual processing device according to attachment 35, further comprising profile data creation means that creates profile data.

The profile data creation means for example creates profile data using properties of the image signal or the processed signal, for example.

With the visual processing device of this invention, it is possible to execute visual processing using profile data that have been created by the profile data creation means.

The visual processing device according to attachment 42 is the visual processing device according to attachment 41 in which the profile data creation means creates the profile data based on a histogram of the gradation properties of the image signal.

With the visual processing device of this invention, visual processing is achieved using profile data that have been created based on a histogram of the gradation properties of the image signal. Thus, it is possible to accomplish appropriate visual processing for the properties of the image signal.

The visual processing device according to attachment 43 is the visual processing device according to attachment 35 in which the profile data that are registered to the two-dimensional LUT are switched in accordance with a predetermined condition.

With the visual processing device of this invention, visual processing is achieved using profile data that are switched based on a predetermined condition. Thus, it is possible to accomplish more appropriate visual processing.

The visual processing device according to attachment 44 is the visual processing device according to attachment 43 in which the predetermined condition is a condition relating to the brightness.

With the visual processing device of this invention, it is possible to achieve more appropriate visual processing for the condition relating to the brightness.

The visual processing device according to attachment 45 is the visual processing device according to attachment 44 in which the brightness is the brightness of the image signal.

With the visual processing device of this invention, it is possible to achieve more appropriate visual processing for the condition relating to the brightness of the image signal.

The visual processing device according to attachment 46 is the visual processing device according to attachment 45, further comprising brightness determination means that determines the brightness of the image signal. The profile data registered to the two-dimensional LUT are switched in accordance with results of a determination by the brightness determination means.

Here, the brightness determination means for example determines the brightness of the image signal based on a pixel value such as the luminance or the brightness of the image signal. Further, it is possible to switch between profile data according to the results of this determination.

With the visual processing device of this invention, it is possible to achieve more appropriate visual processing, based on the brightness of the image signal.

The visual processing device according to attachment 47 is the visual processing device according to attachment 44, further comprising brightness input means that allows a condition relating to the brightness to be input. The profile data registered to the two-dimensional LUT are switched in accordance with results of an input by the brightness input means.

Here, the brightness input means is for example a switch or the like, connected through a wired or wireless connection, which allows the user to input conditions relating to the brightness.

With the visual processing device of this invention, it is possible for the user to determine a condition relating to the brightness and through the brightness input means to switch between the profile data. Thus, it is possible to accomplish visual processing that is more suited for the user.

The visual processing device according to attachment 48 is the visual processing device according to attachment 47 in which the brightness input means allows the brightness of the environment in which the output signal is output, or the brightness of the environment in which the input signal is received as input, to be input.

Here, the brightness of the output environment is for example the brightness of the ambient light around the medium that outputs the output signal, such as a computer, television, digital camera, portable telephone, or PDA, or is the brightness of the medium itself that will output the output signal, such as the printer paper. The brightness of the input environment is for example the brightness of the medium itself that will input the input signal, such as scanner paper.

With the visual processing device of this invention, it is for example possible for the user to determine a condition relating to the brightness of the room, for example, and through the brightness input means to switch between profile data. Thus, it is possible to accomplish visual processing that is more suited for the user.

The visual processing device according to attachment 49 is the visual processing device according to attachment 44, further comprising brightness detection means that detects at least two types of brightness. The profile data registered to the two-dimensional LUT are switched in accordance with results of a detection by the brightness detection means.

Here, the brightness detection means is for example means for detecting the brightness of the image signal based on a pixel value such as the luminance or the brightness of the image signal, means such as a photo sensor for detecting the brightness of the output environment or the input environment, or means for detecting conditions relating to the brightness that has been input by the user. It should be noted that the brightness of the output environment is for example the brightness of the ambient light around the medium itself to which the output signal will be output, such as a computer, television, digital camera, portable telephone, or PDA, or is the brightness of the medium itself to which the output signal will be output, such as the printer paper. The brightness of the input environment is for example the brightness of the medium itself from which the input signal is input, such as scanner paper.

With the visual processing device of this invention, at least two types of brightness are detected and based on these the profile data are switched. Thus, it is possible to achieve more appropriate visual processing.

The visual processing device according to attachment 50 is the visual processing device according to attachment 49 in which the brightness that is detected by the brightness detection means includes the brightness of the image signal, and the brightness of the output environment of the output signal or the brightness of the input environment of the input signal.

With the visual processing device of this invention, it is possible to achieve more appropriate visual processing corresponding to the brightness of the image signal and the brightness of the environment in which the output signal is output or the brightness of the environment in which the input signal is received as input.

The visual processing device according to attachment 51 is the visual processing device according to attachment 43, further comprising profile data selection means that allows the profile data registered to the two-dimensional LUT to be selected. The profile data registered to the two-dimensional LUT are switched in accordance with results of a selection by the profile data selection means.

The profile data selection means allows the user to select profile data. Further, with this visual processing device, visual processing is achieved using the profile data that have been selected.

With the visual processing device of this invention, it is possible for the user to select profile data based on his or her preferences and using this to achieve visual processing.

The visual processing device according to attachment 52 is the visual processing device according to attachment 51 in which the profile data selection means is an input device for performing the selection of profile data.

Here, the input device is for example a switch that is provided in, or connected to wirelessly or through wired connection, the visual processing device.

With the visual processing device of this invention, the user can use the input device to select preferred profile data.

The visual processing device according to attachment 53 is the visual processing device according to attachment 43, further comprising image property determination means that determines an image property of the image signal. The profile data registered to the two-dimensional LUT are switched in accordance with results of a determination by the image property determination means.

The image property determination means determines an image property, such as the luminance, brightness, or spatial frequency, of the image signal. The visual processing device uses the profile data that have been switched in accordance with results of a determination by the image property determination means to accomplish visual processing.

With the visual processing device of this invention, the image property determination means automatically selects profile data corresponding to the image property. Thus, it is possible to execute visual processing using profile data that are more appropriate for the image signal.

The visual processing device according to attachment 54 is the visual processing device according to attachment 43, further comprising user authentication means that authenticates the user. The profile data registered to the two-dimensional LUT are switched according to the result of the authentication by the user authentication means.

The user authentication means is for example an input device or a camera for authenticating the user.

With the visual processing device of this invention, it is possible to achieve visual processing that is suited for the user that has been authenticated by the user authentication means.

The visual processing device according to attachment 55 is the visual processing device according to any one of attachments 1 to 54, in which the visual processing means performs an interpolation computation of the values stored in the two-dimensional LUT and outputs the result as an output signal.

The two-dimensional LUT stores values with respect to values of the image signal or values of the processed signal at a predetermined interval. By performing an interpolation computation of the values of the two-dimensional LUT corresponding to a section that includes the value of the image signal that has been received as input or the value of the processed signal, it is possible to output a value for the output signal that corresponds to the value of the image signal that has been received as input or the value of the processed signal.

With the visual processing device of this invention, it is not necessary for the two-dimensional LUT to store a value for all of the values that the image signal or the processed signal can take, and this allows the amount of memory for the two-dimensional LUT to be reduced.

The visual processing device according to attachment 56 is the visual processing device according to attachment 55 in which the interpolation computation is linear interpolation based on the values of the lower bits of at least one of the image signal or the processed signal, which are expressed in binary form.

The two-dimensional LUT stores values corresponding to the values of the upper bits of the image signal or the processed signal. The visual processing means performs linear interpolation of the values of the two-dimensional LUT corresponding to the section including the value of image signal or the processed signal that has been input with the values of the lower bits of the image signal or the processed signal, and outputs the result as an output signal.

With the visual processing device of this invention, it is possible to store the two-dimensional LUT using a smaller memory amount while achieving even more accurate visual processing.

The visual processing device according to attachment 57 is the visual processing device according to any one of attachments 1 to 56, in which the input signal processing means performs spatial processing of the image signal.

With the visual processing device of this invention, it is possible to use the image signal and the image signal after spatial processing to perform visual processing using a two-dimensional LUT.

The visual processing device according to attachment 58 is the visual processing device according to attachment 57 in which the input signal processing means creates an unsharp signal from the image signal.

Here, "unsharp signal" means the signal that is obtained by directly or indirectly spatially processing the image signal.

With the visual processing device of this invention, it is possible to use the image signal and the unsharp signal to achieve visual processing using a two-dimensional LUT.

The visual processing device according to attachment 59 is the visual processing device according to attachment 57 or 58 in which the spatial processing leads to the derivation of a mean value, a maximum value, or a minimum value of the image signal.

Here, the mean value can be the simple mean or the weighted mean of the image signal.

With the visual processing device of this invention, it is possible to achieve visual processing through a two-dimensional LUT using the image signal and a mean value, a maximum value, or a minimum value of the image signal.

The visual processing device according to attachment 60 is the visual processing device according to any one of attachments 1 to 59, in which the visual processing means performs spatial processing and gradation processing using the image signal and the processed signal that have been received as input.

With the visual processing device of this invention, it is possible to use a two-dimensional LUT to simultaneously achieve spatial processing and gradation processing.

The visual processing method according to attachment 61 comprises an image signal processing step and a visual processing step. The input signal processing step is a step of performing a fixed processing with respect to an image signal that has been received as input and outputting the result as a processed signal. The visual processing step is a step of outputting an output signal based on a two-dimensional LUT that lists the relationship between the image signal that has been received as input and the processed signal, and an output signal, which is the image signal after visual processing.

Here, the fixed processing is for example direct or indirect processing of the image signal, and includes a process of adding a transformation to the pixel values of the image signal, such as spatial processing or gradation processing.

With the visual processing method of this invention, visual processing is performed using a two-dimensional LUT storing the relationship of the image signal and the processed signal with respect to the visually processed output signal. Thus, the speed at which visual processing is performed can be increased.

The visual processing program according to attachment 62 is a visual processing program for performing a visual processing method on a computer, and causes a computer to perform a visual processing method that comprises an input signal processing step and a visual processing step. The input signal processing step is a step of performing a fixed processing with respect to an image signal that has been received as input and outputting the result as a processed signal. The visual processing step is a step of outputting an output signal based on a two-dimensional LUT that lists the relationship between the image signal that has been received as input and the processed signal, and an output signal, which is the image signal after visual processing.

Here, the fixed processing is for example direct or indirect processing of the image signal, and includes a process of adding a transformation to the pixel values of the image signal, such as spatial processing or gradation processing.

With the visual processing program of this invention, visual processing is performed using a two-dimensional LUT storing the relationship of the image signal and the processing signal with respect to the visually processed output signal. Thus, visual processing can be performed faster.

The integrated circuit according to attachment 63 includes the visual processing device according to any one of attachments 1 to 60.

With the integrated circuit of this invention, it is possible to obtain the same effects as any of the visual processing devices according to attachments 1 to 60.

The display device according to attachment 64 comprises a visual processing device according to any one of attachments 1 to 60, and display means that performs a display of the output signal that has been output from the visual processing device.

With the display device of this invention, it is possible to obtain the same effects as any of the visual processing devices according to attachments 1 to 60.

The image-capturing device according to attachment 65 comprises image-capturing means that captures an image, and a visual processing device according to any one of attachments 1 to 60 that visually processes the image that has been captured by the image-capturing means as the image signal.

With the image-capturing device of this invention, it is possible to obtain the same effects as any of the visual processing devices according to attachments 1 to 60.

The portable information terminal according to attachment 66 comprises data reception means that receives image data that have been transmitted or broadcast, a visual processing device according to any one of attachments 1 to 60 that visually processes as the image signal the image data that have been received, and display means that performs a display of the image signal that has been visually processed by the visual processing device.

With the portable information terminal of this invention, it is possible to obtain the same effects as any of the visual processing devices according to attachments 1 to 60.

The portable information terminal according to attachment 67 comprises image-capturing means that captures an image, a visual processing device according to any one of attachments 1 to 60 that visually processes as the image signal the image that has been captured by the image-capturing means, and data transmission means that transmits the image signal that has been visually processed.

With the portable information terminal of this invention, it is possible to obtain the same effects as any of the visual processing devices according to attachments 1 to 60.

The image processing device according to attachment 68 is an image processing device that performs image processing of an input image signal that has been received as input, and comprises profile data creation means and image processing execution means. The profile data creation means creates profile data to be used for image processing based on a plurality of profile data for performing different image processing. The image processing execution means uses the profile data that have been created by the profile data creation means to perform image processing.

Here, image processing is for example visual processing such as spatial processing or gradation processing, or color processing such as color transformation (the same applies in the following description).

The profile data are for example coefficient matrix data for performing a computation with respect to the input image signal, or table data storing values of the image-processed input image signal with respect to the values of the input image signal (the same applies in the following description).

The image processing device of the present invention creates new profile data based on data of a plurality of profiles. Thus, a great number of different image processing types can be performed even though there may be a small number of profile data that have been prepared in advance. That is, it is possible to reduce the storage capacity for storing the profile data.

The image processing device according to attachment 69 is an image processing device that performs image processing of an input image signal that has been received as input, and comprises profile information output means and image processing execution means. The profile information output means outputs profile information for specifying profile data to be used in image processing. The image processing execution means uses the profile data that have been specified based on the information output from the profile information output means to perform image processing.

Here, the profile information is for example profile data, tag information such as a number that specifies profile data, parameter information indicating the features of the processing of the profile data, or other information for specifying profile data.

With the image processing device of this invention, it is possible to perform image processing controlling the profile data in accordance with the profile information.

The image processing device according to attachment 70 is the image processing device according to attachment 69 in which the profile information output means outputs profile information in correspondence with the display environment in which the input image signal that has been subjected to image processing is to be displayed.

Here, the display environment is for example the brightness or color temperature of the ambient light, the device for performing the display, the size of the displayed image, the positional relationship between the image that is displayed and the user who will view the image that is displayed, and information related to the user.

With the image processing device of this invention, it is possible to perform image processing that is suited for the display environment.

The image processing device according to attachment 71 is the image processing device according to attachment 69 in which the profile information output means outputs the profile information in correspondence with information related to the profile data from among the information included in the input image signal.

The information related to the profile data is for example profile data, tag information such as a number that specifies profile data, parameter information indicating the features of the processing of the profile data, or other information for specifying profile data.

With the image processing device of this invention, it is possible to obtain information related to the profile data from the input image signal and to use this to perform image processing.

The image processing device according to attachment 72 is the image processing device according to attachment 69 in which the profile information output means outputs profile information in accordance with information related to the features of the image processing that has been obtained.

The information related to the features of the image processing that has been obtained is information on the features of the parameters of the image processing, and for example is a value of a parameter for adjusting the brightness, picture quality, or color, for example.

With the image processing device of this invention, it is for example possible to perform image processing based on information related to the features of the image processing that has been input by the user based on his or her preferences.

The image processing device according to attachment 73 is the image processing device according to attachment 69 in which the profile information output means outputs profile information in accordance with information related to the environment in which the input image signal was created.

The information related to the environment in which the input image signal was created includes for example information related to the image capture conditions in a case where the input image signal has been recorded by image capture or allowed image capture information for the image capture environment.

With the image processing device of this invention, it is possible to perform image processing that corresponds to the information related to the environment in which the input image signal was created.

The image processing device according to attachment 74 is the image processing device according to attachment 69 in which the input image signal includes image data and property information of the input image signal. The profile information output means outputs the profile information in accordance with the property information.

With the image processing device of this invention, it is possible to perform image processing in accordance with the property information of the input image signal. Thus, it is possible to perform image processing that is suited for the input image signal.

The image processing device according to attachment 75 is the image processing device according to attachment 74 in which the property information includes overall property information that is related to the image data overall.

Here, "overall property information" includes for example information related to the production of the image data overall or information related to the content of the image data overall.

With the image processing device of this invention, it is possible to perform image processing that is in accordance with the overall property information. Thus, it is possible to perform image processing that is suited for the image data.

The image processing device according to attachment 76 is the image processing device according to attachment 74 or 75 in which the property information includes partial property information that is related to some of the image data.

The partial property information includes for example information related to the scene content of some of the image data.

With the image processing device of this invention, it is possible to perform image processing that is in accordance with the partial property information. Thus, it is possible to perform image processing that is suited for the image data.

The image processing device according to attachment 77 is the image processing device according to attachment 74 in which the property information includes creation environment property information that is related to the environment in which the input image signal was created.

The creation environment property information is information related to the environment in which the input image signal was captured, recorded, or created, and for example includes information related to the environment when the input image signal was created, or information on the operation of the device used to create the input image signal.

With the image processing device of this invention, it is possible to perform image processing that is in correspondence with the creation environment property information. Thus, it is possible to perform image processing that is appropriate for the input image signal.

The image processing device according to attachment 78 is the image processing device according to attachment 74 in which the property information includes medium property information that is related to the medium in which the input image signal was obtained.

The medium property information is information related to the medium through which the input image signal was obtained, such as broadcast medium, transmission medium, or recording medium.

With the image processing device of this invention, it is possible to perform image processing that is in correspondence with the medium property information. Thus, it is possible to perform image processing that is appropriate for the properties of the medium.

The image processing device according to attachment 79 is the image processing device according to any one of attachments 68 to 78 in which the profile data are a two-dimensional LUT. Also, the image processing execution means includes a visual processing device according to any one of attachments 1 to 60.

With the image processing device of this invention, it is possible to obtain the same effects as any of the image processing devices according to attachments 68 to 78. It is also possible to achieve the same effects as any one of the visual processing devices according to attachments 1 to 60.

The image processing device according to attachment 80 comprises image processing execution means, profile information output means, and profile information output means. The image processing execution means performs image processing of an input image signal that has been received as input. The profile information output means outputs profile information for specifying profile data with which to perform favorable image processing of the input image signal that has been received as input. The profile information adding means adds profile information to the input image signal or the input image signal after image processing by the image processing execution means, and outputs the result.

With the image processing device of this invention, it is possible to execute processing relating the input image signal or the input image signal after image processing by the image processing execution means with profile information. Thus, a device that obtains a signal to which profile information has been added can favorably process that signal with ease.

The integrated circuit according to attachment 81 includes an image processing device according to any one of attachments 68 to 80.

With the integrated circuit of this invention, it is possible to obtain the same effects as any of the image processing devices according to attachments 68 to 80.

The display device according to attachment 82 comprises an image processing device according to any one of attachments 68 to 80, and display means that performs a display of the input image signal that has been subjected to image processing by the image processing device.

With the display device of this invention, it is possible to obtain the same effects as any of the image processing devices according to attachments 68 to 80.

The image-capturing device according to attachment 83 comprises image-capturing means that captures an image, and an image processing device according to any one of attachments 68 to 80 that processes the image that has been captured by the image-capturing means as the input image signal.

With the image-capturing device of this invention, it is possible to obtain the same effects as any of the image processing devices according to attachments 68 to 80.

The portable information terminal according to attachment 84 comprises data reception means that receives image data that have been transmitted or broadcast, an image processing device according to any one of attachments 68 to 80 that processes the image data that have been received as the input image signal, and display means that performs a display of the input image signal that has been subjected to image processing by the image processing device.

With the portable information terminal of this invention, it is possible to obtain the same effects as any of the image processing devices according to attachments 68 to 80.

The portable information terminal according to attachment 85 comprises image-capturing means that captures an image, an image processing device according to any one of attachments 68 to 80 that processes the image that has been captured by the image-capturing means as the input image signal, and data transmission means that transmits the input image signal that has been subjected to image processing.

With the portable information terminal of this invention, it is possible to obtain the same effects as any of the image processing devices according to attachments 68 to 80.

[Third Attachment]

The present invention (especially the invention described in the first to the third embodiments) can also be expressed as follows. It should be noted that dependant-type attachments set forth in this section ([Third Attachment]) are dependent on attachments set forth in the Third Attachment.

<Content of the Third Attachment>

(Attachment 1)

A visual processing device comprising:

image signal processing means that performs spatial processing of an image signal that has been received as input, and outputs a processed signal; and signal computation means that outputs an output signal based on a computation for emphasizing the respective differences in the image signal and the processed signal after each has been transformed by a predetermined transformation.

(Attachment 2)

The visual processing device according to attachment 1, wherein the signal computation means computes a value C of the output signal with respect to a value A of the image signal, a value B of the processed signal, a transformation function F1, an inverse transformation function F2 of the transformation function F1, and the enhancement function F3, according to the equation $F2(F1(A)+F3(F1(A)-F1(B)))$.

(Attachment 3)

The visual processing device according to attachment 2, wherein the transformation function F1 is a logarithmic function.

(Attachment 4)

The visual processing device according to attachment 2, wherein the inverse transformation function F2 is a gamma correction function.

(Attachment 5)

The visual processing device according to any one of attachments 2 to 4, wherein the signal computation means has signal space transformation means that transforms the signal space of the image signal and the processed signal, enhancement processing means that performs enhancement processing of a difference signal of the difference between the image signal after transformation and the processed signal after transformation, and inverse transformation means that performs inverse transformation of the signal space with respect to a sum signal obtained by summing the image signal after transformation and the difference signal after enhancement processing and outputs the result as the output signal.

(Attachment 6)

A visual processing device comprising:

image signal processing means that performs spatial processing of an image signal that has been received as input, and outputs a processed signal; and signal computation means that outputs an output signal based on a computation for emphasizing the ratio between the image signal and the processed signal.

(Attachment 7)

The visual processing device according to attachment 6, wherein the signal computation means outputs the output signal based on said calculation in which dynamic range compression of the image signal is further performed.

(Attachment 8)

The visual processing device according to attachment 6 or 7, wherein the signal computation means computes a value C of the output signal with respect to a value A of the image signal, a value B of the processed signal, a dynamic range compression function F4, and the enhancement function F5, according to the equation F4(A)*F5(A/B).

(Attachment 9)

The visual processing device according to attachment 8, wherein the dynamic range compression function F4 is a direct proportion function of a proportion coefficient 1.

(Attachment 10)

The visual processing device according to attachment 8, wherein the dynamic range compression function F4 is a monotonically increasing function.

(Attachment 11)

The visual processing device according to attachment 10, wherein the dynamic range compression function F4 is a concave function.

(Attachment 12)

The visual processing device according to attachment 8, wherein the dynamic range compression function F4 is a power function.

(Attachment 13)

The visual processing device according to attachment 12, wherein the exponent of the power function in the dynamic range compression function F4 is determined based on a target contrast value, which is a target value of the contrast when displaying the image, and an actual contrast value, which is a contrast value in the display environment when displaying the image.

(Attachment 14)

The visual processing device according to any one of attachments 8 to 13, wherein the enhancement function F5 is a power function.

(Attachment 15)

The visual processing device according to attachment 14, wherein the exponent of the power function in the enhancement function F5 is determined based on a target contrast value, which is a target value of the contrast when displaying the image, and an actual contrast value, which is a contrast value in the display environment when displaying the image.

(Attachment 16)

The visual processing device according to attachment 14 or 15, wherein the exponent of the power function in the enhancement function F5 is a value that decreases monotonically with respect to the value A of the image signal in a case where the value A of the image signal is larger than the value B of the processed signal.

(Attachment 17)

The visual processing device according to attachment 14 or 15, wherein the exponent of the power function in the enhancement function F5 is a value that increases monotonically with respect to the value A of the image signal in a case where the value A of the image signal is smaller than the value B of the processed signal.

(Attachment 18)

The visual processing device according to attachment 14 or 15, wherein the exponent of the power function in the enhancement function F5 is a value that increases monotonically with respect to the value A of the image signal in a case where the value A of the image signal is larger than the value B of the processed signal.

(Attachment 19)

The visual processing device according to attachment 14 or 15, wherein the exponent of the power function in the enhancement function F5 is a value that increases monotonically with respect to the absolute value of the difference between the value A of the image signal and the value B of the processed signal.

(Attachment 20)

The visual processing device according to any one of attachment 14 to 19, wherein at least one of a maximum value or a minimum value of the enhancement function F5 is kept within a predetermined range.

(Attachment 21)

The visual processing device according to attachment 8, wherein the signal computation means has enhancement processing means that performs enhancement processing of a divided signal that is obtained by dividing the image signal by the processed signal, and output processing means that outputs the output signal based on the image signal and the divided signal that has been subjected to enhancement processing.

(Attachment 22)

The visual processing device according to attachment 21, wherein the output processing means obtains the product of the image signal and the divided signal that has been subjected to enhancement processing.

(Attachment 23)

The visual processing device according to attachment 21, wherein the output processing means includes DR compression means that performs dynamic range (DR) compression with respect to the image signal, and obtains the product of the image signal after DR compression and the divided signal that has been subjected to enhancement processing.

(Attachment 24)

The visual processing device according to any one of attachments 8 to 23, further comprising:

first transformation means that transforms input image data of a first predetermined range to a second predetermined range, and outputs this as the image signal; and second transformation means that transforms the output signal of a third predetermined range to a fourth predetermined range, and outputs this as output image data;

wherein the second predetermined range is determined based on the target contrast value, which is the target value of the contrast when the image is displayed; and wherein the third predetermined range is determined based on the actual contrast value, which is the contrast value in the display environment when the image is displayed.

(Attachment 25)

The visual processing device according to attachment 24, wherein the dynamic range compression function F4 is a function that transforms image signal of the second predetermined range into the output signal of the third predetermined range.

(Attachment 26)

The visual processing device according to attachment 24 or 25, wherein the first transformation means transforms the minimum value and the maximum value of the first predetermined range into the minimum value and the maximum value, respectively, of the second predetermined range; and wherein the second transformation means transforms the minimum value and the maximum value of the third predetermined range into the minimum value and the maximum value, respectively, of the fourth predetermined range.

(Attachment 27)

The visual processing device according to attachment 26, wherein the transformations by the first transformation means and the second transformation means are linear transformations.

(Attachment 28)

The visual processing device according to any one of attachments 24 to 27, further comprising:

setting means that sets the third predetermined range.

(Attachment 29)

The visual processing device according to attachment 28, wherein the setting means includes storage means that stores a dynamic range of the display device for displaying an image, and measuring means that measures the luminance of the ambient light in the display environment when displaying an image.

(Attachment 30)

The visual processing device according to attachment 28, wherein the setting means includes measuring means that measures the luminance in the display environment of the display device for displaying an image when displaying black level and when displaying white level.

(Attachment 31)

A visual processing device comprising:

input signal processing means that performs spatial processing of an image signal that has been received as input, and outputs a processed signal; and signal computation means that outputs an output signal based on a computation for enhancing a difference between the image signal and the processed signal in accordance with a value of the image signal.

(Attachment 32)

The visual processing device according to attachment 31, wherein the signal computation means outputs the output signal based on a computation that adds a value that is obtained by compressing the dynamic range of the image signal to the enhanced value from the computation for enhancing.

(Attachment 33)

The visual processing device according to attachment 31 or 32, wherein the signal computation means computes a value C of the output signal with respect to a value A of the input signal, a value B of the processed signal, an enhancement amount adjustment function F6, an enhancement function F7, and a dynamic range compression function F8, according to the equation $F8(A)+F6(A)*F7(A-B)$.

(Attachment 34)

The visual processing device according to attachment 33, wherein the dynamic range compression function F8 is a direct proportion function of a proportion coefficient 1.

(Attachment 35)

The visual processing device according to attachment 33, wherein the dynamic range compression function F8 is a monotonically increasing function.

(Attachment 36)

The visual processing device according to attachment 35, wherein the dynamic range compression function F8 is a concave power function.

(Attachment 37)

The visual processing device according to attachment 33, wherein the dynamic range compression function F8 is a power function.

(Attachment 38)

The visual processing device according to attachment 33, wherein the signal computation means has enhancement processing means that performs enhancement processing of a difference signal of the difference between the image signal and the processed signal in accordance with the pixel value of the image signal, and output processing means that outputs the output signal based on the image signal and the enhanced difference signal.

(Attachment 39)

The visual processing device according to attachment 38, wherein the output processing means performs a summing process of taking the sum of the image signal and the enhanced difference signal.

(Attachment 40)

The visual processing device according to attachment 38, wherein the output processing means includes DR compression means that performs dynamic range (DR) compression with respect to the image signal, and performs a summing process of taking the sum of the DR compressed image signal and the enhanced difference signal.

(Attachment 41)

A visual processing device comprising:

input signal processing means that performs spatial processing of an image signal that has been received as input, and outputs a processed signal; and signal computation means that outputs an output signal based on a computation that adds a value obtained by correcting the gradation of the image signal to the value obtained by enhancing the difference between the image signal and the processed signal.

(Attachment 42)

The visual processing device according to attachment 41, wherein the signal computation means computes a value C of the output signal with respect to a value A of the input signal, a value B of the processed signal, an enhancement function F11, and a gradation correction function F12, according to the equation $F12(A)+F11(A-B)$.

(Attachment 43)

The visual processing device according to attachment 42, wherein the signal computation means has enhancement processing means that performs enhancement processing of a difference signal of the difference between the image signal and the processed signal, and summing means that takes the sum of the gradation-corrected image signal and the enhanced difference signal and outputs the result as an output signal.

(Attachment 44)

A visual processing method comprising:

a first transformation step of transforming an input image data of a first predetermined range to a second predetermined range, and taking this as an image signal;

a signal computation step of outputting an output signal of a third predetermined range based on a computation that includes at least one of a computation for compressing the dynamic range of the image signal, and a computation for enhancing a ratio between the image signal and a processed signal that is obtained by spatially processing the image signal; and a second transformation step of transforming the output signal of the third predetermined range to a fourth predetermined range, and taking this as output image data;

wherein the second predetermined range is determined based on a target contrast value, which is a target value of the contrast when the image is displayed; and wherein the third predetermined range is determined based on an actual contrast value, which is a contrast value in the display environment when the image is displayed.

(Attachment 45)

A visual processing device comprising:

first transformation means that transforms input image data of a first predetermined range to a second predetermined range, and takes this as an image signal;

signal computation means that outputs an output signal of a third predetermined range based on a computation that includes at least one of a computation for compressing the dynamic range of the image signal, and a computation for enhancing a ratio between the image signal and a processed signal that is obtained by spatially processing the image signal; and second transformation means that transforms the output signal of the third predetermined range to a fourth predetermined range, and takes this as output image data;

wherein the second predetermined range is determined based on a target contrast value, which is a target value of the contrast when the image is displayed; and wherein the third predetermined range is determined based on an actual contrast value, which is a contrast value in the display environment when the image is displayed.

(Attachment 46)

A visual processing program for causing a computer to perform visual processing, the visual processing program causing the computer to perform a visual processing method comprising:

a first transformation step of transforming an input image data of a first predetermined range to a second predetermined range, and taking this as an image signal;

a signal computation step of outputting an output signal of a third predetermined range based on a computation that includes at least one of a computation for compressing the dynamic range of the image signal, and a computation for enhancing a ratio between the image signal and a processed signal that is obtained by spatially processing the image signal; and a second transformation step of transforming the output signal of the third predetermined range to a fourth predetermined range, and taking this as output image data;

wherein the second predetermined range is determined based on a target contrast value, which is a target value of the contrast when the image is displayed; and wherein the third predetermined range is determined based on an actual contrast value, which is a contrast value in the display environment when the image is displayed.

<Description of the Third Attachment>

The visual processing device according to attachment 1 is provided with image signal processing means and signal computation means. The image signal processing means performs spatial processing of an image signal that has been received as input, and outputs a processed signal. The signal computation means outputs an output signal based on a computation for emphasizing the respective differences in the image signal and the processed signal after each has been transformed by a predetermined transformation.

Here, spatial processing for example refers to processing in which a low pass spatial filter is adopted for the image signal that is received as input, or processing for deriving a mean value, a maximum value, or a minimum value of the pixel being processed and the surrounding pixels of the image signal that is received as input (the same applies in the following). Also, the computation for enhancing is for example a computation for adjusting the gain, a computation for inhibiting extreme contrasts, or a computation for suppressing small amplitude noise components (the same applies in the following).

With the visual processing device of this invention, it is possible to enhance the respective differences in the image signal and the processed signal after these have been transformed to a separate space. Thus, it is possible to achieve enhancement that is suited for the viewing properties, for example.

The visual processing device according to attachment 2 is the visual processing device according to attachment 1 in which the signal computation means computes a value C of the output signal with respect to a value A of the image signal, a value B of the processed signal, a transformation function F1, an inverse transformation function F2 of the transformation function F1, and the enhancement function F3, according to the equation F2(F1(A)+F3(F1(A)−F1(B))).

The enhancement function F3 is for example a function for adjusting the gain, a function for inhibiting extreme contrasts, or a function for suppressing small amplitude noise components.

Here, the value C of the output signal indicates the following. That is, the value A of the image signal and the value B of the processed signal are transformed into values in different spaces by the transformation function F1. The difference between the value of the image signal and the value of the processed signal after transformation represents a sharp signal, for example, in a separate space. The difference between the image signal and the processed signal after transformation, in which they are enhanced by the enhancement function F3, is added to the transformed image signal. Thus, the value C of the output signal indicates a value that is obtained by enhancing the sharp signal component in a separate space.

With the visual processing device of this invention, it is for example possible to use the value A of the image signal and the value B of the processed signal, which have been transformed to separate spaces, to perform processing such as edge enhancement or contrast enhancement in a separate space.

The visual processing device according to attachment 3 is the visual processing device according to attachment 2 in which the transformation function F1 is a logarithmic function.

Here, human visual performance in general is logarithmic. Thus, by processing the image signal and the processed signal by transforming to logarithmic space, it is possible to perform visual processing that is suited for our visual characteristics.

With the visual processing device of this invention, it is possible to perform contrast enhancement having a high visual effect or dynamic range compression that maintains local contrast.

The visual processing device according to attachment 4 is the visual processing device according to attachment 2 in which the inverse transformation function F2 is a gamma correction function.

Image signals in general are subjected to gamma correction through a gamma correction function based on to the gamma characteristics of the device that inputs and outputs the image signal.

With the visual processing device of this invention, with the transformation function F1 it is possible to exclude gamma correction of the image signal and perform processing using linear characteristics. Thus, it is possible to correct optical blurring.

The visual processing device according to attachment 5 is the visual processing device according to any one of attachments 2 to 4, in which the signal computation means has signal space transformation means, enhancement processing means, and inverse transformation means. The signal space transformation means transforms the signal space of the image signal and the processed signal. The enhancement processing means performs enhancement processing of a differential signal between the image signal after transformation and the processed signal after transformation. The inverse transformation means performs inverse transformation of the signal space with respect to a sum signal obtained by summing the image signal after transformation and the differential signal after enhancement processing and outputs the result as the output signal.

With the visual processing device of this invention, the signal space transformation means transforms the signal space of the image signal and the processed signal using the transformation function F1. The enhancement processing means performs enhancement processing of a differential signal between the image signal after transformation and the processed signal after transformation. The inverse transformation means performs inverse transformation of the signal space with respect to a sum signal obtained by summing the image signal after transformation and the difference signal after enhancement processing, using the inverse transformation function F2.

The visual processing device according to attachment 6 comprises input signal processing means and signal computation means. The input signal processing means performs spatial processing of an image signal that has been received as input, and outputs a processed signal. The signal computation means outputs an output signal based on a computation for emphasizing the ratio between the image signal and the processed signal.

With the visual processing device of this invention, the ratio of the image signal to the processed signal expresses the sharp component of the image signal. Thus, it is for example possible to perform visual processing for enhancing the sharp component.

The visual processing device according to attachment 7 is the visual processing device according to attachment 6 in which the signal computation means outputs the output signal based on the calculation in which dynamic range compression of the image signal is further performed.

With the visual processing device of this invention, it is possible to enhance the sharp component of the image signal, which expresses the ratio of the image signal to the processed signal, while performing compression of the dynamic range.

The visual processing device according to attachment 8 is the visual processing device according to attachment 6 or 7, in which the signal computation means computes a value C of the output signal with respect to a value A of the image signal, a value B of the processed signal, a dynamic range compression function F4, and the enhancement function F5, according to the equation F4(A)*F5(A/B).

Here, the value C of the output signal shows the following. That is, the amount (A/B) obtained by dividing the value A of the image signal by the value B of the processed signal expresses the sharp signal, for example. Also, F5(A/B) expresses the enhancement amount of the sharp signal, for example. These show processing equivalent to transforming the value A of the image signal and the value B of the processed signal into logarithmic space and then enhancing the respective differences in each, performing enhancement processing that is suited for the visual characteristics.

With the visual processing device of this invention, it is possible to perform dynamic range compression where necessary while enhancing local contrast.

The visual processing device according to attachment 9 is the visual processing device according to attachment 8 in which the dynamic range compression function F4 is a direct proportion function of a proportion coefficient 1.

With the visual processing device of this invention, it is possible to enhance the contrast of the image signal uniformly over a range spanning dark areas to bright areas. This contrast enhancement is enhancement processing that is suited for the visual characteristics.

The visual processing device according to attachment 10 is the visual processing device according to attachment 8 in which the dynamic range compression function F4 is a monotonically increasing function.

With the visual processing device of this invention, it is possible to use the dynamic range compression function F4, which is a monotonically increasing function, to perform dynamic range compression while enhancing local contrast.

The visual processing device according to attachment 11 is the visual processing device according to attachment 10 in which the dynamic range compression function F4 is a concave function.

With the visual processing device of this invention, it is possible to use the dynamic range compression function F4, which is a concave function, to perform dynamic range compression while enhancing local contrast.

The visual processing device according to attachment 12 is the visual processing device according to attachment 8 in which the dynamic range compression function F4 is a power function.

With the visual processing device of this invention, it is possible to use the dynamic range compression function F4, which is a power function, to transform the dynamic range while enhancing local contrast.

The visual processing device according to attachment 13 is the visual processing device according to attachment 12 in which the exponent of the power function in the dynamic range compression function F4 is determined based on a target contrast value, which is a target value of the contrast when displaying the image, and an actual contrast value, which is a contrast value in the display environment when displaying the image.

Here, the target contrast value is the target value of the contrast when the image is displayed, and for example is a value that is determined by the dynamic range of the display device that will display the image. The actual contrast value is the contrast value in the display environment in which the image is to be displayed, and for example is a value that is determined by the contrast of the image displayed by the display device in a case where there is ambient light.

With the visual processing device of this invention, through the dynamic range compression function F4 it is possible to compress the dynamic range of an image signal having a dynamic range that is equal to the target contrast value to a dynamic range that is equal to the actual contrast value.

The visual processing device according to attachment 14 is the visual processing device according to any one of the attachments 8 to 13, in which the enhancement function F5 is a power function.

With the visual processing device of this invention, it is possible to use the enhancement function F5, which is a power function, to enhance local contrast, allowing the dynamic range to be transformed visually.

The visual processing device according to attachment 15 is the visual processing device according to attachment 14 in which the exponent of the power function in the enhancement function F5 is determined based on a target contrast value, which is a target value of the contrast when displaying the image, and an actual contrast value, which is a contrast value in the display environment when displaying the image.

With the visual processing device of this invention, it is possible to use the enhancement function F5, which is a power function, to enhance local contrast, allowing the dynamic range to be transformed visually.

The visual processing device according to attachment 16 is the visual processing device according to attachment 14 or 15 in which the exponent of the power function in the enhancement function F5 is a value that decreases monotonically with respect to the value A of the image signal in a case where the value A of the image signal is larger than the value B of the processed signal.

With the visual processing device of this invention, of those pixels being processed having a higher luminance than the surrounding pixels in the image signal, it is possible to lower the enhancement of local contrast in high-luminance areas. Thus, it is possible to inhibit "blooming" in the visually processed image.

The visual processing device according to attachment 17 is the visual processing device according to attachment 14 or 15 in which the exponent of the power function in the enhancement function F5 is a value that increase monotonically with respect to the value A of the image signal in a case where the value A of the image signal is smaller than the value B of the processed signal.

With the visual processing device of this invention, of those pixels being processed having a lower luminance than the surrounding pixels in the image signal, it is possible to lower the enhancement of local contrast in low-luminance areas. Thus, it is possible to inhibit "black squashing" in the visually processed image.

The visual processing device according to attachment 18 is the visual processing device according to attachment 14 or 15 in which the exponent of the power function in the enhancement function F5 is a value that increases monotonically with respect to the value A of the image signal in a case where the value A of the image signal is larger than the value B of the processed signal.

With the visual processing device of this invention, of those pixels being processed having a higher luminance than the surrounding pixels in the image signal, it is possible to lower the enhancement of local contrast in low-luminance areas. Thus, the SN ratio is kept from becoming worse in the visually processed image.

The visual processing device according to attachment 19 is the visual processing device according to attachment 14 or 15 in which the exponent of the power function in the enhancement function F5 is a value that increases monotonically with respect to the absolute value of the difference between the value A of the image signal and the value B of the processed signal.

Here, it is also possible to define the value that monotonically increases with respect to the absolute value of the difference between the value A of the image signal and the value B of the processed signal as a value that is greater in magnitude the closer the ratio of the value A of the image signal to the value B of the processed signal is to one.

With the visual processing device of this invention, it is possible to in particular enhance the local contrast of target pixels having little difference in brightness compared to the surrounding pixels in the image signal, and to keep from over enhancing the local contrast in pixels being processed having significant difference in brightness compared to the surrounding pixels in the image signal.

The visual processing device according to attachment 20 is the visual processing device according to any one of attachments 14 to 19 in which at least one of a maximum value or a minimum value of the enhancement function F5 is kept within a predetermined range.

With the visual processing device of this invention, it is possible to keep the enhancement amount of the local contrast within an appropriate range.

The visual processing device according to attachment 21 is the visual processing device according to attachment 8 in which the signal computation means has enhancement processing means and output processing means. The enhancement processing means performs enhancement processing of a divided signal that is obtained by dividing the image signal by the processed signal. The output processing means outputs the output signal based on the image signal and the divided signal that has been subjected to enhancement processing.

With the visual processing device of this invention, enhancement processing means uses the enhancement function F5 to perform enhancement processing of a divided signal that is obtained by dividing the image signal by the processed signal. The output processing means outputs the output signal based on the image signal and the divided signal.

The visual processing device according to attachment 22 is the visual processing device according to attachment 21 in which the output processing means obtains the product of the image signal and the divided signal that has been subjected to enhancement processing.

With the visual processing device of this invention, the dynamic range compression function F4 is for example a direct proportion function of a proportion coefficient 1.

The visual processing device according to attachment 23 is the visual processing device according to attachment 21 in which the output processing means includes DR compression means that performs dynamic range (DR) compression with respect to the image signal, and obtains the product of the image signal after DR compression and the enhanced divided signal.

With the visual processing device of this invention, the DR compression means performs dynamic range compression of the image signal using the dynamic range compression function F4.

The visual processing device according to attachment 24 is the visual processing device according to any one of attachments 8 to 23, further comprising first transformation means and second transformation means. The first transformation means transforms input image data of a first predetermined range to a second predetermined range, and outputs this as the image signal. The second transformation means transforms the output signal of a third predetermined range to a fourth predetermined range, and outputs this as output image data. The second predetermined range is determined based on the target contrast value, which is the target value of the contrast when the image is displayed. The third predetermined range is determined based on the actual contrast value, which is the contrast value in the display environment when the image is displayed.

With the visual processing device of this invention, it is possible to compress the dynamic range of the image overall down to the actual contrast value that has dropped due to the presence of ambient light, while locally maintaining the target contrast value. Thus, the image after visual processing has an improved visual effect.

The visual processing device according to attachment 25 is the visual processing device according to attachment 24 in which the dynamic range compression function F4 is a function that transforms the image signal of the second predetermined range into the output signal of the third predetermined range.

With the visual processing device of this invention, the dynamic range of the image overall is compressed down to the third predetermined range due to the dynamic range compression function F4.

The visual processing device according to attachment 26 is the visual processing device according to attachment 24 or 25 in which the first transformation means transforms the minimum value and the maximum value of the first predetermined range into the minimum value and the maximum value, respectively, of the second predetermined range. The second transformation means transforms the minimum value and the maximum value of the third predetermined range into the minimum value and the maximum value, respectively, of the fourth predetermined range.

The visual processing device according to attachment 27 is the visual processing device according to attachment 26 in which the transformations by the first transformation means and the second transformation means are linear transformations.

The visual processing device according to attachment 28 is the visual processing device according to any one of attachments 24 to 27, further comprising setting means that sets the third predetermined range.

With the visual processing device of this invention, it is possible to set the third predetermined range in accordance with the display environment of the display device that is to display the image. Thus, it is possible to more suitably correct the ambient light.

The visual processing device according to attachment 29 is the visual processing device according to attachment 28 in which the setting means includes storage means that stores a dynamic range of the display device for displaying an image, and measuring means that measures the luminance of the ambient light in the display environment when displaying an image.

With the visual processing device of this invention, it is possible to measure the luminance of the ambient light and then determine the actual contrast value from the luminance that has been measured and the dynamic range of the display device.

The visual processing device according to attachment 30 is the visual processing device according to attachment 28 in which the setting means includes measuring means that measures the luminance in the display environment of the display device for displaying an image when displaying black level and when displaying white level.

With the visual processing device of this invention, it is possible to measure the luminance when displaying black level and when displaying white level in the display environment and from these to determine the actual contrast value.

The visual processing device according to attachment 31 comprises input signal processing means and signal computation means. The input signal processing means performs spatial processing of an image signal that has been received as input, and outputs a processed signal. The signal computation means outputs an output signal based on a computation for enhancing a difference between the image signal and the processed signal in accordance with a value of the image signal.

With the visual processing device of this invention, it is for example possible to enhance the sharp component of the image signal, which is the difference between the image signal and the processed signal, in accordance with the value of the image signal. Thus, it is possible to perform appropriate enhancement over a range spanning dark areas to bright areas of the image signal.

The visual processing device according to attachment 32 is the visual processing device according to attachment 31 in which the signal computation means outputs the output signal based on a computation that adds a value that is obtained by compressing the dynamic range of the image signal to the enhanced value from the computation for enhancing.

With the visual processing device of this invention, it is for example possible to enhance the sharp component, for example, of the image signal in accordance with the value of the image signal and at the same time to compress the dynamic range.

The visual processing device according to attachment 33 is the visual processing device according to attachment 31 or 32 in which the signal computation means computes a value C of the output signal with respect to a value A of the image signal, a value B of the processed signal, an enhancement amount adjustment function F6, an enhancement function F7, and a dynamic range compression function F8, according to the equation $F8(A)+F6(A)*F7(A-B)$.

Here, the value C of the output signal shows the following. That is, the difference (A–B) between the value A of the image signal and the value B of the processed signal expresses the sharp signal, for example. Also, F7(A–B) for example expresses the enhancement amount of the sharp signal. The enhancement amount is adjusted by the enhancement amount adjustment function F6 in accordance with the value A of the image signal, and where necessary is added to the value of the image signal after its dynamic range has been compressed.

With the visual processing device of this invention, in areas where the value A of the image signal is large it is for example possible to maintain the contrast over a range spanning dark areas to bright areas by reducing the enhancement amount, for example. It is possible to maintain local contrast over a range spanning dark areas to bright areas even when dynamic range compression has been performed.

The visual processing device according to attachment 34 is the visual processing device according to attachment 33 in which the dynamic range compression function F8 is a direct proportion function of a proportion coefficient 1.

With the visual processing device of this invention, it is possible to enhance the contrast uniformly over dark to bright areas of the image signal.

The visual processing device according to attachment 35 is the visual processing device according to attachment 33 in which the dynamic range compression function F8 is a monotonically increasing function.

With the visual processing device of this invention, it is possible to use the dynamic range compression function F8, which is a monotonically increasing function, to perform dynamic range compression while maintaining local contrast.

The visual processing device according to attachment 36 is the visual processing device according to attachment 35 in which the dynamic range compression function F8 is a concave function.

With the visual processing device of this invention, it is possible to use the dynamic range compression function F8, which is a concave function, to perform dynamic range compression while maintaining local contrast.

The visual processing device according to attachment 37 is the visual processing device according to attachment 33 in which the dynamic range compression function F8 is a power function.

With the visual processing device of this invention, it is possible to use the dynamic range compression function F8, which is a power function, to transform the dynamic range while maintaining local contrast.

The visual processing device according to attachment 38 is the visual processing device according to attachment 33 in which the signal computation means has enhancement processing means and output processing means. The enhancement processing means performs enhancement processing of a difference signal of the difference between the image signal and the processed signal in accordance with the pixel value of the image signal. The output processing means outputs the output signal based on the image signal and the enhanced difference signal.

With the visual processing device of this invention, the enhancement processing means performs enhancement processing using the enhancement function F7, in which the enhancement amount has been adjusted by the enhancement amount adjustment function F6. The output processing means outputs an output signal based on the image signal and the difference signal.

The visual processing device according to attachment 39 is the visual processing device according to attachment 38 in which the output processing means performs a summing process of taking the sum of the image signal and the enhanced difference signal.

With the visual processing device of this invention, the dynamic range compression function F8 is for example a direct proportion function of a proportion coefficient 1.

The visual processing device according to attachment 40 is the visual processing device according to attachment 38 in which the output processing means includes DR compression means that performs dynamic range (DR) compression with respect to the image signal, and performs a summing process of taking the sum of the DR compressed image signal and the enhanced difference signal.

With the visual processing device of this invention, the DR compression means uses the dynamic range compression function F8 to perform dynamic compression of the image signal.

The visual processing device according to attachment 41 comprises input signal processing means and signal computation means. The input signal processing means performs spatial processing of an image signal that has been received as input, and outputs a processed signal. The signal computation means outputs an output signal based on a computation that adds a value obtained by correcting the gradation of the image signal to the value obtained by enhancing the difference between the image signal and the processed signal.

With the visual processing device of this invention, the difference between the image signal and the processed signal expresses the sharp component of the image signal. Also, enhancement of the sharp component and gradation correction of the image signal are performed independently. Thus, it is possible to perform a constant enhancement of the sharp component regardless of the gradation correction amount of the image signal.

The visual processing device according to attachment 42 is the visual processing device according to attachment 41 in which the signal computation means computes a value C of the output signal with respect to a value A of the input signal, a value B of the processed signal, an enhancement function F11, and a gradation correction function F12, according to the equation F12(A)+F11(A−B).

Here, the value C of the output signal shows the following. That is, the difference (A−B) between the value A of the image signal and the value B of the processed signal expresses the sharp signal, for example. Also, F11(A−B) for example expresses the enhancement processing of the sharp signal. It also indicates that the gradation-corrected image signal and the enhanced sharp signal have been added.

With the visual processing device of this invention, it is possible to perform a fixed contrast enhancement regardless of the gradation correction.

The visual processing device according to attachment 43 is the visual processing device according to attachment 42 in which the signal computation means has enhancement processing means and summing means. The enhancement processing means performs enhancement processing of a difference signal of the difference between the image signal and the processed signal. The summing means takes the sum of the gradation-corrected image signal and the enhanced difference signal and outputs the result as an output signal.

With the visual processing device of this invention, the enhancement processing means performs enhancement processing of the difference signal using the enhancement function F11. The summing means uses the gradation correction function F12 to take the sum of the gradation-processed image signal and the enhanced difference signal.

The visual processing method according to attachment 44 comprises a first transformation step, a signal computation step, and a second transformation step. The first transformation step is step of transforming an input image data of a first predetermined range to a second predetermined range, and taking this as an image signal. The signal computation step is a step of outputting an output signal of a third predetermined range based on a computation that includes at least one of a computation for compressing the dynamic range of the image signal, and a computation for enhancing a ratio between the image signal and a processed signal that is obtained by spatially processing the image signal. The second transformation step is a step of transforming the output signal of the third predetermined range to a fourth predetermined range, and taking this as output image data. The second predetermined range is determined based on a target contrast value, which is a target value of the contrast when the image is displayed. The third predetermined range is determined based on an actual contrast value, which is a contrast value in the display environment when the image is displayed.

With the visual processing method of this invention, it is for example possible to compress the dynamic range of the overall image down to the actual contrast value that has dropped due to the presence of ambient light, while locally maintaining the target contrast value. Thus, the image after visual processing has an improved visual effect.

The visual processing device according to attachment 45 comprises first transformation means, signal computation means, and second transformation means. The first transformation means transforms input image data of a first predetermined range to a second predetermined range, and takes this as an image signal. The signal computation means outputs an output signal of a third predetermined range based on a computation that includes at least one of a computation for compressing the dynamic range of the image signal, and a computation for enhancing a ratio between the image signal and a processed signal that is obtained by spatially processing the image signal. The second transformation means transforms the output signal of the third predetermined range to a fourth predetermined range, and takes this as output image data. The second predetermined range is determined based on a target contrast value, which is a target value of the contrast when the image is displayed. The third predetermined range is determined based on an actual contrast value, which is a contrast value in the display environment when the image is displayed.

With the visual processing device of this invention, it is for example possible to compress the dynamic range of the overall image down to the actual contrast value that has dropped due to the presence of ambient light, while locally maintaining the target contrast value.

Thus, the image after visual processing has an improved visual effect. The visual processing program according to attachment 46 is a visual processing program for causing a computer to perform visual processing, the visual processing program causing the computer to perform a visual processing method that comprises a first transformation step, a signal computation step, and a second transformation step.

The first transformation step is a step of transforming an input image data of a first predetermined range to a second predetermined range, and taking this as an image signal. The signal computation step is a step of outputting an output signal of a third predetermined range based on a computation that includes at least one of a computation for compressing the dynamic range of the image signal, and a computation for enhancing a ratio between the image signal and a processed signal that is obtained by spatially processing the image signal. The second transformation step is a step of transforming the output signal of the third predetermined range to a fourth predetermined range, and taking this as output image data. The second predetermined range is determined based on a target contrast value, which is a target value of the contrast when the image is displayed. The third predetermined range is determined based on an actual contrast value, which is a contrast value in the display environment when the image is displayed.

With the visual processing program of this invention, it is for example possible to compress the dynamic range of the overall image down to the actual contrast value that has dropped due to the presence of ambient light, while locally maintaining the target contrast value. Thus, the image after visual processing has an improved visual effect.

With the visual processing device of the present invention, it is possible to provide a device that has a hardware configuration that does not depend on the visual processing that is achieved, and this device can be favorably employed as a visual processing device, and in particular, as a visual processing device that performs visual processing such as spatial processing or gradation processing of an image signal.

The invention claimed is:

1. A visual processing device comprising:
a spatial signal processing unit operable to output a processed signal generated by performing a predetermined processing on an input image signal based on information from a plurality of pixels surrounding a target pixel of the input image signal; and
a visual processing unit operable to perform visual processing on the input image signal and operable to output an output signal as a result of the visual processing, the visual processing being performed using the input image signal and the processed signal output by the spacial signal processing unit,
wherein the visual processing unit performs the visual processing, such that, within a predetermined input range of the input image signal and the processed signal, and with respect to a specific value of the input image signal, a corresponding value of the output signal decreases as a corresponding value of the processed signal increases, and
wherein the visual processing unit performs the visual processing, such that, within the predetermined input range of the input image signal and the processed signal, and when a value of the input image signal and a value of the processed signal are a same value, a value of the output signal is obtained based on a concave function of the value of the input image signal.

2. The visual processing device according to claim 1, wherein a transformation relationship provided by a transformation unit identifies a relationship between the input image signal, the processed signal and the output signal, such that, in the identified relationship, at least a portion of the input image signal or at least a portion of the processed signal, and at least a portion of the output signal have a nonlinear relationship.

3. The visual processing device according to claim 2, wherein, in the relationship identified the transformation relationship provided by the transformation unit, both the input image signal and the processed signal have a nonlinear relationship with the output signal.

4. The visual processing device according to claim 1, wherein a transformation relationship provided by a transformation unit identifies a relationship between the input image signal, the processed signal and the output signal, such that the identified relationship is determined based on a computation for enhancing a value calculated from the input image signal and the processed signal.

5. The visual processing device according to claim 4, wherein the computation for enhancing the value calculated from the input image signal and the processed signal is a nonlinear function.

6. The visual processing device according to claim 4, wherein the computation for enhancing the value calculated from the input image signal and the processed signal is a transformation that uses a value obtained by transforming the input image signal or the processed signal.

7. The visual processing device according to claim 4, wherein the computation for enhancing the value calculated from the input image signal and the processed signal is an enhancement function that enhances a difference between each of a plurality of transformed values obtained by transforming the input image signal and the processed signal.

8. The visual processing device according to claim 4, wherein the computation for enhancing the value calculated from the input image signal and the processed signal is an enhancement function that enhances a ratio between the input image signal and the processed signal.

9. The visual processing device according to claim 1, wherein a transformation relationship provided by a transformation unit identifies a relationship between the input image signal, the processed signal and the output signal, such that the identified relationship is determined based on a transformation that changes a brightness.

10. The visual processing device according to claim 9, wherein the transformation that changes the brightness is a transformation that alters a level or a gain of the input image signal.

11. The visual processing device according to claim 9, wherein the transformation that changes the brightness is a transformation that is determined based on the processed signal.

12. The visual processing device according to claim 9, wherein the transformation that changes the brightness is a transformation according to which output signals that monotonically decrease with respect to the processed signal are output.

13. The visual processing device according to claim 1, wherein a transformation unit stores a relationship between the input image signal and the output signal as a plurality of gradation transformation curve groups, such that each gradation transformation curve group of the plurality of gradation transformation curve groups includes a plurality of gradation transformation curves.

14. The visual processing device according to claim 13, wherein the processed signal is a signal for selecting a corresponding gradation transformation curve from the plurality of gradation transformation curve groups.

15. The visual processing device according to claim 14, wherein a value of the processed signal is associated with at least one gradation transformation curve included in the plurality of gradation transformation curve groups.

16. The visual processing device according to claim 1, wherein a transformation unit includes a lookup table (LUT), and wherein profile data created in advance through a predetermined computation is registered to the LUT.

17. The visual processing device according to claim 16, wherein the LUT can be changed through a registration of the profile data.

18. The visual processing device according to claim 16, further comprising a profile data registration unit for registering the profile data to the visual processing unit.

19. The visual processing device according to claim 18, wherein the visual processing unit obtains the profile data, which has been created by an external device.

20. The visual processing device according to claim 19, wherein the LUT can be changed by the obtained profile data.

21. The visual processing device according to claim 19, wherein the visual processing unit obtains the profile data over a communications network.

22. The visual processing device according to claim 16, further comprising a profile data creation unit operable to create the profile data.

23. The visual processing device according to claim 22, wherein the profile data creation unit creates the profile data based on a histogram of gradation characteristics of the input image signal.

24. The visual processing device according to claim 16, wherein the profile data registered to the LUT is switched in accordance with a predetermined condition.

25. The visual processing device according to claim 24, wherein the predetermined condition is a condition relating to a brightness.

26. The visual processing device according to claim 25, wherein the brightness is a brightness of the input image signal.

27. The visual processing device according to claim 26, further comprising a brightness determination unit operable to determine the brightness of the input image signal,
wherein the profile data registered to the LUT is switched in accordance with results of the determination of the brightness of the input image signal by the brightness determination unit.

28. The visual processing device according to claim 25, further comprising a brightness input unit operable to allow the condition relating to the brightness to be input,
wherein the profile data registered to the LUT is switched in accordance with results of the input of the condition relating to the brightness allowed by the brightness input unit.

29. The visual processing device according to claim 28, wherein the brightness input unit allows a brightness of an output environment of the output signal, or a brightness of an input environment of the input image signal, to be input.

30. The visual processing device according to claim 25, further comprising a brightness detection unit operable to detect at least two types of brightness,
wherein the profile data registered to the LUT is switched in accordance with results of the detection of the at least two types of brightness by the brightness detection unit.

31. The visual processing device according to claim 30, wherein a brightness of the at least two types of brightness detected by the brightness detection unit includes a brightness of the input image signal, and a brightness of an output environment of the output signal or a brightness of an input environment of the input image signal.

32. The visual processing device according to claim 24, further comprising a profile data selection unit operable to allow the profile data registered to the LUT to be selected,
wherein the profile data registered to the LUT is switched in accordance with results of the selection of the profile data allowed by the profile data selection unit.

33. The visual processing device according to claim 32, wherein the profile data selection unit is an input device for performing the selection of the profile data.

34. The visual processing device according to claim 24, further comprising an image property determination unit operable to determine an image property of the input image signal,
wherein the profile data registered to the LUT is switched in accordance with results of the determination of the image property of the input image signal by the image property determination unit.

35. The visual processing device according to claim 24, further comprising a user authentication unit operable to authenticate a user,
wherein the profile data registered to the LUT is switched according to results of the authentication of the user by the user authentication unit.

36. The visual processing device according to claim 16, wherein the visual processing unit performs an interpolation computation of values stored in the LUT and outputs the output signal.

37. The visual processing device according to claim 36, wherein the interpolation computation is a linear interpolation based on values of lower bits of at least one of the input image signal and the processed signal, which are expressed in binary form.

38. The visual processing device according to claim 1, wherein the spacial signal processing unit performs spatial processing with respect to the input image signal.

39. The visual processing device according to claim 38, wherein the spatial signal processing unit creates an unsharp signal from the input image signal.

40. The visual processing device according to claim 38, wherein the spatial signal processing unit derives, through the spatial processing, a mean value, a maximum value, or a minimum value of the input image signal.

41. The visual processing device according to claim 1, wherein the visual processing unit performs spatial processing and gradation processing using the input image signal and the processed signal.

42. An integrated circuit that includes the visual processing device according to claim 1.

43. A display device comprising:
the visual processing device according to claim 1; and
a display unit that performs a display of the output signal that is output from the visual processing device.

44. An image-capturing device comprising:
an image-capturing unit operable to capture an image; and
the visual processing device according to claim 1 operable to visually process the image captured by the image-capturing unit, as the input image signal.

45. A portable information terminal comprising:
A data reception unit operable to receive transmitted or broadcast image;
the visual processing device according to claim 1 operable to visually process the transmitted or broadcast image data received by the data reception unit, as the input image signal; and
a display unit operable to perform a display of the input image signal that has been visually processed by the visual processing device.

46. A portable information terminal comprising:
an image-capturing unit operable to capture an image;
the visual processing device according to claim 1 operable to visually process the image captured by the image-capturing unit, as the input image signal; and
a data transmission unit that transmits a result of the visual processing of the image.

47. A visual processing method, comprising:
performing predetermined processing on an input image signal based on information from a plurality of pixels surrounding a target pixel of the input image signal and outputting, as a processed signal, a result of the predetermined processing performed on the input image signal; and
performing, by a processor, visual processing on the input image signal and outputting an output signal as a result of the visual processing, the visual processing being performed using the input image signal and the processed signal output by said performing of the predetermined processing,
wherein said performing of the visual processing performs the visual processing, such that, within a predetermined input range of the input image signal and the processed signal, and with respect to a specific value of the input image signal, a corresponding value of the output signal decreases as a corresponding value of the processed signal increases, and wherein said performing of the visual processing performs the visual processing, such that, within the predetermined input range of the input image signal and the processed signal, and when a value of the input image signal and a value of the processed signal are a same value, a value of the output signal is obtained based on a concave function of the value of the input image signal.

48. A non-transitory computer-readable recording medium having a visual processing program stored thereon, the visual processing program for performing a visual processing method on a computer by causing the computer to execute the visual processing method comprising:
performing predetermined processing on an input image signal based on information from a plurality of pixels surrounding a target pixel of the input image signal and outputting, as a processed signal, a result of the predetermined processing performed on the input image signal; and
performing visual processing on the input image signal and outputting an output signal as a result of the visual processing, the visual processing being performed using the input image signal and the processed signal output by said performing of the predetermined processing,
wherein said performing of the visual processing performs the visual processing, such that, within a predetermined input range of the input image signal and the processed signal, and with respect to a specific value of the input image signal, a corresponding value of the output signal decreases as a corresponding value of the processed signal increases, and
wherein said performing of the visual processing performs the visual processing, such that, within the predetermined input range of the input image signal and the processed signal, and when a value of the input image signal and a value of the processed signal are a same value, a value of the output signal is obtained based on a concave function of the value of the input image signal.

* * * * *